US012516194B2

(12) United States Patent
He et al.

(10) Patent No.: US 12,516,194 B2
(45) Date of Patent: Jan. 6, 2026

(54) REACTIVE NAVY TO BLACK DYE COMPOSITION AND DYE PRODUCT THEREOF

(71) Applicants: ZHEJIANG KEYONG CHEMICAL CO., LTD., Shaoxing (CN); SHANGHAI KEHUA DYESTUFF INDUSTRY CO., LTD., Shanghai (CN); ZHEJIANG LONGSHENG GROUP CO., LTD., Zhejiang (CN)

(72) Inventors: Xubin He, Shaoxing (CN); Zhuan Wang, Shaoxing (CN); Quanhui He, Shaoxing (CN); Peng Zhao, Shaoxing (CN); Jianliang Shen, Shaoxing (CN); Shuyi Fang, Shaoxing (CN)

(73) Assignees: ZHEJIANG KEYONG CHEMICAL CO., LTD., Shaoxing (CN); SHANGHAI KEHUA DYESTUFF INDUSTRY CO., LTD., Shanghai (CN); ZHEJIANG LONGSHENG GROUP CO., LTD., Zhejiang (CN)

( * ) Notice: Subject to any disclaimer, the term of this patent is extended or adjusted under 35 U.S.C. 154(b) by 464 days.

(21) Appl. No.: 18/253,019

(22) PCT Filed: Jul. 6, 2021

(86) PCT No.: PCT/CN2021/104713
§ 371 (c)(1),
(2) Date: May 15, 2023

(87) PCT Pub. No.: WO2022/134535
PCT Pub. Date: Jun. 30, 2022

(65) Prior Publication Data

US 2024/0002669 A1 Jan. 4, 2024

(30) Foreign Application Priority Data

Dec. 26, 2020 (CN) ........................ 202011570956.7

(51) Int. Cl.
*C09B 56/00* (2006.01)
*C09B 56/04* (2006.01)

(52) U.S. Cl.
CPC .................................... *C09B 56/04* (2013.01)

(58) Field of Classification Search
CPC . C09B 56/04; C09B 67/0057; C09B 67/0059; D06P 1/384; D06P 3/666
(Continued)

(56) References Cited

U.S. PATENT DOCUMENTS 5,634,949 A * 6/1997 Hohmann ............. D06P 1/6495 8/918
10,954,392 B2 * 3/2021 Wang ........................ D06P 3/24
(Continued)

FOREIGN PATENT DOCUMENTS

CN 1730566 A 2/2006
CN 100582168 C 1/2010
(Continued)

OTHER PUBLICATIONS

STIC Search Report dated Oct. 8, 2025.*

*Primary Examiner* — Eisa B Elhilo
(74) *Attorney, Agent, or Firm* — MUNCY, GEISSLER, OLDS & LOWE, P.C.

(57) ABSTRACT

A reactive navy to black dye composition comprises component A and component B. Component A is one or more selected from the group consisting of dye compounds of formula (I) and alkali metal salts thereof, and component B is one or more selected from the group consisting of dye compounds of formula (II) and alkali metal salts thereof, based on component A and component B, component A has a mass percentage of 5% to 50%, and component B has a mass percentage of 50% to 95%. The present invention also
(Continued)

provides a reactive navy to black dye product comprising the reactive navy to black dye composition. The reactive navy to black dye composition and dye product thereof with properties such as good fastness to washing, high degree of fixation and good build-up, which is suitable for printing and dyeing of nitrogen-containing and/or hydroxyl-containing fiber materials and blended fabrics thereof.

(I)

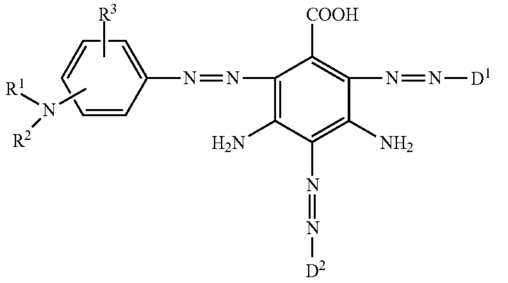

(II)

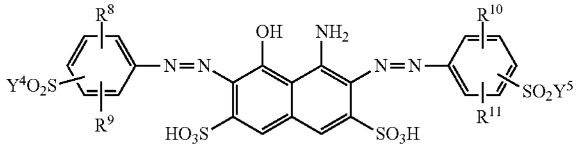

20 Claims, 1 Drawing Sheet

(58) Field of Classification Search
USPC .............................................................. 8/543
See application file for complete search history.

(56) References Cited

U.S. PATENT DOCUMENTS

| | | | | |
|---|---|---|---|---|
| 2006/0112504 A1* | 6/2006 | Huang | ................ | C09B 67/0059<br>8/636 |
| 2015/0232668 A1* | 8/2015 | Wang | ........................ | D06P 1/38<br>534/810 |
| 2020/0283634 A1* | 9/2020 | Wang | ........................ | D06P 3/66 |

FOREIGN PATENT DOCUMENTS

| | | | | | |
|---|---|---|---|---|---|
| CN | 103703083 | A | | 4/2014 | |
| CN | 104059000 | A | | 9/2014 | |
| CN | 104059387 | A | | 9/2014 | |
| CN | 105176141 | A | * | 12/2015 | |
| CN | 105778561 | A | | 7/2016 | |
| CN | 106566281 | A1 | * | 4/2017 | ......... C09B 67/0057 |
| CN | 108102423 | A | | 6/2018 | |
| CN | 112574592 | A | | 3/2021 | |
| CN | 112679987 | A | | 4/2021 | |
| CN | 112679988 | A | | 4/2021 | |
| EP | 1669415 | A1 | * | 6/2006 | ......... C09B 67/0057 |

* cited by examiner

REACTIVE NAVY TO BLACK DYE COMPOSITION AND DYE PRODUCT THEREOF

TECHNICAL FIELD

The present invention relates to a reactive dye composition and dye product thereof, especially a reactive navy to black dye composition suitable for printing and dyeing of nitrogen-containing and/or hydroxyl-containing fiber materials, and dye product thereof.

Background Art

Reactive black dye KNB has become the most widely used reactive black dye due to its low price, good fastnesses and easy washing. However, the dye has low substantivity to fiber, and its dye-uptake and degree of fixation are not high. Aiming at the shortcomings of the reactive black dye KNB, dye researchers have done a lot of work in the research and development of reactive black dyes in recent years. In the actual application process, existing composite reactive black products, such as described in patents CN100582168A, CN1730566A, and the like, still have problems such as poor build-up and not good fastness to washing.

SUMMARY OF THE INVENTION

To solve the above problems, the object of the present invention is to provide a reactive navy to black dye composition and dye product thereof with properties such as good fastness to washing, high degree of fixation and good build-up, which is suitable for printing and dyeing of nitrogen-containing and/or hydroxyl-containing fiber materials and blended fabrics thereof.

In order to achieve the above object, the present invention adopts the technical solution as follows:

The present invention provides a reactive navy to black dye composition, comprising component A and component B, wherein component A is one or more selected from the group consisting of dye compounds of formula (I) and alkali metal salts thereof, and component B is one or more selected from the group consisting of dye compounds of formula (II) and alkali metal salts thereof; based on component A and component B, component A has a mass percentage of 5% to 50%, and component B has a mass percentage of 50% to 95%, (I)

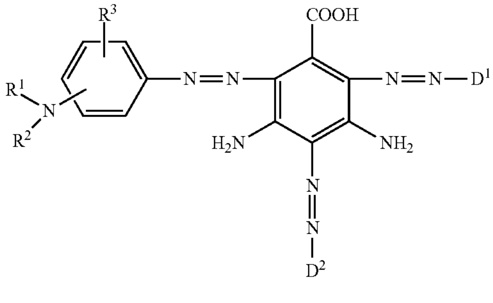

-continued (II)

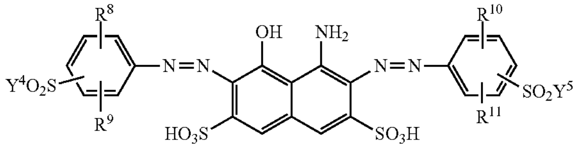

in formula (I):

$D^1$ and $D^2$ are each independently a group represented by the following formula (a) or (b);

in the above formulae (a)

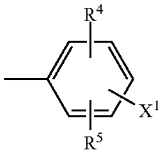

(b)

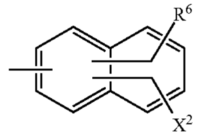

(I), (a) and (b)

$R^1$ and $R^2$ are each independently hydrogen, oxygen, —$COR^7$, $C_1$~$C_4$ alkyl or $C_1$~$C_4$ alkyl substituted by hydroxyl, sulfo or carboxyl, in which $R^7$ is $C_1$~$C_4$ alkyl, $C_2$~$C_4$ alkenyl or —$NH_2$;

$R^3$ is hydrogen, $C_1$~$C_4$ alkyl, $C_1$~$C_4$ alkoxy, carboxyl or sulfo;

$R^4$~$R^6$ are each independently hydrogen, $C_1$~$C_4$ alkyl, $C_1$~$C_4$ alkoxy or sulfo;

$X^1$ and $X^2$ are each independently —$SO_2Y^1$, —$NHCO(CH_2)_pSO_2Y^2$ or —$CONH(CH_2)_qSO_2Y^3$, wherein $Y^1$~$Y^3$ are each independently —$CH{=}CH_2$, —$CH_2CH_2OSO_3H$ or —$CH_2CH_2Cl$, p=1-3 and q=1-3;

in formula (II):

$R^8$~$R^{11}$ are each independently hydrogen, $C_1$~$C_4$ alkyl, $C_1$~$C_4$ alkoxy or sulfo;

$Y^4$ and $Y^5$ are each independently —$CH{=}CH_2$, —$CH_2CH_2OSO_3H$ or —$CH_2CH_2Cl$.

In the present invention, the $C_1$~$C_4$ alkyl may be methyl, ethyl, n-propyl, isopropyl, n-butyl, isobutyl, tert-butyl, etc.; the $C_1$~$C_4$ alkoxy may be methoxy, ethoxy, n-propoxy, isopropoxy, n-butoxy, isobutoxy, tert-butoxy, etc.

Further, both $D^1$ and $D^2$ are preferably the group of formula (a) or (b).

More further, both $D^1$ and $D^2$ are preferably the group of formula (a).

Further, $R^1$ and $R^2$ are each independently preferably hydrogen or —$COR^7$, in which $R^7$ is methyl or —$NH_2$.

Further, $R^3$ is preferably hydrogen, methyl, methoxy, carboxyl or sulfo.

Further, $R^4$~$R^6$ are each independently preferably hydrogen, methyl, methoxy or sulfo.

Further, $X^1$ and $X^2$ are each independently preferably —$SO_2Y^1$, —$NHCOCH_2CH_2SO_2Y^2$ or —$CONHCH_2CH_2SO_2Y^3$, wherein $Y^1$~$Y^3$ are each independently —$CH{=}CH_2$ or —$CH_2CH_2OSO_3H$.

Further, $R^8$~$R^{11}$ are each independently preferably hydrogen, methyl, methoxy or sulfo.

Further, $Y^4$ and $Y^5$ are each independently preferably $—CH{=}CH_2$ or $—CH_2CH_2OSO_3H$.

As the first preferred solution of the present invention, the reactive navy to black dye composition consists of component A and component B.

As the second preferred solution of the present invention, the reactive navy to black dye composition also comprises component C, and component C is one or more selected from the group consisting of compounds of formulae (III)~(IV) and alkali metal salts thereof, in the composition, the mass of component C is 1% to 50%, preferably is 1% to 40%, of the total mass of component A and component B:

component A, which is at least one selected from the group consisting of dye compounds of formula (I) and alkali metal salts thereof;

component B, which is at least one selected from the group consisting of dye compounds of formula (II) and alkali metal salts thereof;

and component C, which is at least one selected from the group consisting of dye compounds of formula (III) and/or formula (IV) and alkali metal salt thereof, wherein both a and b are 0, or one of a and b is 0 while the other is 1, c is 1, and d is 0 or 1.

Further, the reactive navy to black dye composition consists of component A, component B and component C.

(III)

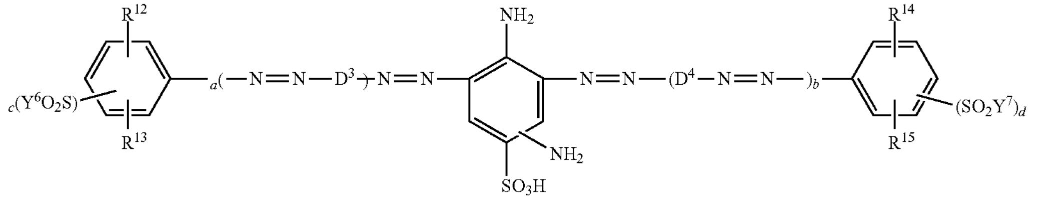

(IV)

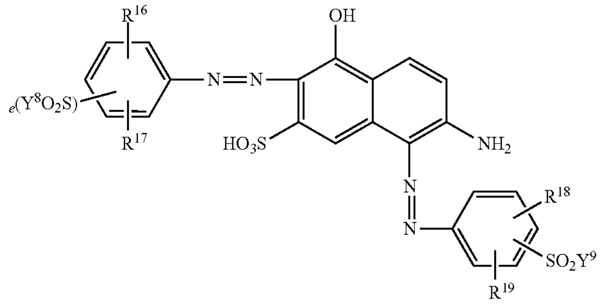

in formula (III):

$R^{12}$~$R^{15}$ are each independently H, $C_1$~$C_4$ alkyl, $C_1$~$C_4$ alkoxy, carboxyl or sulfo, preferably are H, methyl, methoxy, carboxyl or sulfo;

$Y^6$ and $Y^7$ are each independently $—CH{=}CH_2$, $—C_2H_4OSO_3H$ or $—C_2H_4Cl$;

a is 0 or 1;

b is 0 or 1;

c and d are each independently 0 or 1, preferably are 1;

each of $D^3$ and $D^4$ is independently substituted phenyl, unsubstituted phenyl, substituted naphthyl or unsubstituted naphthyl, and the number of the substituents of the substituted phenyl and the substituted naphthyl is 1-3, respectively, and each of the substituents is independently selected from the group consisting of amino, sulfo, ureido, $C_1$~$C_4$ alkanoylamino, $C_1$~$C_4$ alkoxy and hydroxyl, preferably the number of the substituents is 1-2, respectively, and each of the substituents is independently selected from the group consisting of amino, sulfo, ureido, acetylamino, methoxy and hydroxyl;

in formula (IV):

$R^{16}$~$R^{19}$ are each independently H, $C_1$~$C_4$ alkyl, $C_1$~$C_4$ alkoxy or sulfo, preferably are H, methyl, methoxy or sulfo;

e=0-1;

$Y^8$ and $Y^9$ are each independently $—CH{=}CH_2$, $—C_2H_4OSO_3H$ or $—C_2H_4Cl$.

Further, the reactive navy to black dye composition of the present invention preferably comprises the following components:

More further, the reactive navy to black dye composition of the present invention preferably consists of the following dye components:

component A, which is at least one selected from the group consisting of dye compounds of formula (I) and alkali metal salts thereof;

component B, which is at least one selected from the group consisting of dye compounds of formula (II) and alkali metal salts thereof;

and component C, which is at least one selected from the group consisting of dye compounds of formula (III) and/or formula (IV) and alkali metal salts thereof, wherein both a and b are 0, or one of a and b is 0 while the other is 1, c is 1, and d is 0 or 1.

As the third preferred solution of the present invention, the dye composition also comprises component D, component D is one or more selected from the group consisting of dye compounds of formulae (V)~(VII) and alkali metal salts thereof, in the composition, the mass of component D is 1% to 50%, preferably is 1% to 40%, of the total mass of component A and component B:

(V)

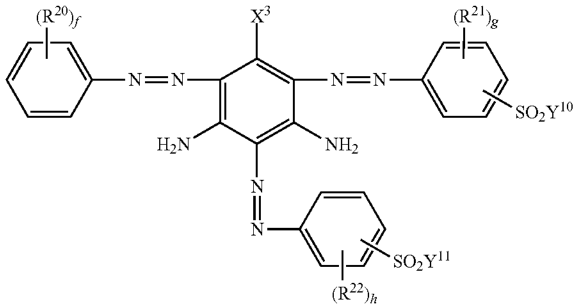

(VI)

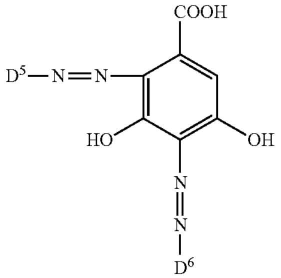

(VII)

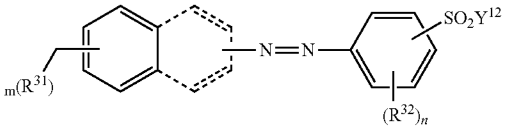

in formula (V):

f, g and h are each independently selected from 0-3, and every $R^{20}$, $R^{21}$ and $R^{22}$ is each independently $C_1$~$C_4$ alkyl, $C_1$~$C_4$ alkoxy or sulfo, preferably is methyl, methoxy or sulfo;

$X^3$ is hydrogen or carboxyl;

$Y^{10}$ and $Y^{11}$ are each independently $-CH{=}CH_2$, $-C_2H_4OSO_3H$ or $-C_2H_4Cl$;

in formula (VI):

$D^5$ and $D^6$ are each independently a group of the following formula (c), (d) or (f):

(c)

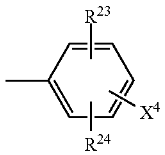

(d)

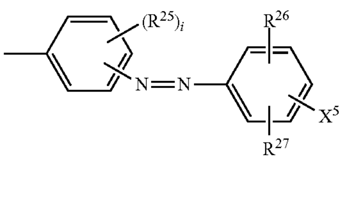

-continued (f)

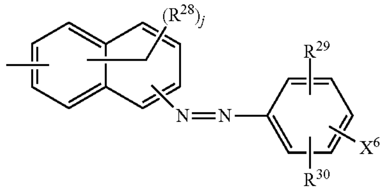

in the above formulae (c), (d) and (f): $R^{23}$, $R^{24}$, $R^{26}$, $R^{27}$, $R^{29}$ and $R^{30}$ are each independently H, $C_1$~$C_4$ alkyl, $C_1$~$C_4$ alkoxy or sulfo, preferably are H, methyl, methoxy and sulfo;

i=0-3, and every $R^{21}$ is each independently selected from the group consisting of sulfo, ureido and $C_1$~$C_4$ alkanoylamino, preferably is methyl, sulfo, ureido or acetylamino;

j=0-3, and every $R^{28}$ is each independently selected from the group consisting of hydroxyl and sulfo;

$X^4$, $X^5$ and $X^6$ are each independently $-SO_2Y^{13}$, $-NHCO(CH_2)_pSO_2Y^{14}$ or $-CONH(CH_2)_qSO_2Y^{15}$, wherein p=1-3, q=1-3, $Y^{13}$~$Y^{15}$ are each independently $-CH{=}CH_2$, $-C_2H_4OSO_3H$ or $-CH_2CH_2C_1$, wherein $X^4$, $X^5$ and $X^6$ are each independently preferably $-SO_2Y^{13}$;

in formula (VI):

m=1-3, and every $R^{31}$ is each independently selected from the group consisting of amino, sulfo, ureido, $C_1$~$C_4$ alkanoylamino, $C_1$~$C_4$ alkoxy and hydroxyl, preferably is amino, sulfo or acetylamino;

$Y^{12}$ is $-CH{=}CH_2$, $-C_2H_4OSO_3H$ or $-C_2H_4Cl$;

n=0-2, and every $R^{32}$ is each independently linear or branched $C_1$~$C_4$ alkyl, $C_1$~$C_4$ alkoxy or sulfo, preferably is methyl, methoxy or sulfo.

Further, component D is at least one selected from the group consisting of dyes of formula (VI) and alkali metal salts thereof.

Further, the reactive navy to black dye composition consists of component A, component B and component D.

More further, the reactive navy to black dye composition of the present invention preferably consists of the following dye components:

component A, which is at least one selected from the group consisting of dye compounds of formula (I) and alkali metal salts thereof;

component B, which is at least one selected from the group consisting of dye compounds of formula (II) and alkali metal salts thereof;

and component D, which is at least one selected from the group consisting of dye compounds of formula (VI) and alkali metal salts thereof.

As the fourth preferred solution of the present invention, the dye composition also comprises component C and component D, and component C is one or more selected from the group consisting of compounds of formulae (III) ~(IV) and alkali metal salts thereof, in the composition, the mass of component C is 1% to 50%, preferably is 1% to 40%, of the total mass of component A and component B; component D is one or more selected from the group consisting of dye compounds of formulae (V)~(VII) and alkali metal salts thereof, in the composition, the mass of component D is 1% to 50%, preferably is 1% to 40%, of the total mass of component A and component B:

the groups in formulae (III)~(VII) are defined as above.

Further, the reactive navy to black dye composition consists of component A, component B, component C and component D.

Further, component C is at least one selected from the group consisting of dye compounds of formula (III) and/or formula (IV) and alkali metal salts thereof, wherein both a and b are 0, or one of a and b is 0 while the other is 1, c is 1, and d is 0 or 1.

Further, component D is at least one selected from the group consisting of dye compounds of formula (VI) and alkali metal salts thereof.

More further, the reactive navy to black dye composition of the present invention preferably comprises the following components:

component A, which is at least one selected from the group consisting of dye compounds of formula (I) and alkali metal salts thereof;

component B, which is at least one selected from the group consisting of dye compounds of formula (II) and alkali metal salts thereof;

component C, which is at least one selected from the group consisting of dye compounds of formula (III) and/or formula (IV) and alkali metal salts thereof, wherein both a and b are 0, or one of a and b is 0 while the other is 1, c is 1, and d is 0 or 1.

and component D, which is at least one selected from the group consisting of dye compounds of formula (VI) and alkali metal salts thereof.

Even more further, the reactive navy to black dye composition consists of component A, component B, component C and component D, wherein component A is at least one selected from the group consisting of dye compounds of formula (I) and alkali metal salts thereof;

component B is at least one selected from dye compounds of formula (II) and alkali metal salts thereof;

component C is at least one selected from the group consisting of dye compounds of formula (III) and/or formula (IV) and alkali metal salts thereof, wherein both a and b are 0, or one of a and b is 0 while the other is 1, c is 1, and d is 0 or 1;

and component D is at least one selected from the group consisting of dye compounds of formula (VI) and alkali metal salts thereof.

Besides component A, component B, component C and component D, the reactive navy to black dye composition of the present invention may also comprises one or more conventional shade-adjusting dye components such as C.I. reactive yellow 145, C.I. reactive red 194, C.I. reactive red 195 and C.I. reactive red 198, and the total amount of the conventional dye component(s) is not more than 30% of the total mass of component A, component B, component C and component D.

Specifically, component A is preferably at least one selected from the group consisting of dye compounds of the following formulae (I-1)~(I-66) and alkali metal salts thereof:

(I-1)

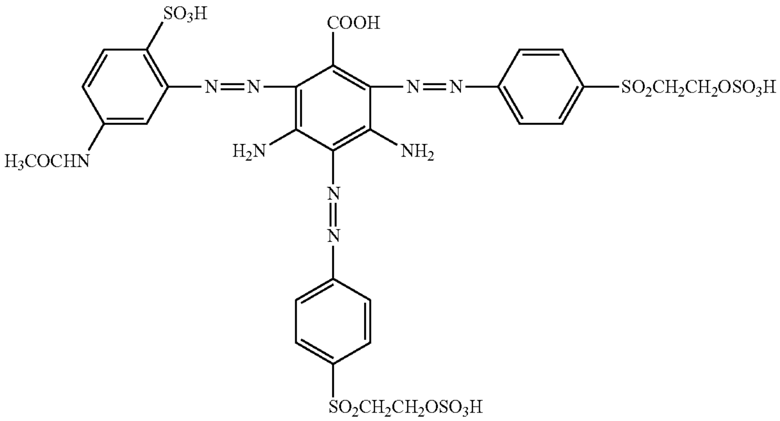

(I-2)

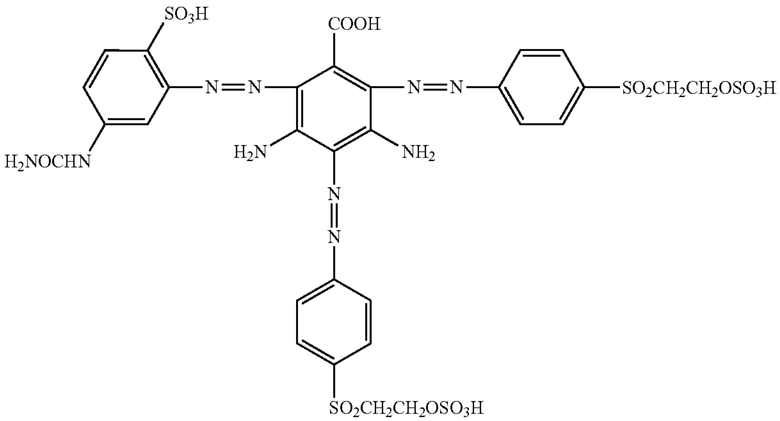

-continued
(I-3)
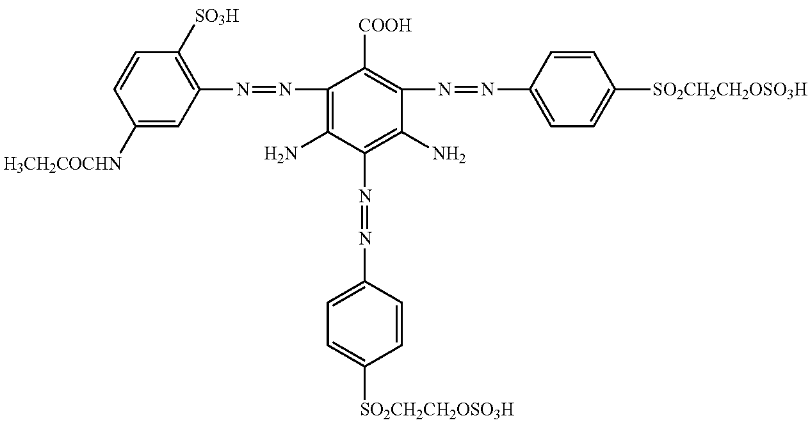
(I-4)
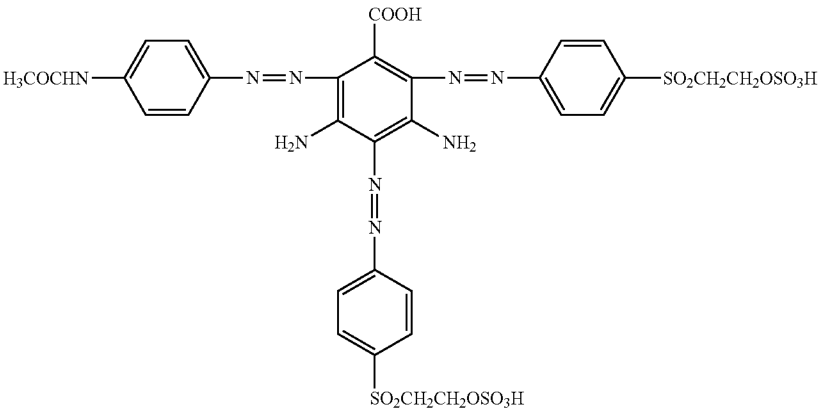
(I-5)
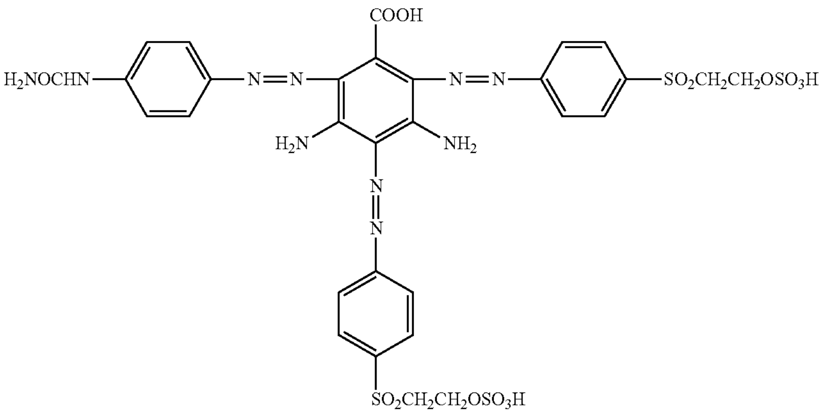

-continued
(I-6)
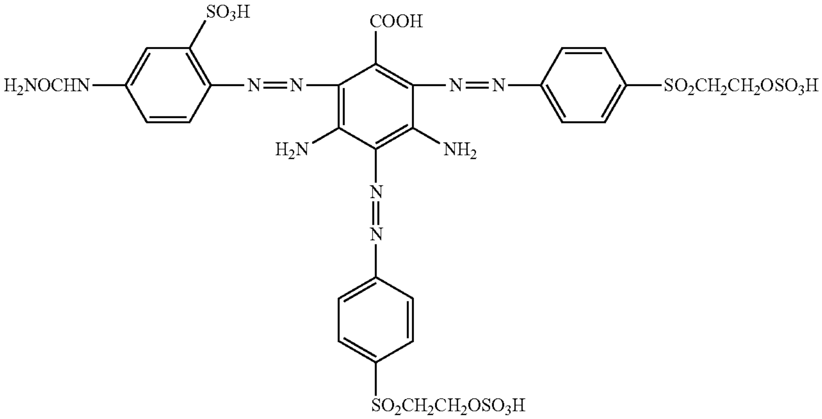
(I-7)
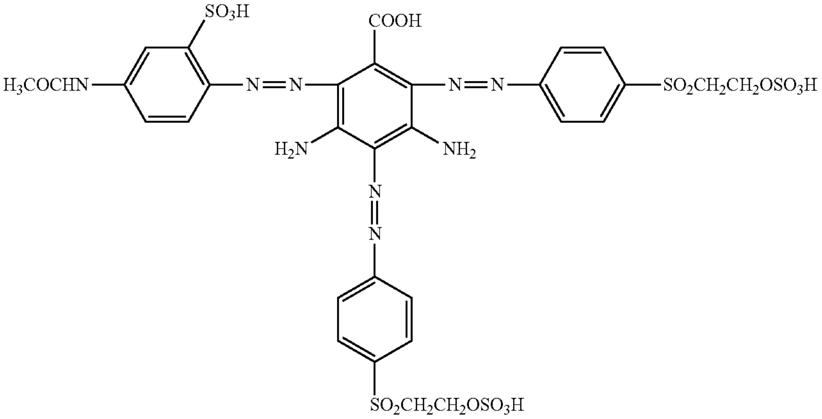
(I-8)
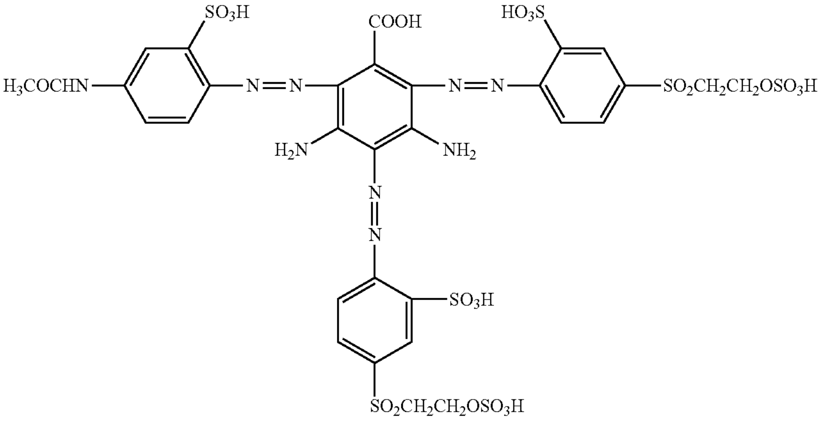

-continued
(I-9)
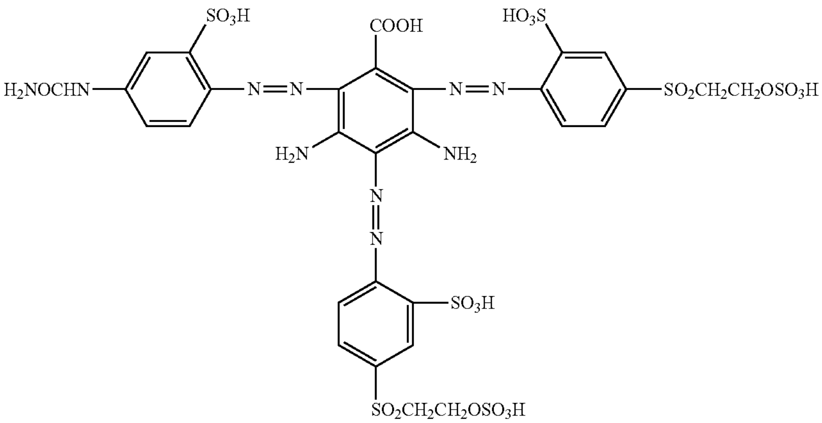
(I-10)
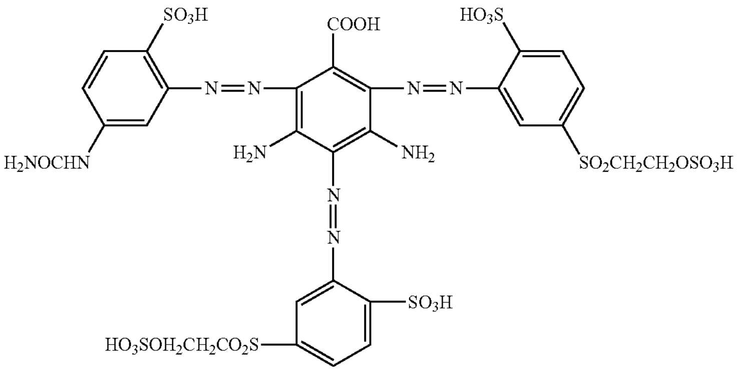
(I-11)
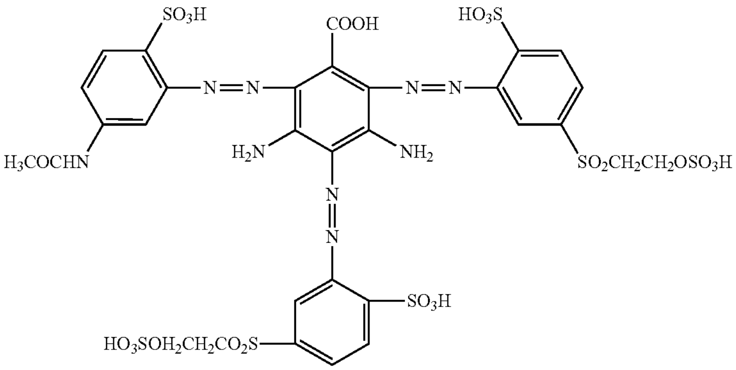
(I-12)
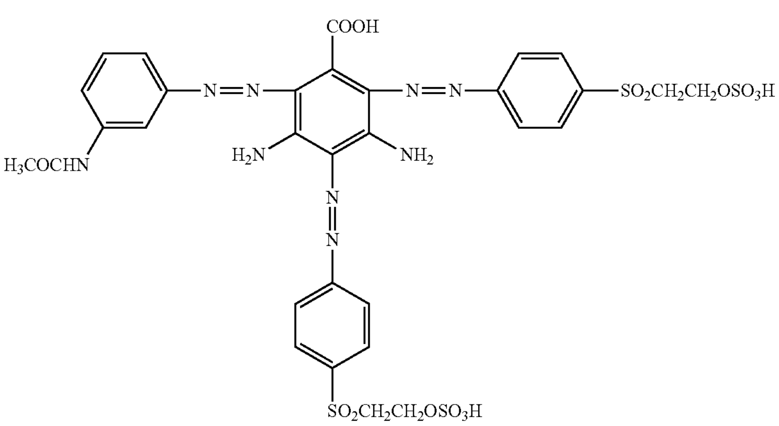

-continued
(I-13)
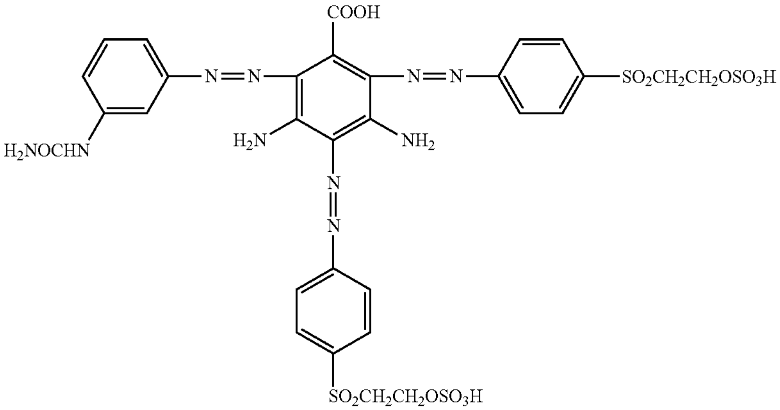
(I-14)
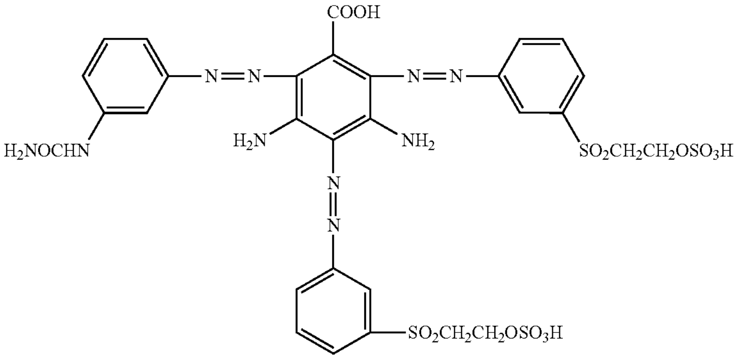
(I-15)
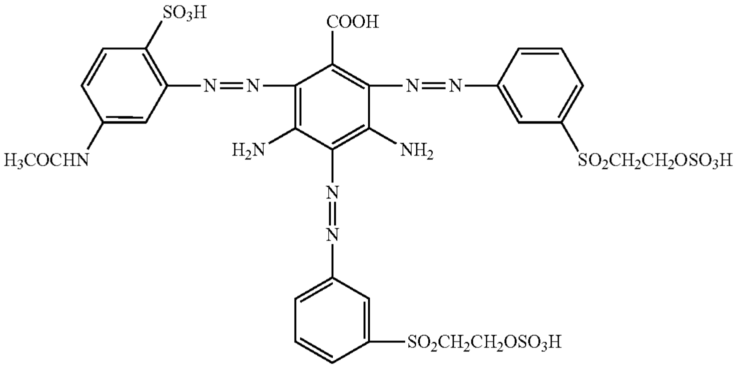
(I-16)
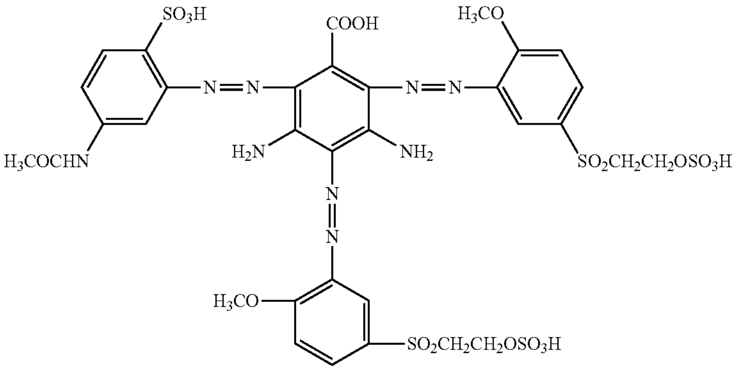

-continued
(I-17)
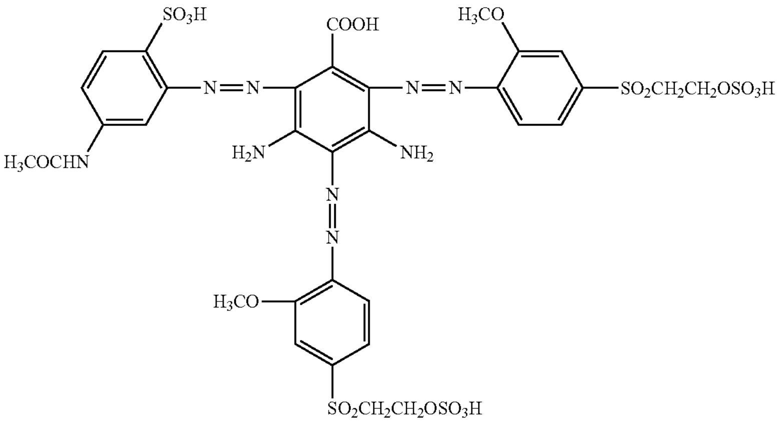
(I-18)
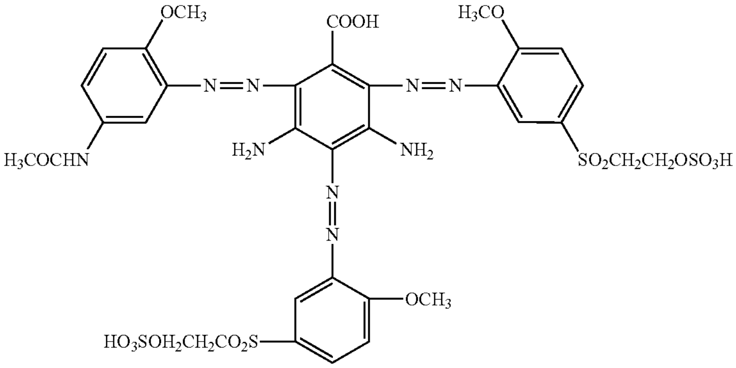
(I-19)
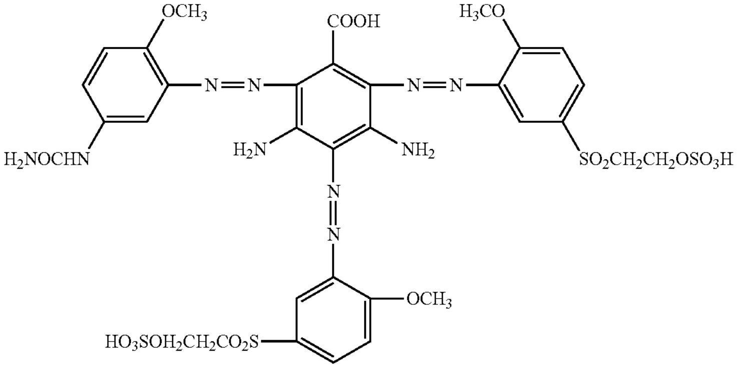
(I-20)
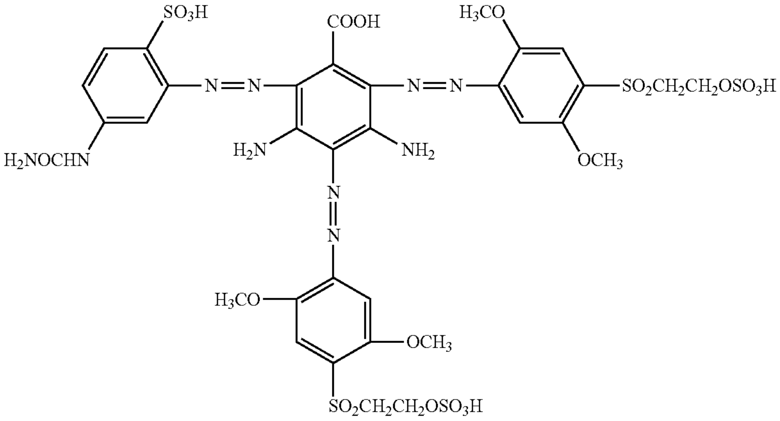

-continued
(I-21)
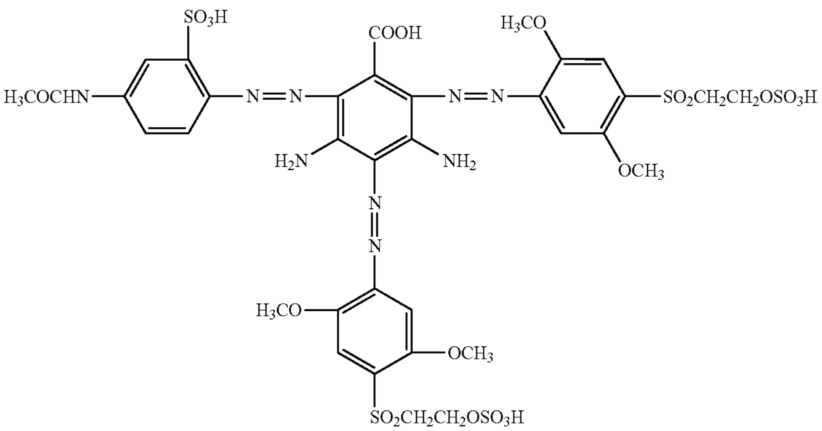
(I-22)
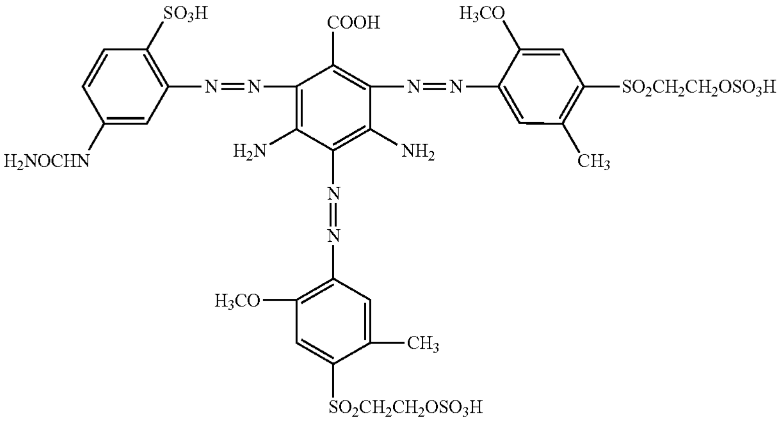
(I-23)
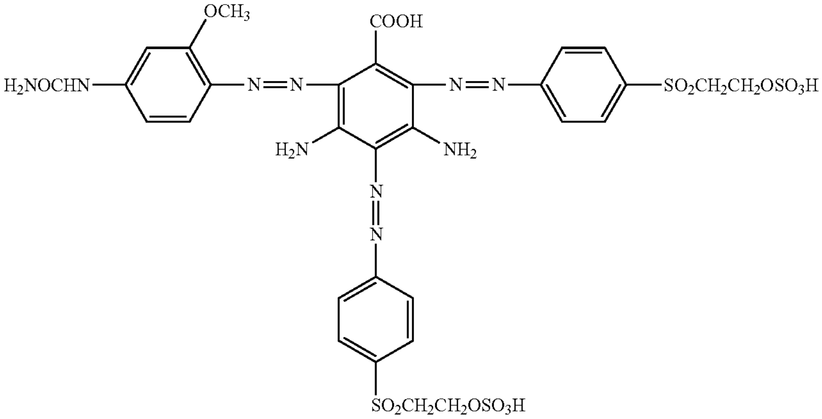

-continued
(I-24)
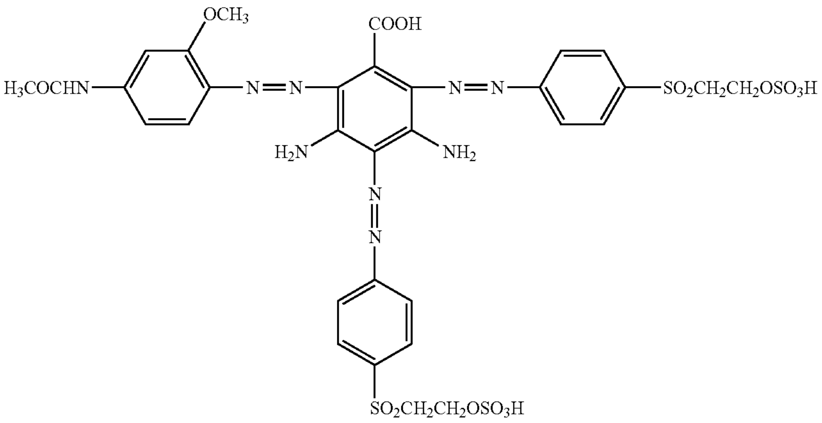
(I-25)
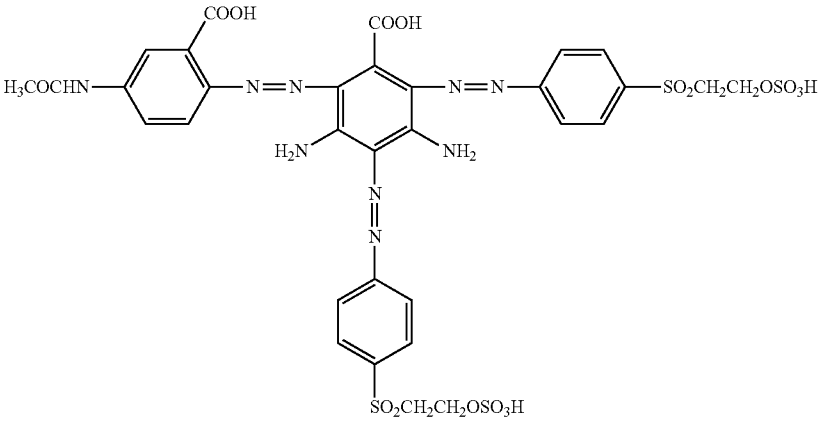
(I-26)
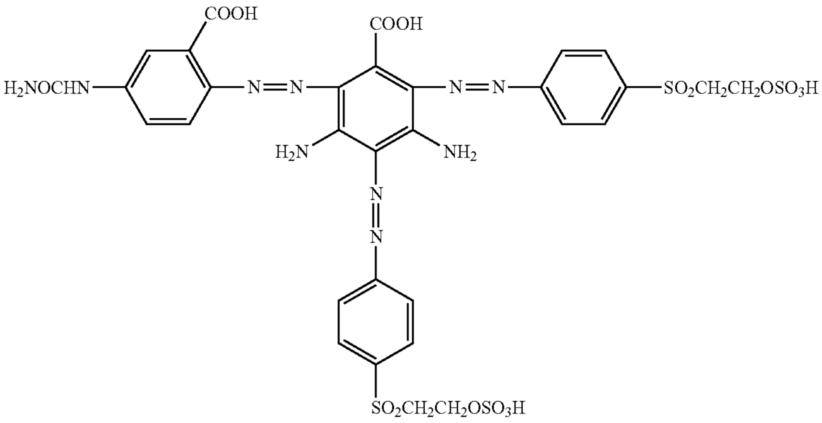

-continued
(I-27)
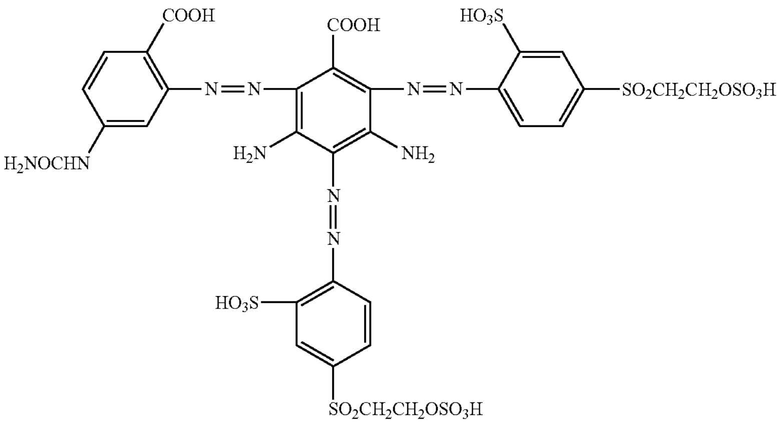
(I-28)
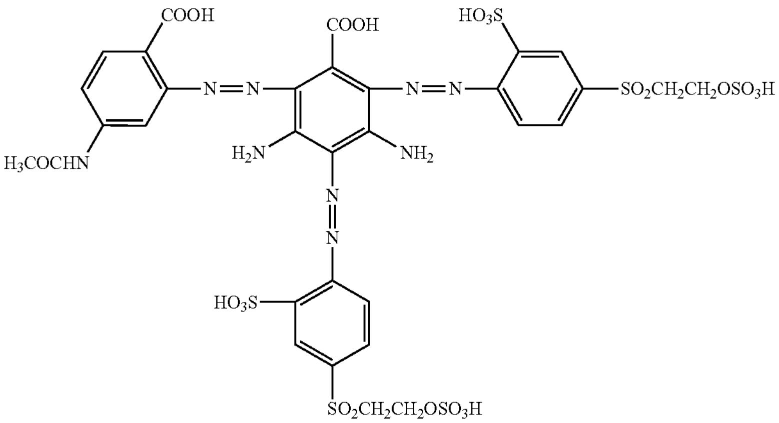
(I-29)
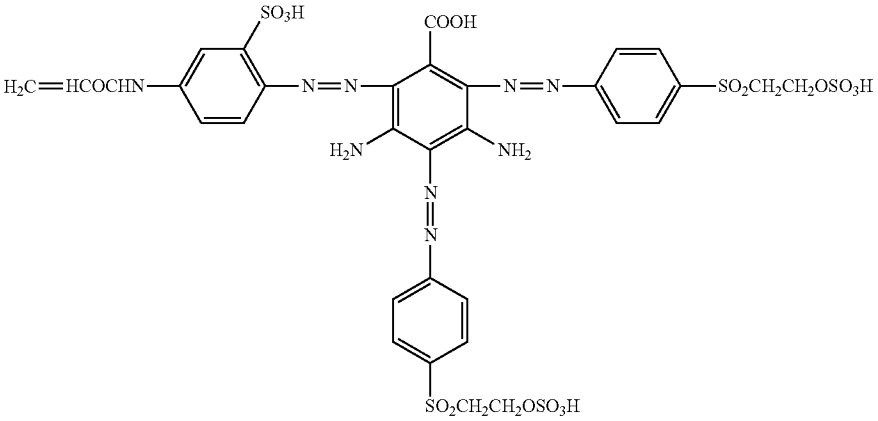

-continued
(I-30)
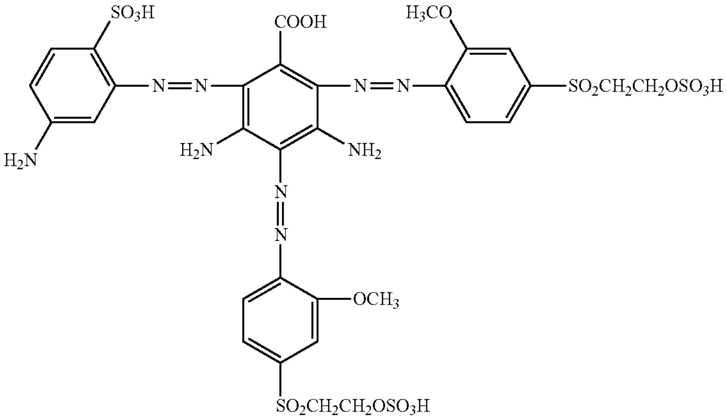
(I-31)
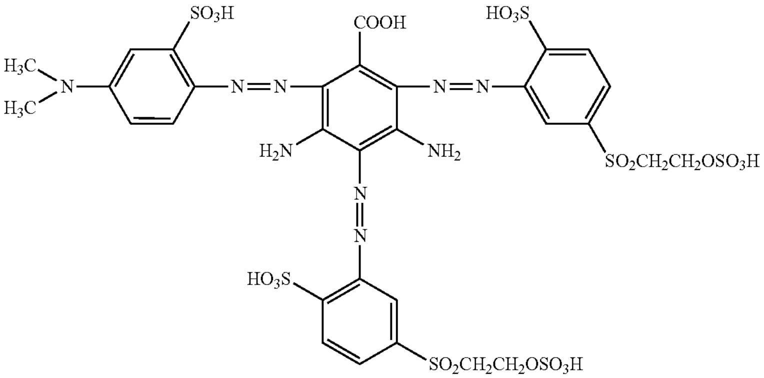
(I-32)
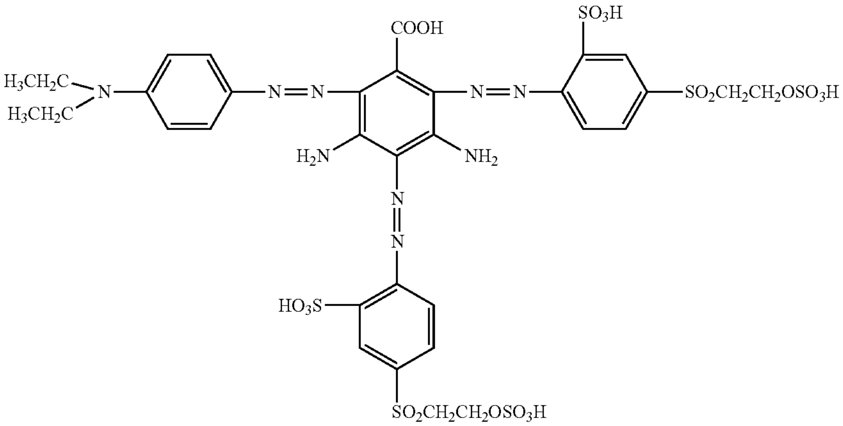
(I-33)
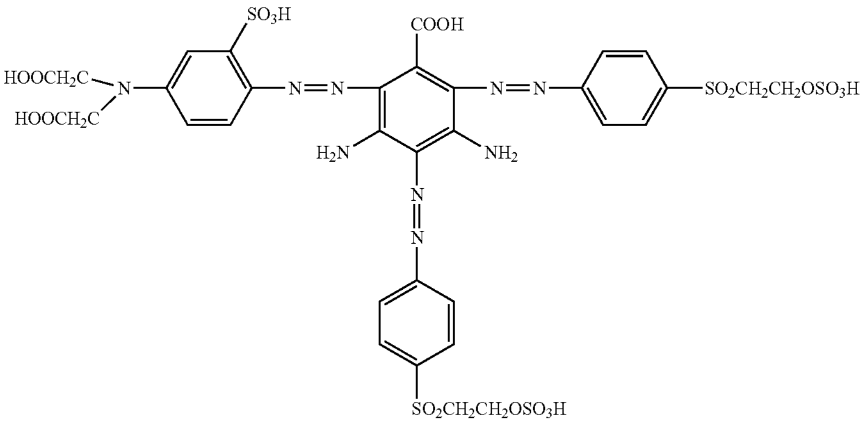

-continued
(I-34)
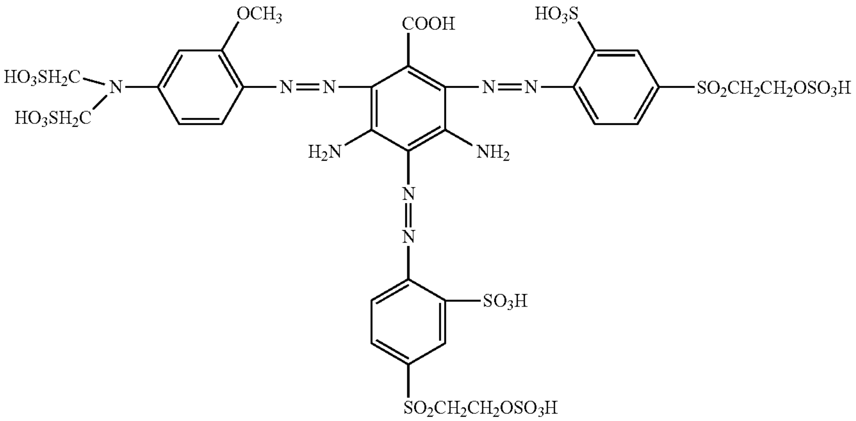
(I-35)
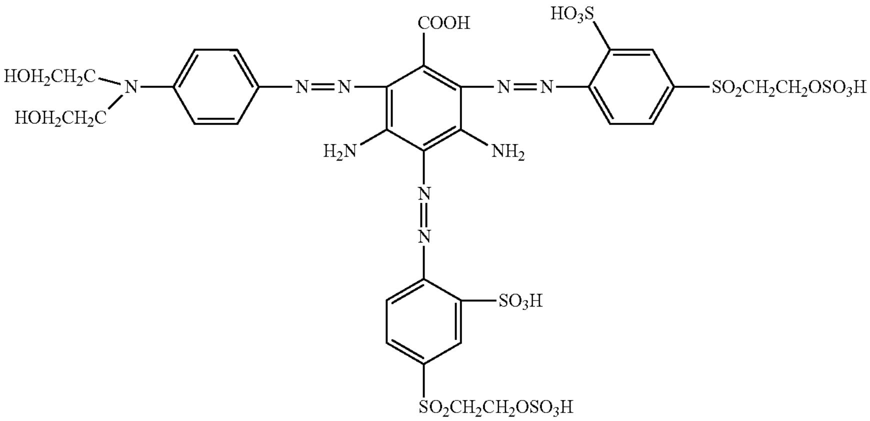
(I-36)
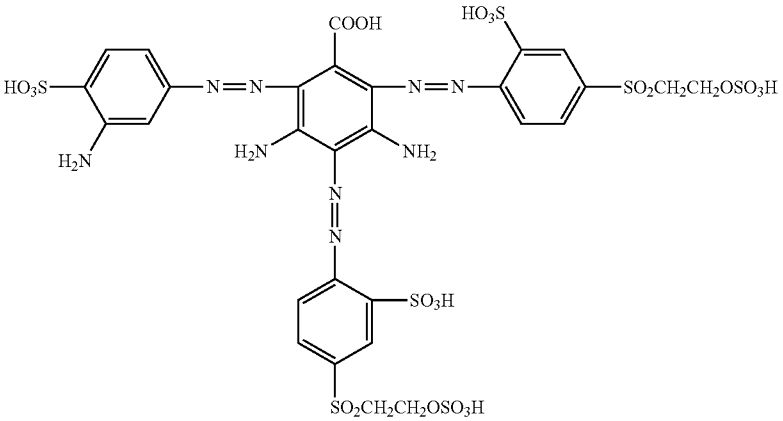

-continued
(I-37)
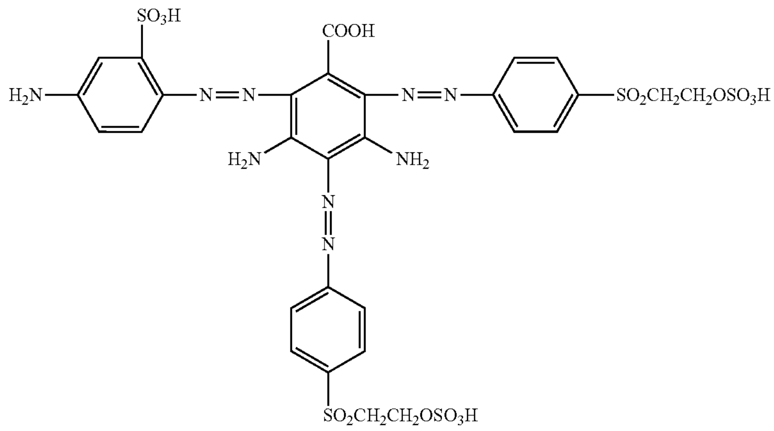
(I-38)
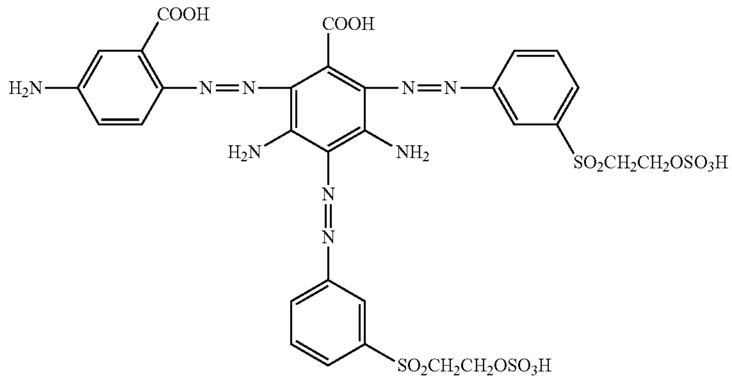
(I-39)
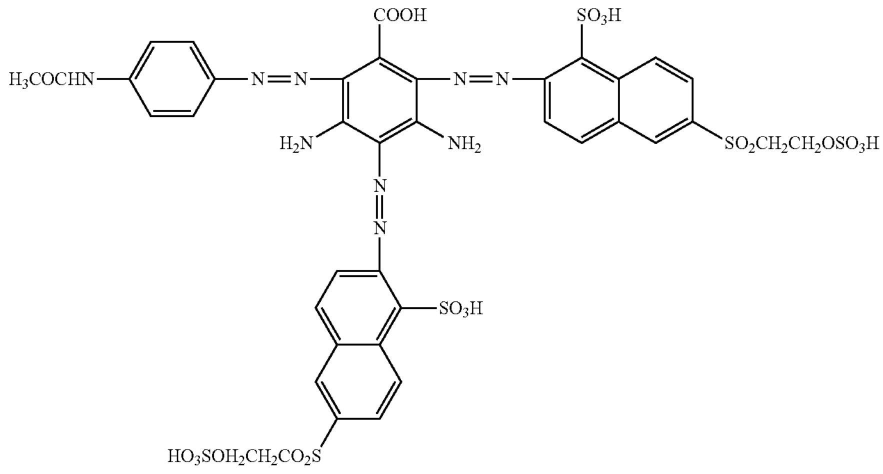

-continued
(I-40)
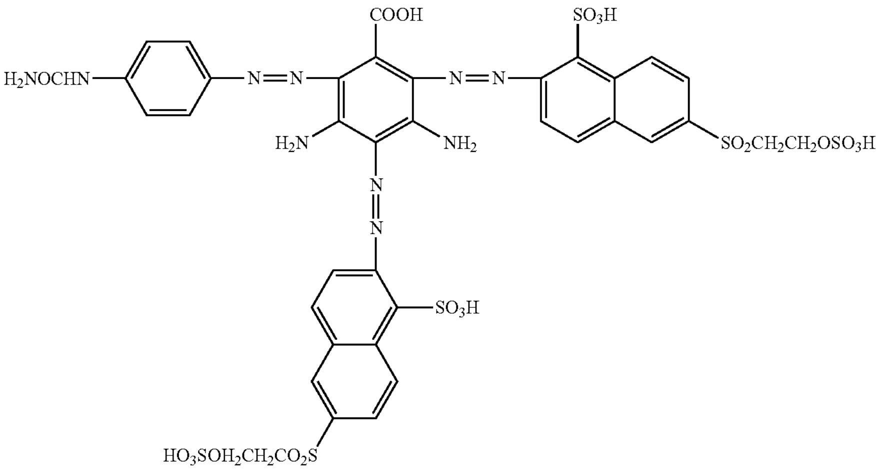
(I-41)
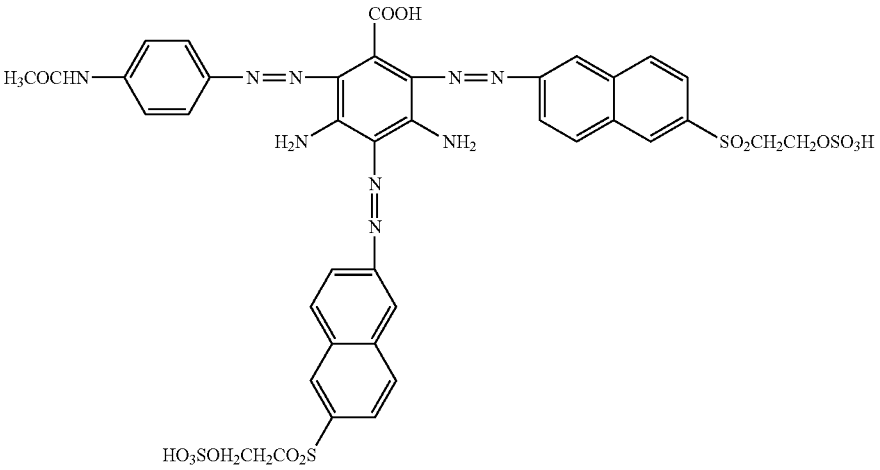
(I-42)
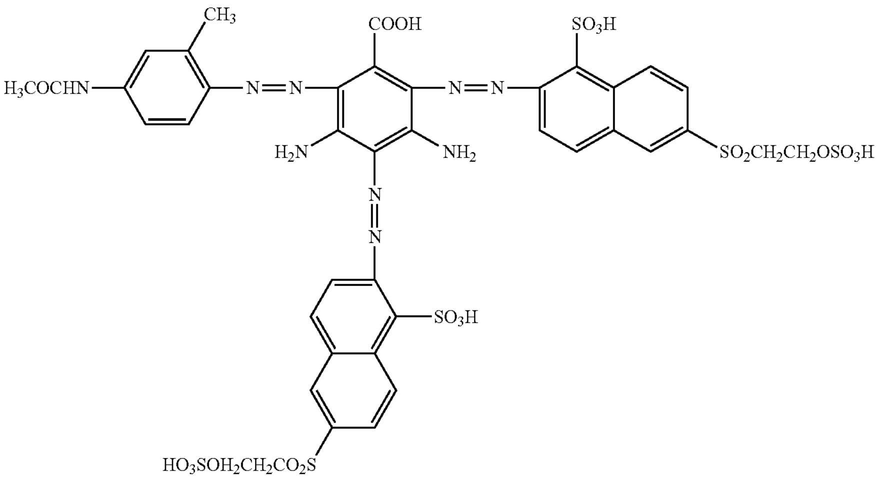

-continued
(I-43)
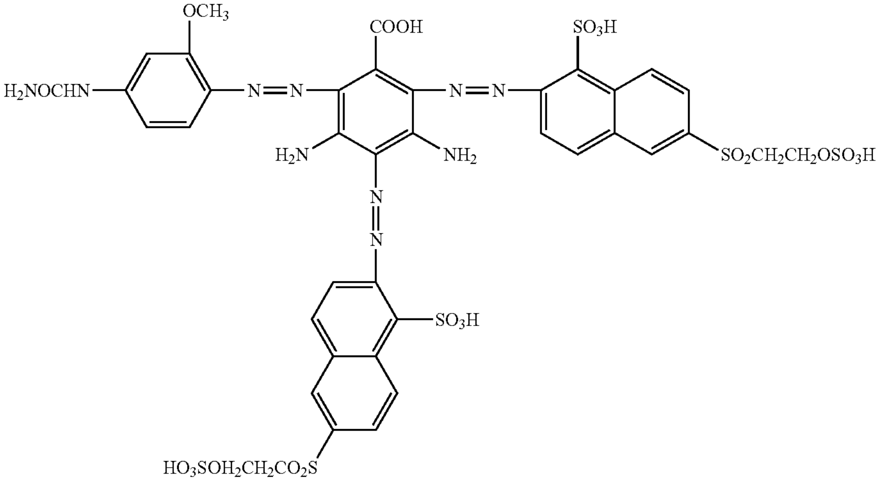
(I-44)
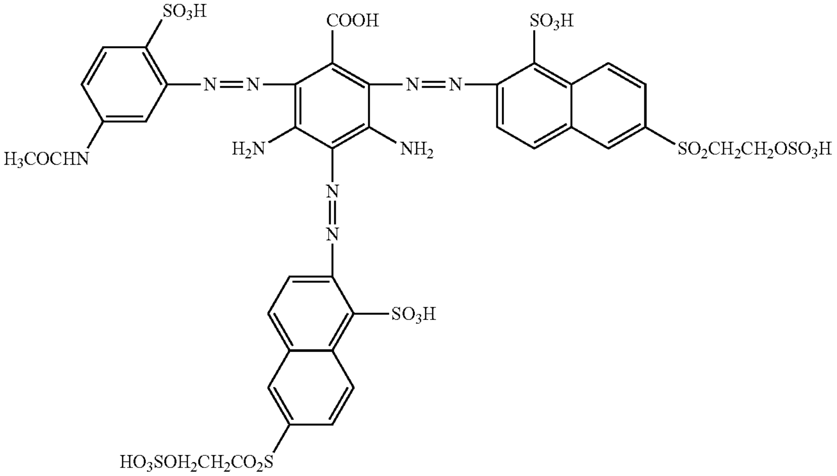
(I-45)
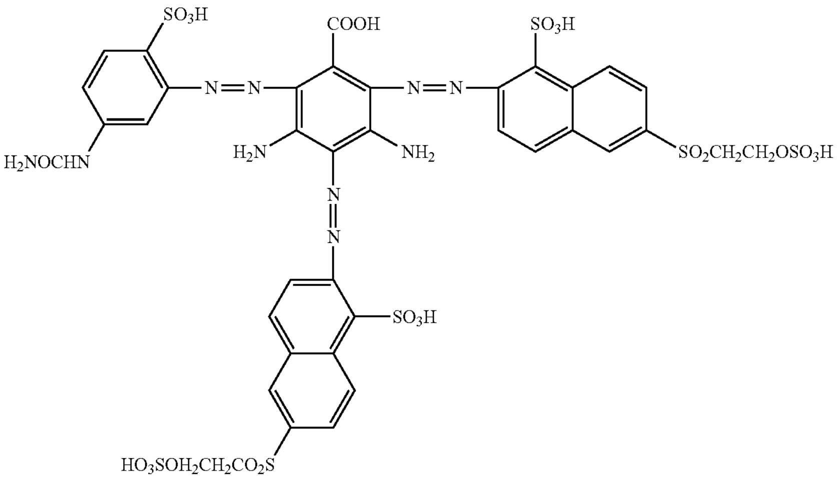

-continued
(I-46)
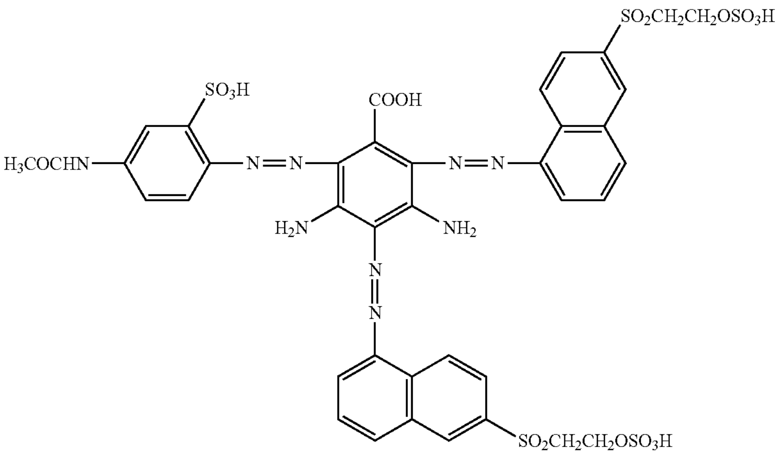
(I-47)
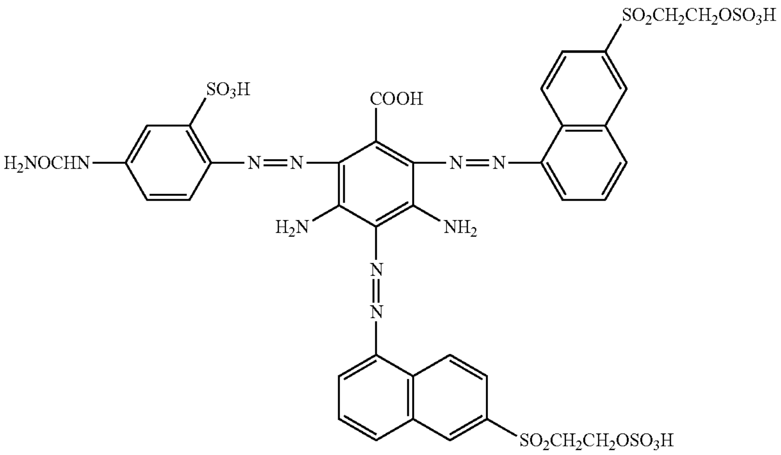
(I-48)
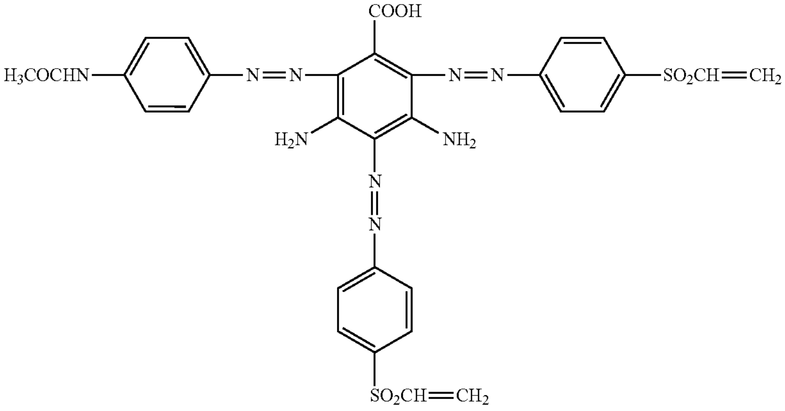

-continued
(I-49)
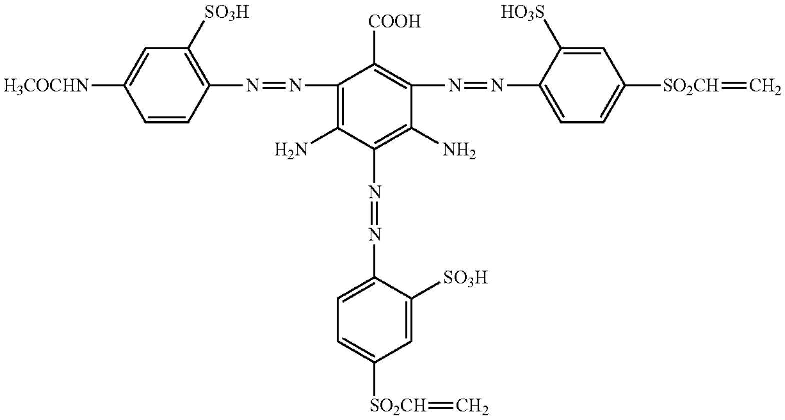
(I-50)
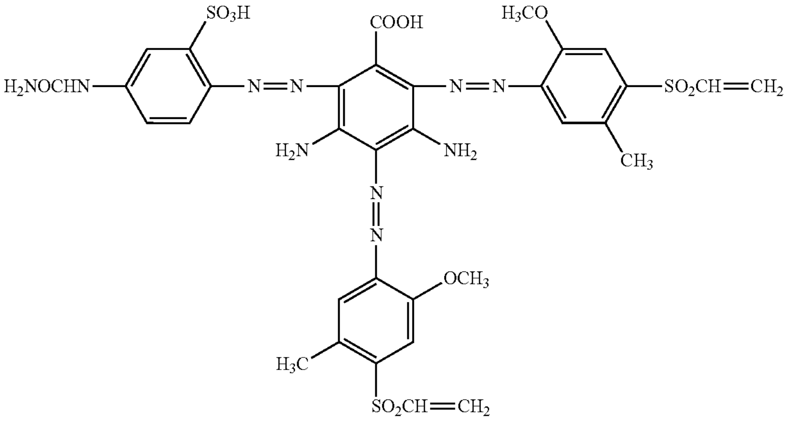
(I-51)
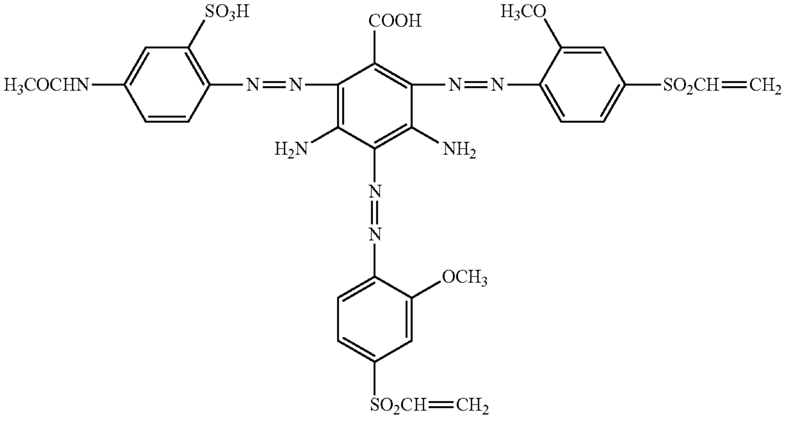
(I-52)
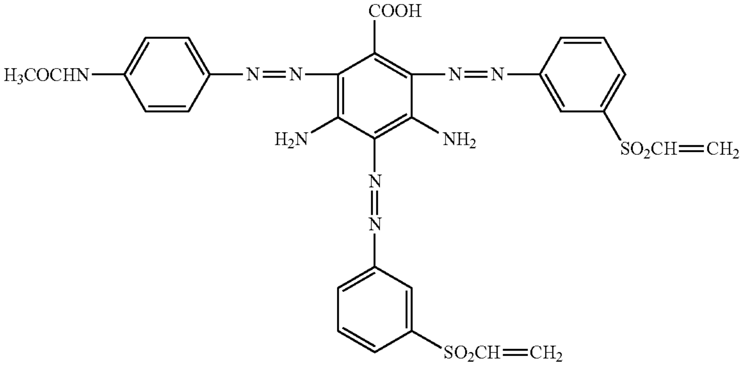

-continued
(I-53)
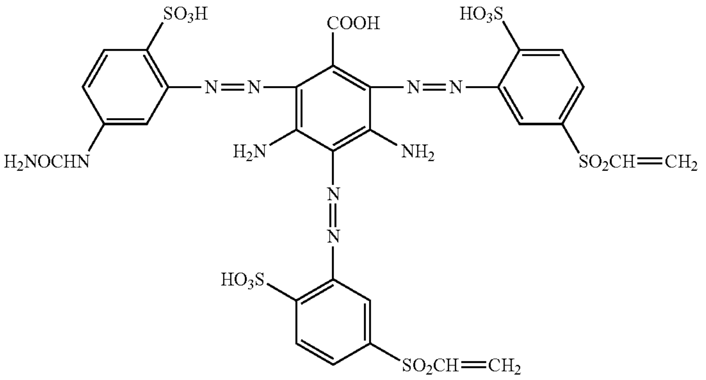
(I-54)
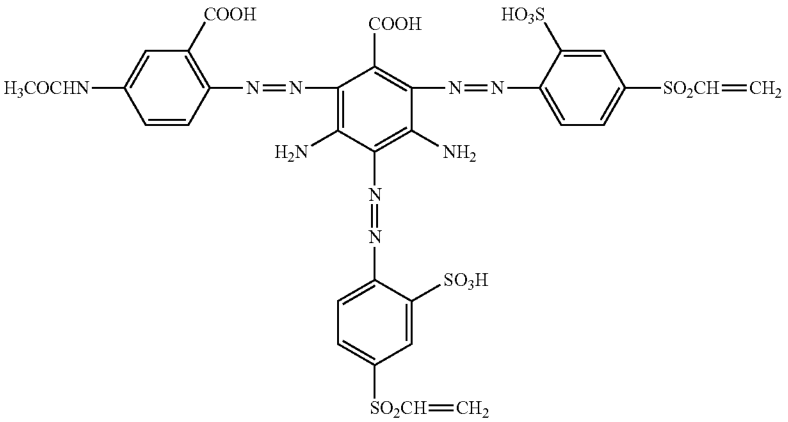
(I-55)
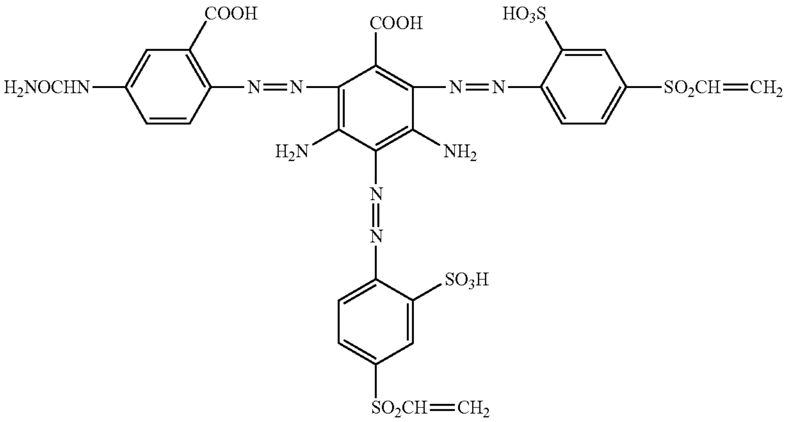
(I-56)
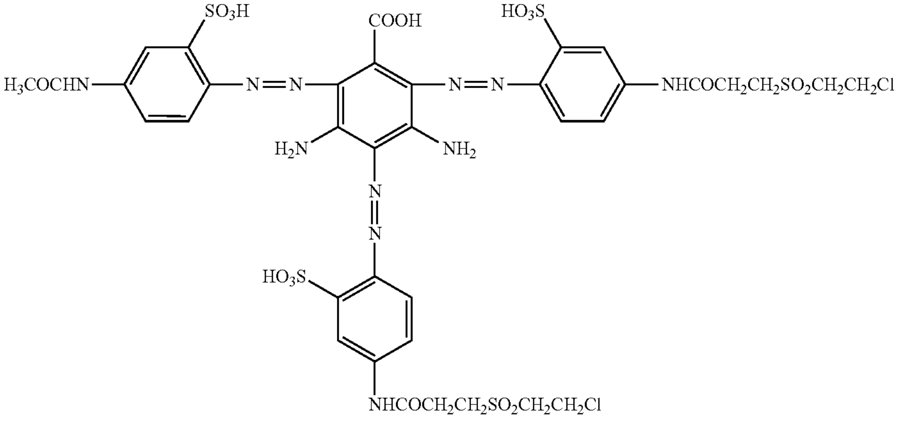

-continued
(I-57)
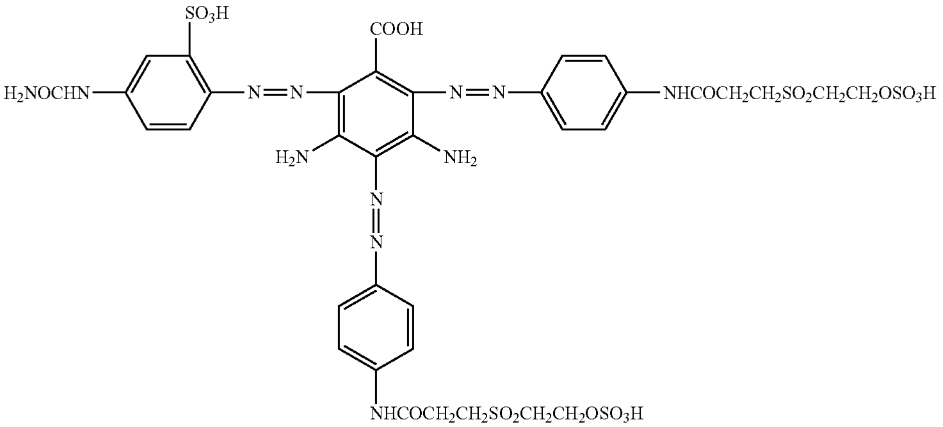
(I-58)
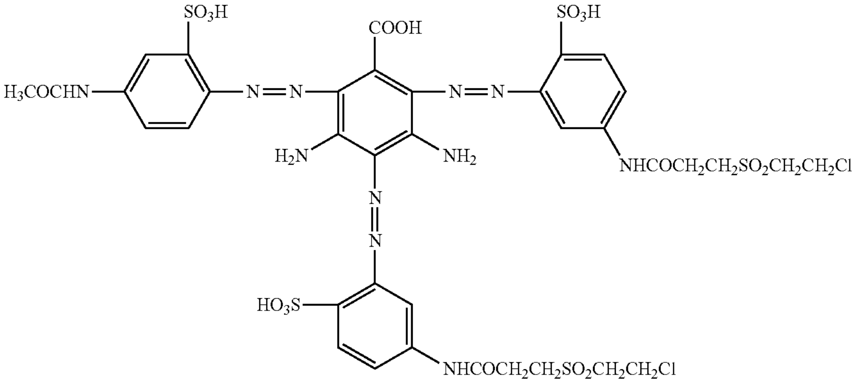
(I-59)
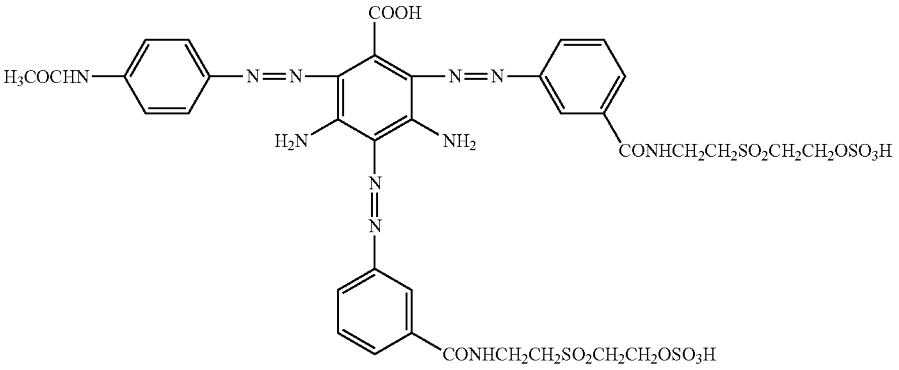
(I-60)
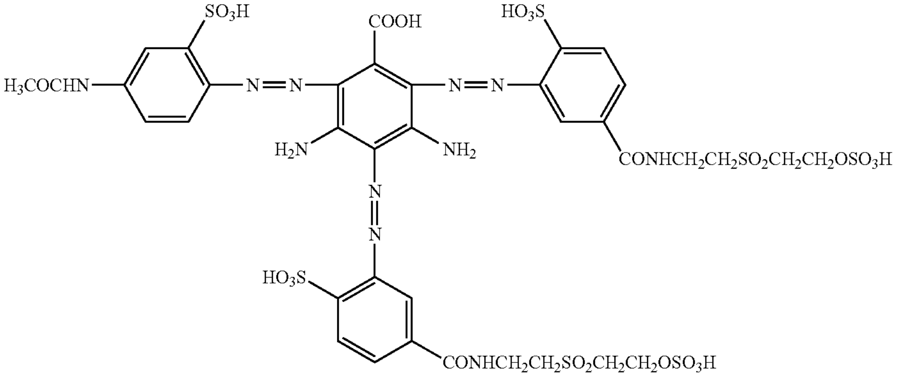

-continued
(I-61)
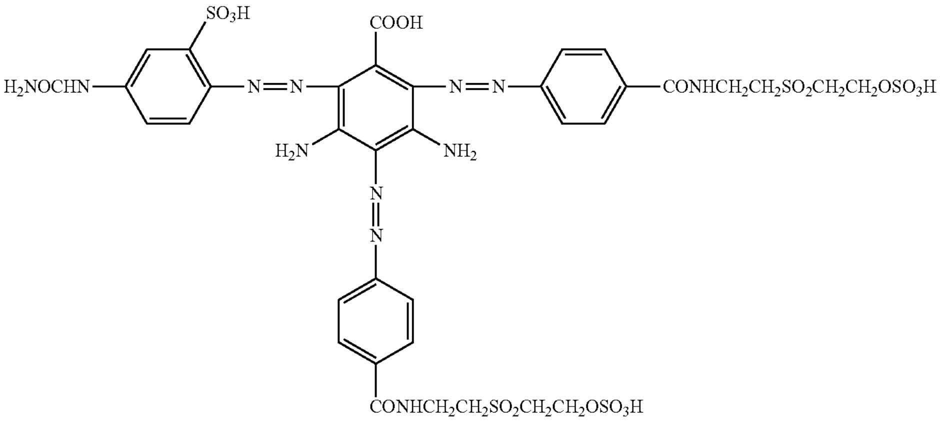
(I-62)
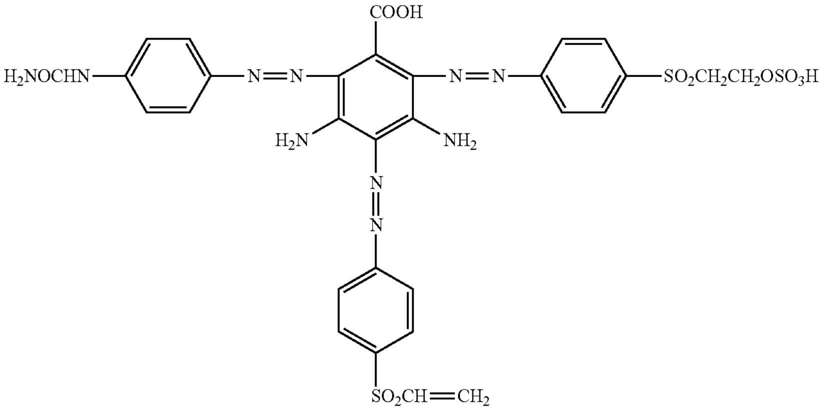
(I-63)
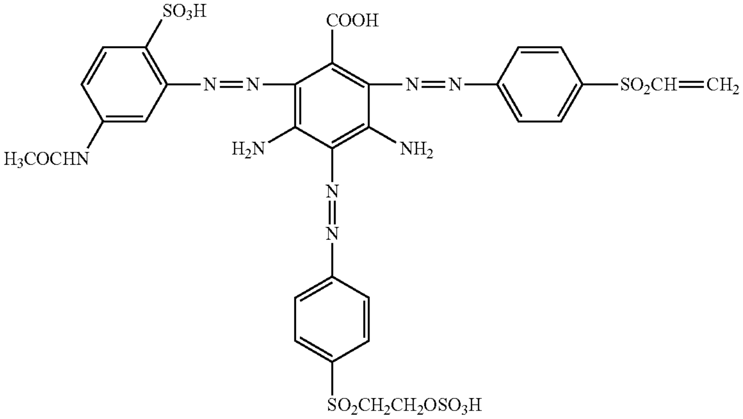

-continued
(I-64)
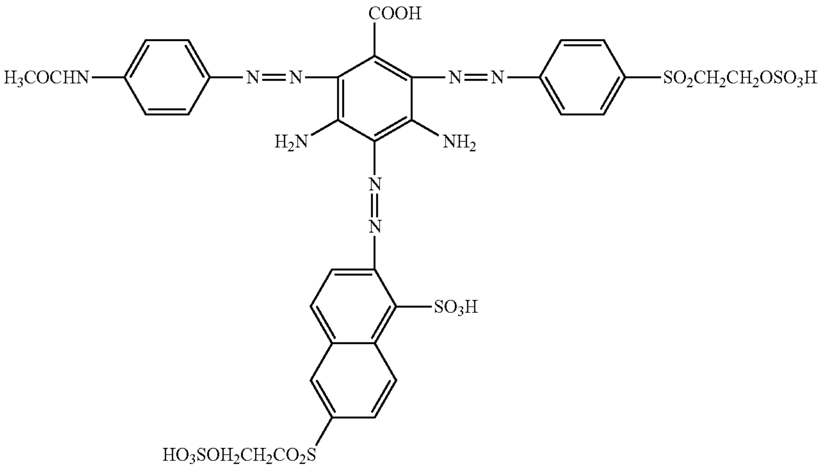
(I-65)
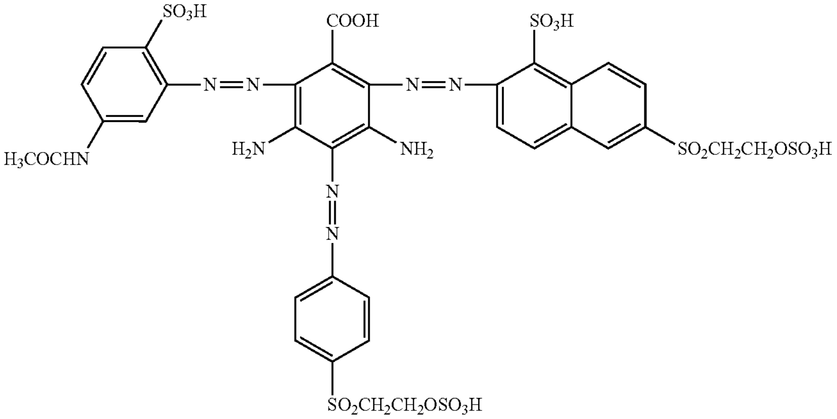
(I-66)
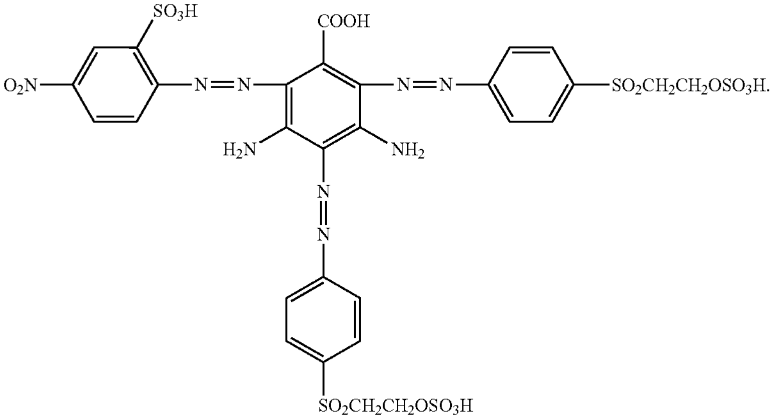

Further, component A is preferably at least one selected from the group consisting of compounds of formulae (I-1) ~(I-28) and (I-48)~(I-55) and alkali metal salts thereof.

More further, component A is preferably at least one selected from the group consisting of compounds of formulae (I-1), (I-2), (I-4), (I-5), (I-6) and (I-7) and alkali metal salts thereof.

Specifically, component B is preferably at least one selected from the group consisting of the following compounds and alkali metal salts thereof:

(II-1)

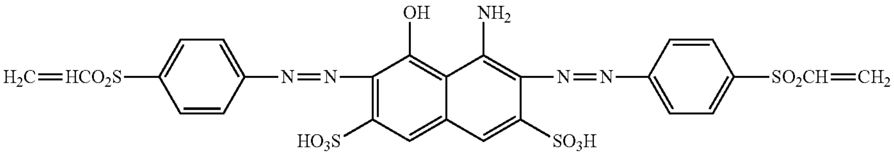

(II-2)

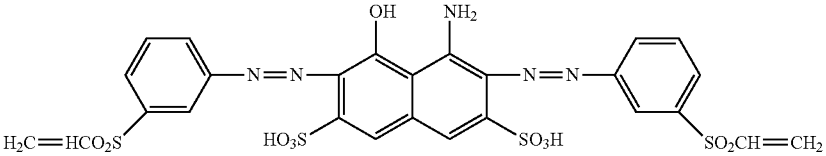

(II-3)

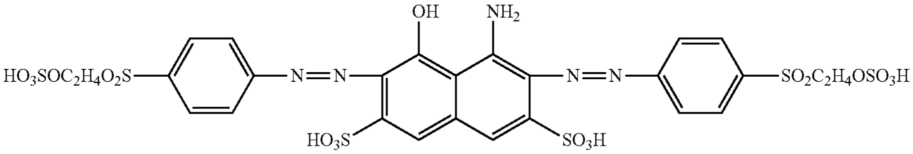

(II-4)

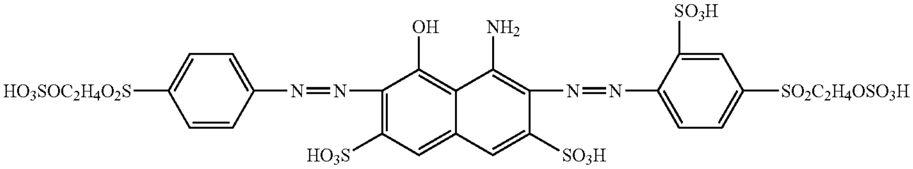

(II-5)

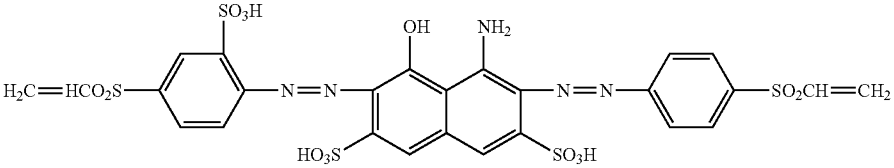

(II-6)

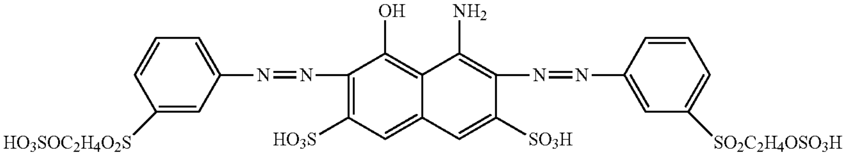

(II-7)

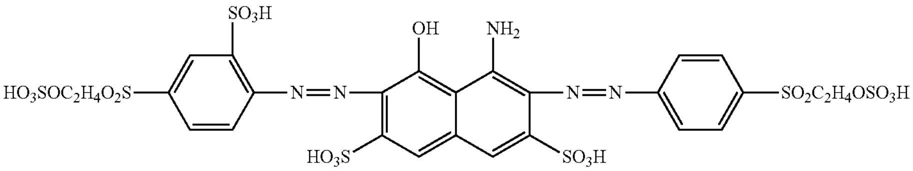

(II-8)

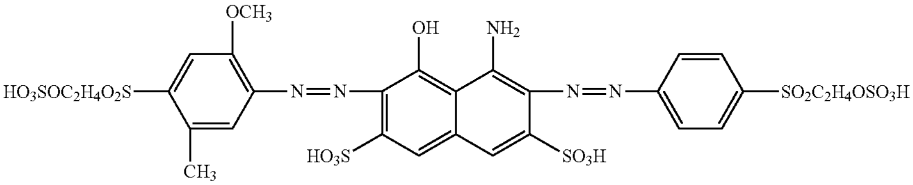

-continued
(II-9)
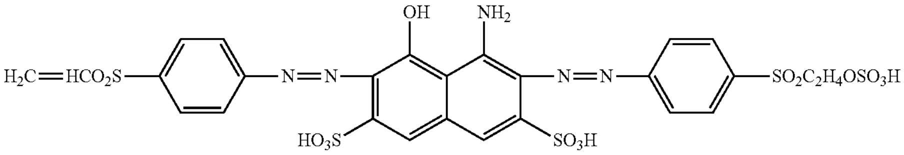
(II-10)
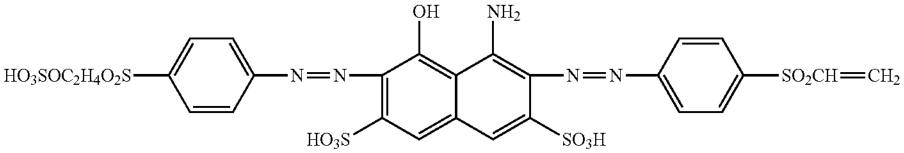
(II-11)
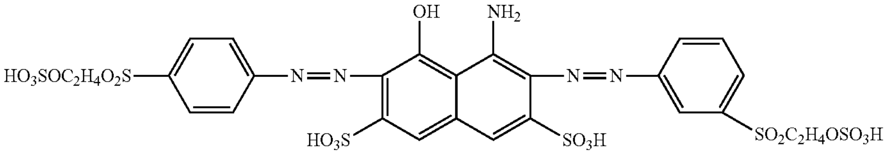
(II-12)
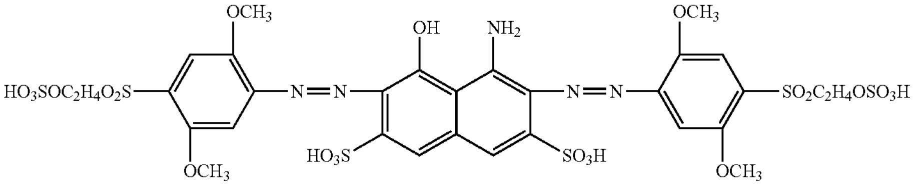
(II-13)
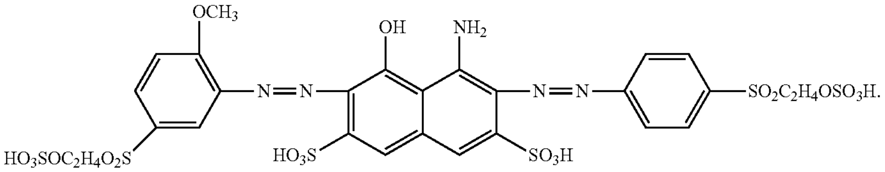
Further, component A is preferably at least one selected from the group consisting of compounds of formulae (II-1) and (II-3) and alkali metal salts thereof.
Specifically, component C is preferably at least one selected from the group consisting of the following compounds and alkali metal salts thereof:
(III-1)
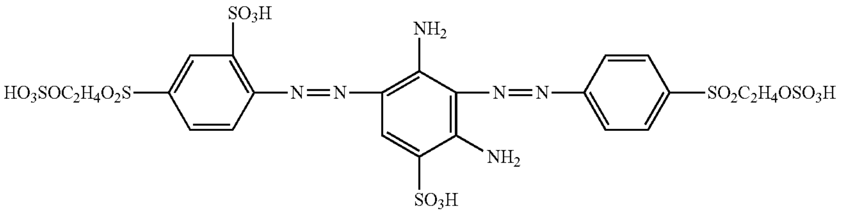
(III-2)
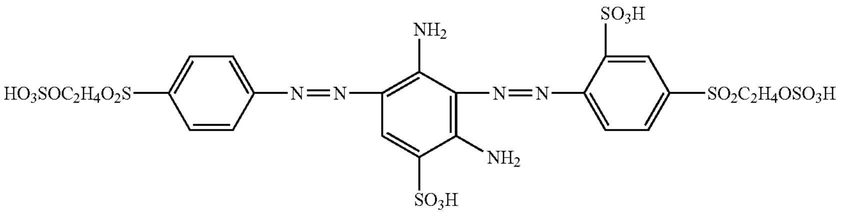

-continued
(III-3)
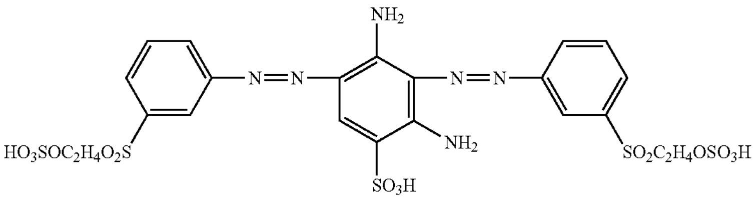
(III-4)
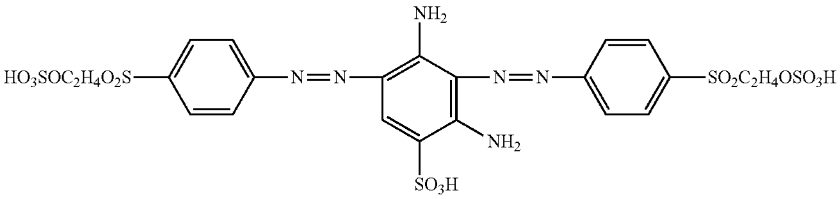
(III-5)
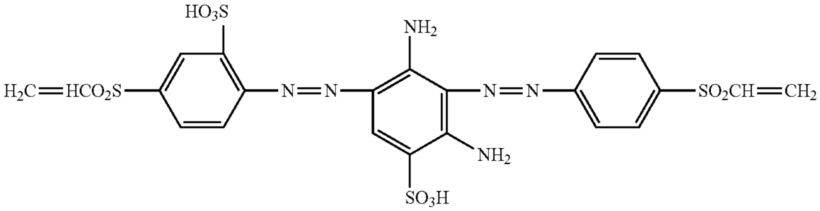
(III-6)
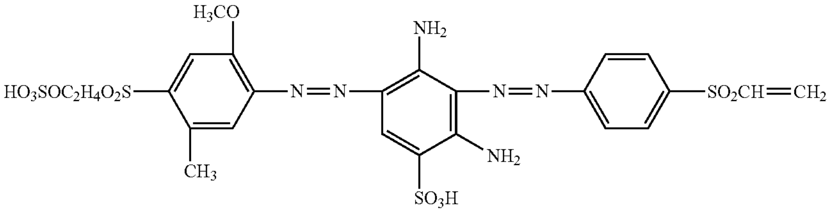
(III-7)
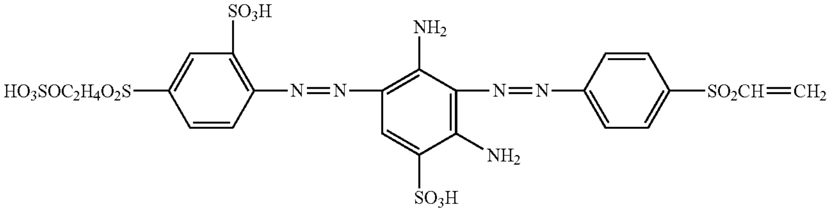
(III-8)
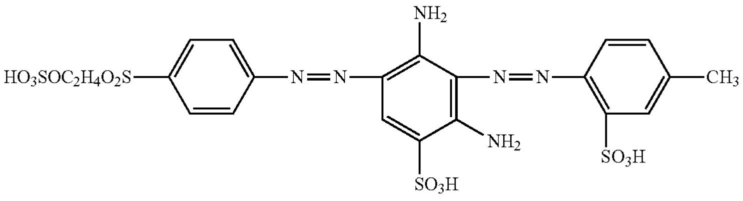
(III-9)
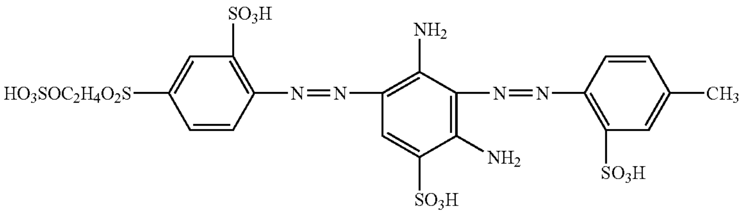

-continued
(III-10)
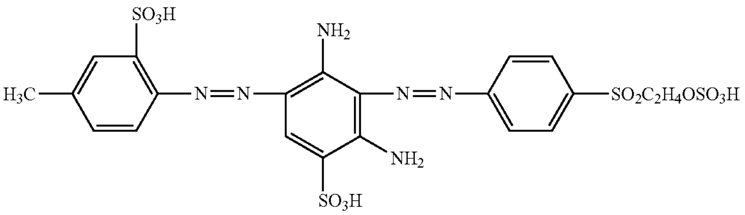
(III-11)
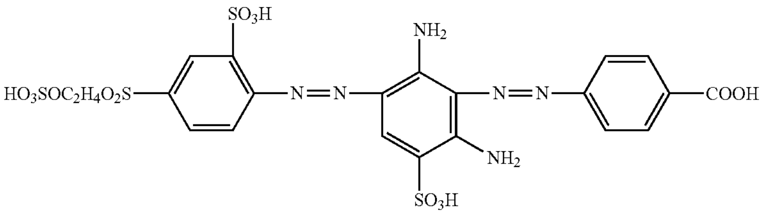
(III-12)
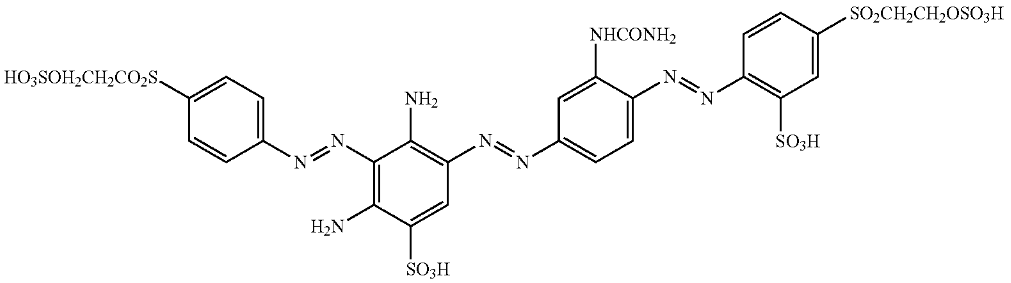
(III-13)
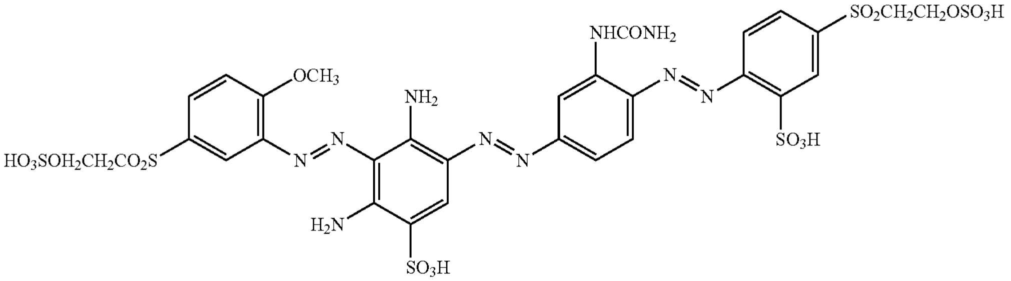
(III-14)
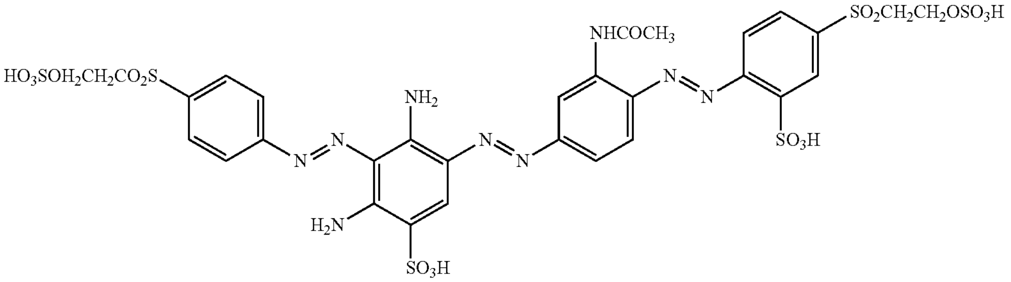
(III-15)
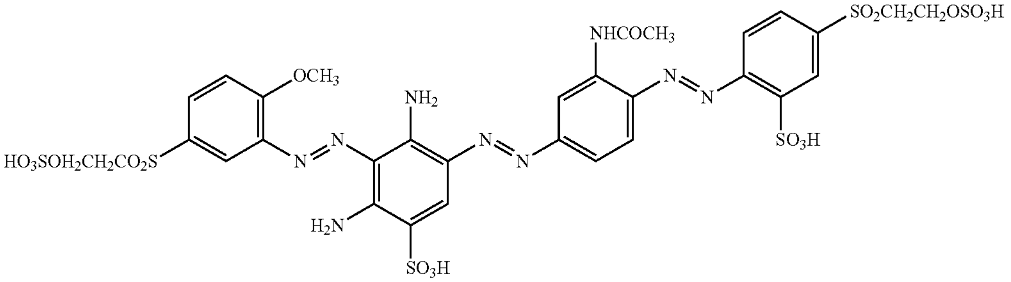

-continued
(III-16)
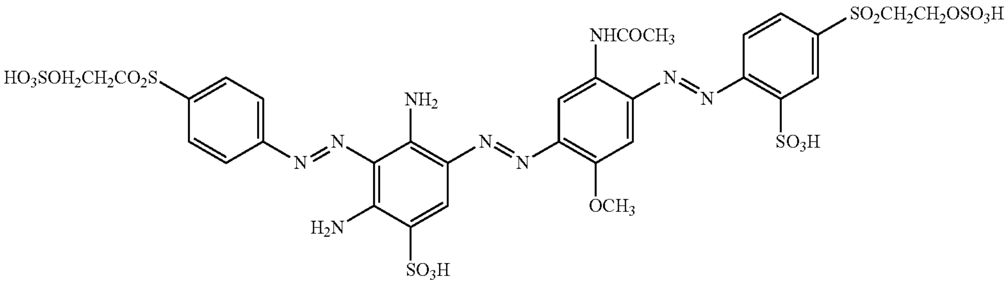
(III-17)
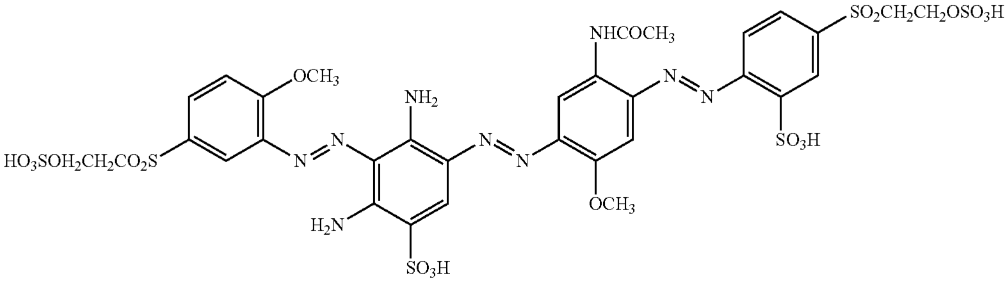
(III-18)
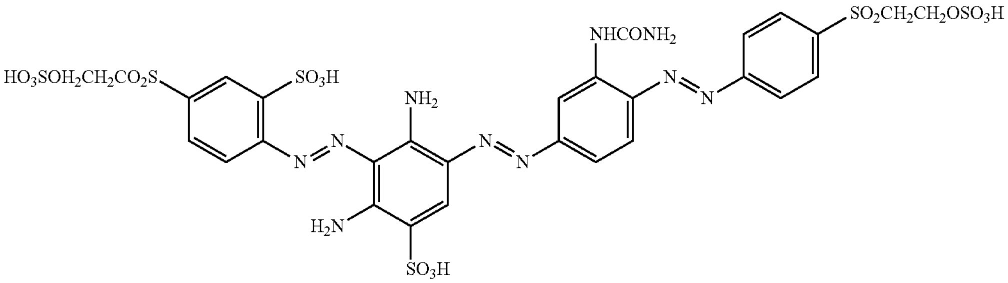
(III-19)
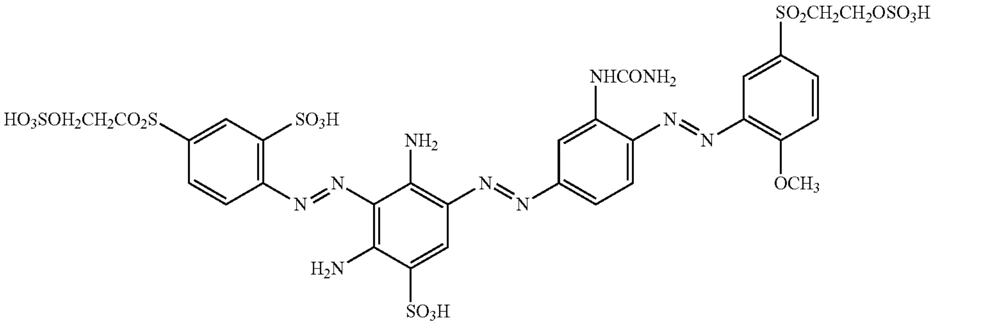
(III-20)
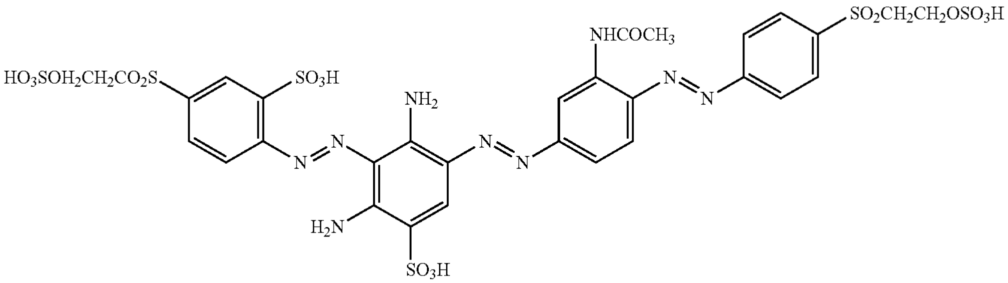

-continued
(III-21)
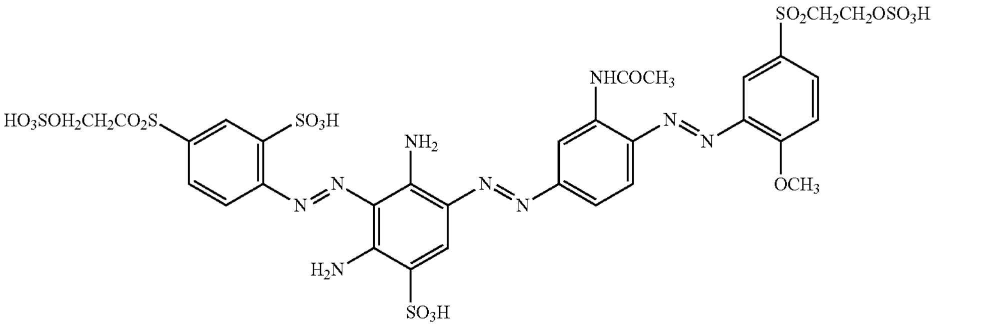
(III-22)
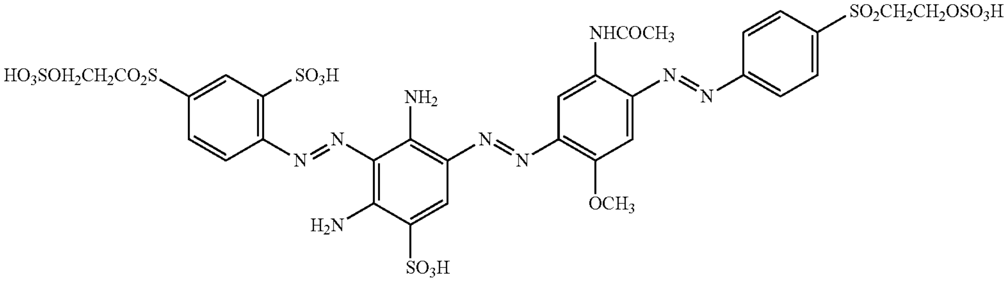
(III-23)
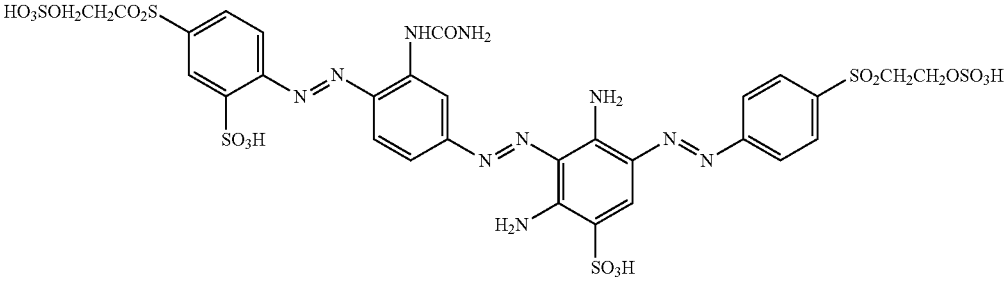
(III-24)
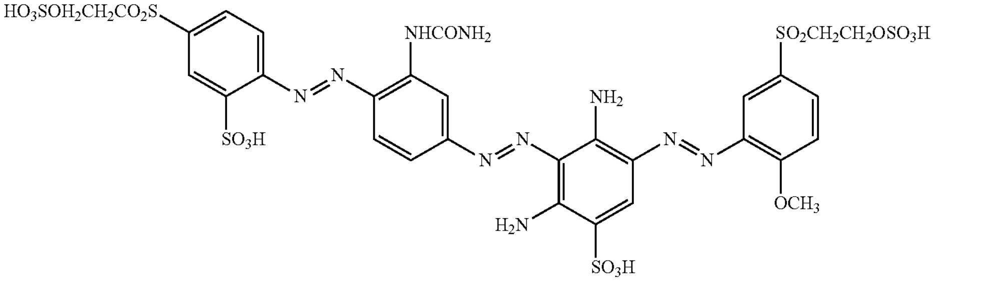
(III-25)
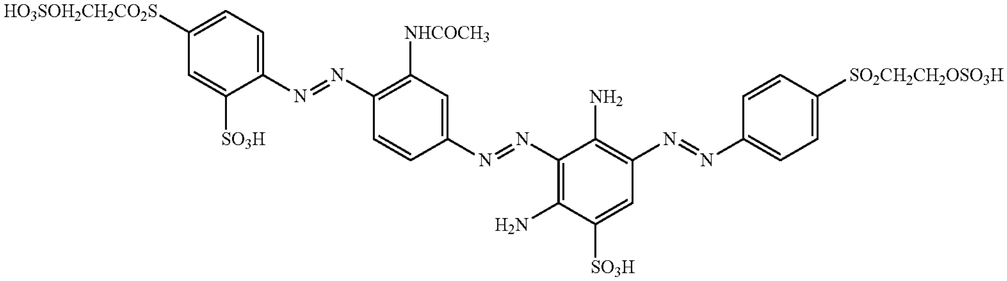

-continued
(III-26)
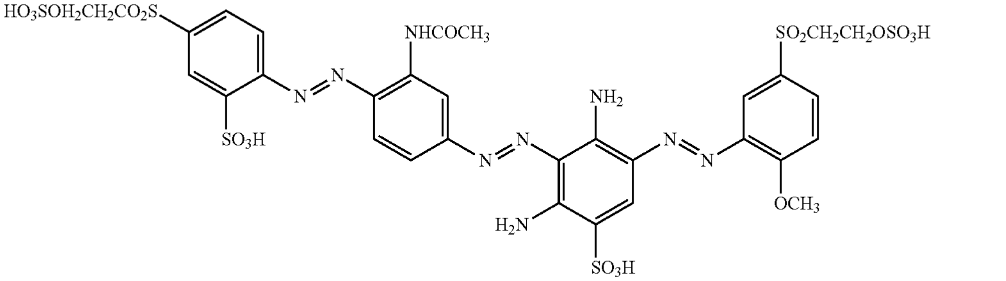
(III-27)
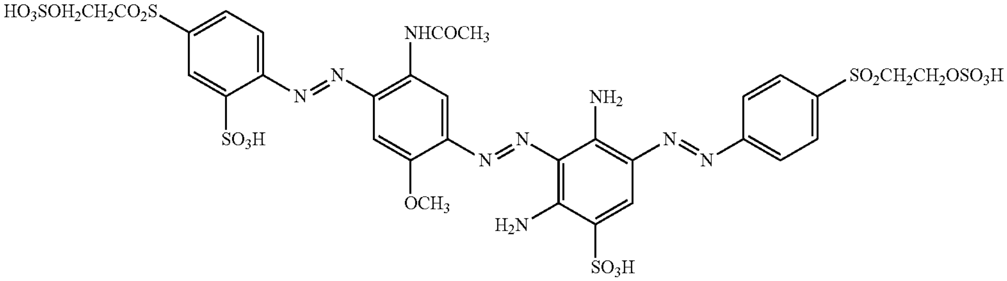
(III-28)
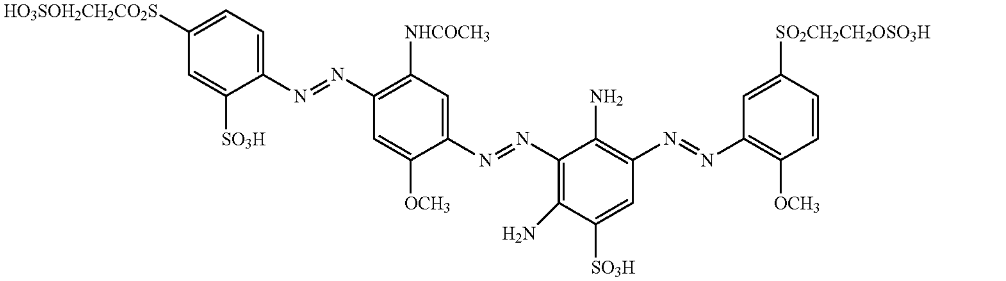
(III-29)
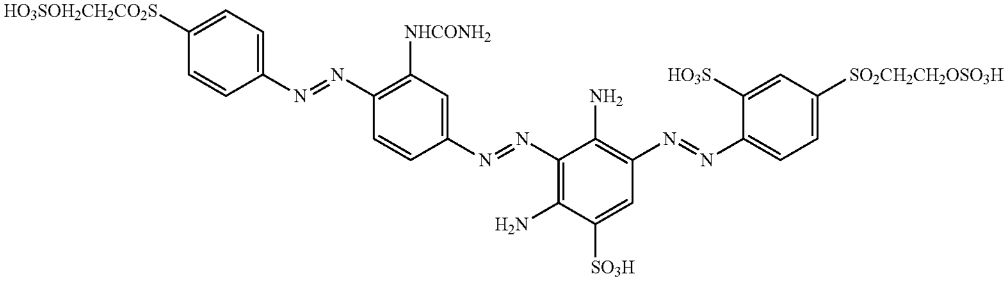
(III-30)
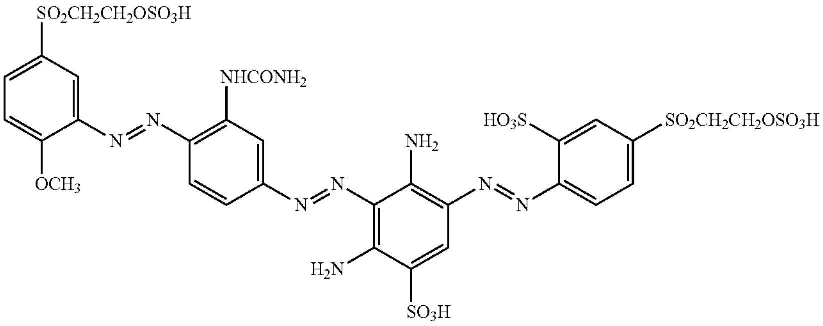

-continued
(III-31)
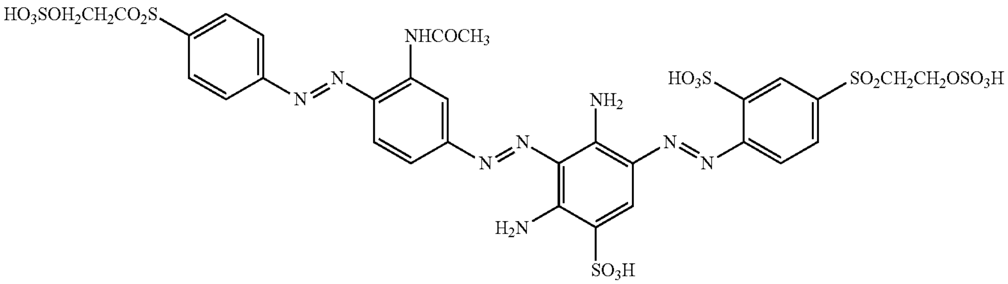
(III-32)
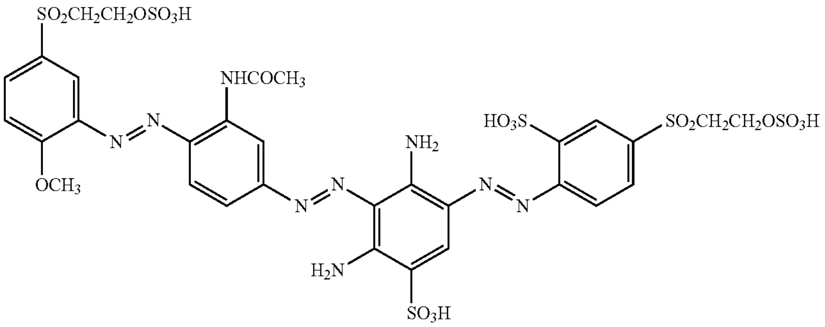
(III-33)
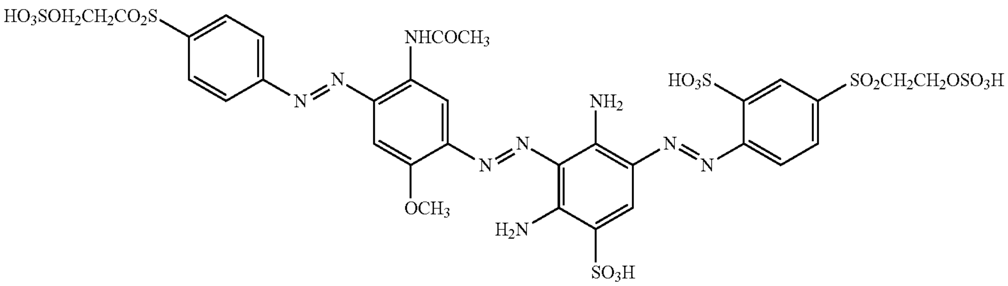
(III-34)
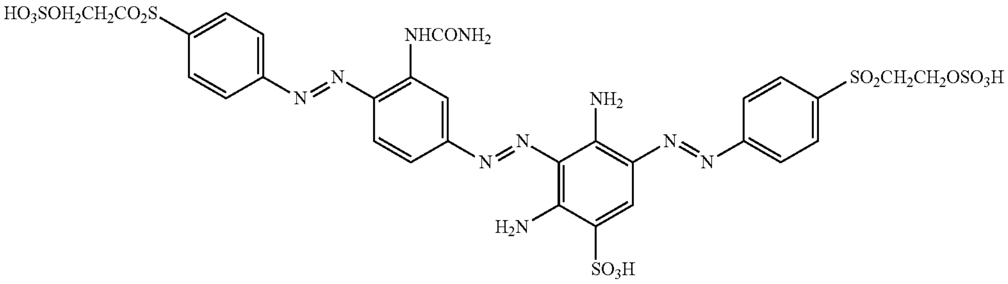
(III-35)
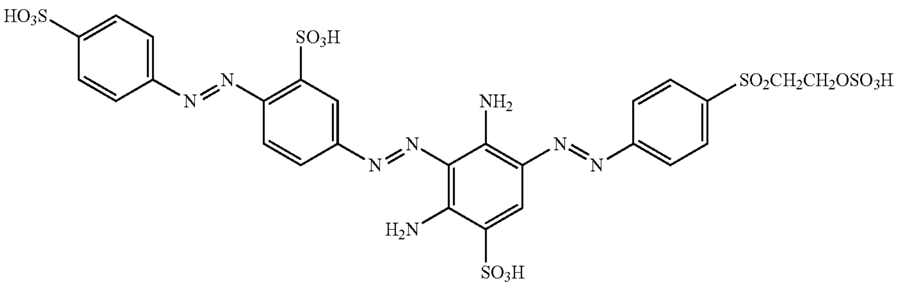

-continued
(III-36)
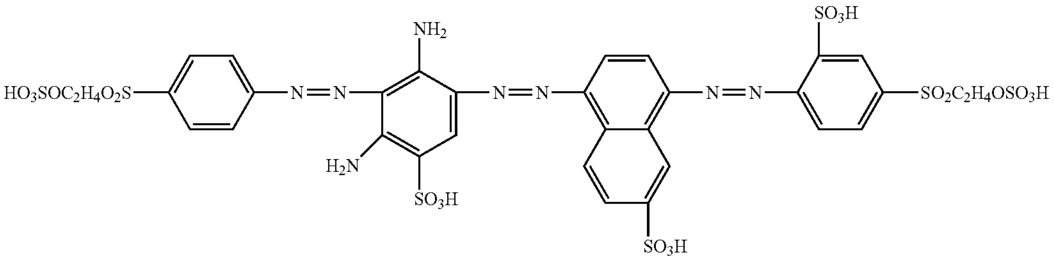
(III-37)
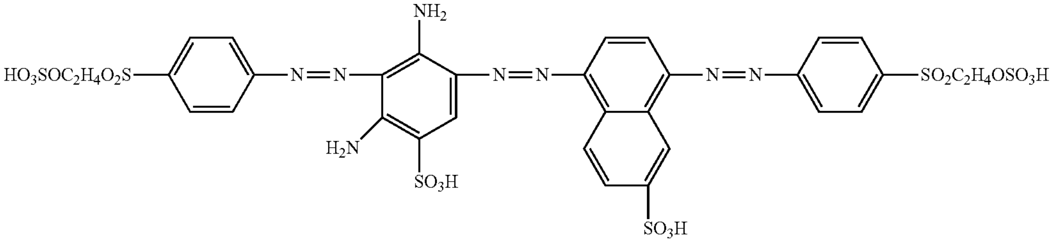
(III-38)
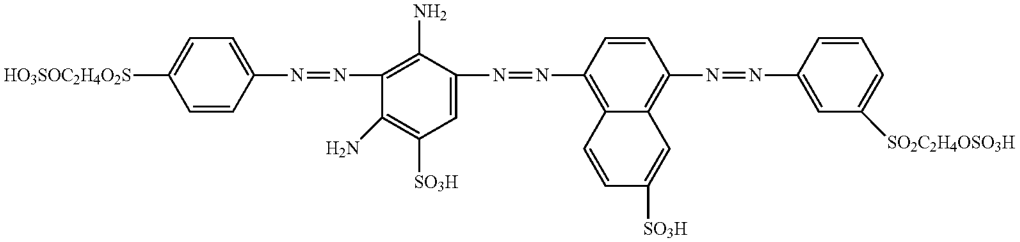
(III-39)
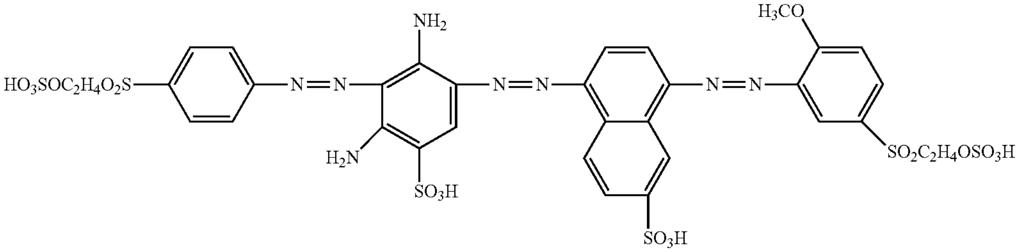
(III-40)
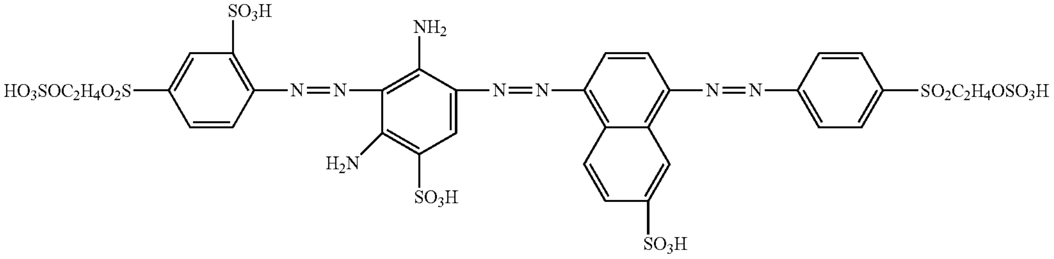
(III-41)
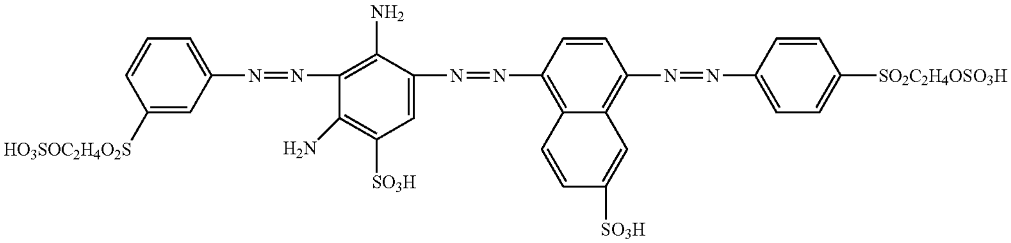

-continued
(III-42)
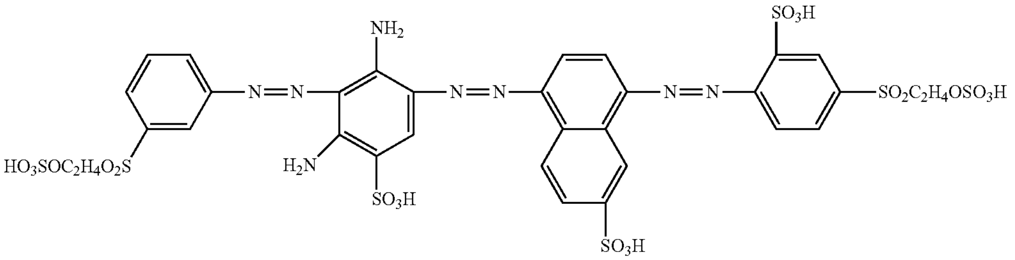
(III-43)
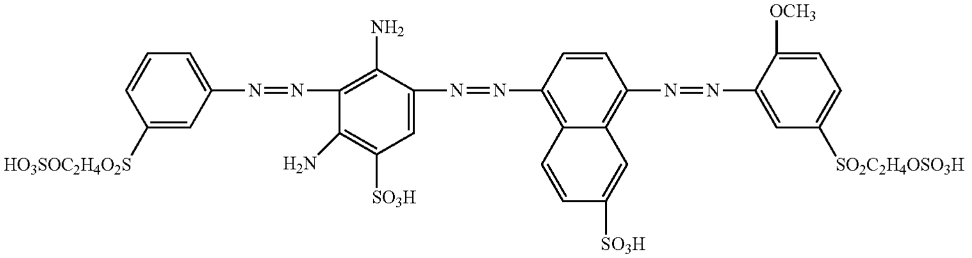
(III-44)
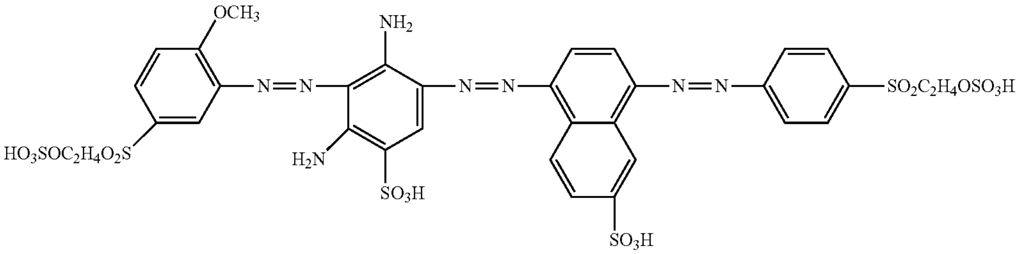
(III-45)
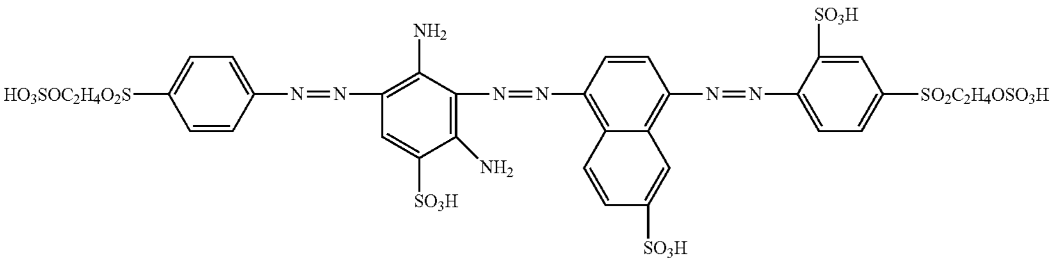
(III-46)
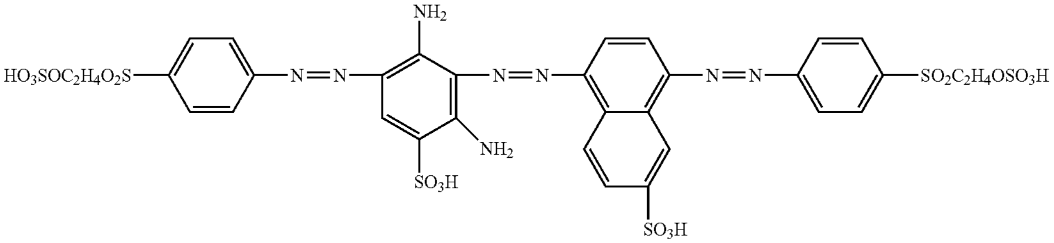
(III-47)
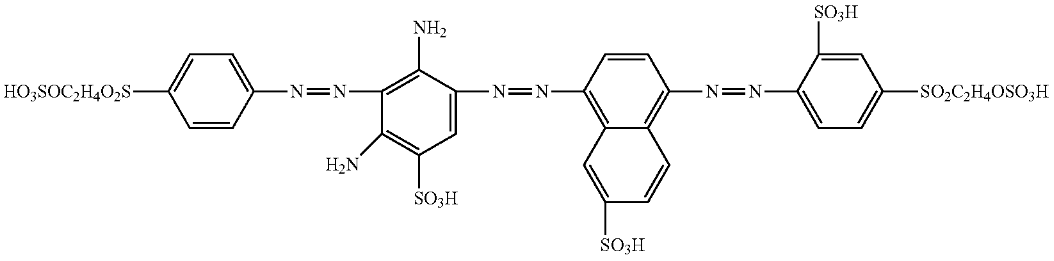

-continued
(III-48)
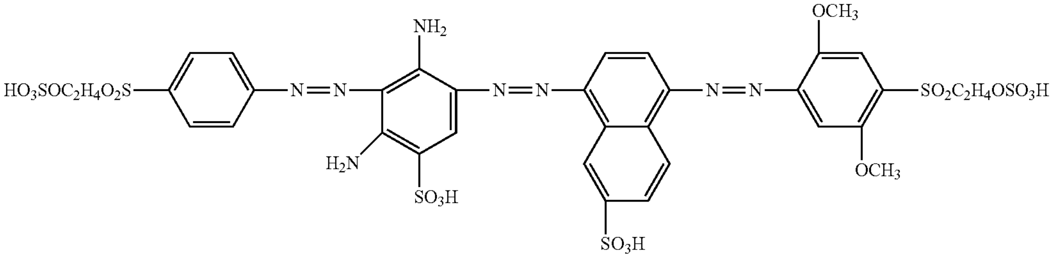
(III-49)
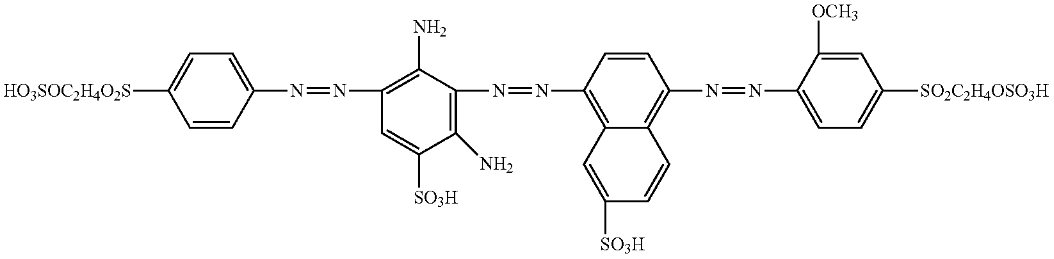
(III-50)
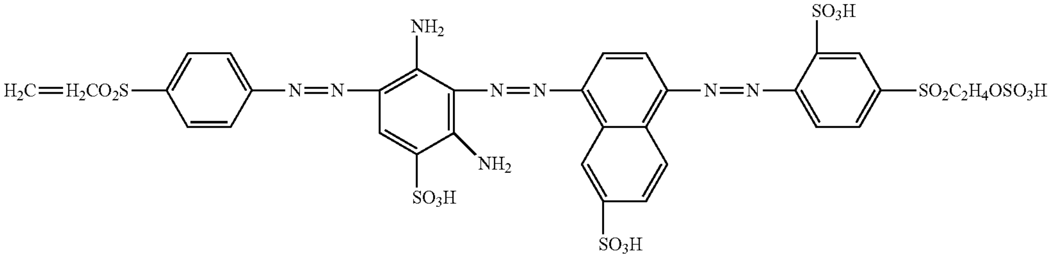
(III-51)
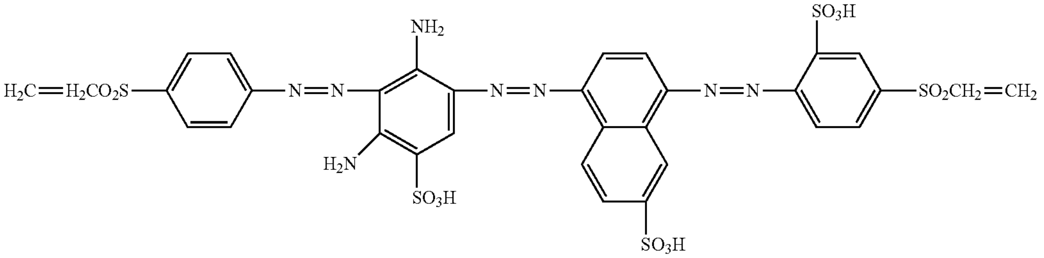
(III-52)
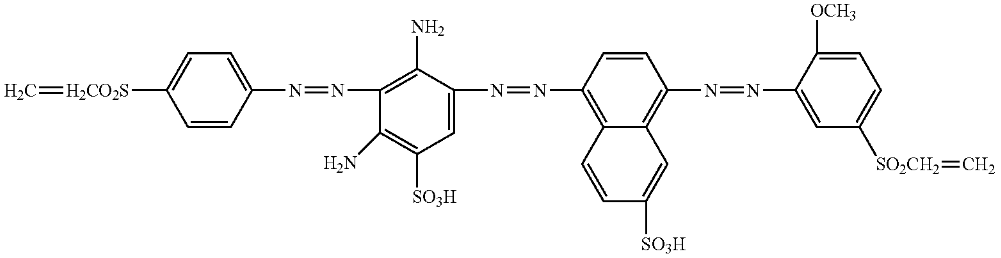

-continued
(IV-1)
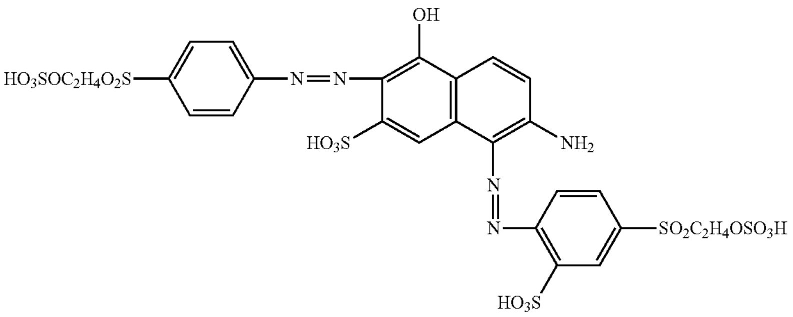
(IV-2)
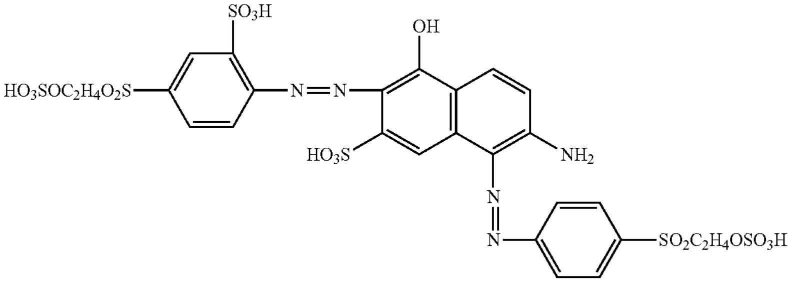
(IV-3)
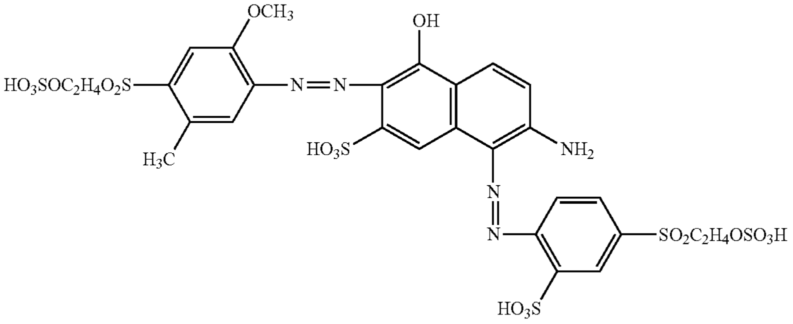
(IV-4)
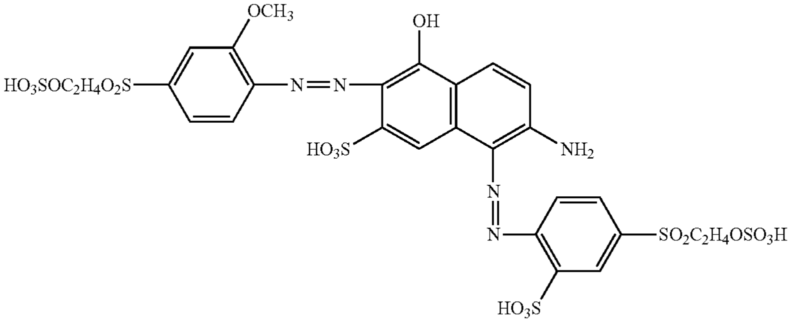
(IV-5)
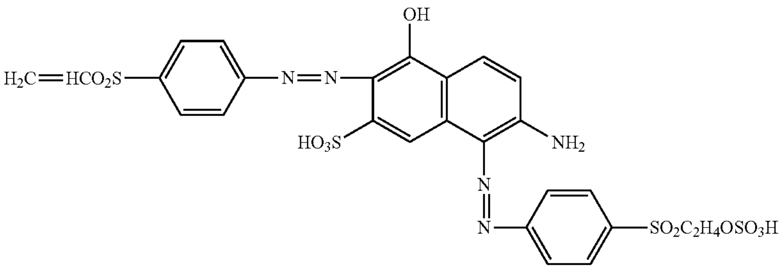

-continued
(IV-6)
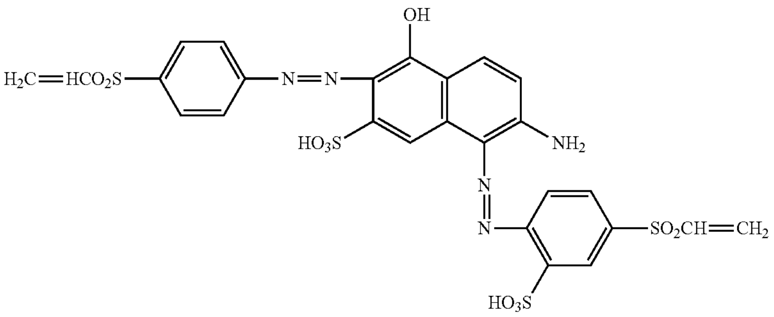
(IV-7)
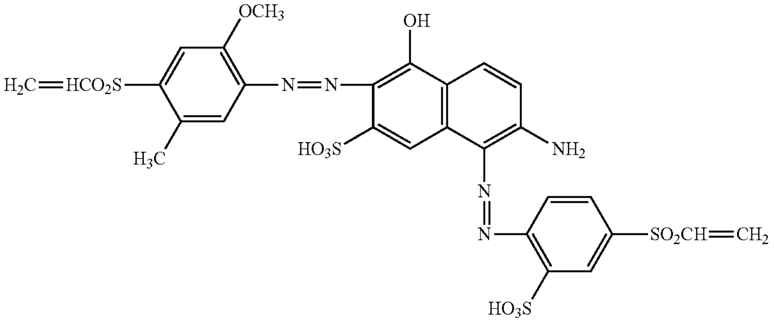
(IV-8)
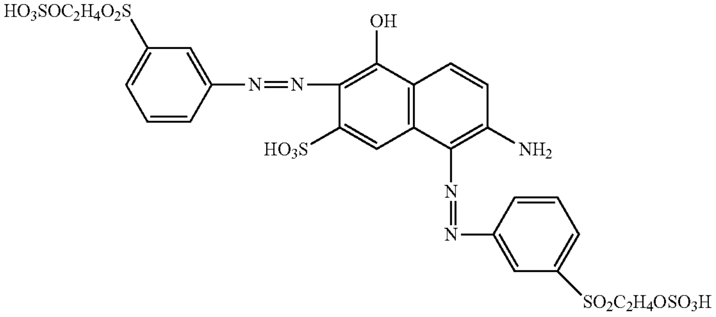
(IV-9)
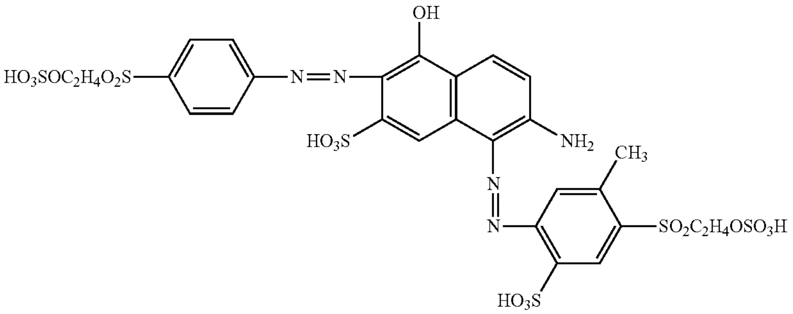
(IV-10)
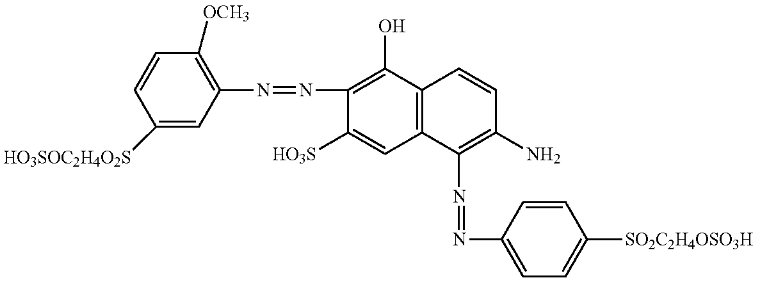

-continued (IV-11)

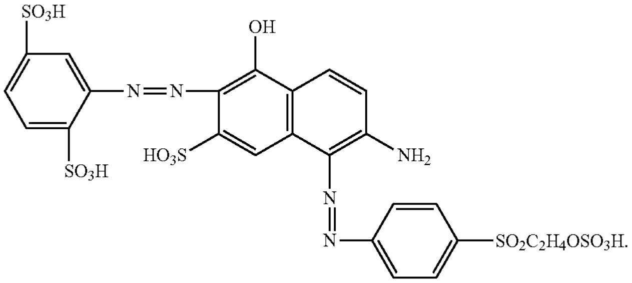

Further, component C is preferably at least one selected from the group consisting of compounds of formulae (III-1)~(III-33) and (IV-1)~(IV-10) and alkali metal salts thereof. More further, component C is preferably at least one selected from the group consisting of compounds of formulae (II-1), (II-2), (III-4), (IV-1) and (IV-3) and alkali metal salts thereof.

Specifically, component D is at least one selected from the group consisting of the following compounds and alkali metal salts thereof:

(V-1)

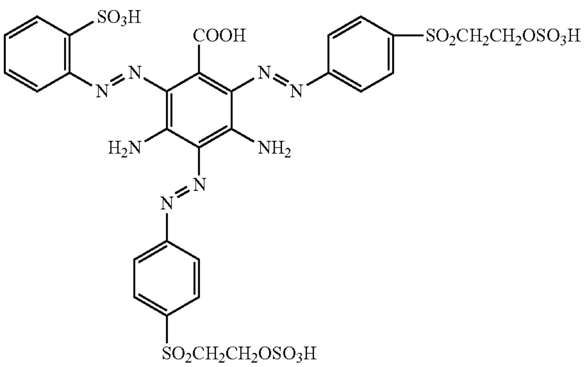

(V-2)

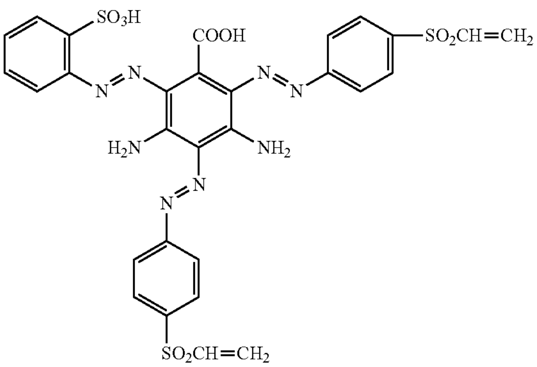

(V-3)

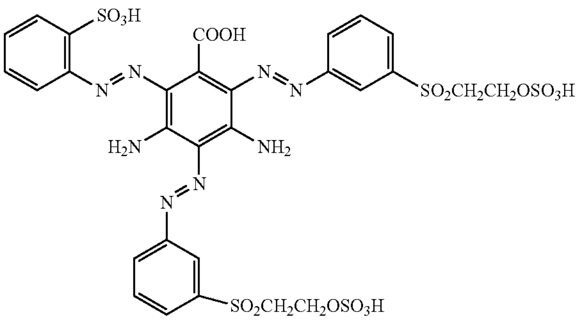

(V-4)

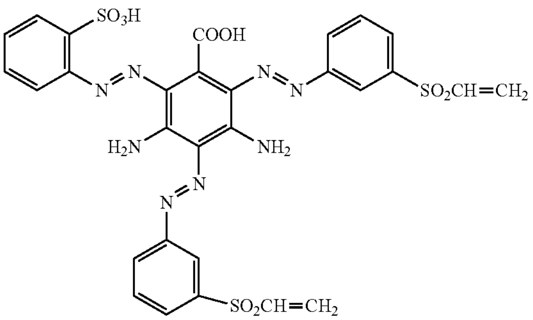

(V-5)

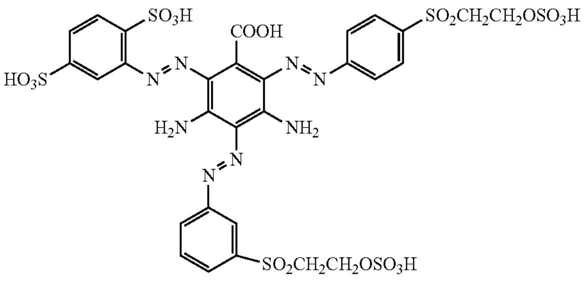

(V-6)

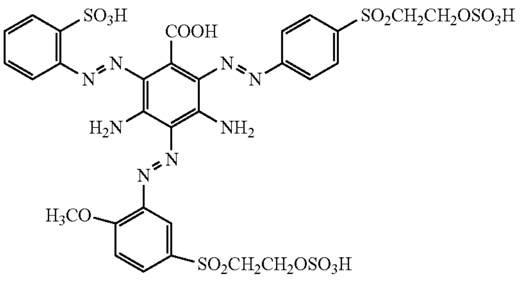

-continued
(V-7)
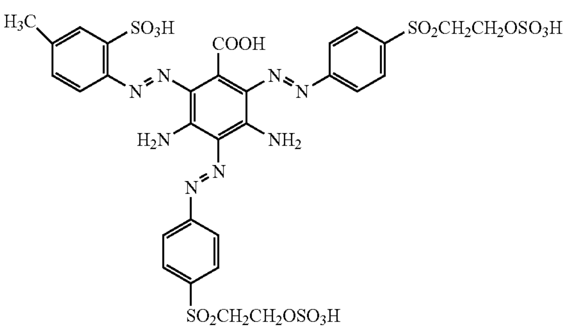
(V-8)
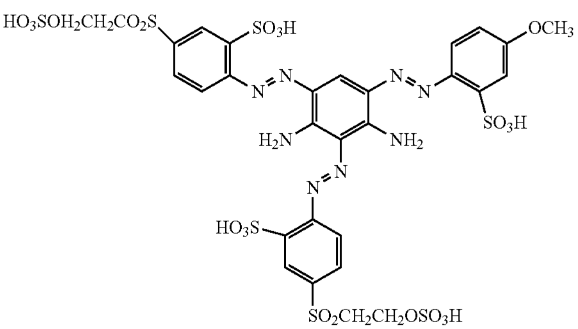
(VI-1)
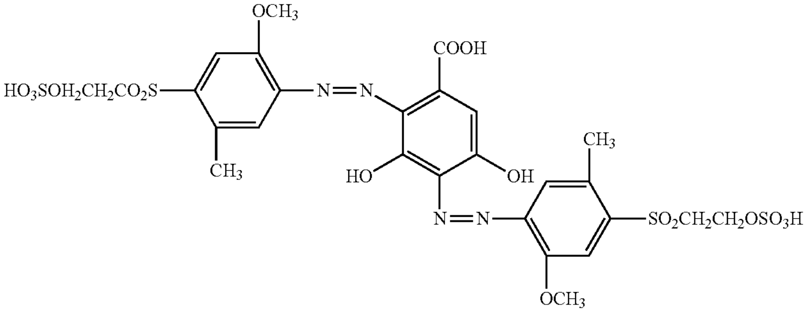
(VI-2)
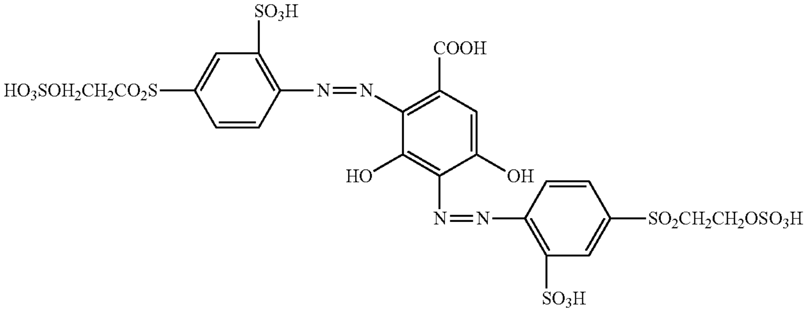
(VI-3)
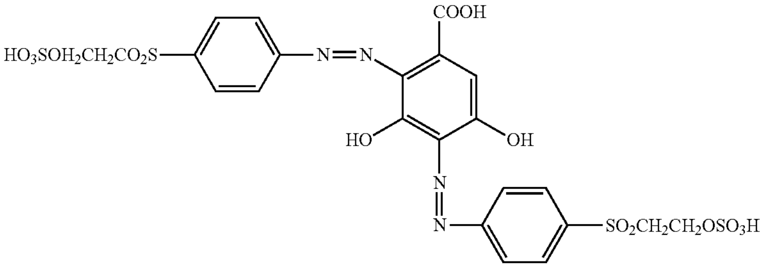
(VI-4)
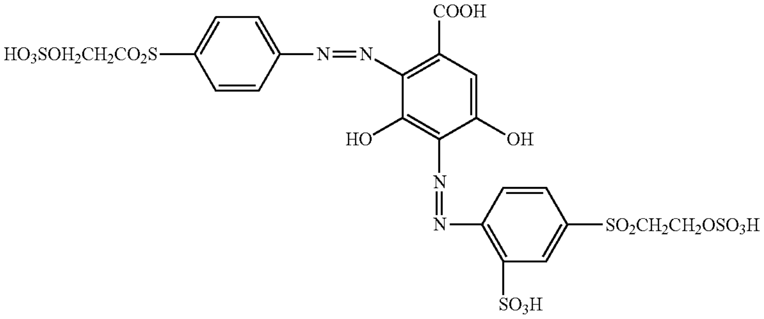

-continued
(VI-5)
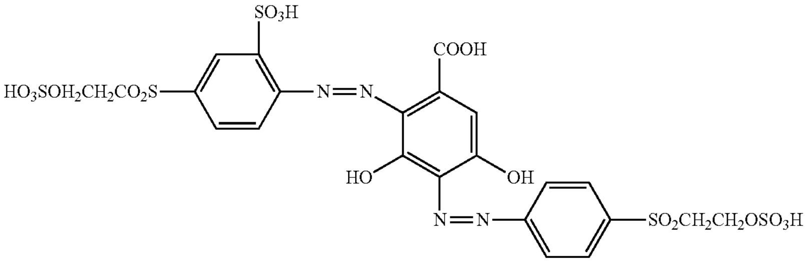
(VI-6)
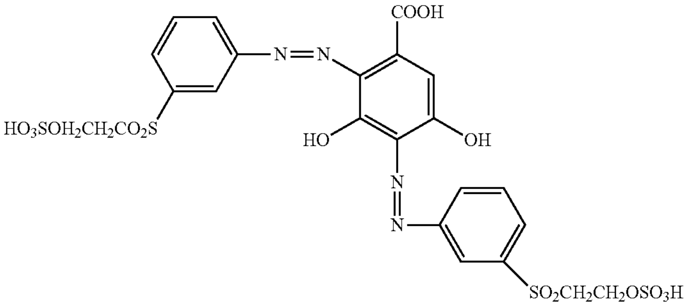
(VI-7)
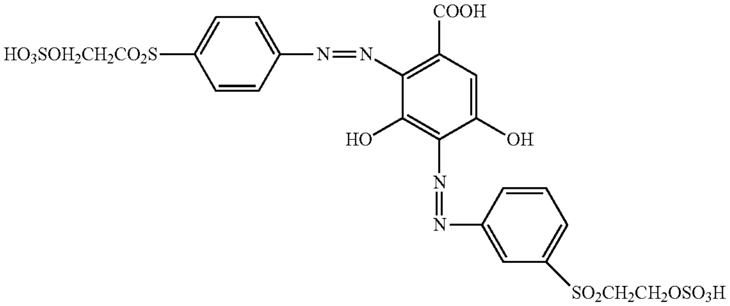
(VI-8)
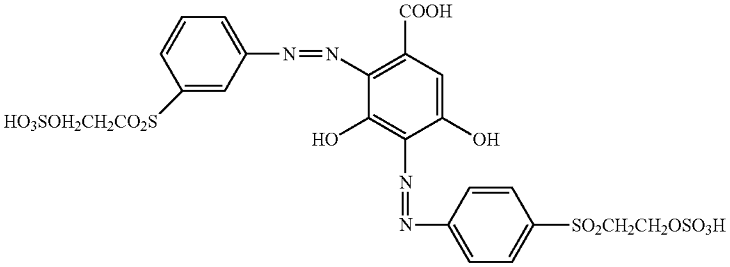
(VI-9)
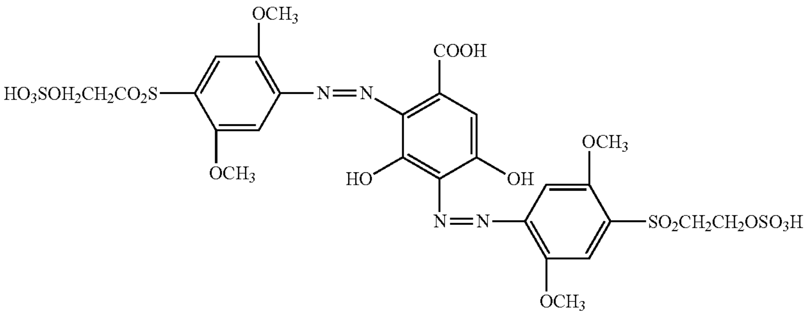

-continued
(VI-10)
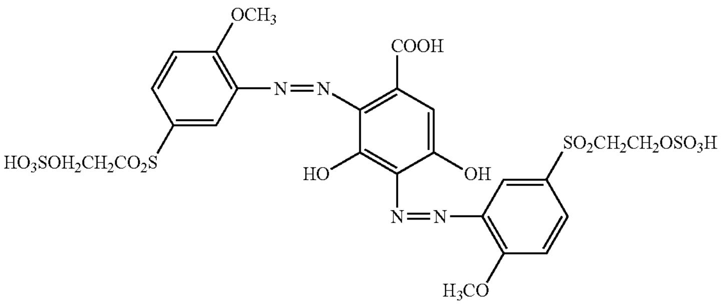
(VI-11)
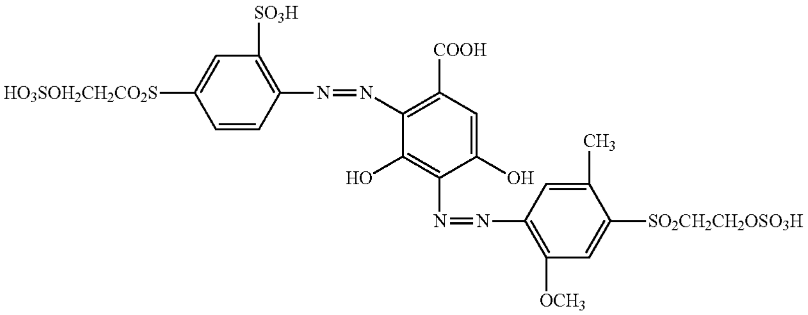
(VI-12)
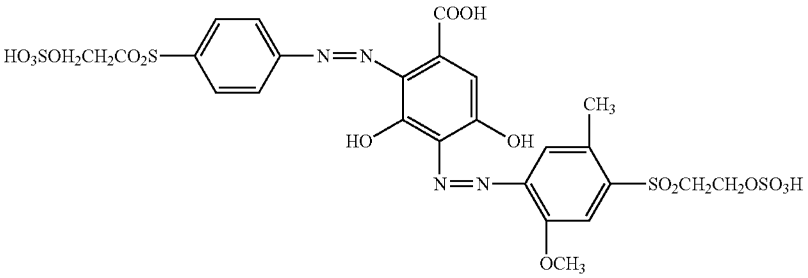
(VI-13)
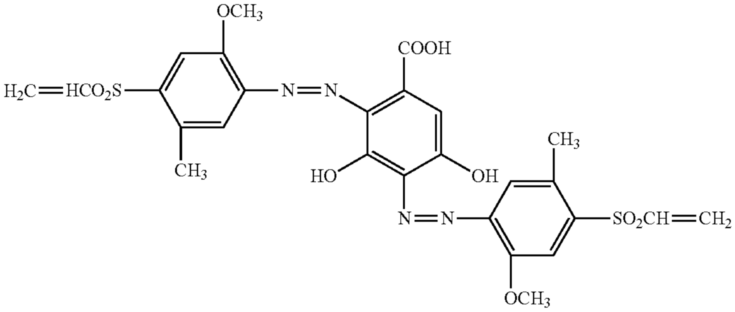
(VI-14)
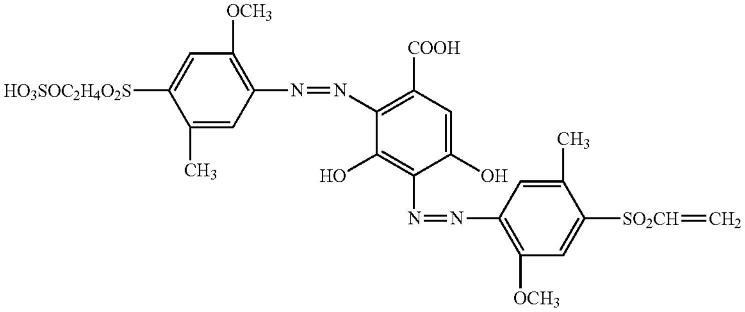

-continued
(VI-15)
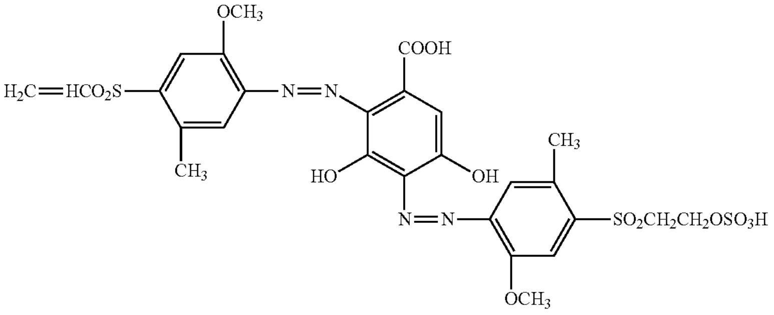
(VI-16)
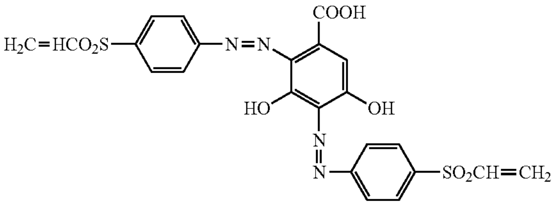
(VI-17)
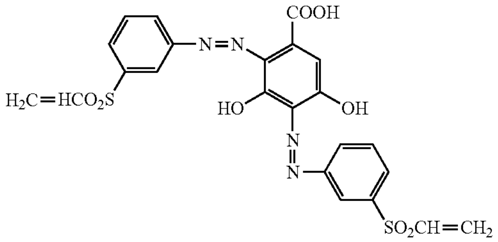
(VI-18)
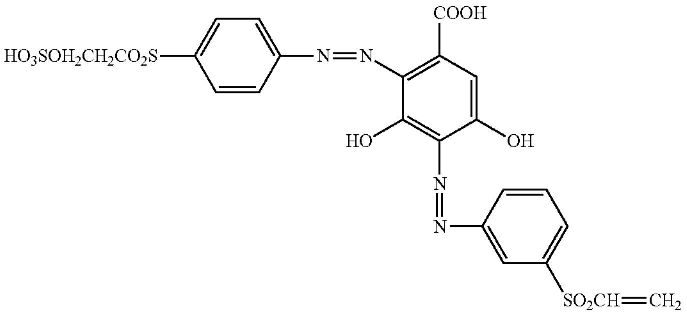
(VI-19)
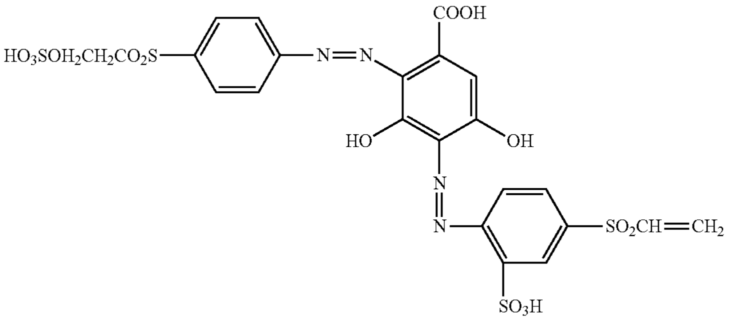
(VI-20)
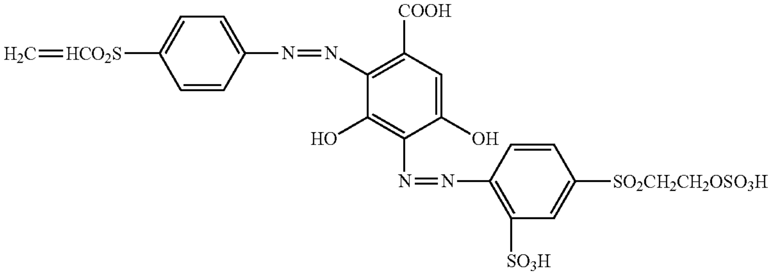

-continued
(VI-21)
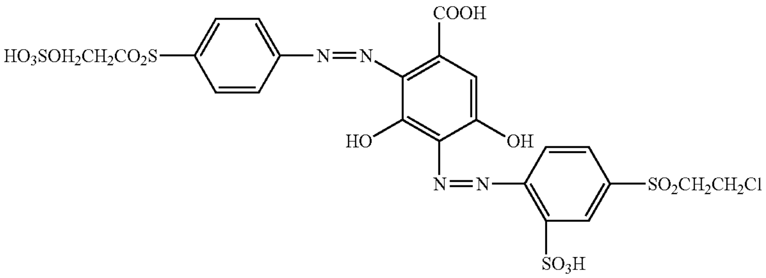
(VI-22)
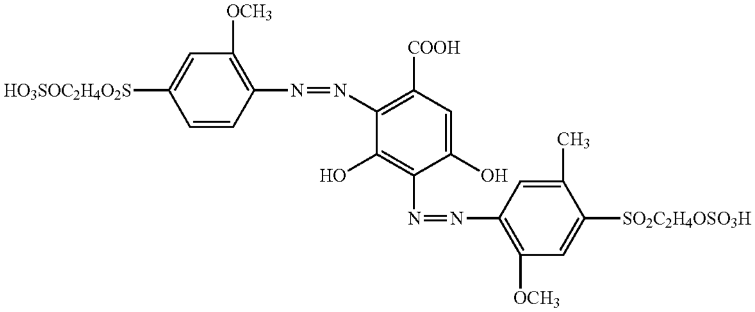
(VI-23)
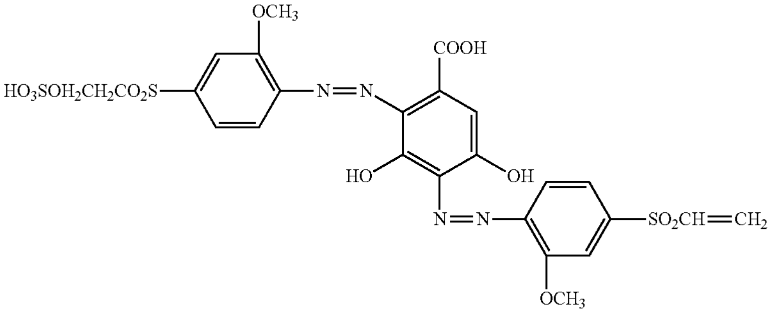
(VI-24)
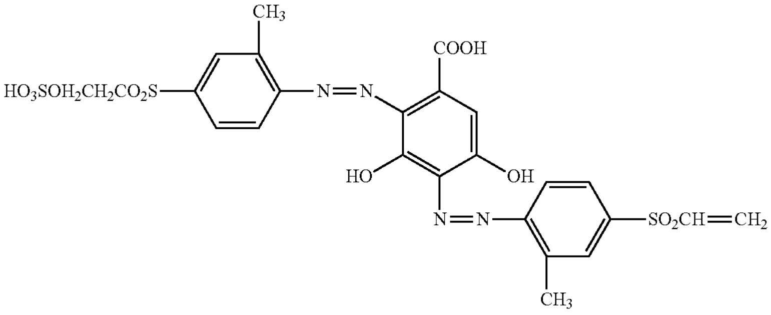
(VI-25)
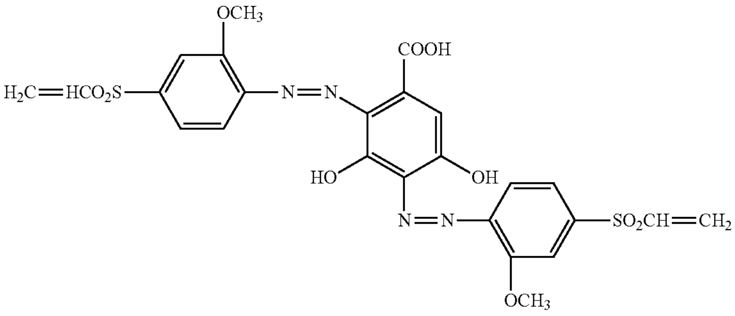

-continued
(VI-26)
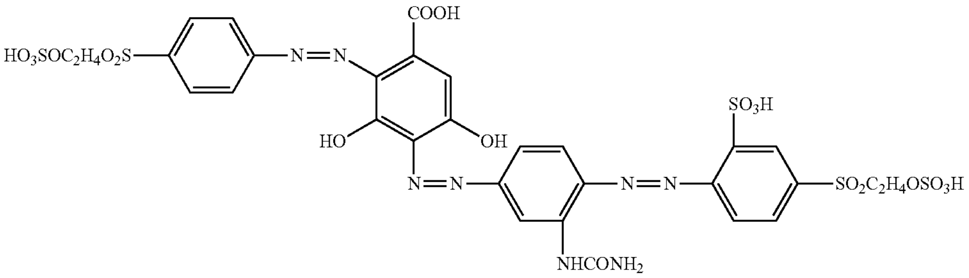
(VI-27)
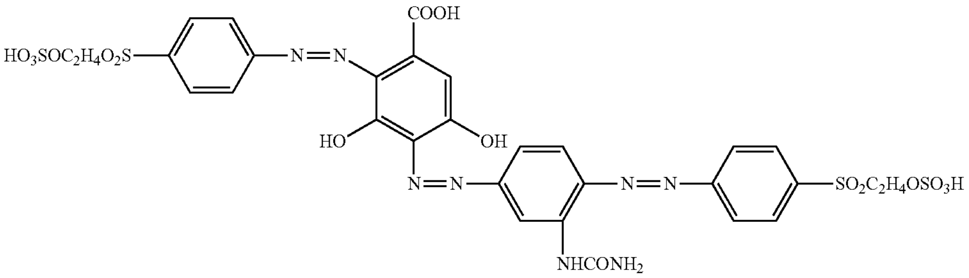
(VI-28)
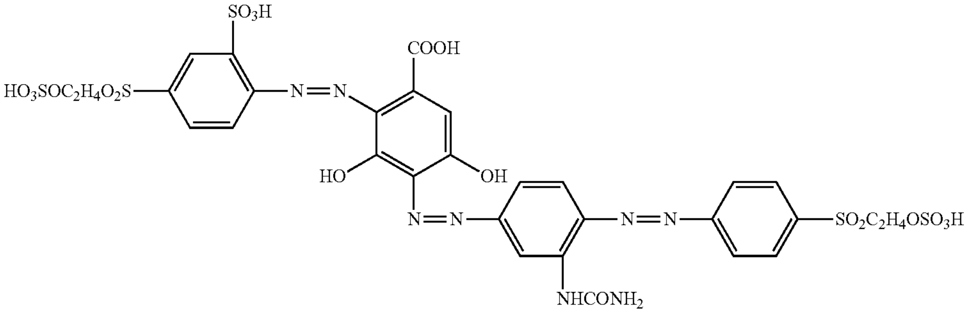
(VI-29)
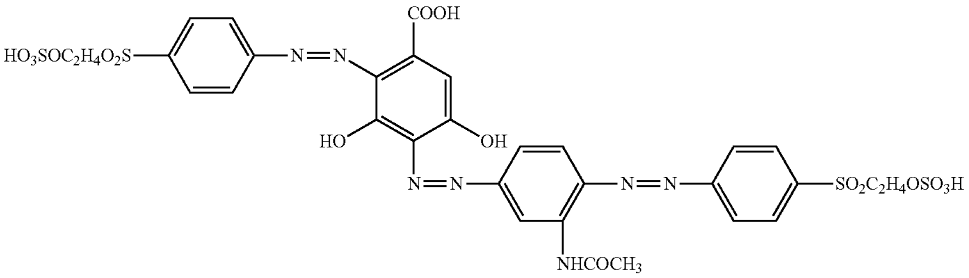
(VI-30)
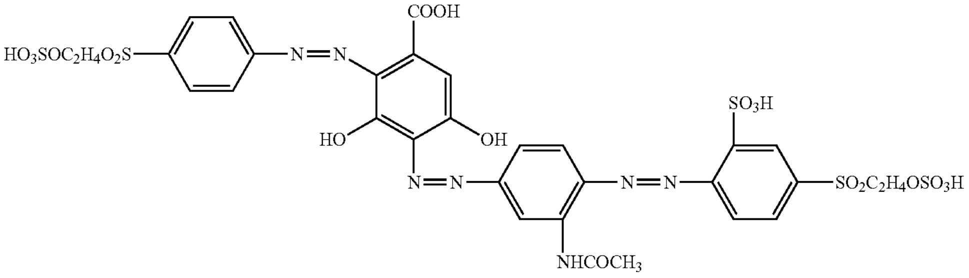

-continued
(VI-31)
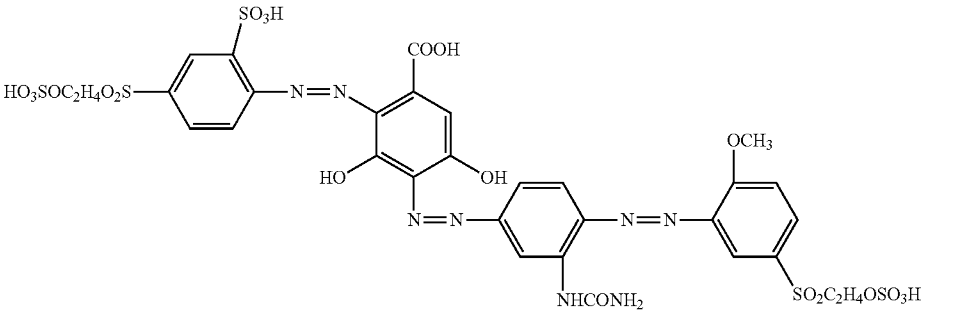
(VI-32)
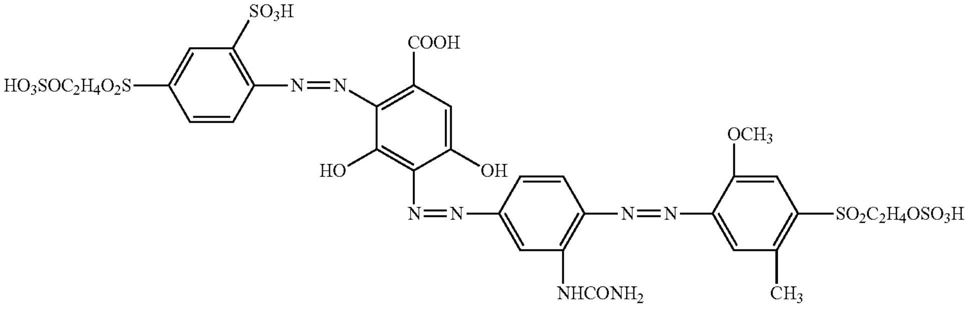
(VI-33)
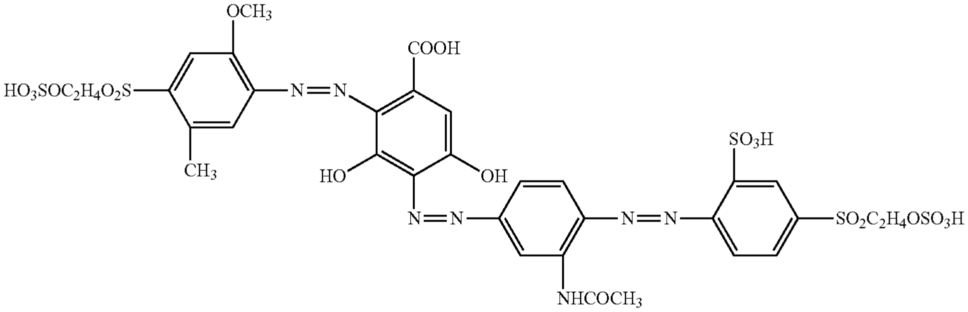
(VI-34)
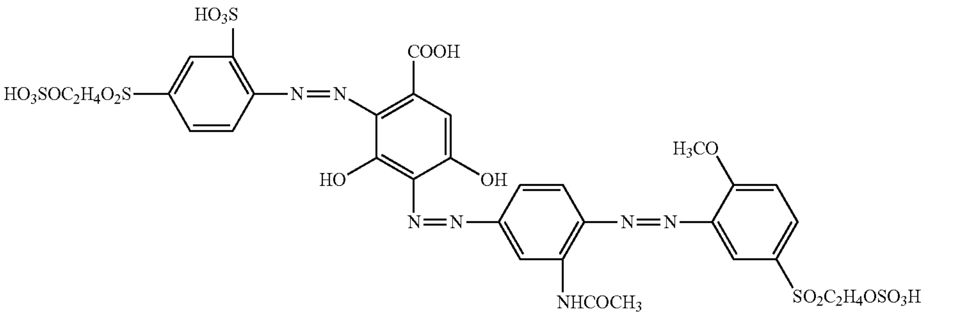
(VI-35)
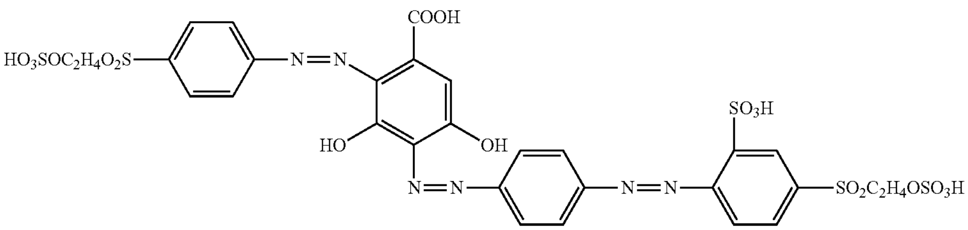

-continued
(VI-36)
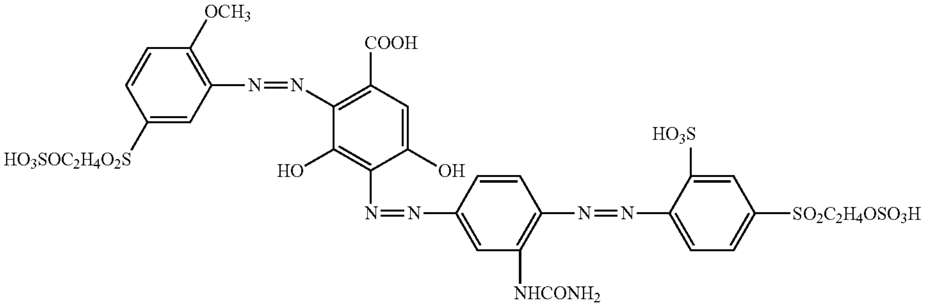
(VI-37)
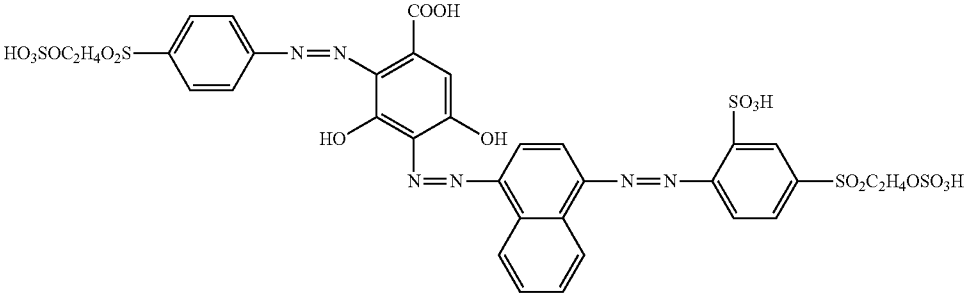
(VI-38)
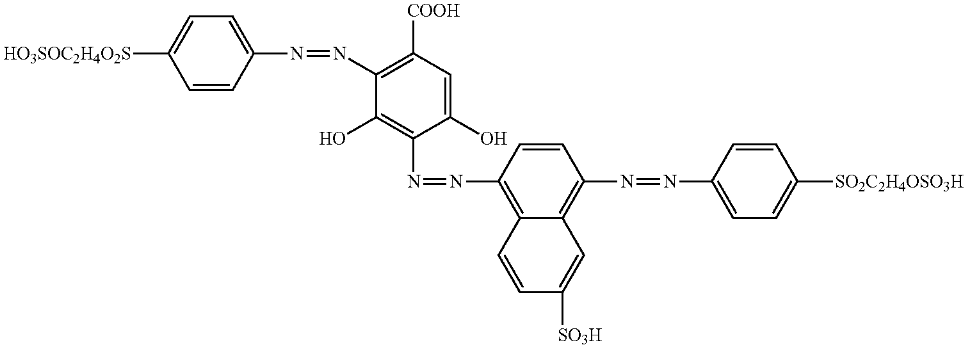
(VI-39)
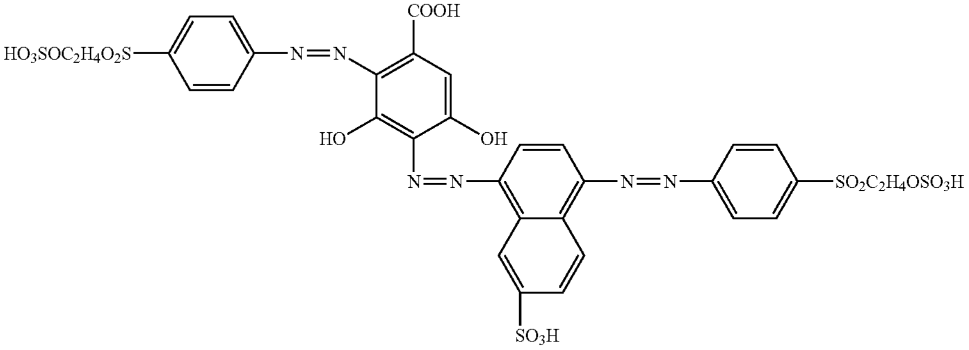
(VI-40)
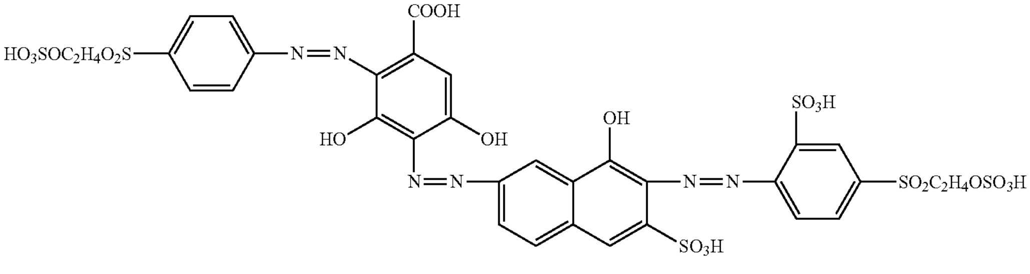

-continued
(VI-41)
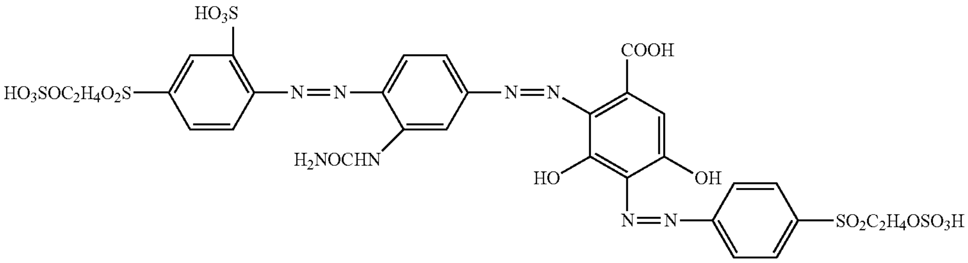
(VI-42)
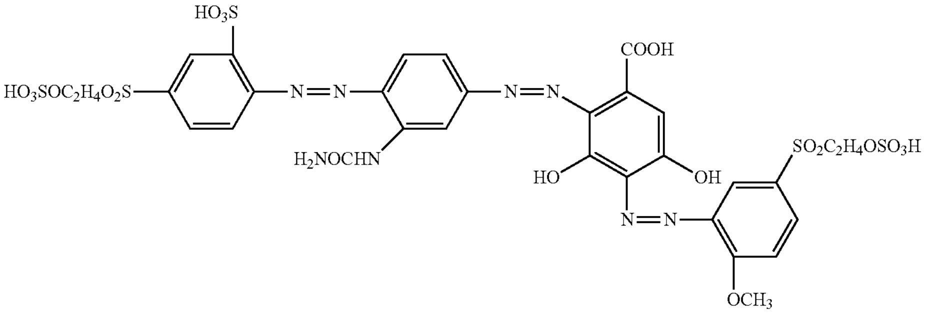
(VI-43)
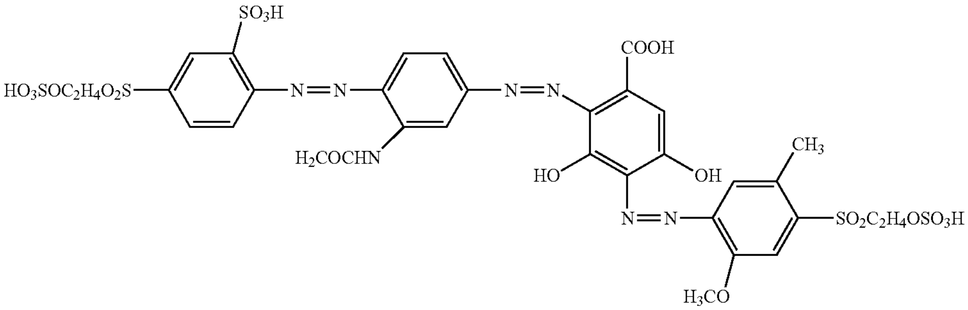
(VI-44)
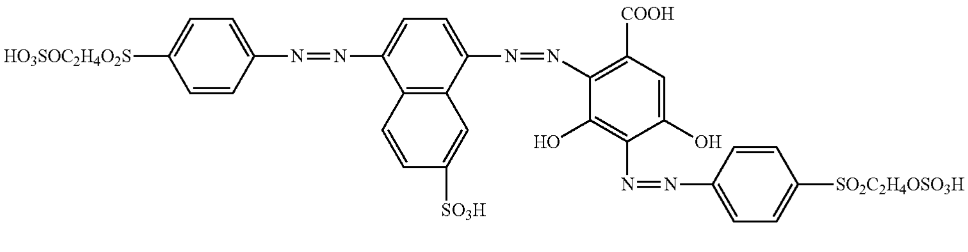
(VI-45)
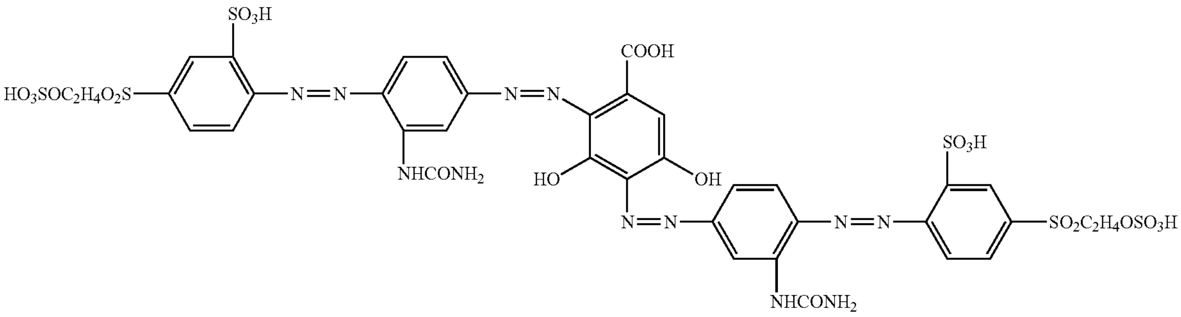

-continued
(VI-46)
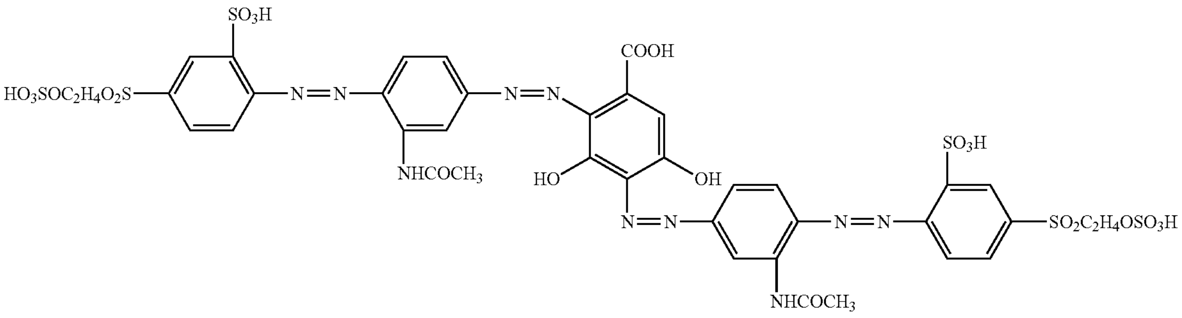
(VI-47)
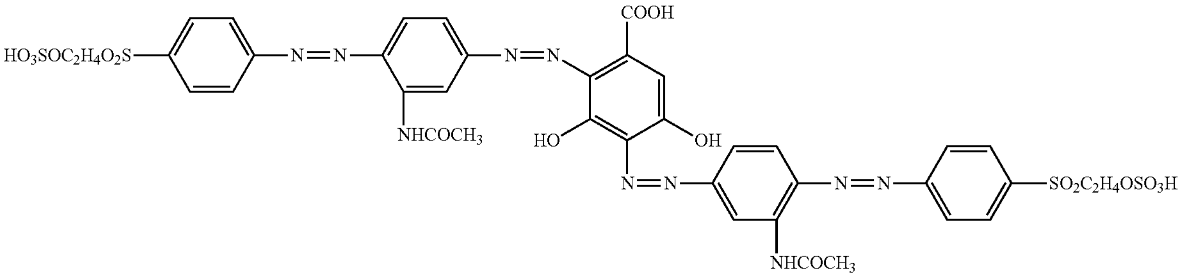
(VI-48)
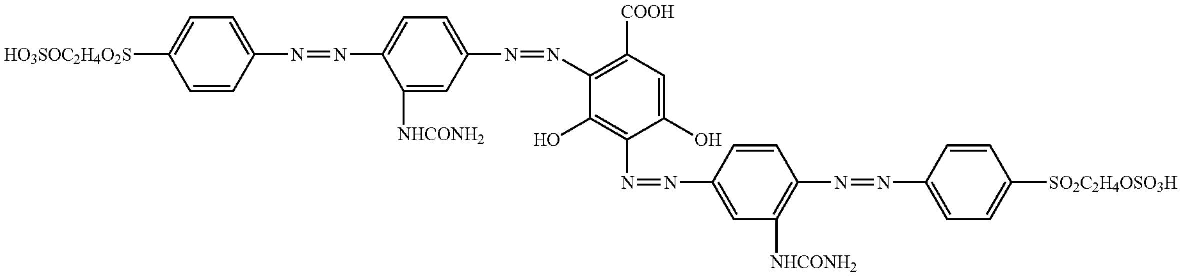
(VI-49)
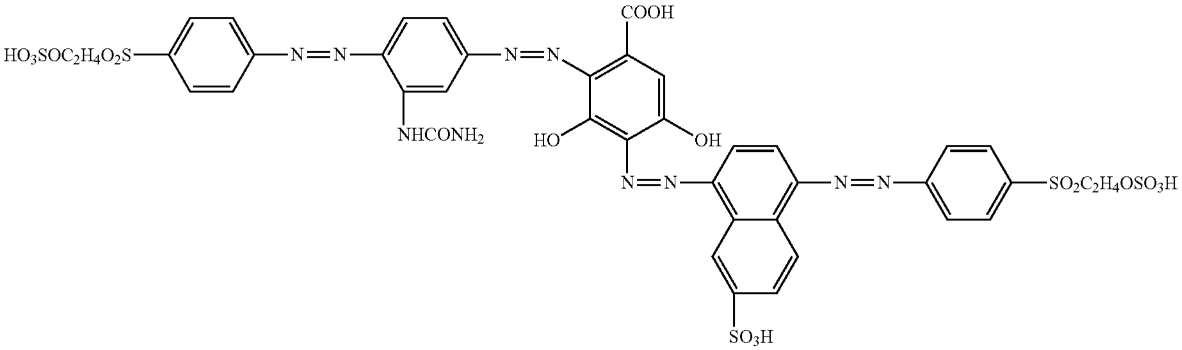
(VI-50)
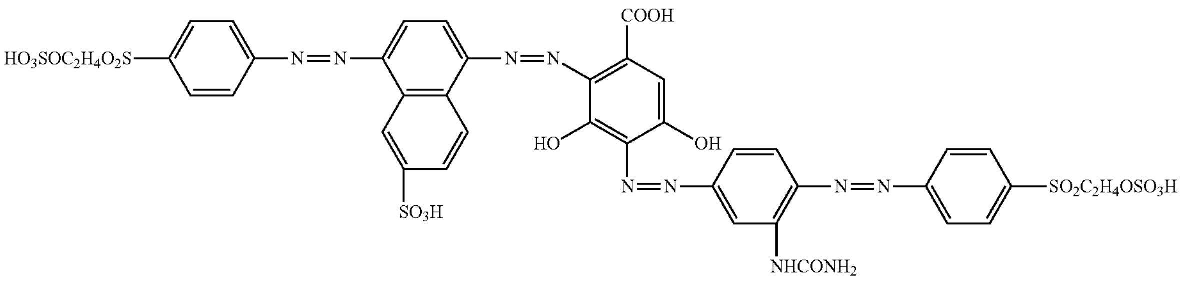

-continued
(VI-51)
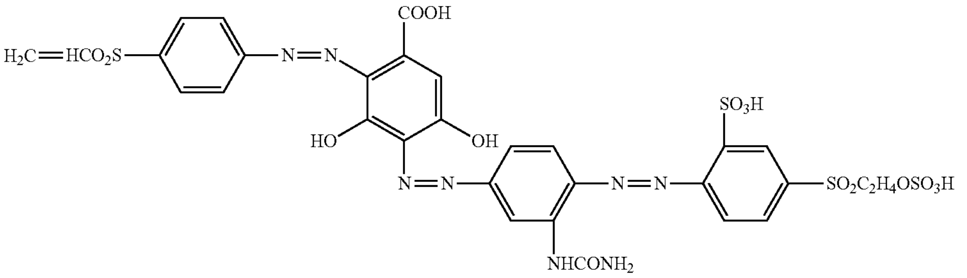
(VI-52)
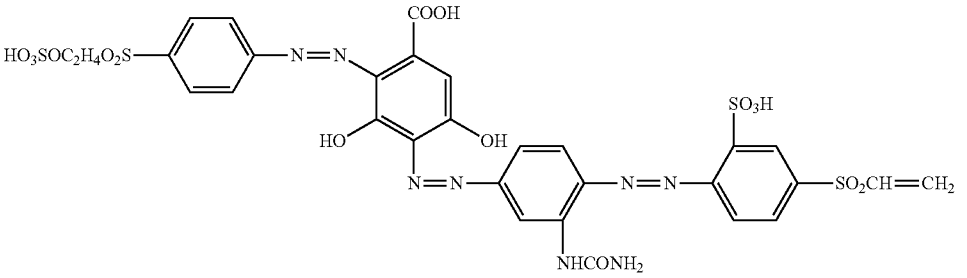
(VI-53)
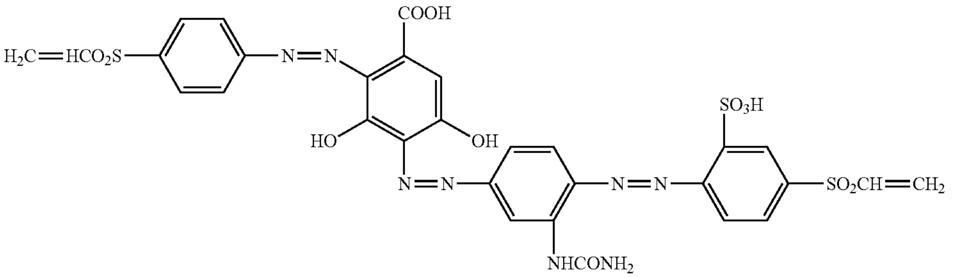
(VI-54)
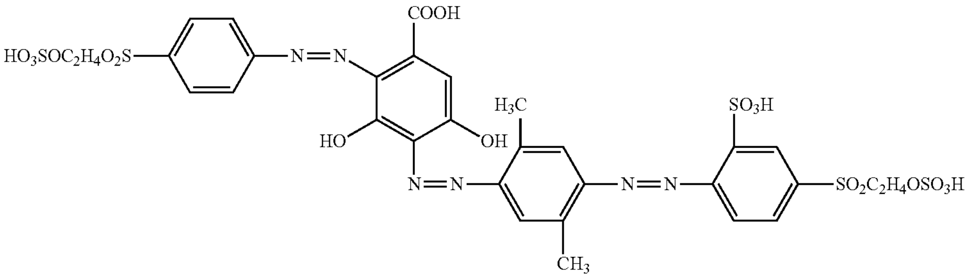
(VI-55)
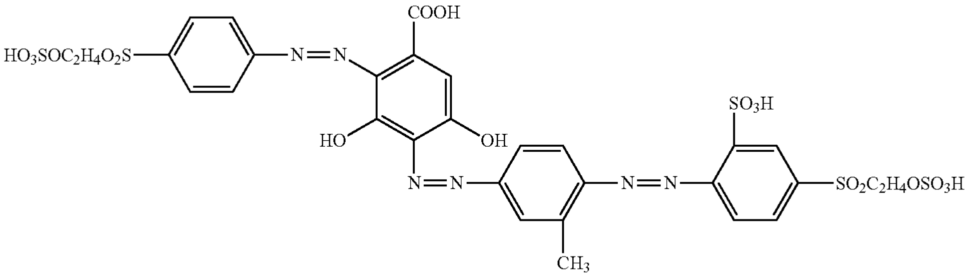

-continued (VII-1)

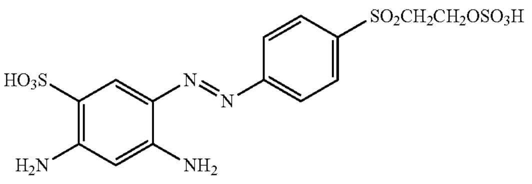

(VII-2)

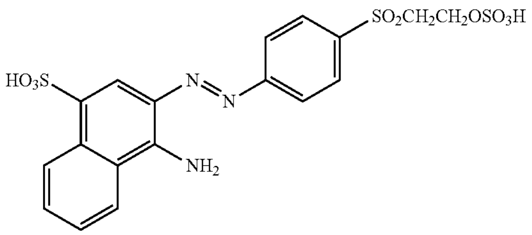

(VII-3)

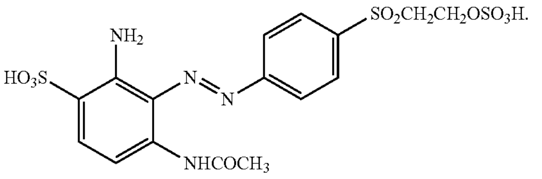

Further, component D is preferably at least one selected from the group consisting of compounds of formulae (VI-1), (VI-3), (VI-4), (VI-26), (VI-27), (VI-31), (VI-38), (VI-41), (VI-42), (VI-45) and (VI-54) and alkali metal salts thereof.

More further, component D is preferably at least one selected from the group consisting of compounds of formulae (VI-26), (VI-27), (VI-41) and (VI-42) and alkali metal salts thereof.

The dye composition of the present invention particularly preferably comprises component A and component B, wherein component A is at least one selected from the group consisting of dye compounds of formulae (I-1)~(I-28) and (I-48)~(I-55) and alkali metal salts thereof, even more preferably at least one selected from the group consisting of dye compounds of formulae (I-1), (I-2), (I-4), (I-5), (I-6) and (I-7) and alkali metal salts thereof;

and component B is at least one selected from the group consisting of dye compounds of formulae (II-1) and (II-3) and alkali metal salts thereof;

based on the sum of the masses of components A and B, the mass percentage of component A is 5-50%, and the mass percentage of component B is 50-95%.

Particularly preferably, the dye composition of the present invention comprises component A, component B and component C, wherein component A is at least one selected from the group consisting of dye compounds of formulae (I-1) (I-28) and (I-48)~(I-55) and alkali metal salts thereof, even more preferably at least one selected from the group consisting of dye compounds of formulae (I-1), (I-2), (I-4), (I-5), (I-6) and (I-7) and alkali metal salts thereof;

component B is at least one selected from the group consisting of dye compounds of formulae (II-1) and (II-3) and alkali metal salts thereof;

and component C is at least one selected from the group consisting of dye compounds of formulae (III-1), (III-2), (III-4), (IV-1) and (IV-3) and alkali metal salts thereof; based on the sum of the masses of components A and B, the mass percentage of component A is 5-50%, the mass percentage of component B is 50-95%, and the mass of component C is 1~50% of the total mass of components A and B.

Particularly preferably, the dye composition of the present invention comprises component A, component B and component D, wherein component A is at least one selected from the group consisting of dye compounds of formulae (I-1) (I-28) and (I-48)~(I-55) and alkali metal salts thereof, even more preferably at least one selected from the group consisting of dye compounds of formulae (I-1), (I-2), (I-4), (I-5), (I-6) and (I-7) and alkali metal salts thereof;

component B is at least one selected from the group consisting of dye compounds of formulae (II-1) and (II-3) and alkali metal salts thereof;

and component D is preferably at least one selected from the group consisting of compounds of formulae (VI-26), (VI-27), (VI-41) and (VI-42) and alkali metal salts thereof;

based on the sum of the masses of components A and B, the mass percentage of component A is 5-50%, the mass percentage of component B is 50-95%, and the mass of component D is 1~50% of the total mass of components A and B.

Particularly preferably, the dye composition of the present invention comprises component A, component B, component C and component D, wherein component A is at least one selected from the group consisting of dye compounds of formulae (I-1)~(I-28) and (I-48)~(I-55) and alkali metal salts thereof, even more preferably at least one selected from the group consisting of dye compounds of formulae (I-1), (I-2), (I-4), (I-5), (I-6) and (I-7) and alkali metal salts thereof;

component B is at least one selected from the group consisting of dye compounds of formulae (II-1) and (II-3) and alkali metal salts thereof;

component C is at least one selected from the group consisting of dye compounds of formulae (III-1), (III-2), (III-4), (IV-1) and (IV-3) and alkali metal salts thereof;

and component D is at least one selected from the group consisting of dye compounds of formulae (VI-26), (VI-27), (VI-41) and (VI-42) and alkali metal salts thereof; based on the sum of the masses of components A and B, the mass percentage of component A is 5-50%, the mass percentage of component B is 50-95%, the mass of component C is 1~50% of the total mass of components A and B, and the mass of component D is 1-50% of the total mass of components A and B.

In the reactive navy to black dye composition of the present invention, the dye compounds of formulae (II)~(VI) used are all known dyes, and can be synthesized by conventional methods, for example, synthesized by using suitable components well known to those skilled in the art in necessary proportions by means of conventional diazotization and coupling reactions, or prepared according to the methods described in the applications CN101250334A, CN105176139A, CN 105524485A, CN1266869A and CN109971208A or the like.

The reactive dye compound of formula (I) can also be prepared by diazotization and coupling reactions commonly used in reactive dyes, for example:

(Ia)

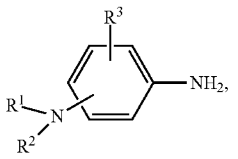

(Ib)

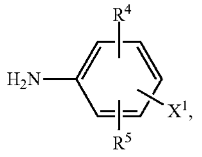

(Ic)

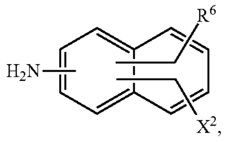

the substituents in the formulae (Ia)~(Ic) are the same as defined in formula (I).

(1) Diazotization Reaction:

according to needs, the compounds of formulae (Ia), (Ib) and/or (Ic) are each beaten with ice water for 1 to 2 hours; after the beating, a certain amount of hydrochloric acid is added, and then a sodium nitrite solution is added within 20-30 min, the diazotization reaction is carried out by controlling pH at between 0.5 and 3.0 (preferably between 0.5 and 2.0) and temperature T at between 0° C. and 30° C. (preferably at between 0° C. and 20° C.), the end point of the reaction is detected with an ethanol solution of 4-dimethylaminobenzaldehyde (that is, if no color change within 5 s, the end point is reached); after the diazotization, excess sodium nitrite is eliminated with sulfamic acid, and the diazonium solution of formula (Ia), (Ib) or (Ic) is obtained and stored for use; wherein the molar ratio of each of the compounds of formula (Ia), (Ib) or (Ic) to hydrochloric acid and sodium nitrite is 1:(1-3):(1-1.1), preferably is 1:(1-1.8):(1-1.05);

(2) Coupling Reaction:

first, 3,5-diaminobenzoic acid is dissolved with water, the pH of the solution is controlled to be between 8.0 and 12.0, and the temperature of the solution is controlled to be between 15° C. and 25° C. The dissolved 3,5-diaminobenzoic acid solution is added to the diazonium solution of formula (Ia) prepared in the above step (1), the pH is controlled to be between 2.0 and 6.0 with liquid alkali or baking soda, the temperature is controlled to be between 0° C. and 20° C., and the first coupling reaction is carried out, the first reaction solution is tested with H acid test solution, if the bleed circle is colorless, it means that the diazonium is reacted completely to the end point, thereby obtaining coupling product 1;

second, the diazonium solution of formula (Ib) or (Ic) prepared in step (1) is added to coupling product 1, the pH is controlled to be between 5.0 and 8.0 with liquid alkali or baking soda, the temperature is controlled to be between 0° C. and 20° C., and the second coupling reaction is carried out, the second reaction solution is tested with H acid test solution, if the bleed circle is colorless, it means that the diazonium is reacted completely to the end point, thereby obtaining coupling product 2;

third, the diazonium solution of formula (Ib) or (Ic) prepared in step (1) is added to coupling product 2, the pH is controlled to be between 5.0 and 8.0 with liquid alkali or baking soda, the temperature is controlled to be between 0° C. and 20° C., and the third coupling reaction is carried out, the third reaction solution is tested with H acid test solution, if the bleed circle is colorless, it means that the diazonium is reacted completely to the end point, thereby obtaining the reactive dye compound of formula (I) of the present invention;

wherein, in each coupling reaction, the molar ratio of the compound of formula (Ia), (Ib) or (Ic) to 3,5-diaminobenzoic acid is (0.95-1.2):1, preferably is (0.98-1.08):1.

Further, if both $D^1$ and $D^2$ are the group of formula (a) or (b), the second coupling reaction and the third coupling reaction can be merged into one coupling reaction, that is, the diazonium solution of formula (Ib) or (Ic) prepared in step (1) is added to coupling product 1, the pH is controlled to be between 5.0 and 8.0 with liquid alkali or baking soda, the temperature is controlled to be between 0° C. and 20° C., and the second coupling reaction is carried out, the second reaction solution is tested with H acid test solution, if the bleed circle is colorless, it means that the diazonium is reacted completely to the end point, thereby obtaining the reactive dye compound of formula (I) of the present invention; wherein, the molar ratio of the compound of formula (Ib) or (Ic) to 3,5-diaminobenzoic acid is (1.9-2.4):1, preferably is (1.96-2.16):1.

It should be emphasized that, in the reactive navy to black dye composition of the present invention, the dye compounds coupled at the ortho-position of the phenolic hydroxyl, often exist in a stable state of quinohydrazone, that is, the dye of the general formulae (VI) substantially contains a quinohydrazone structure of the following formulae (VIa) and/or (VIb) and/or (VIc) and/or (VId), and the dyes of the general formulae (II) and (IV) substantially contain a quinohydrazone structure of the following formulae (IIa) and (IVa), respectively. Considering the writing habits of those skilled in the art, azo-form is also used as the written form in the summary of the invention and the examples, which does not affect the essence of the present invention:

(IIa)

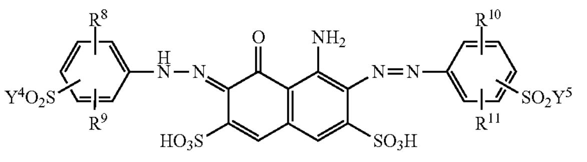

(IVa)

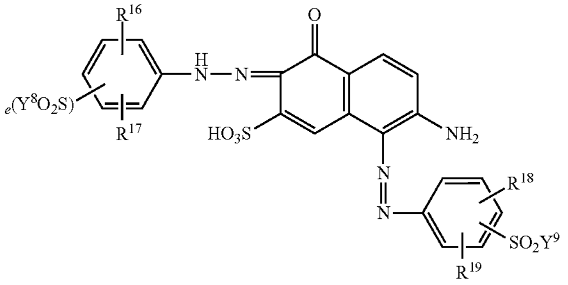

(VIa)

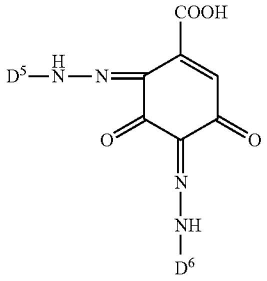

(VIb)

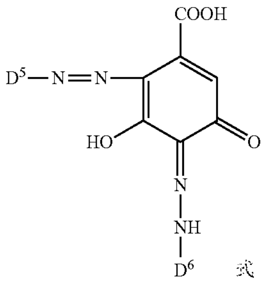

(VIc)

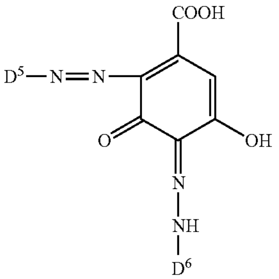

(VId)

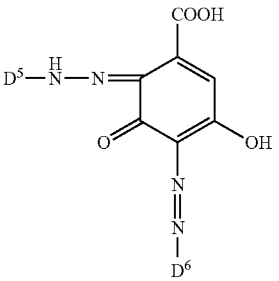

the definitions of the substituents of the above formulae (IIa) and (IVa) are respectively the same as those of formula (II) and (IV), and the definitions of the substituents of formulae (VIa)~(VId) are the same as those of formula (VI).

In addition, in the reactive navy to black dye composition of the present invention, component A is at least one selected from the group consisting of compounds of formula (I) and alkali metal salts thereof, component B is at least one selected from the group consisting of compounds of formula (II) and alkali metal salts thereof, component C is at least one selected from the group consisting of compounds of formulae (III)~(IV) and alkali metal salts thereof, and component D is at least one selected from the group consisting of compounds of formulae (V)~(VII) and alkali metal salts thereof; when the compound is alkali metal salt, the carboxyl groups and sulfonic acid groups in formulae (I)~(VII) exist in the form of alkali metal salt of carboxylic acid or sulfonic acid. Preferably, the alkali metal salt is sodium salt or potassium salt. It is known by all the person skilled in the art that dye compounds in the form of free acid and dye compounds in the form of alkali metal salt (such as sodium salt, potassium salt, etc.) have the same dyeing properties and that the structural formula of each single color dye compound is generally expressed in the form of free acid. However, in the actual synthesis process, they are usually prepared and isolated in the form of alkali metal salt (such as sodium or potassium salt) and also used for dyeing in the form of salt, which is also well known to those skilled in the art.

The preparation method of the reactive navy to black dye composition of the present invention comprises mixing the dye components according to the said ratio. The mixing can adopt a conventional mechanical means, such as performing in a grinder, a kneading machine or a homogenizer. In the mixing process, the individual dye compound may be present in the form of powder, granule, an aqueous solution or a synthetic solution. When the individual dye compound is mixed in the form of the synthetic solution, separation of the reactive navy to black dye composition of the present invention from the synthetic solution can be carried out by a generally known method, for example, the dye is salted out and filtered from a reaction medium with an electrolyte salt (such as sodium chloride or potassium chloride), or the mixture is evaporated and spray dried. Hence, the dye components and their dye compositions generally contain the conventional electrolyte salt(s) (such as sodium chloride, sodium sulfate, etc.) commonly appearing in reactive dyes.

When sold as a commodity or used directly, the reactive navy to black dye composition of the present invention can be without an auxiliary, and can also be added with an auxiliary commonly used in commercial dyes, such as a cosolvent, a dispersant, an alkali-resistant auxiliary, a dust-proof agent, a surfactant, a buffer, and an accelerant. Therefore, the present invention also provides a reactive navy to black dye product comprising the reactive navy to black dye composition. Preferably, the reactive navy to black dye product contains the reactive navy to black dye composition and an auxiliary. The weight of the auxiliary does not exceed 45%, preferably 40% of the weight of the reactive navy to black dye composition. The auxiliary is preferably one or more selected from the group consisting of the following compounds: a naphthalene sulfonic acid/formaldehyde condensation product (NNO), a methylnaphthalenesulfonic acid/formaldehyde condensation product (dispersant MF), a diffusing agent CNF (benzylnaphthalenesulfonate/formaldehyde condensation product), Yuanming powder (industrial sodium sulfate), lignosulfonate, sodium acetate, sodium hydrogencarbonate, sodium citrate, sodium dihydrogen phosphate, disodium hydrogen phosphate, a thickener, and the like. All the auxiliaries are commercially available conventional products.

The reactive navy to black dye product of the present invention is suitable for dyeing and printing of nitrogen-containing and/or hydroxyl-containing fiber materials, which may be cellulose fibers, polyamide fibers and fabrics thereof. Wherein, the cellulose fibers are preferably cotton fibers or regenerated fibers, and of course may include other vegetable fibers such as hemp fibers or fabrics thereof; the polyamide fibers preferably include animal fiber materials including skin, wool or silk, and synthetic fiber materials such as nylon 6 and nylon 66. When the above-mentioned fiber materials are dyed and printed by using the reactive navy to black dye product of the present invention, it can be carried out according to known reactive dye dyeing and printing methods, such as a commonly used reactive dye dip dyeing method and pad dyeing method, and the dip dyeing method is a method of immersing a fabric into a dyeing solution to gradually dye the fabric, which usually needs to go through the processes of dyeing-fixing-washing-soaping-washing-dehydration-drying and so on.

The pad dyeing method is a method of firstly immersing the fabric into a dyeing solution, then passing the fabric through a roll, uniformly rolling the dyeing solution into the interior of the fabric, and then treating the fabric by steaming, hot-melting or other treatments, which usually needs to go through the processes of padding with a dye solution-drying-(padding with a fixing solution)-steaming or curing-washing-soaping-washing-drying and so on.

Generally, due to different requirements for the dyed color of the fabrics, the usage amount of dyes is different. When dyed by dip dyeing, the dyeing depth (owf) is generally between 0.1% and 10% (which means the weight of the dye accounts for 0.1%~-10% of the weight of the fabric), the bath ratio is 1:2 to 1:60 (the bath ratio is defined as the weight ratio of the fabric to the dyeing solution, and preferably is 1:10 to 1:30), the initial dyeing temperature is controlled to be between 30° C. and 60° C., the dyeing time is 10 minutes to 30 minutes, the soaping temperature is 85° C. to 95° C., the soaping time is 10 minutes to 15 minutes, the fixing temperature is 60° C. to 100° C., the fixing time is 10 minutes to 50 minutes, and the fixing pH is 9 to 11. When dyed by the pad dyeing method, the pickup of cellulose fiber is generally 60% to 80%, the steaming temperature is 100° C. to 103° C., and the steaming time is 1 minute to 3 minutes. In padding methods, cold pad-batch dyeing method is widely used, in which a dye and an alkaline substance are introduced into a pad dyeing machine, batched onto a roll and the roll which is covered is turned slowly for 2 hours to 30 hours at room temperature for fixation, and then thoroughly rinsed.

The advantages of the present invention are mainly embodied in that when used for dyeing and printing of nitrogen-containing and/or hydroxyl-containing fiber materials, the reactive navy to black dye composition and product of the present invention have the properties of good build-up, good compatibility, high degree of fixation and color fastness, especially excellent fastness to washing, and the like.

SPECIFIC EMBODIMENTS

Figure 1:
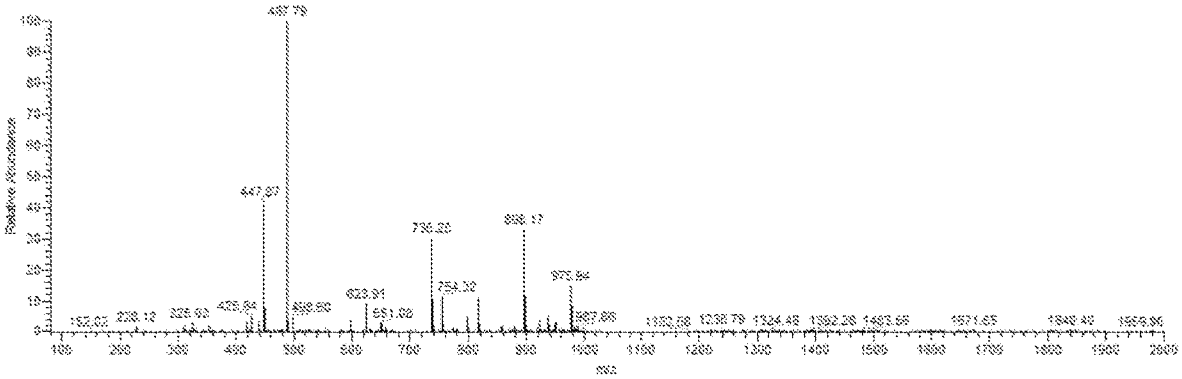
FIG. 1 is the mass spectrum of the compound (I-1) obtained in example 1.

The present invention will be further described in conjunction with the specific examples, but the scope of protection of the present invention is not limited thereto:

The dye compounds used in the examples of the present invention were prepared and separated in the form of their sodium salt in the actual synthesis process, and are also used for dyeing in the form of sodium salt, but for the convenience of writing, all the chemical formulae of the dye compounds in the examples are expressed in the form of free acid, and their substantial dyeing properties are equivalent to the form of sodium salt.

Example 1

(1) Diazotization:

23.0 g (0.1 mol) of 4-(acetylamino)-2-amino-benzenesulfonic acid were added into 100 g of water and 100 g of ice, beaten for about 1 h, added with 20 g of 31% hydrochloric acid (containing 0.17 mol of HCl), and added with 24 g of a 30% sodium nitrite solution (containing 0.104 mol of sodium nitrite) within 20 min to 30 min. The diazotization reaction was carried out for 1~2 hours by controlling pH at between 0.5 and 2.0 and temperature T at between 0° C. and 20° C., and the end point of the reaction was detected with an ethanol solution of 4-dimethylaminobenzaldehyde (ie, if no color change within 5 s, the end point was reached). After the diazotization, excess sodium nitrite was eliminated with sulfamic acid, and the diazonium solution of 4-(acetylamino)-2-amino-benzenesulfonic acid was obtained and stored for use.

56.2 g (0.2 mol) of para-ester (p-β-hydroxyethylsulfone sulfate aniline) were added into 200 g of water and 200 g of ice, beaten for about 1 h, added with 35 g of 31% hydrochloric acid (containing 0.3 mol of HCl), and added with 48 g of a 30% sodium nitrite solution (containing 0.208 mol of sodium nitrite) within 20 min to 30 min. The diazotization reaction was carried out for 1~2 hours by controlling pH at between 0.5 and 2.0 and temperature T at between 0° C. and 20° C., and the end point of the reaction was detected with an ethanol solution of 4-dimethylaminobenzaldehyde (ie, if no color change within 5 s, the end point was reached). After the diazotization, excess sodium nitrite was eliminated with sulfamic acid, and the diazonium solution of the para-ester was obtained and stored for use.

Figure 2:
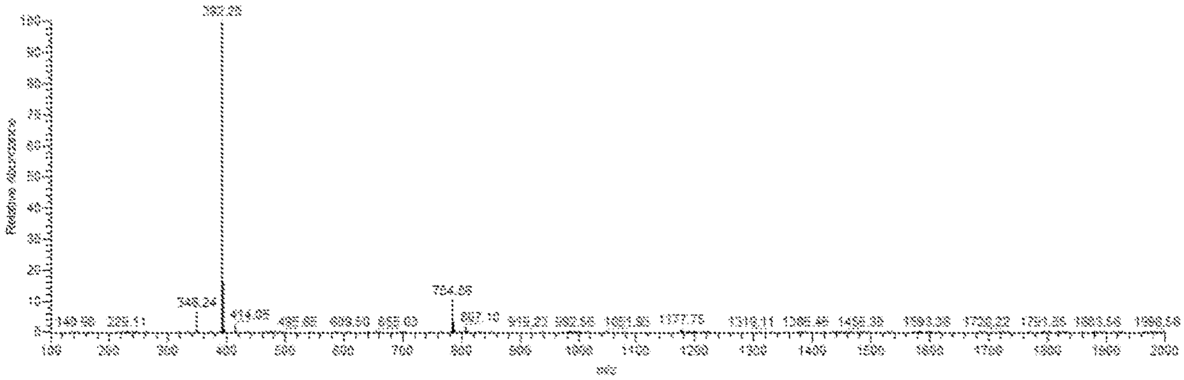
FIG. 2 is the mass spectrum of the chromophore (A) obtained in example 1.

(2) Coupling Reaction:

15.2 g (0.1 mol) of 3,5-dihydroxybenzoic acid were added to 200 g of water for beating, the pH of the solution was controlled to be between 8.0 and 9.0, and the temperature of the solution was controlled to be between 20° C. and 25° C. After the beating, the diazonium solution of 0.1 mol 4-(acetylamino)-2-amino-benzenesulfonic acid obtained in step (1) was added to the 3,5-dihydroxybenzoic acid solution. The pH was controlled to be between 5 and 5.5 with 30% liquid alkali, the temperature was controlled to be between 5° C. and 10° C., the reaction was carried out for 0.5~2 h, and when the content of the free 3,5-dihydroxybenzoic acid was detected to be below 3% by HPLC, the reaction reached the end point, thereby obtaining chromophore of the following formula (A) whose mass spectrum is shown in FIG. 2.

(A)

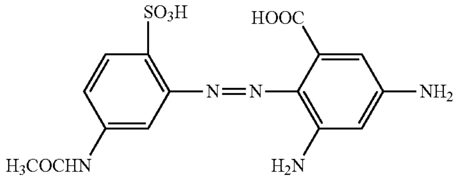

The diazonium solution of the para-ester obtained in step (1) was added to the chromophore of formula (A), the pH was controlled to be between 5 and 5.5 with 30% liquid alkali, and the temperature T was controlled to be between 5° C. and 10° C., the coupling reaction was further carried out for 0.5 h to 10 h. The reaction solution was tested with H acid test solution, if the bleed circle was colorless, it meant that the diazonium had been reacted completely to the end point, thereby obtaining an orange reactive dye compound (I-1) whose λmax is 420 nm in water. And the mass spectrum of the compound (I-1) is shown in FIG. 1.

(I-1)

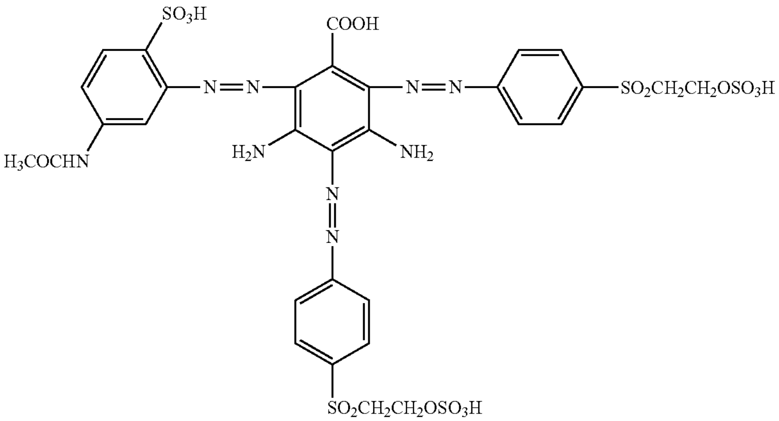

Example 2~66

Referring to the preparation method of the azo dye described in example 1, the dye compounds of the structures shown in the following table 1 were respectively obtained by stepwise diazotization and coupling reactions using raw materials of intermediates well known in the art.

TABLE 1

| Examples | Reactive dye compounds | λmax (nm) |
|---|---|---|
| 2 | 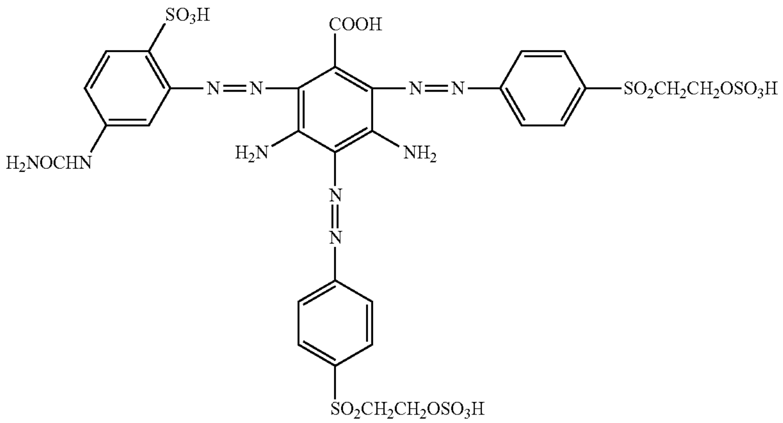 (I-2) | 420 |

TABLE 1-continued
| Examples | Reactive dye compounds | λmax (nm) |
|---|---|---|
| 3 | 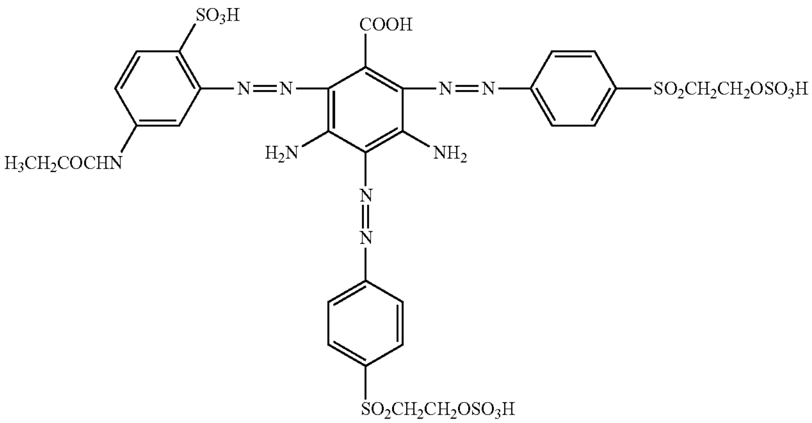 (I-3) | 420 |
| 4 | 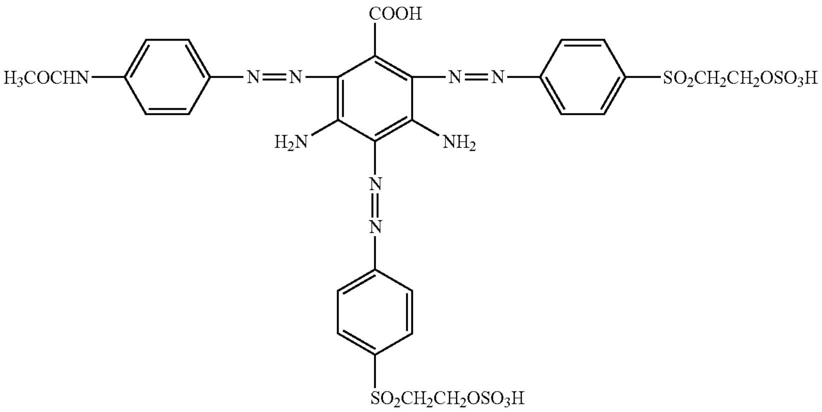 (I-4) | 412 |
| 5 | 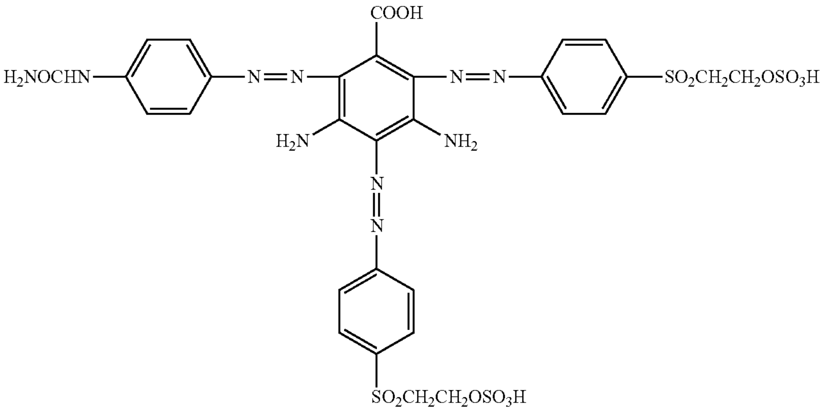 (I-5) | 412 |

TABLE 1-continued
| Examples | Reactive dye compounds | λmax (nm) |
|---|---|---|
| 6 | 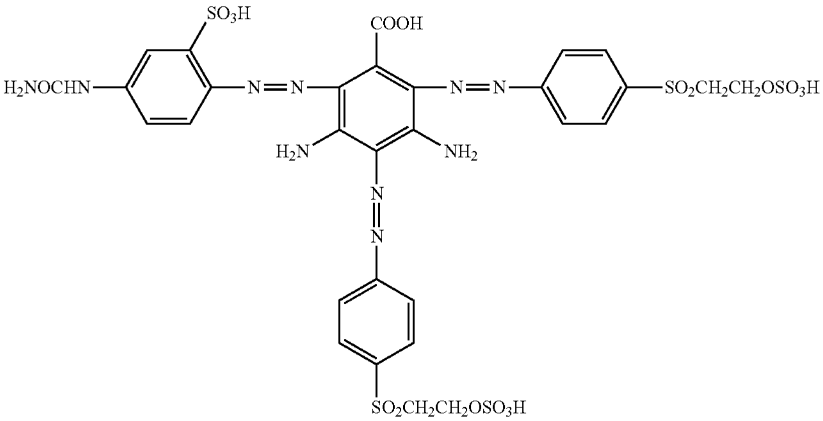 (I-6) | 420 |
| 7 | 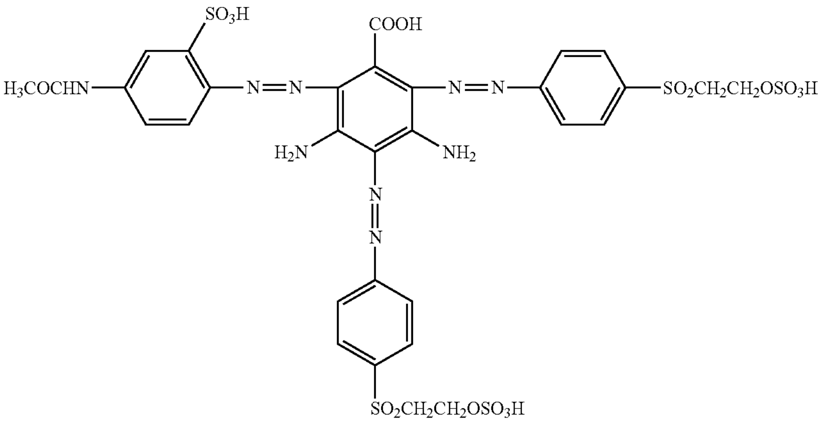 (I-7) | 420 |
| 8 | 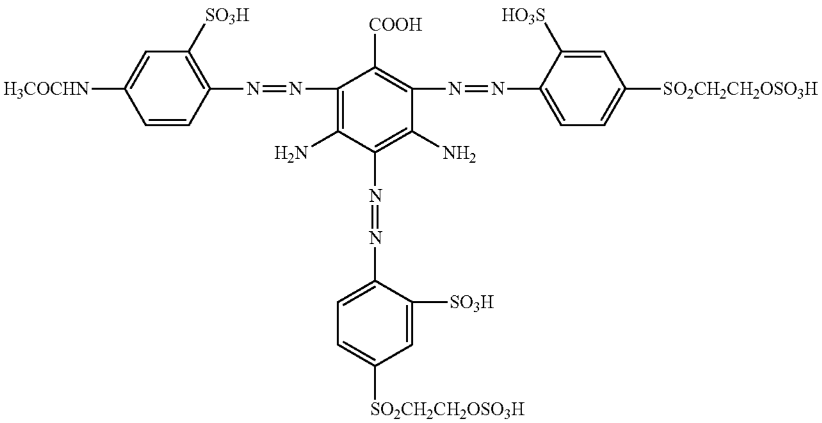 (I-8) | 425 |

TABLE 1-continued
| Examples | Reactive dye compounds | λmax (nm) |
|---|---|---|
| 9 | 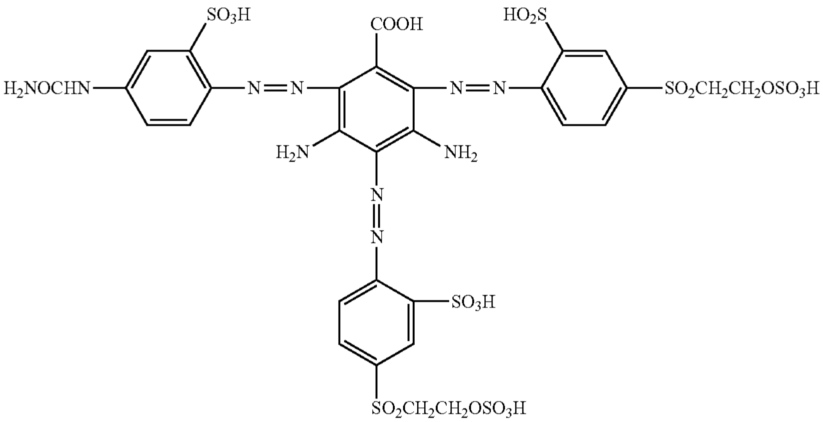 (I-9) | 425 |
| 10 | 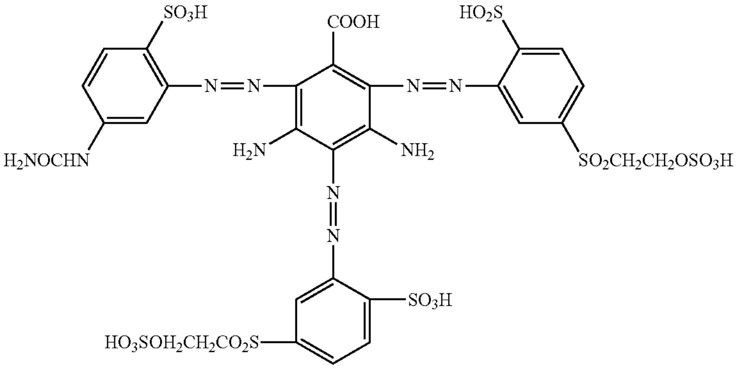 (1-10) | 425 |
| 11 | 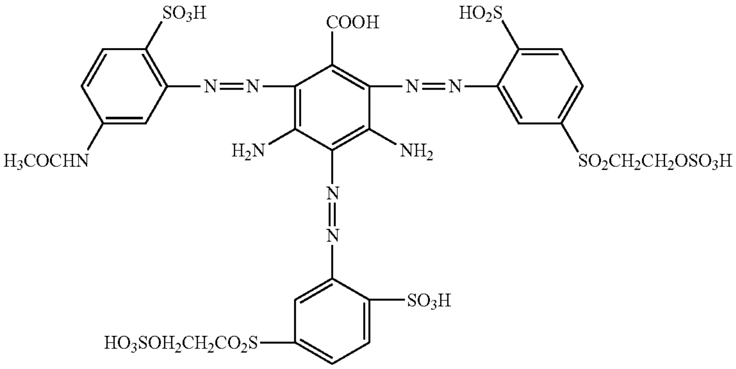 (I-11) | 425 |

TABLE 1-continued
| Examples | Reactive dye compounds | λmax (nm) |
|---|---|---|
| 12 | 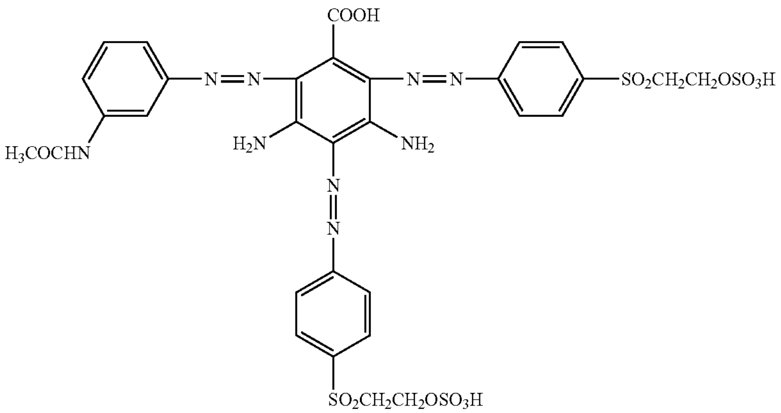<br>(I-12) | 415 |
| 13 | 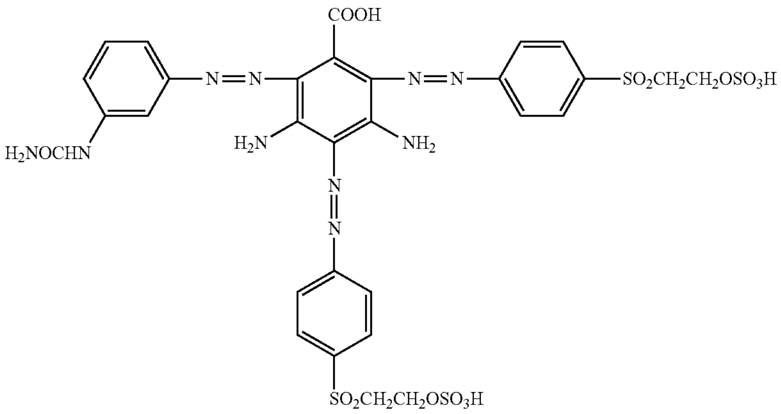<br>(I-13) | 415 |
| 14 | 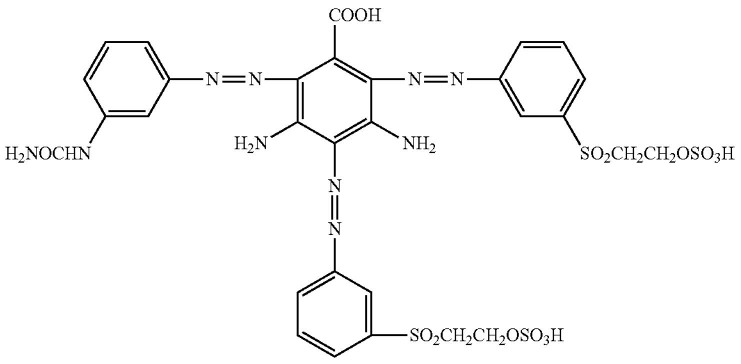<br>(I-14) | 415 |

TABLE 1-continued
| Examples | Reactive dye compounds | λmax (nm) |
|---|---|---|
| 15 | 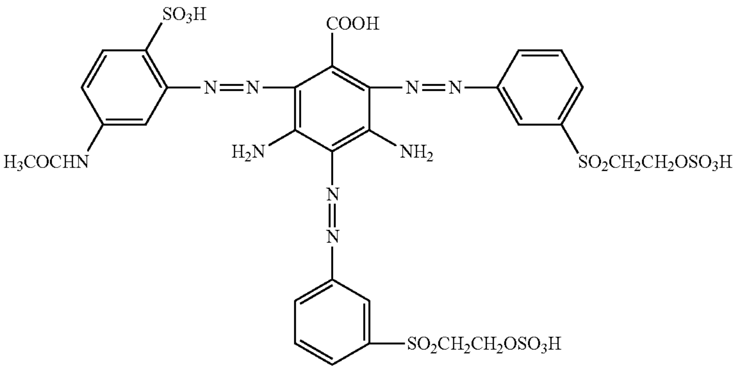 (I-15) | 420 |
| 16 | 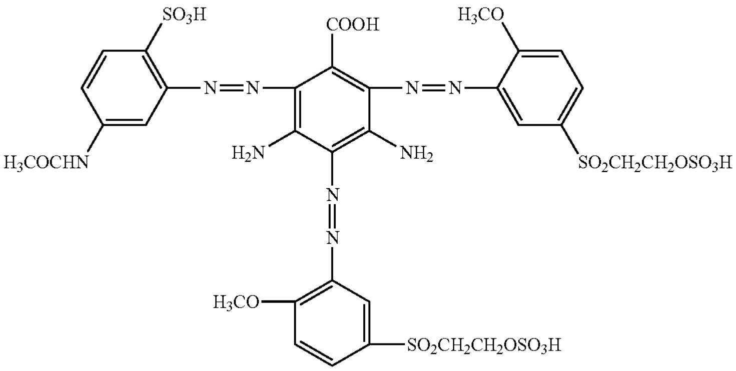 (I-16) | 415 |
| 17 | 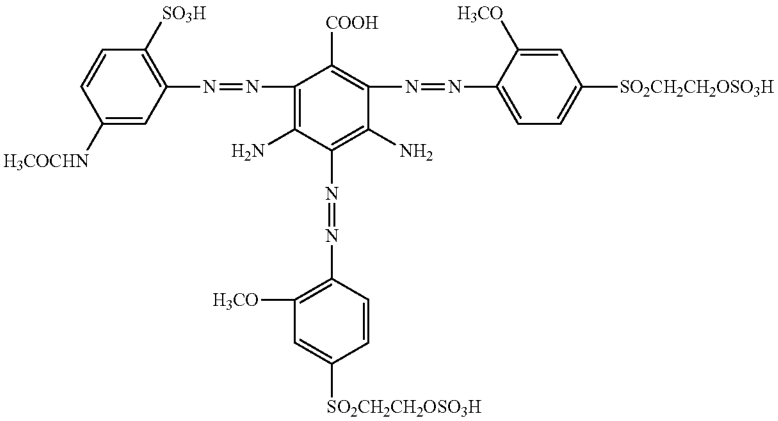 (I-17) | 415 |

TABLE 1-continued
| Examples | Reactive dye compounds | λmax (nm) |
|---|---|---|
| 18 | 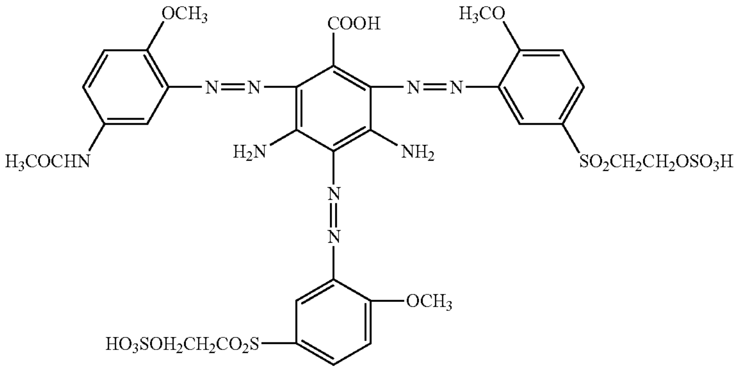 (I-18) | 410 |
| 19 | 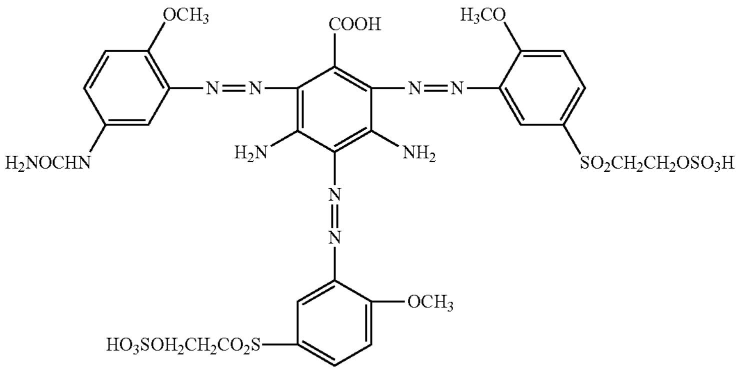 (I-19) | 410 |
| 20 | 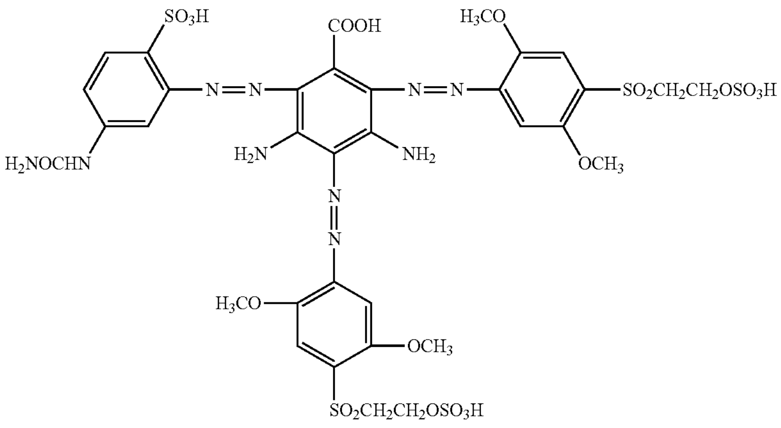 (I-20) | 415 |

TABLE 1-continued
| Examples | Reactive dye compounds | λmax (nm) |
|---|---|---|
| 21 | 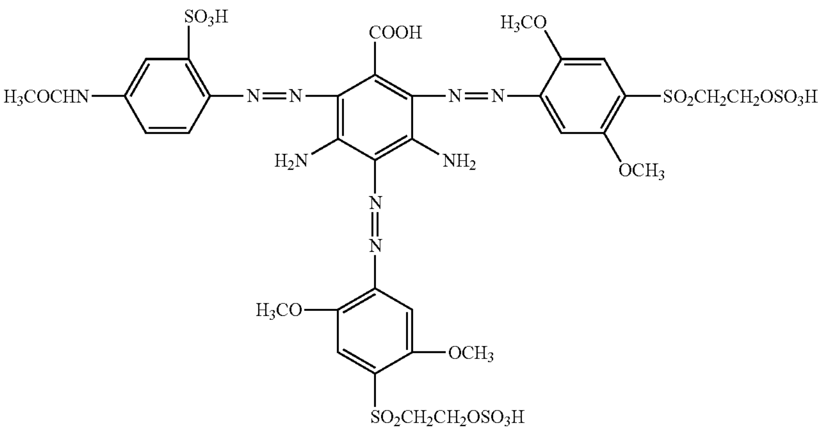 (I-21) | 415 |
| 22 | 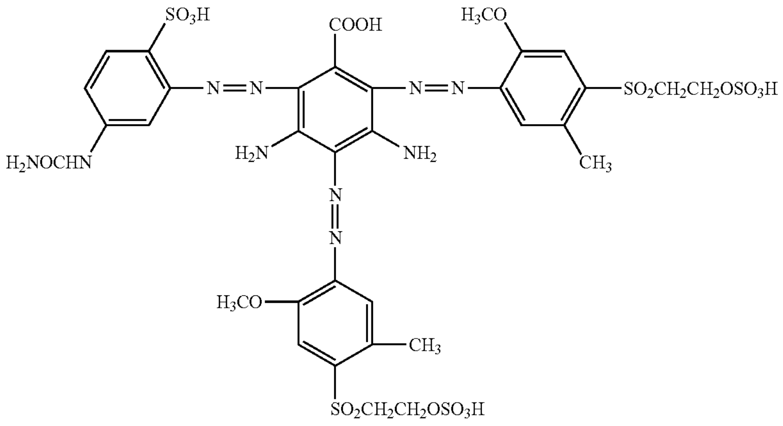 (I-22) | 415 |
| 23 | 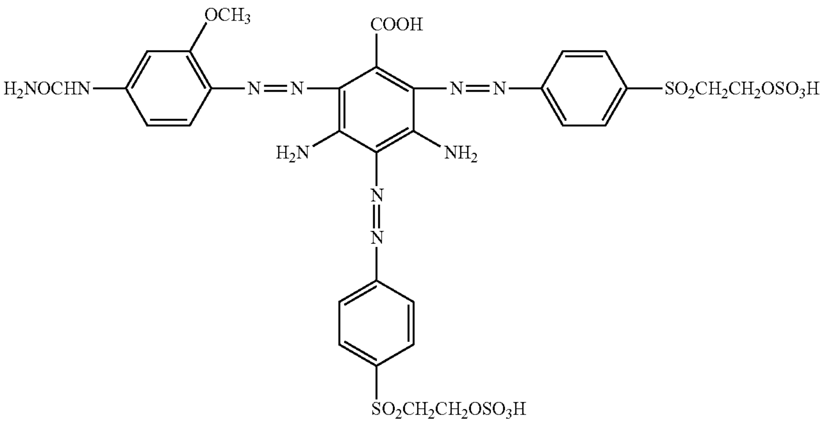 (I-23) | 410 |

TABLE 1-continued
| Examples | Reactive dye compounds | λmax (nm) |
|---|---|---|
| 24 | 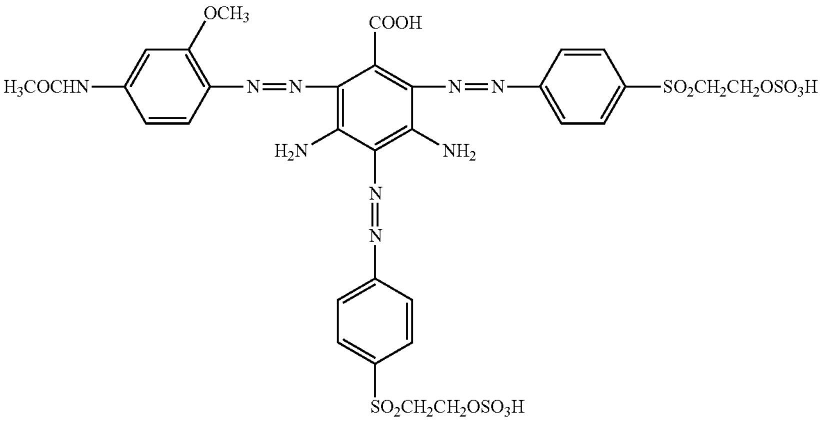 (I-24) | 410 |
| 25 | 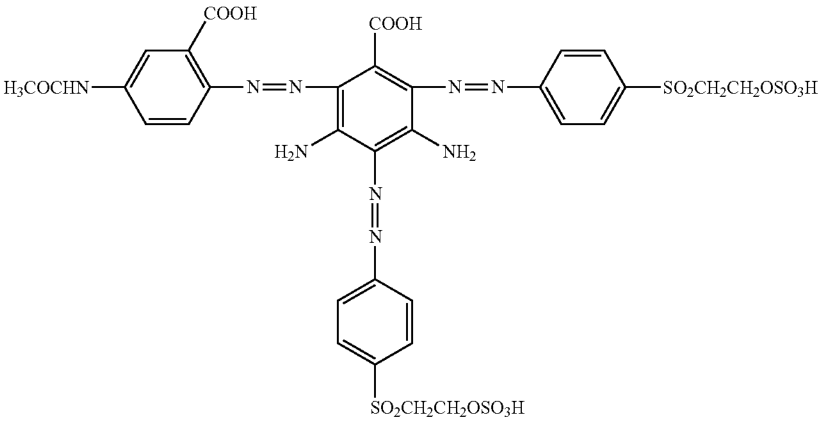 (I-25) | 415 |
| 26 | 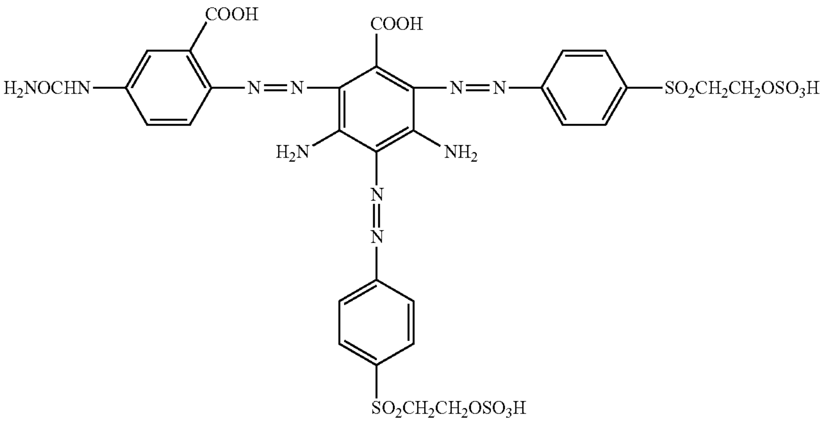 (I-26) | 415 |

TABLE 1-continued
| Examples | Reactive dye compounds | λmax (nm) |
|---|---|---|
| 27 | 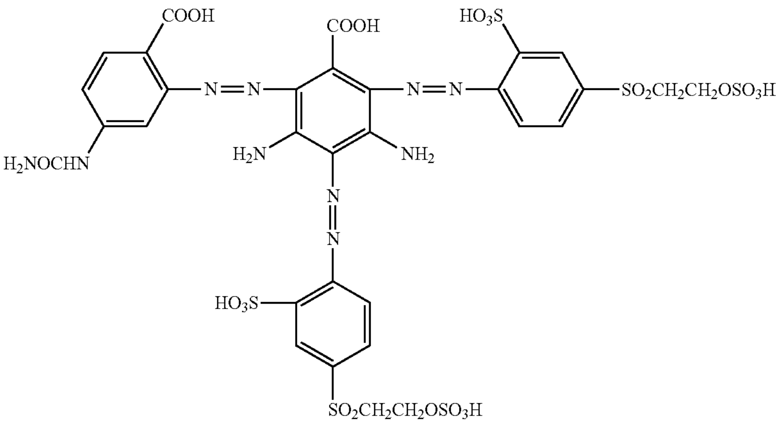 (I-27) | 425 |
| 28 | 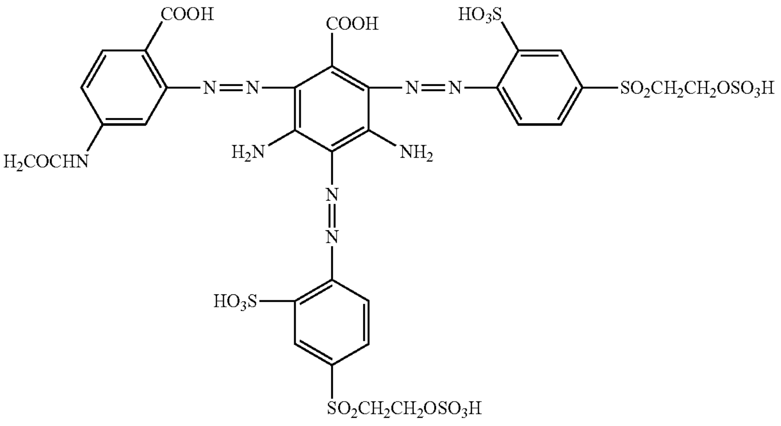 (I-28) | 425 |
| 29 | 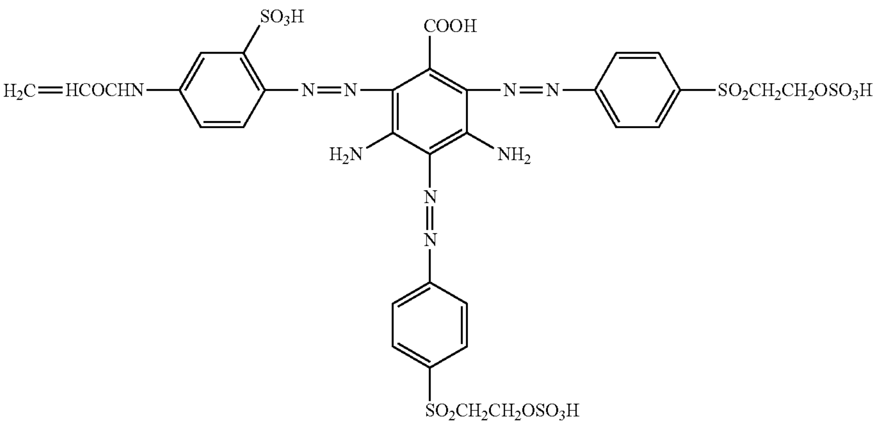 (I-29) | 420 |

TABLE 1-continued
| Examples | Reactive dye compounds | λmax (nm) |
|---|---|---|
| 30 | 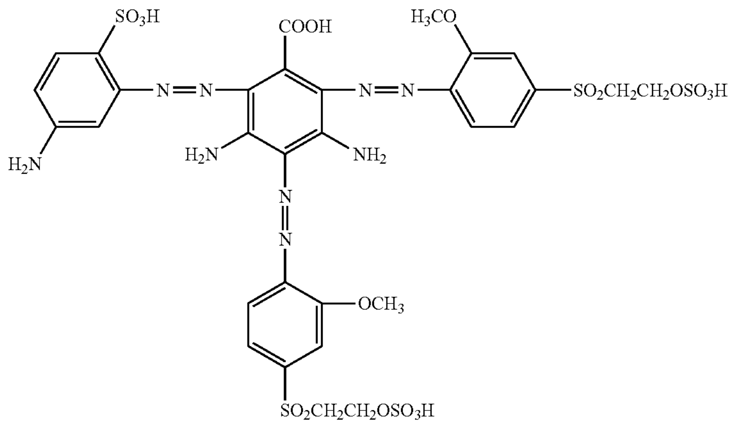 (I-30) | 415 |
| 31 | 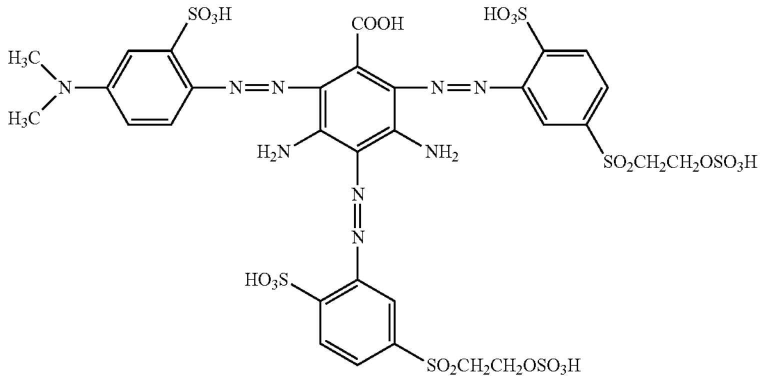 (I-31) | 410 |
| 32 | 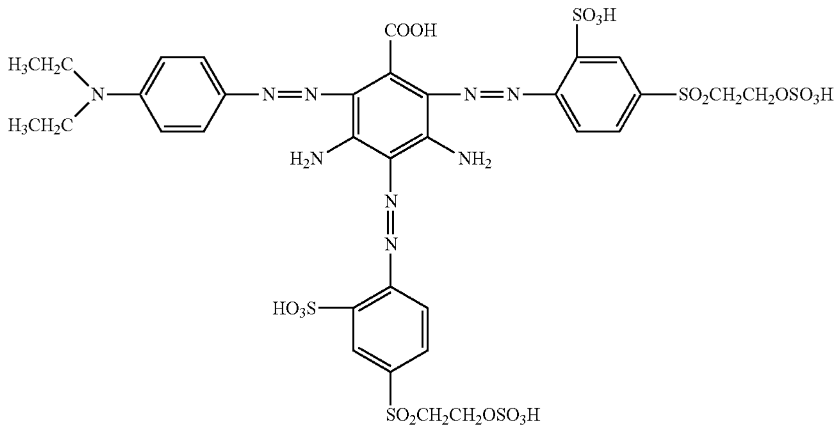 (I-32) | 410 |

TABLE 1-continued
| Examples | Reactive dye compounds | λmax (nm) |
|---|---|---|
| 33 | 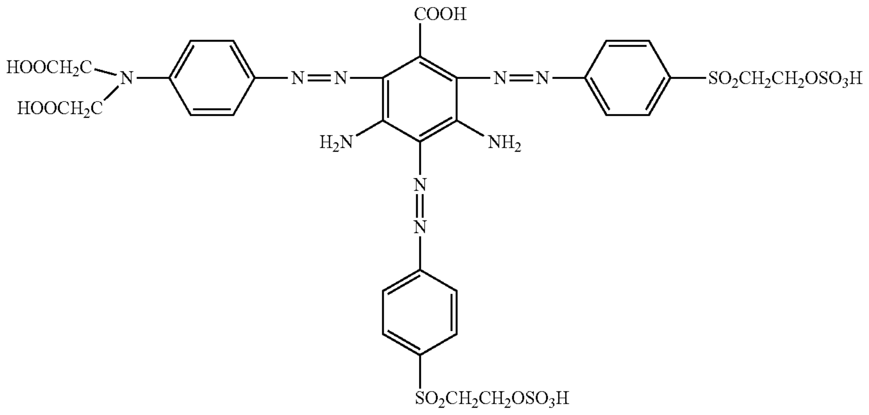 (I-33) | 410 |
| 34 | 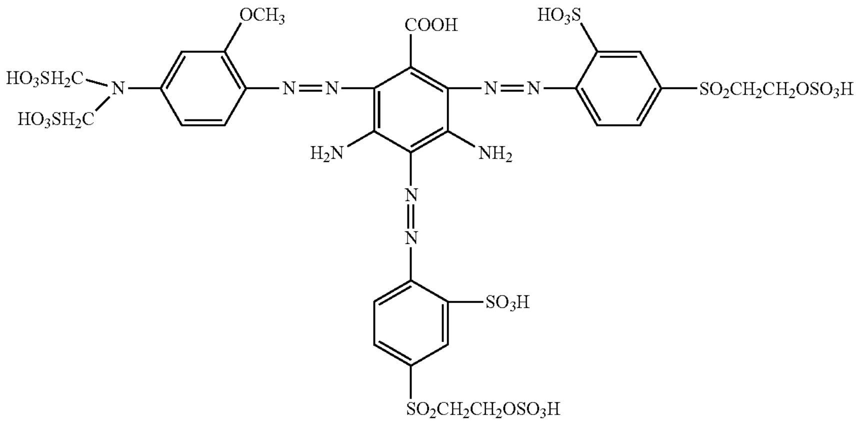 (I-34) | 415 |
| 35 | 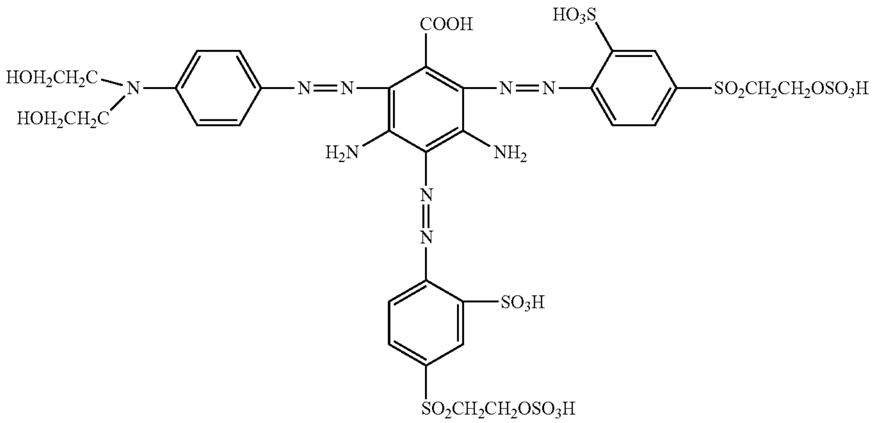 (I-35) | 410 |

TABLE 1-continued
| Examples | Reactive dye compounds | λmax (nm) |
|---|---|---|
| 36 | 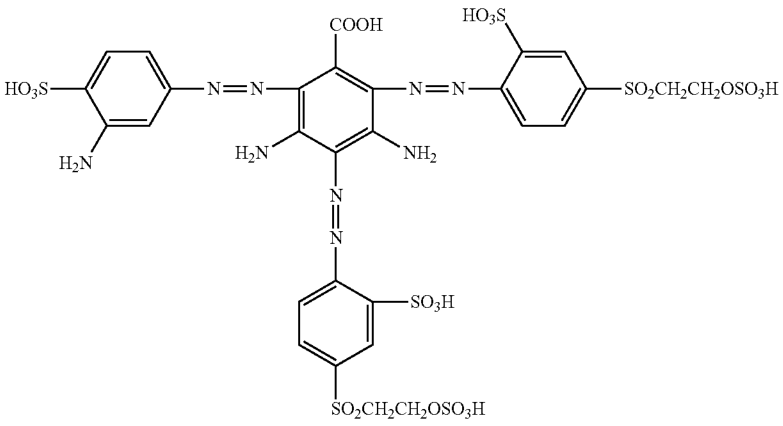 (I-36) | 418 |
| 37 | 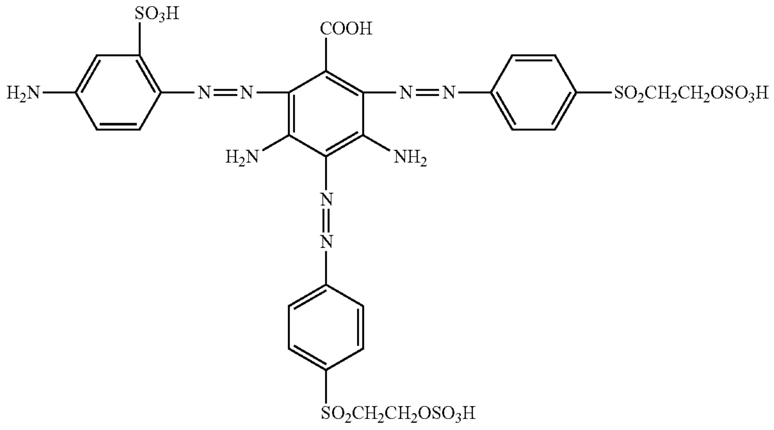 (I-37) | 418 |
| 38 | 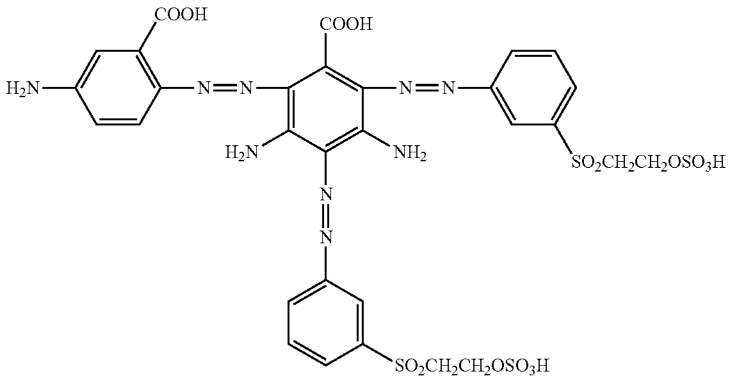 (I-38) | 418 |

TABLE 1-continued
| Examples | Reactive dye compounds | λmax (nm) |
|---|---|---|
| 39 | 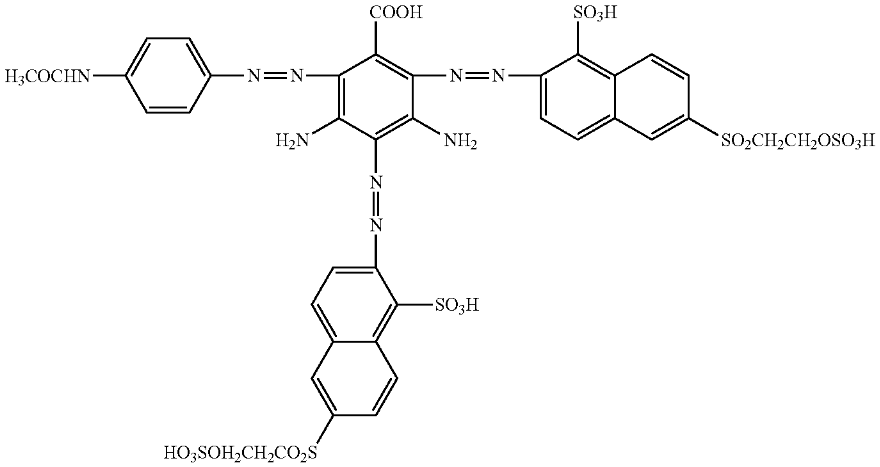 (I-39) | 435 |
| 40 | 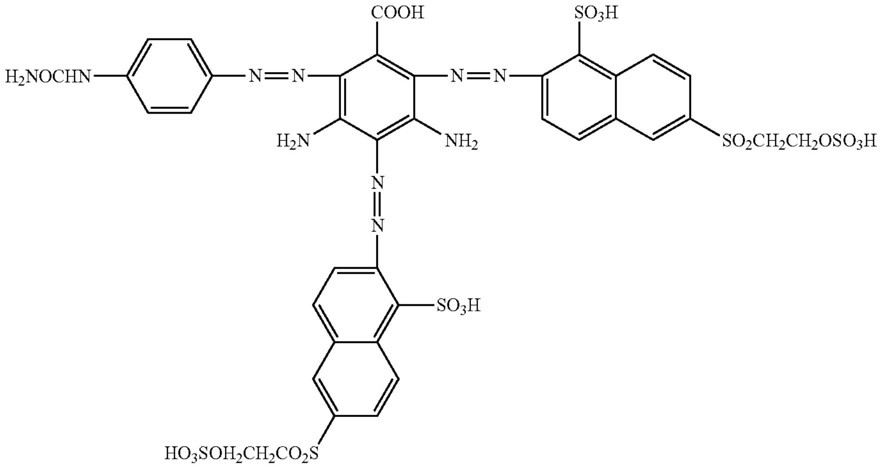 (I-40) | 435 |
| 41 | 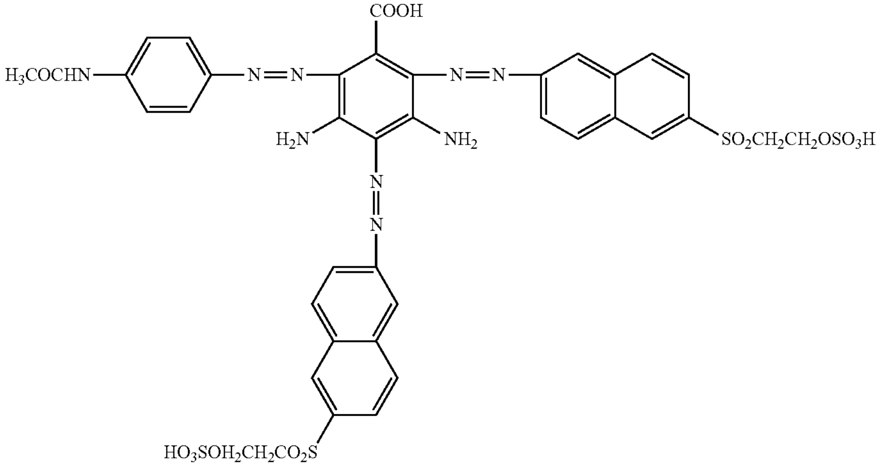 (I-41) | 430 |

TABLE 1-continued
| Examples | Reactive dye compounds | λmax (nm) |
|---|---|---|
| 42 | 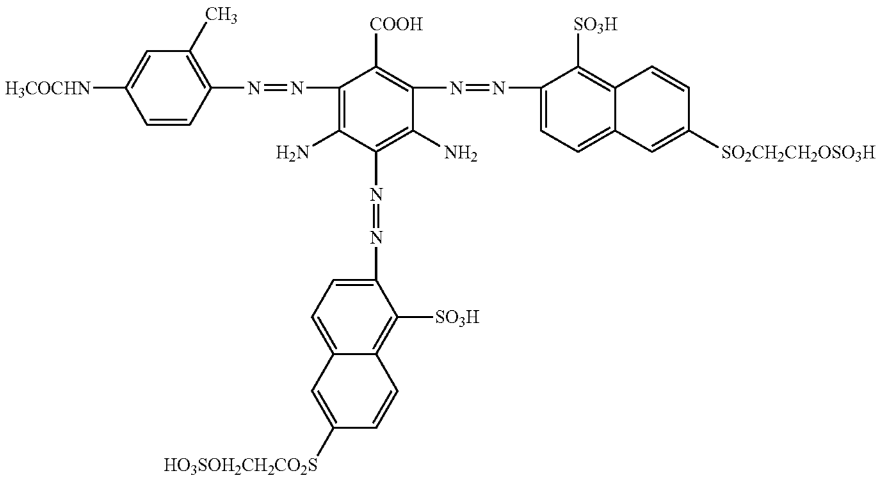 (I-42) | 435 |
| 43 | 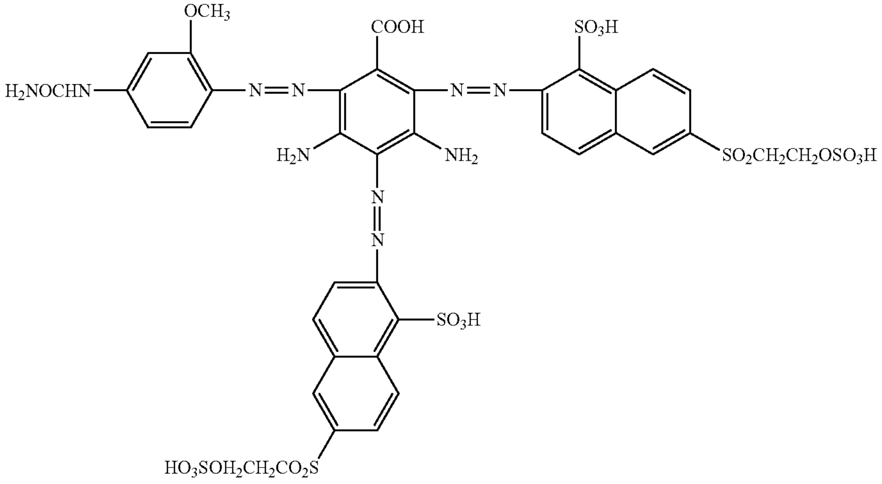 (I-43) | 435 |

TABLE 1-continued
| Examples | Reactive dye compounds | λmax (nm) |
|---|---|---|
| 44 | 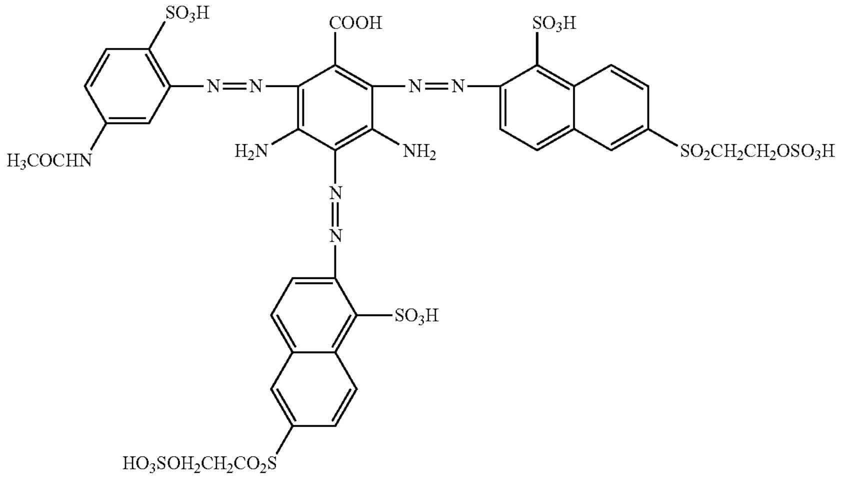 (I-44) | 440 |
| 45 | 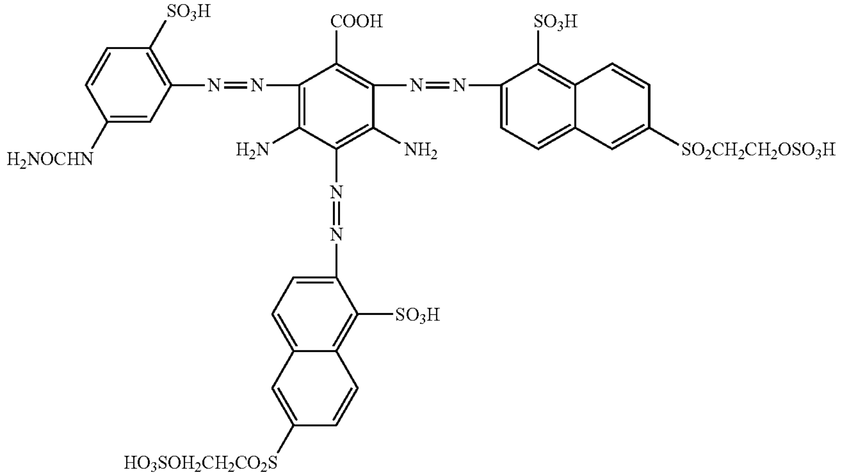 (I-45) | 440 |
| 46 | 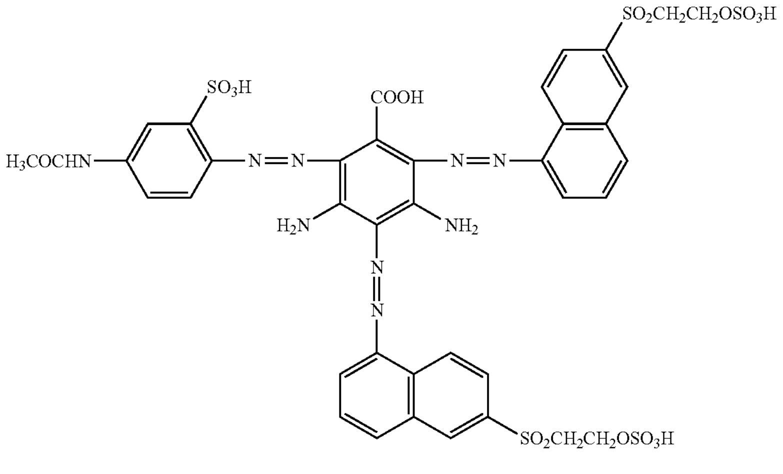 (I-46) | 435 |

TABLE 1-continued
| Examples | Reactive dye compounds | λmax (nm) |
|---|---|---|
| 47 | 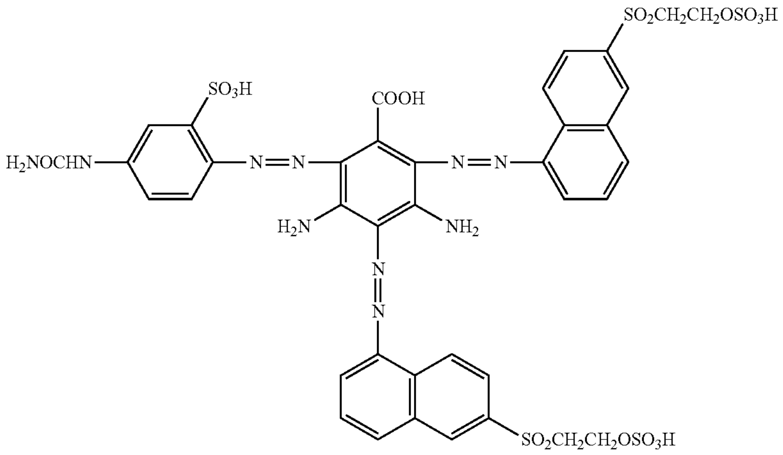 (I-47) | 435 |
| 48 | 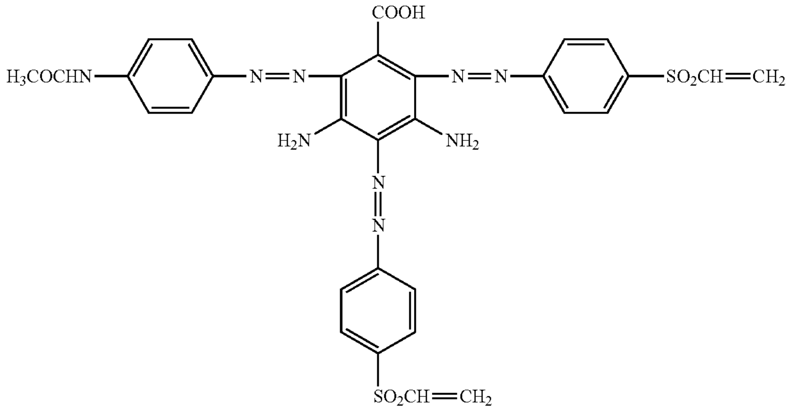 (I-48) | 415 |
| 49 | 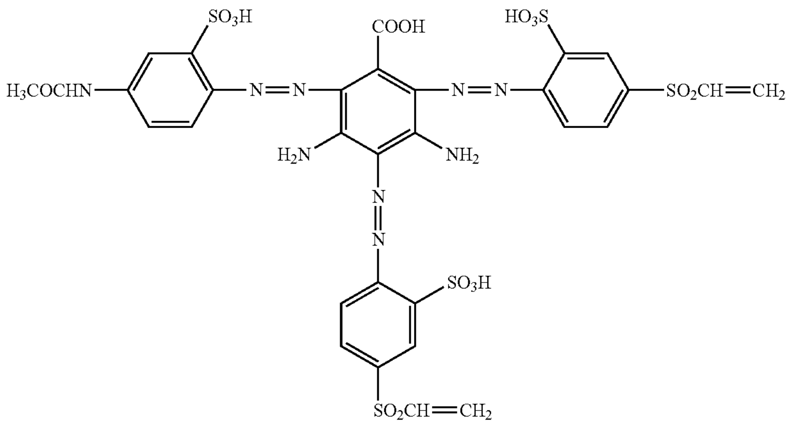 (I-49) | 425 |

TABLE 1-continued
| Examples | Reactive dye compounds | λmax (nm) |
|---|---|---|
| 50 | 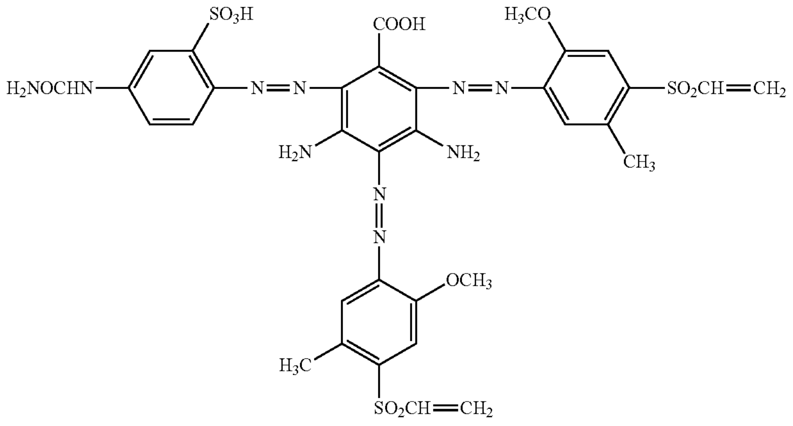 (I-50) | 418 |
| 51 | 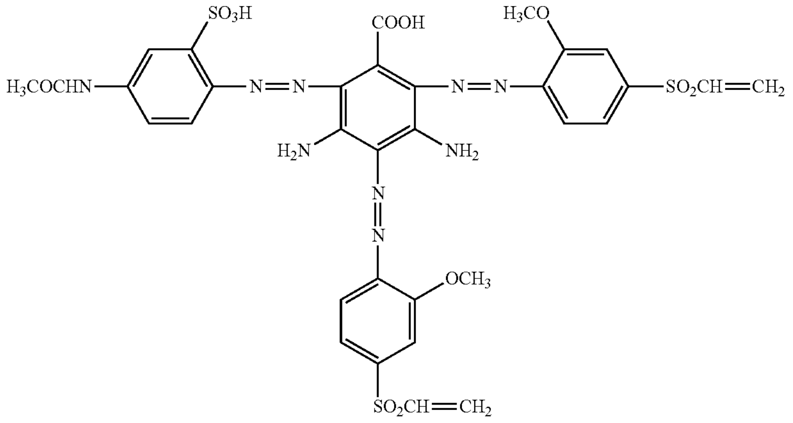 (I-51) | 418 |
| 52 | 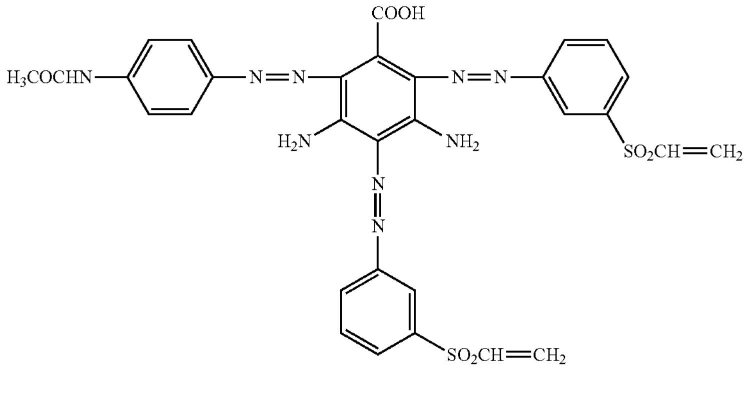 (I-52) | 415 |

TABLE 1-continued
| Examples | Reactive dye compounds | λmax (nm) |
|---|---|---|
| 53 | 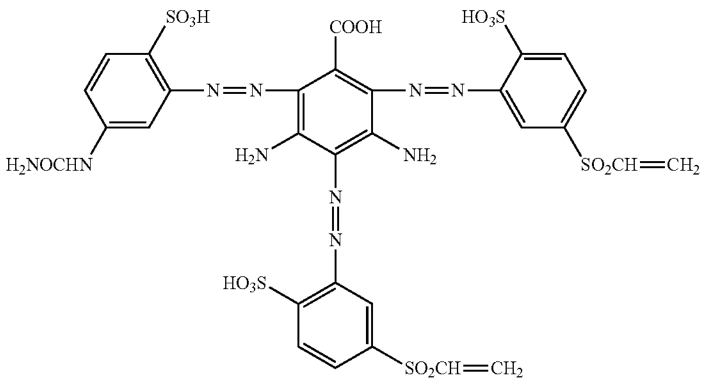 (I-53) | 425 |
| 54 | 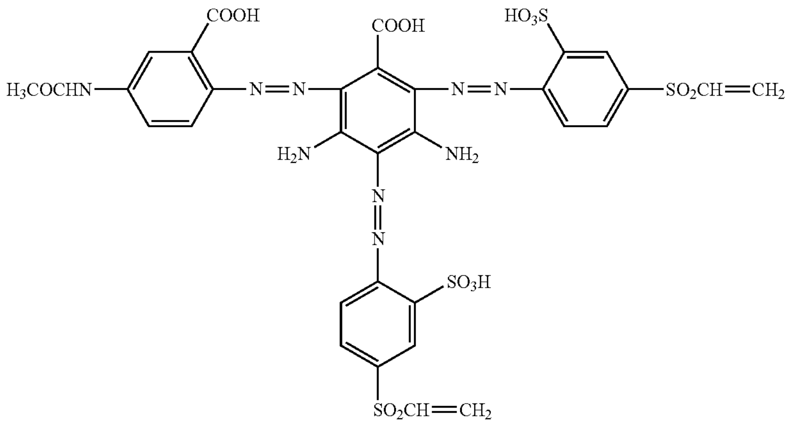 (I-54) | 422 |
| 55 | 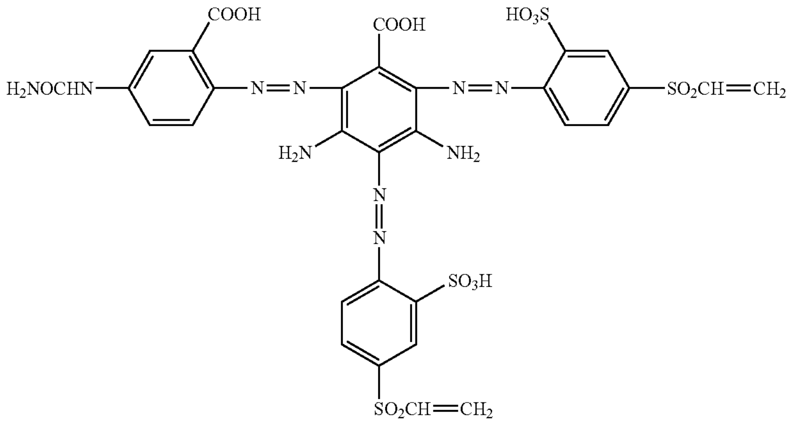 (I-55) | 422 |

TABLE 1-continued
| Examples | Reactive dye compounds | λmax (nm) |
|---|---|---|
| 56 | 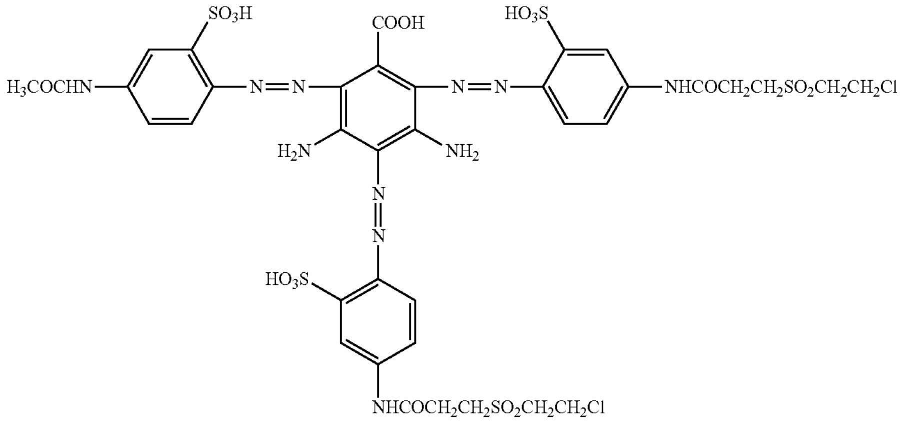 (I-56) | 428 |
| 57 | 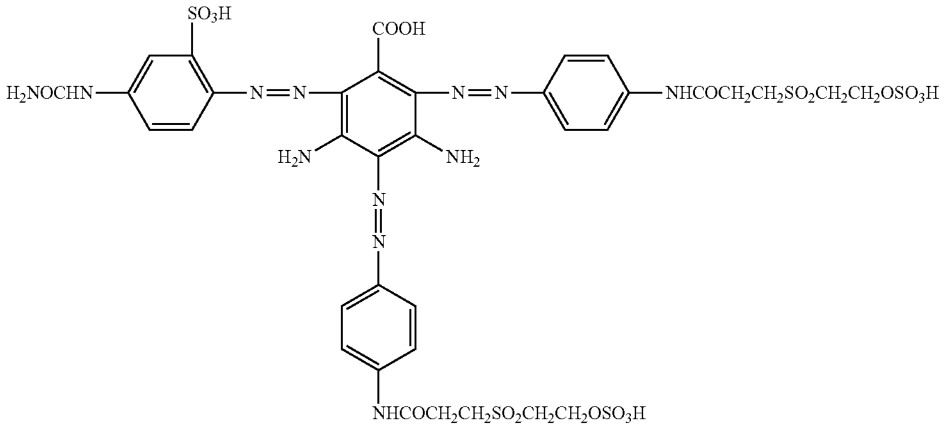 (I-57) | 425 |
| 58 | 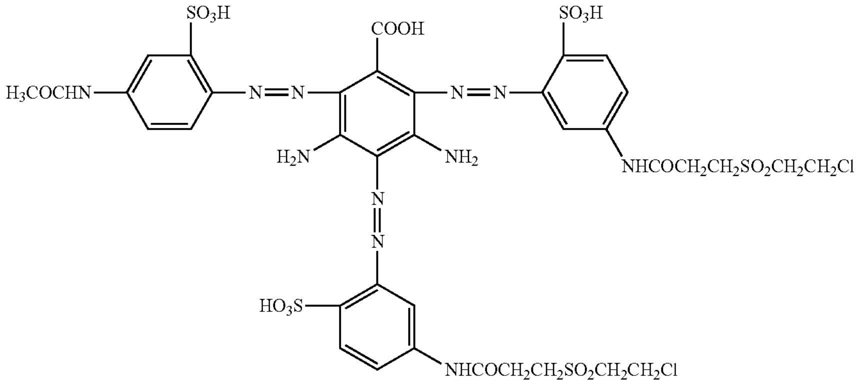 (I-58) | 430 |

TABLE 1-continued
| Examples | Reactive dye compounds | λmax (nm) |
|---|---|---|
| 59 | 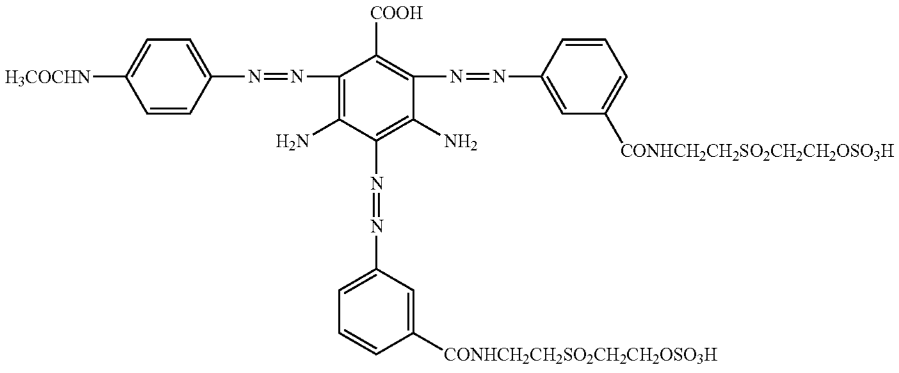 (I-59) | 420 |
| 60 | 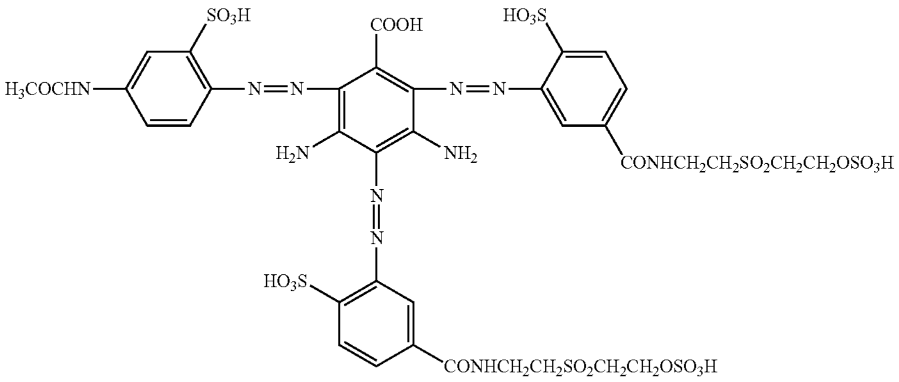 (I-60) | 430 |
| 61 | 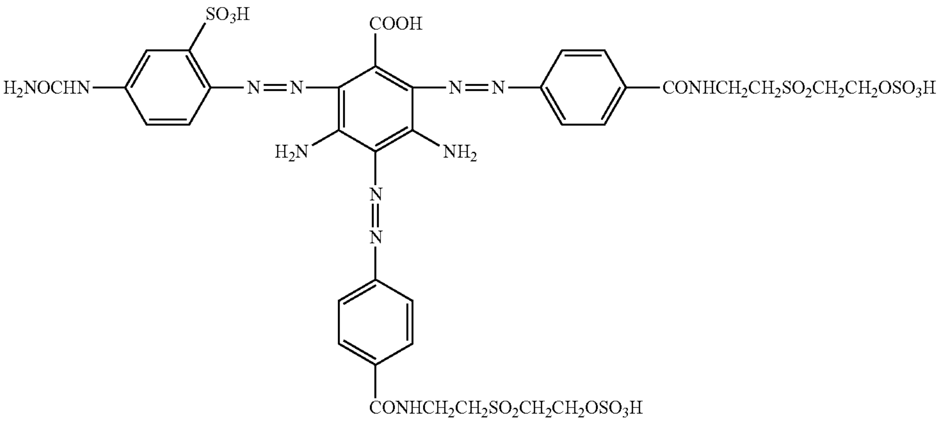 (I-61) | 425 |

TABLE 1-continued
| Examples | Reactive dye compounds | λmax (nm) |
|---|---|---|
| 62 | 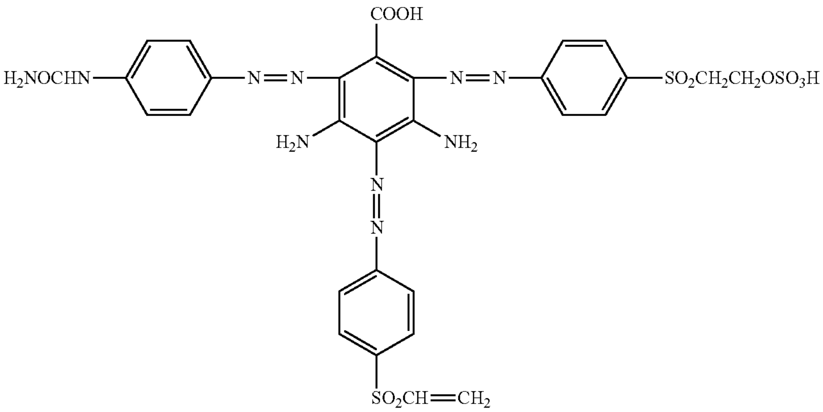<br>(I-62) | 415 |
| 63 | 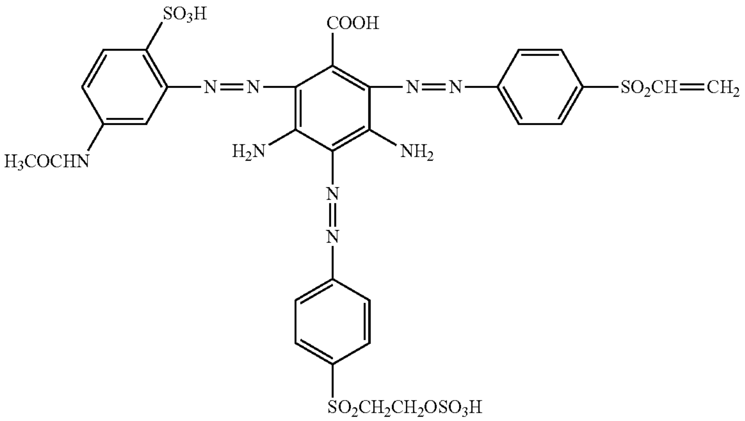<br>(I-63) | 420 |
| 64 | 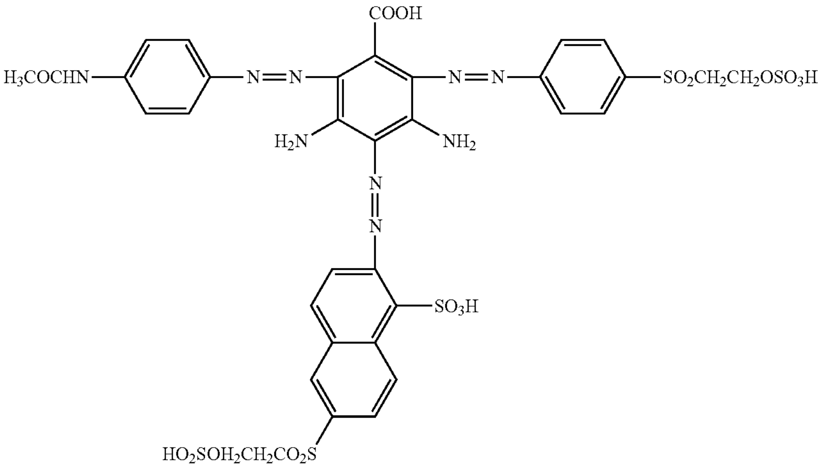<br>(I-64) | 430 |

TABLE 1-continued

| Examples | Reactive dye compounds | λmax (nm) |
|---|---|---|
| 65 | 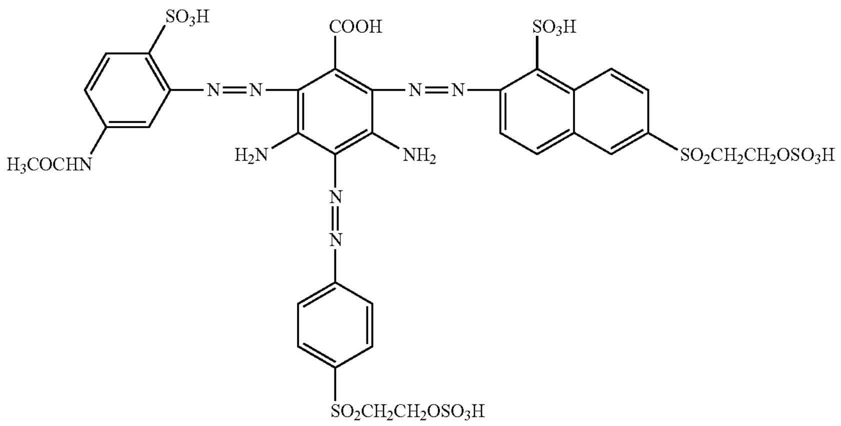 (I-65) | 430 |
| 66 | 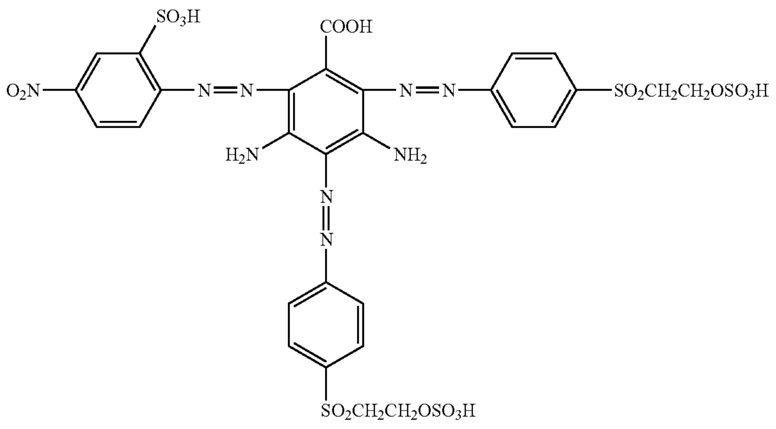 (I-66) | 420 |

Example 67

25 parts of the dye of formula (I-1), 75 parts of the dye of formula (II-1) and 10 parts of sodium sulfate powder were mechanically mixed, and the obtained dye composition dyed cotton black by conventional dip dyeing, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

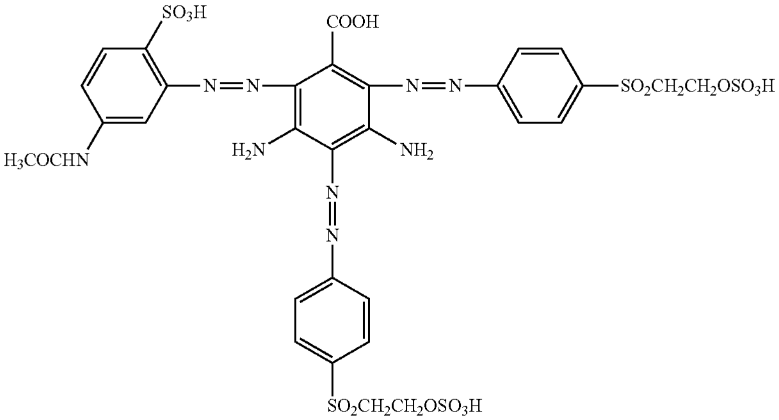

(II-1)

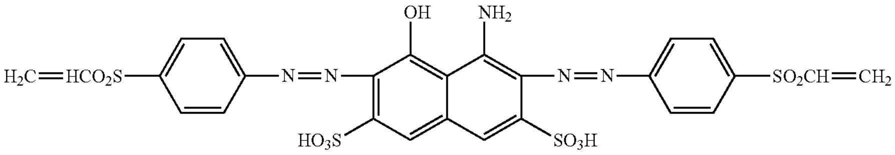

Example 68

20 parts of the dye of formula (I-1), 76 parts of the dye of formula (II-3), 4 parts of the dye of formula (VI-26) and 10 parts of sodium sulfate powder were mechanically mixed, and the obtained dye composition dyed cotton black by conventional dip dyeing, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

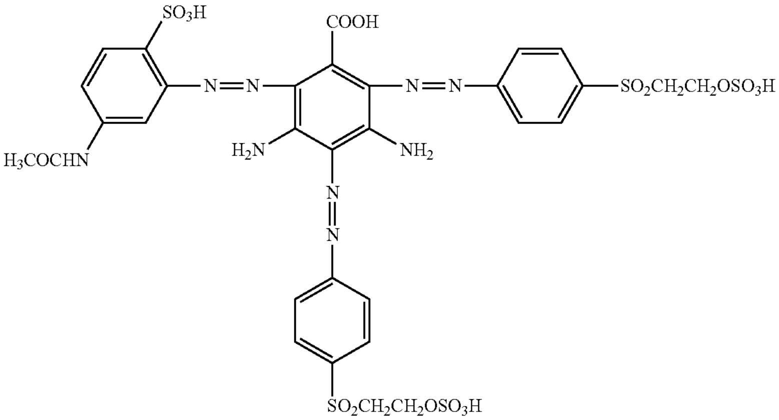

(II-3)

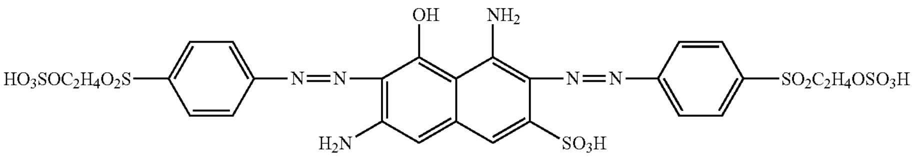

-continued (VI-26)

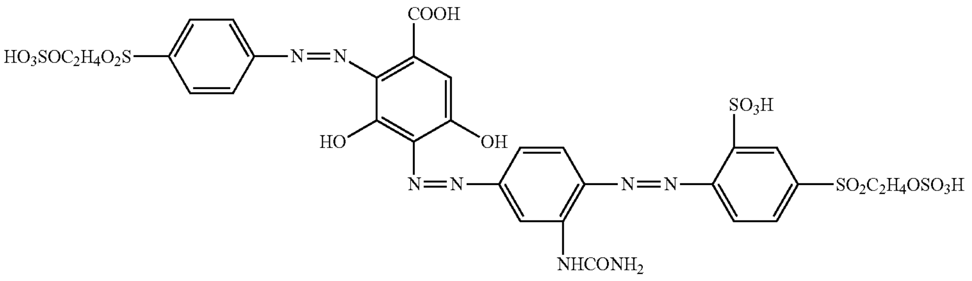

Example 69

22 parts of the dye of formula (I-1), 75 parts of the dye of formula (II-3), 3 parts of the dye of formula (IV-1) and 10 parts of sodium sulfate powder were mechanically mixed, and the obtained dye composition dyed cotton dark black by conventional dip dyeing, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

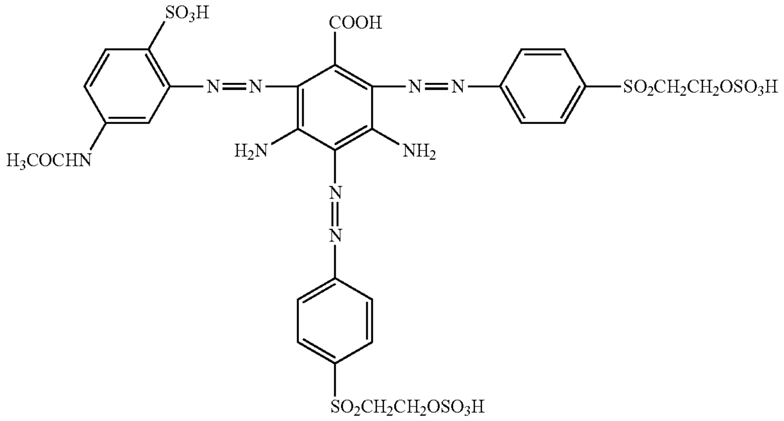

(II-3)

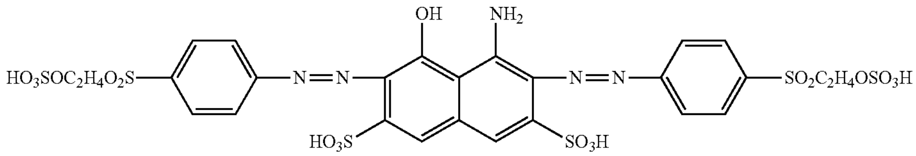

(IV-1)

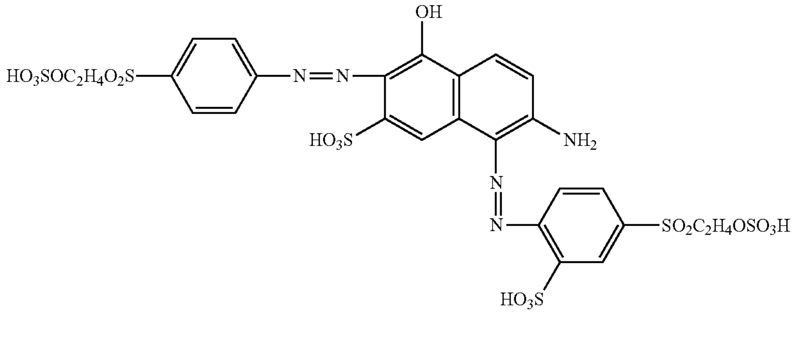

Example 70

21 parts of the dye of formula (I-1), 76 parts of the dye of formula (II-3), 1 part of the dye of formula (IV-1), 2 parts of the dye of formula (VI-26), 10 parts of sodium sulfate powder and 10 parts of dispersant MF were mechanically mixed, and the obtained dye composition dyed cotton dark black, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

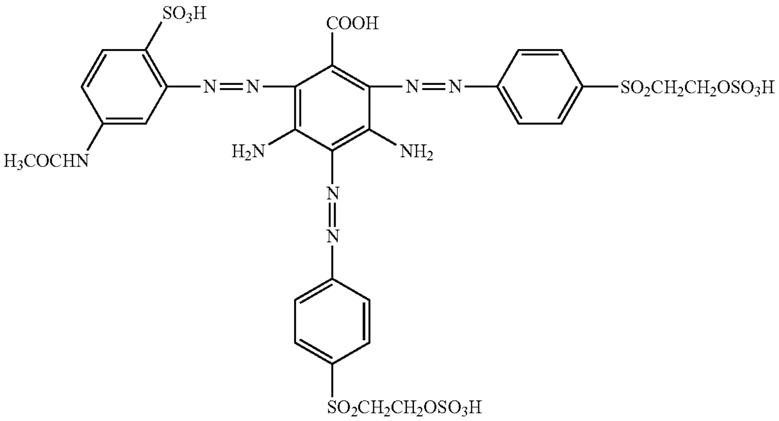

(II-3)

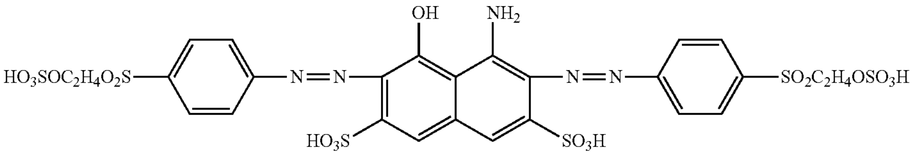

(IV-1)

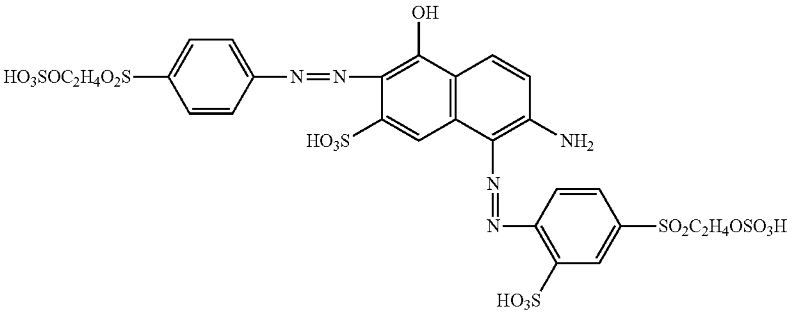

(VI-26)

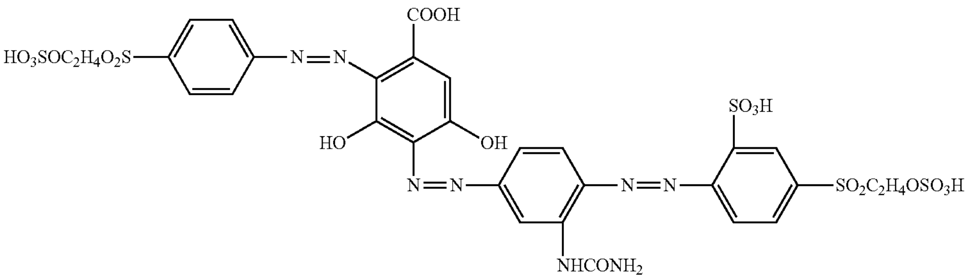

Example 71

17 parts of the dye of formula (I-1), 68 parts of the dye of formula (II-3), 7 parts of the dye of formula (IV-1), 8 parts of the dye of formula (VI-26), 10 parts of sodium sulfate powder and 10 parts of dispersant MF were mechanically mixed, and the obtained dye composition dyed cotton dark black, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

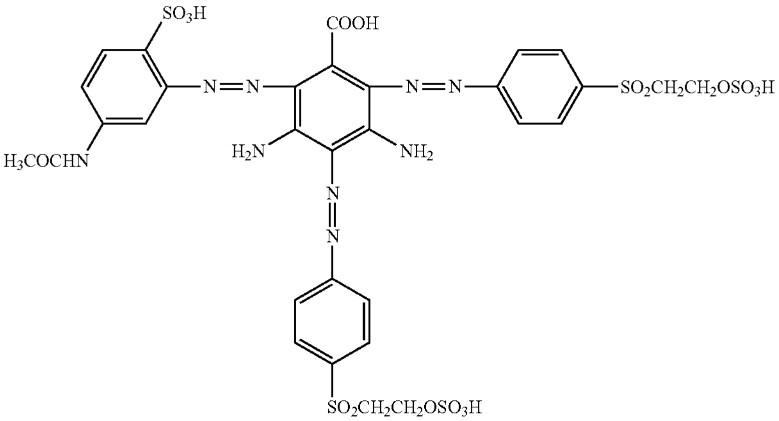

(II-3)

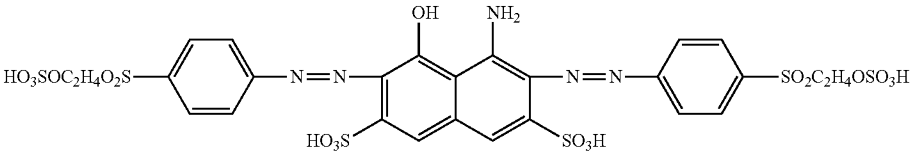

(IV-1)

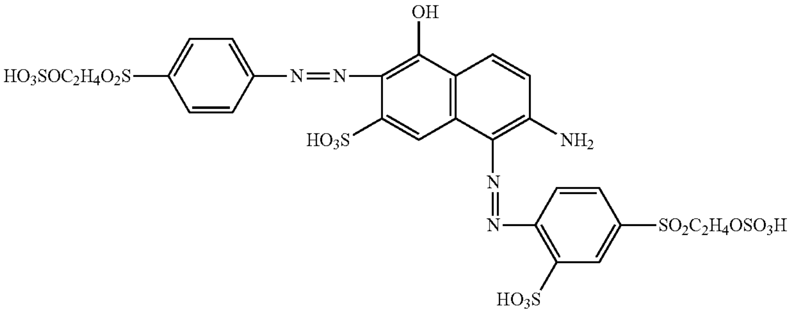

(VI-26)

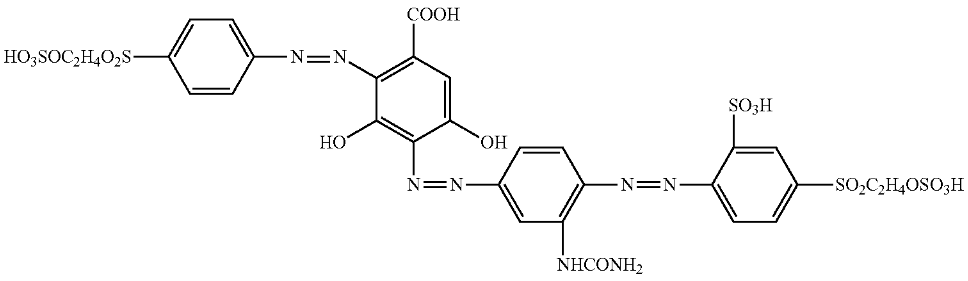

Example 72

20 parts of the dye of formula (I-1), 70 parts of the dye of formula (II-1), 10 parts of the dye of formula (III-1), 10 parts of sodium sulfate powder and 10 parts of dispersant MF were mechanically mixed, and the obtained dye composition dyed cotton dark black, and the color fastness to washing of the dyeings, especially on nylon and wool was not lower than grade 4 (referring to ISO 105 C10-2006), and the build-up and degree of fixation were excellent (referring to GB/T21875-2016 and GB/T2391-2014).

(I-1)

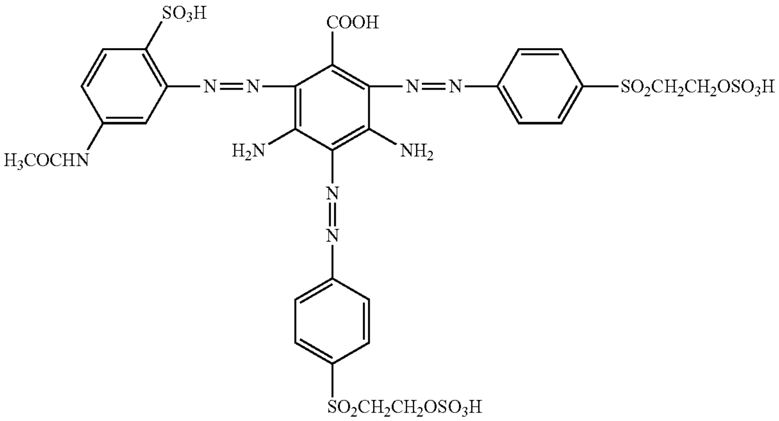

(II-1)

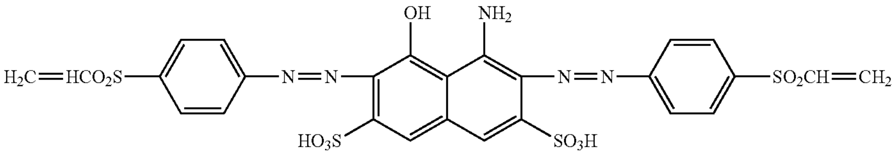

(III-1)

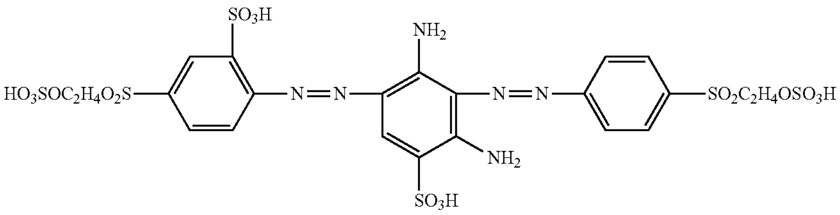

Examples 73-224

According to the method described in one of examples 67-72, the dyes with listed ratio in Table 2 were mechanically mixed, and the obtained dye mixture dyed cotton navy to black by the conventional reactive dyeing method, and the color fastness to washing of the dyeings especially on nylon and wool was not lower than grade 4 (referring to ISO 105 C10-2006), and the build-up was excellent (referring to GB/T21875-2016), and the build-up and degree of fixation were excellent (referring to GB/T21875-2016 and GB/T2391-2014).

TABLE 2

表2

| 实施例 Examples | 组分 Component A | 组分 Component B | 组分 Component C | 配比 Ratio |
|---|---|---|---|---|
| 73 | (I -1) | (II -3) | — | 50:50 |
| 74 | (I -1) | (II -1) | — | 45:55 |

TABLE 2-continued

表2

| 实施例 Examples | 组分 Component A | 组分 Component B | 组分 Component C | 配比 Ratio |
|---|---|---|---|---|
| 75 | (I -1) | (II -1) + (II -3) | — | 40:(30 + 30) |
| 76 | (I -4) | (II -3) | — | 35:65 |
| 77 | (I -4) | (II -1) | — | 30:70 |
| 78 | (I -4) | (II -1) + (II -3) | — | 20:(40 + 40) |
| 79 | (I -6) | (II -3) | — | 25:75 |
| 80 | (I -6) | (II -1) | — | 15:85 |
| 81 | (I -6) | (II -1) + (II -3) | — | 10:(45 + 45) |
| 82 | (I -2) | (II -3) | — | 5:95 |
| 83 | (I -2) | (II -1) | — | 12:88 |
| 84 | (I -2) | (II -1) + (II -3) | — | 18:(46 + 46) |
| 85 | (I -5) | (II -3) | — | 24:76 |
| 86 | (I -5) | (II -1) | — | 36:64 |
| 87 | (I -5) | (II -1) + (II -3) | — | 30:(35 + 35) |
| 88 | (I -7) | (II -3) | — | 38:62 |
| 89 | (I -7) | (II -1) | — | 44:56 |
| 90 | (I -7) | (II -1) + (II -3) | — | 40:(30 + 30) |
| 91 | (I -1) | (II-3) | (III-1) | 20:80:5 |
| 92 | (I -1) | (II-3) | (IV-1) | 25:75:10 |
| 93 | (I -1) | (II-3) | (IV-3) | 30:70:15 |
| 94 | (I -1) | (II-3) | (VI-26) | 40:60:20 |
| 95 | (I -1) | (II-1) | (III-1) | 45:55:25 |
| 96 | (I -1) | (II-1) | (IV-1) | 35:65:30 |
| 97 | (I -1) | (II-1) | (IV-3) | 50:50:10 |
| 98 | (I -1) | (II-1) | (VI-26) | 20:(40 + 40):15 |
| 99 | (I -1) | (II -1) + (II -3) | (III-1) | 30:(35 + 35):10 |
| 100 | (I -1) | (II -1) + (II -3) | (IV-1) | 40:(30 + 30):5 |
| 101 | (I -1) | (II -1) + (II -3) | (IV-3) | 10:(45 + 45):10 |
| 102 | (I -1) | (II -1) + (II -3) | (VI-26) | 50:(25 + 25):20 |
| 103 | (I -1) | (II-3) | (III-1) + (IV-1) | 5:95:(10 + 10) |
| 104 | (I -1) | (II-3) | (III-1) + (IV-3) | 15:85:(15 + 15) |
| 105 | (I -1) | (II-3) | (III-1) + (VI-26) | 25:75:(5 + 5) |
| 106 | (I -1) | (II-3 | (IV-1) + (IV-3) | 35:65:(3 + 3) |
| 107 | (I -1) | (II-3) | (IV-1) + (VI-26) | 45:55:(10 + 10) |
| 108 | (I -1) | (II-3) | (IV-3) + (VI-26) | 22:78:(7 + 8) |
| 109 | (I -1) | (II-1) | (III-1) + (IV-1) | 24:76:(10 + 10) |
| 110 | (I -1) | (II-1) | (III-1) + (IV-3) | 28:72:(8 + 8) |
| 111 | (I -1) | (II-1) | (III-1) + (VI-26) | 34:68:(12 + 12) |
| 112 | (I -1) | (II-1) | (IV-1) + (IV-3) | 36:64:(15 + 15) |
| 113 | (1-1) | (II-1) | (IV-1) + (VI-26) | 38:62:(5 + 5) |
| 114 | (I -1) | (II-1) | (IV-3) + (VI-26) | 40:60:(7 + 8) |
| 115 | (I -1) | (II -1) + (II -3) | (III-1) + (IV-1) | 20:(40 + 40):(10 + 10) |
| 116 | (I -1) | (II -1) + (II -3) | (III-1) + (IV-3) | 30:(35 + 35):(2 + 3) |
| 117 | (I -1) | (II -1) + (II -3) | (III-1) + (VI-26) | 10:(45 + 45):(5 + 5) |
| 118 | (I -1) | (II -1) + (II -3) | (IV-1) + (IV-3) | 40:(30 + 30):(6 + 6) |
| 119 | (I -1) | (II -1) + (II -3) | (IV-1) + (VI-26) | 28:(36 + 36):(10 + 10) |
| 120 | (I -1) | (II -1) + (II -3) | (IV-3) + (VI-26) | 32:(34 + 34):(4 + 4) |

TABLE 2-continued

| 表2 | | | | |
|---|---|---|---|---|
| 实施例<br>Examples | 组分<br>Component A | 组分<br>Component B | 组分<br>Component C | 配比<br>Ratio |
| 121 | (I -1) | (II-1) | (III-1) + (IV-1) + (IV-3) | 30:70:(5 + 5 + 5) |
| 122 | (I -1) | (II-1) | (III-1) + (IV-1) + (VI-26) | 35:65:(8 + 8 + 8) |
| 123 | (I -1) | (II-1) | (III-1) + (IV-3) + (VI-26) | 25:75:(3 + 3 + 3) |
| 124 | (I -1) | (II-1) | (IV-1) + (IV-3) + (VI-26) | 20:80:(9 + 9 + 9) |
| 125 | (I -1) | (II-1) | (III-1) + (IV-1) + (IV-3) + (VI-26) | 15:85:(5 + 5 + 5 + 5) |
| 126 | (I -1) | (II-3) | (III-1) + (IV-1) + (IV-3) | 10:90:(6 + 6 + 6) |
| 127 | (I -1) | (II-3) | (III-1) + (IV-1) + (VI-26) | 22:78:(7 + 7 + 7) |
| 128 | (I -1) | (II-3) | (III-1) + (IV-3) + (VI-26) | 30:70:(4 + 4 + 4) |
| 129 | (I -1) | (II-3) | (IV-1) + (IV-3) + (VI-26) | 33:67:(5 + 5 + 5) |
| 130 | (I -1) | (II-3) | (III-1) + (IV-1) + (IV-3) + (VI-26) | 40:60:(5 + 5 + 5 + 5) |
| 131 | (I -1) | (II -1) + (II -3) | (III-1) + (IV-1) + (IV-3) | 45:(20 + 35):(4 + 4 + 4) |
| 132 | (I -1) | (II -1) + (II -3) | (III-1) + (IV-1) + (VI-26) | 50:(25 + 25):(2 + 2 + 2) |
| 133 | (I -1) | (II -1) + (II -3) | (III-1) + (IV-3) + (VI-26) | 30:(35 + 35):(10 + 10 + 10) |
| 134 | (I -1) | (II -1) + (II -3) | (IV-1) + (IV-3) + (VI-26) | 28:(36 + 36):(3 + 3 + 3) |
| 135 | (I -1) | (II -1) + (II -3) | (III-1) + (IV-1) + (IV-3) + (VI-26) | 38:(31 + 31):(5 + 5 + 5 + 5) |
| 136 | (I -2) | (II-1) | (III-2) | 5:95:10 |
| 137 | (I -2) | (II-1) | (III-4) | 10:90:30 |
| 138 | (1-2) | (II-1) | (VI-27) | 15:85:25 |
| 139 | (I -4) | (II-1) | (VI-41) | 20:80:15 |
| 140 | (I -4) | (II-3) | (VI-42) | 25:75:25 |
| 141 | (I -4) | (II-3) | (III-2) + (VI-27) | 30:70:(15 + 15) |
| 142 | (I -7) | (II-3) | (III-4) + (VI-41) | 35:65:(10 + 10) |
| 143 | (I -7) | (II-3) | (VI-26) + (VI-27) | 40:60:(5 + 5) |
| 144 | (I -7) | (II-3) | (VI-41) + (VI-42) | 45:55:(2 + 3) |
| 145 | (I -5) | (II-1) | (III-2) + (IV-1) | 50:50:(3 + 3) |
| 146 | (I -5) | (II-1) | (III-4) + (IV-3) | 34:66:(10 + 10) |
| 147 | (I -5) | (II -1) + (II -3) | (III-2) + (IV-3) + (VI-27) | 32:(34 + 34):(5 + 5 + 5) |
| 148 | (I -6) | (II -1) + (II -3) | (III-4) + (IV-1) + (VI-41) | 30:(35 + 35):(7 + 7 + 7) |
| 150 | (I -6) | (II -1) + (II -3) | (IV-1) + (VI-27) | 25:(40 + 35):(10 + 10) |
| 151 | (I -1) + (I -2) | (II-2) | (V-1) | (10 + 10):80:30 |

TABLE 2-continued

| 表2<br>实施例<br>Examples | 组分<br>Component A | 组分<br>Component B | 组分<br>Component C | 配比<br>Ratio |
|---|---|---|---|---|
| 152 | (I -3) | (II-4) | (VII-1) | 10:90:40 |
| 153 | (I -8) | (II-5) | (III-1) + (III-2) | 20:80:(15 + 15) |
| 154 | (I -9) + (I -10) | (II-6) | (III-3) + (III-4) | (15 + 15):70:(10 + 10) |
| 155 | (I -11) | (II-7) | (III-4) | 25:75:15 |
| 156 | (I -12) | (II-8) | (III-5) | 30:70:20 |
| 157 | (I -13) + (I -14) | (II-9) + (II -10) | (III-6) | (20 + 20):(30 + 30):18 |
| 158 | (I -15) | (II-11) | (III-7) | 35:65:12 |
| 160 | (I -16) + (I -17) | (II-12) | (III-8) + (III-9) | (10 + 10):80:(10 + 10) |
| 161 | (I -18) + (I -19) | (II-13) | (III-10) | (10 + 15):75:10 |
| 162 | (I -20) + (I -21) | (II-9) | (III-11) | (5 + 5):90:50 |
| 163 | (I -23) | (II-10) | (IV-2) | 15:85:40 |
| 164 | (I -24) | (II-1) | (IV-4) | 25:75:10 |
| 165 | (I -22) | (II-1) | (V -1) + (V -2) | 35:65:(10 + 10) |
| 166 | (I -25) | (II-2) | (V -3) + (V -4) | 28:72:(5 + 5) |
| 167 | (I -26) | (II-2) | (V -5) | 32:68:5 |
| 168 | (I -27) + (I -28) | (II-3) | (VI-1) | (9 + 9):82:45 |
| 169 | (I -48) | (II-3) | (VI-3) + (VI-4) | 22:78:(10 + 25) |
| 170 | (I -49) | (II-4) | (VII-2) | 23:77:20 |
| 171 | (I -50) | (II-4) | (VII-3) | 32:68:10 |
| 172 | (I -51) | (II-5) | (III-13) + (III-15) + (IV-5) | 38:62:(5 + 5 + 5) |
| 173 | (I -52) + (I -53) | (II-5) | (III-14) + (IV-6) | (10 + 10):80:(10 + 10) |
| 174 | (I -54) | (II-6) | (III-16) + (V-1) | 30:70:(5 + 5) |
| 175 | (I -55) | (II-6) | (III-17) + (V-2) | 25:75:(15 + 10) |
| 176 | (I -56) | (II-7) | (III-18) + (III-19) + (VI-5) | 5:95:(15 + 15 + 15) |
| 177 | (I -57) | (I I-7) | (III-20) + (VI-6) | 10:90:(25 + 25) |
| 178 | (I -58) | (II-8) | (III-21) + (VII-1) | 15:85:(20 + 20) |
| 179 | (I -59) | (II-8) | (III-22) + (VII-2) | 20:80:(15 + 15) |
| 180 | (I -60) | (II-9) | (IV-2) + (V -3) | 25:75:(10 + 10) |
| 181 | (I -61) | (II-9) | (IV-4) + (V -4) | 30:70:(12 + 12) |
| 182 | (I -62) + (I -63) | (II-10) | (IV-5) + (VI-7) + | (15 + 15):70:(5 + 5 + 5) |
| 183 | (I -64) + (I -65) | (II-10) | (IV-6) + (VI-9) | (18 + 18):64:(5 + 5) |
| 184 | (I -66) | (II-11) | (IV-7) + (VI-3) | 21:79:(10 + 10) |
| 185 | (I -29) | (II-11) | (V-5) + (VI-10) | 27:73:(8 + 8) |
| 186 | (I -30) | (II-12) | (V-6) + (VII-1) | 35:65:(7 + 7) |
| 187 | (I -31) + (I -32) | (II-12) | VI-10) + (VII-2) | (20 + 20):60:(10 + 10) |
| 188 | (I -33) | (II-13) | (III-23) + (I V-7) + (V-7) | 45:55:(2 + 2 + 2) |
| 189 | (I -34) | (II-13) | (III-24) + (IV-8) + (VI-11) | 38:62:(5 + 5 + 5) |
| 190 | (I -35) | (II-2) + (II-6) | (III-25) + (IV-9) + (VII-3) | 34:66:(8 + 8 + 8) |
| 191 | (I -36) + (I -37) | (II-5) | (IV-4) + (V-8) + (VI-12) | (15 + 15):70:(6 + 6 + 6) |

TABLE 2-continued

表2

| 实施例 Examples | 组分 Component A | 组分 Component B | 组分 Component C | 配比 Ratio |
|---|---|---|---|---|
| 192 | (I -38) | (II-4) + (II-7) | (IV-5) + (V-1) + (VII-1) | 20:(40 + 40):(10 + 10 + 10) |
| 193 | (I -39) | (II-1) + (II-3) | (V-2) + (VI-13) + (VI-14) | 15:(40 + 45):(15 + 15 + 15) |
| 194 | (I -40) | (II-2) | (III-26) + (IV-10) + (V-3) + (VI-9) | 20:80:(5 + 5 + 5 + 5) |
| 195 | (I -41) | (II-8) | (III-27) + (IV-11) + (V-4) + (VI-2) | 10:90:(10 + 10 + 10 + 10) |
| 196 | (I -42) | (II-10) | (IV-2) + (V-5) + (VI-15) + (VII-3) | 25:75:(12 + 12 + 12 + 12) |
| 197 | (I -43) | (II-9) | (III-28) + (IV-6) + (V-6) + (VI-16) + (VII-1) | 35:65:(5 + 5 + 5 + 5 + 5) |
| 198 | (I -44) | (II-11) | (III-29) + (IV-5) + (V-7) + (VI-17) + (VII-2) | 40:60:(5 + 5 + 5 + 5 + 5) |
| 199 | (I -47) | (II-12) | (III-30) + (IV-4) + (VI-20) | 40:60:(10 + 10 + 10) |
| 200 | (I -46) | (II-13) | (III-31) + (IV-10) + (VI-18) + (VI-19) | 50:50:(4 + 4 + 4 + 4) |
| 201 | (I -45) | (II-8) | (III-32) + (IV-3) + (VI-21) | 45:55 (5 + 5 + 5) |
| 202 | (I -48) + (I -49) | (I I-7) | (III-33) + (IV-2) + (VI-22) | (20 + 20):60:(10 + 10 + 10) |
| 203 | (I -50) | (II-6) | (III-34) + (IV-1) + (VI-23) | 35:65:(12 + 12 + 12) |
| 204 | (I -51) | (II-5) | (III-35) + (IV-2) + (VI-24) + (VI-25) | 25:75:(10 + 10 + 10 + 10) |
| 205 | (I -52) | (II-4) | (III-36) + (III-37) + (IV-4) + (VI-28) | 30:70:(12 + 12 + 12 + 12) |
| 206 | (I -53) | (II-3) | (III-39) + (IV-5) + (VI-29) | 20:80:(15 + 15 + 15) |
| 207 | (I -54) + (I -55) | (II-2) | (III-38) + (III-40) + (IV-6) + (VI-30) | (20 + 20):60:(5 + 5 + 5 + 5) |
| 208 | (I -56) | (II-1) | (III-41) + (IV-7) + (VI-31) + (VI-32) | 35:65:(10 + 10 + 10 + 10) |
| 209 | (I -57) | (II-9) | (III-42) + (IV-8) + (VI-33) | 25:75:(10 + 10 + 10) |
| 210 | (I -58) | (II-10) | (III-43) + (III-44) + (IV-9) + (VI-34) | 40:60:(10 + 10 + 10 + 10) |
| 211 | (I -59) | (II-11) | (III-45) + (III-47) + (IV-10) + (VI-36) | 30:70:(7 + 7 + 7 + 7) |

TABLE 2-continued

表2

| 实施例 Examples | 组分 Component A | 组分 Component B | 组分 Component C | 配比 Ratio |
|---|---|---|---|---|
| 212 | (I -60) | (II-12) | (III-46) + (IV-4) + (VI-35) + (VI-37) | 38:62:(8 + 8 + 8 + 8) |
| 213 | (I -61) | (II-13) | (III-47) + (IV-11) + (VI-38) + (VI-39) | 26:74:(6 + 6 + 6 + 6) |
| 214 | (I -62) + (I -63) | (II-2) | (III-48) + (IV-5) + (VI-40) | (15 + 15):70:(10 + 10 + 10) |
| 215 | (I -64) | (II-2) | (III-49) + (IV-6) + (VI-45) | 40:60:(10 + 10 + 10) |
| 216 | (I -65) | (I -4) | (III-50) + (IV-7) + (VI-46) + (VI-47) | 50:50:(3 + 3 + 3 + 3) |
| 217 | (I -66) | (II-4) | (III-51) + (III-52) + (IV-10) + (VI-43) | 48:52:(4 + 4 + 4 + 4) |
| 218 | (I -55) | (II-5) | (III-50) + (IV-11) + (VI-44) | 45:55:(5 + 5 + 5) |
| 219 | (I -54) | (II-2) + (II-6) | (III-40) + (IV-9) + (VI-50) | 40:(30 + 30):(10 + 10 + 10) |
| 220 | (I -53) | (II-4) + (II-7) | (III-30) + (IV-8) + (VI-48) | 30:(35 + 35):(10 + 10 + 10) |
| 221 | (I -52) | (II-8) | (III-20) + (IV-7) + (VI-49) | 50:50:(5 + 5 + 5) |
| 222 | (I -51) | (II-9) | (III-1) + (IV-6) + (VI-51) + (VI-52) | 30:70:(10 + 10 + 10 + 10) |
| 223 | (I -50) | (II-10) | (III-2) + (IV-5) + (VI-53) | 40:60:(10 + 10 + 10) |
| 224 | (I -48) | (II-11) | (III-4) + (IV-4) + (VI-54) + (VI-55) | 35:65:(5 + 5 + 5 + 5) |

Comparative Example 1: According to Example 1 in Patent CN100582168A, the Reactive Black Dye Comprising the Following Two Components was Prepared

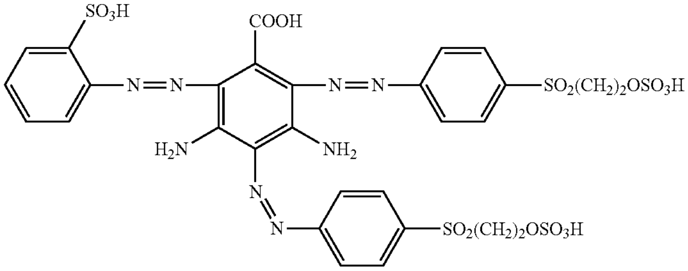

-continued
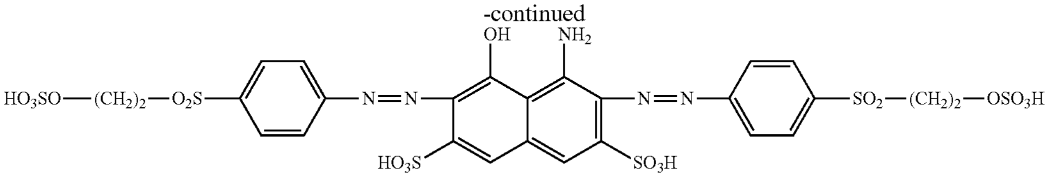
Comparative Example 2: According to Example 6 in Patent CN1730566A, the Reactive Black Dye Comprising the Following Three Components was Prepared
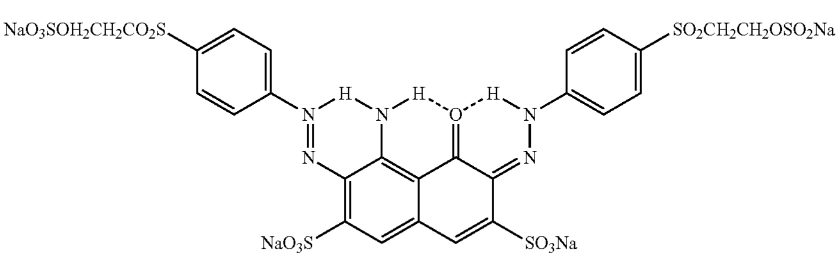
B1
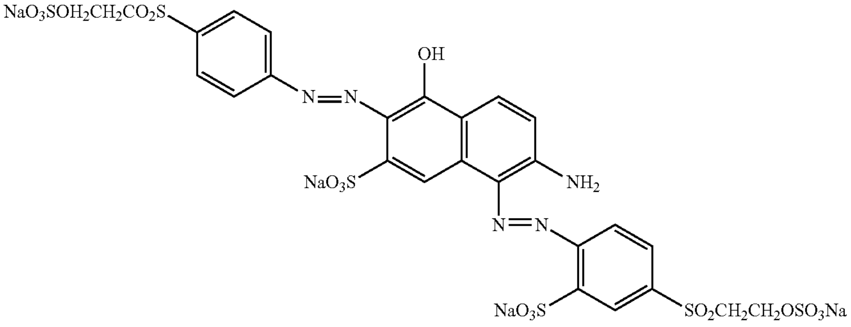
R3
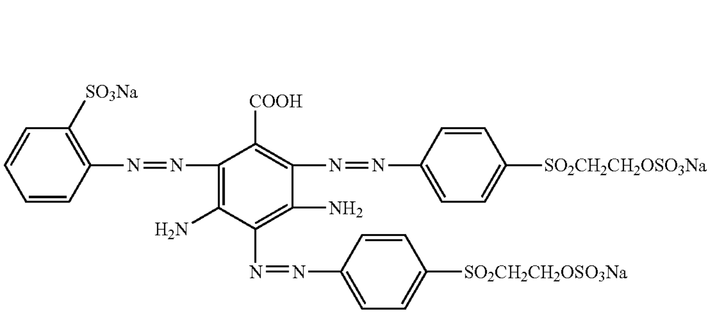
Y2

Application Example 1

The dried reactive black dyes obtained in examples 67-72 (closest to the prior art) and comparative examples 1 and 2 were respectively dissolved in water and added with sodium sulfate powder with a final concentration of 50 g/L to prepare a dyeing solution. The dyeing concentration (dye to cloth weight) was set at 4%, the bath ratio (gram weight of cloth to milliliter volume of dyeing solution) was set at 1:20, cotton was placed in the bath for adsorption at 60° C. for 30 minutes, alkali (sodium carbonate 20 g/L) was added for dye fixation for 45 minutes, the dyed fabric was washed with water, soaped, and dried to obtain a navy to black dyed fabric. Tests of fastnesses to washing, perspiration and rubbing were carried out according to methods in ISO 105 C10, ISO 105-E04 and ISO 105 X12. The results are shown in table 2:

TABLE 2

| Examples | Color strength | Fastness to washing: Color change | Cotton staining | Nylon staining | Wool staining | Perspiration resistence: Acid | Alkli | Rubbing fastness: Dry | Wet |
|---|---|---|---|---|---|---|---|---|---|
| 67 | 4.0% | 4 | 5 | 4-5 | 4 | 4-5 | 4-5 | 5 | 4 |
| 68 | 4.0% | 4 | 5 | 4-5 | 4 | 4-5 | 4-5 | 5 | 4 |
| 69 | 4.0% | 4 | 5 | 4-5 | 4 | 4-5 | 4-5 | 5 | 4 |
| 70 | 4.0% | 4 | 5 | 4-5 | 4 | 4-5 | 4-5 | 5 | 4 |
| 71 | 4.0% | 4 | 5 | 4-5 | 4 | 4-5 | 4-5 | 5 | 4 |
| 72 | 4.0% | 4 | 5 | 4-5 | 4 | 4-5 | 4-5 | 5 | 4 |
| comparative example 1 | 4.0% | 4 | 4 | 4 | 3-4 | 4 | 4 | 4 | 3-4 |
| comparative example 2 | 4.0% | 4 | 3-4 | 3-4 | 3 | 4 | 4 | 4-5 | 3-4 |

The build-up property of the reactive dyes obtained in the representative examples 67-72 of the present invention and comparative examples 1 and 2 was tested according to a method specified in the GB/T 21875-2016 standard, and it was found that the build-up of the reactive dyes of examples 67-72 was obviously better than that of the comparative examples 1 and 2, and that under the same dyeing conditions, the amount of the dye can be reduced by 5% to 15%, which led to remarkable economic effect.

Application Example 3

The degree of fixation of the reactive dyes obtained in examples 67~72 of the present invention and comparative examples 1~2 was tested according to the method specified in GB/T2391-2014 standard, and the results are shown in Table 3:

TABLE 3

| | Examples: Example 67 | Example 68 | Example 69 | Example 70 | Example 71 | Example 72 | Comparative example1 | Comparative example 2 |
|---|---|---|---|---|---|---|---|---|
| Degree of fixation | 81.1% | 80.9% | 81.5% | 82.0% | 81.8% | 80.5% | 72.3% | 70.5% |

In summary, the dyes of the present invention are significantly superior to those of the comparative examples, and for the industry it has a significant improvement in fastness, build-up and degree of fixation.

The invention claimed is:

1. A reactive navy to black dye composition, comprising component A and component B, wherein component A is one or more selected from the group consisting of dye compounds of formula (I) and alkali metal salts thereof, and component B is one or more selected from the group consisting of dye compounds of formula (II) and alkali metal salts thereof, based on component A and component B, component A has a mass percentage of 5% to 50%, and component B has a mass percentage of 50% to 95%, (I)

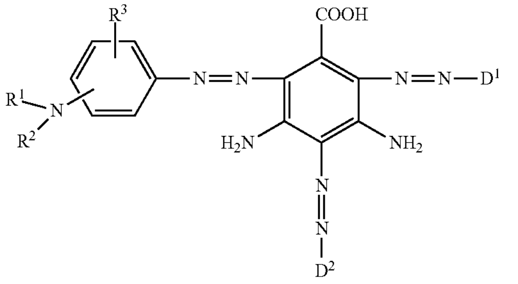

(II)

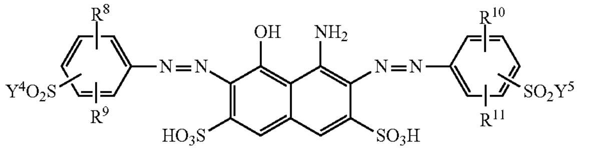

in formula (I):

$D^1$ and $D^2$ are each independently a group represented by the following formula (a) or (b);

(a)

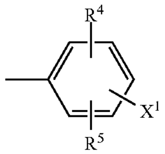

-continued (b)

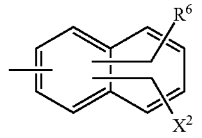

in the above formulae (I), (a) and (b):

$R^1$ and $R^2$ are each independently hydrogen, —$COR^7$, $C_1$~$C_4$ alkyl or $C_1$~$C_4$ alkyl substituted by hydroxyl, sulfo or carboxyl, in which $R^7$ is $C_1$~$C_4$ alkyl, $C_2$~$C_4$ alkenyl or —$NH_2$; $R^3$ is hydrogen, $C_1$~$C_4$ alkyl, $C_1$~$C_4$ alkoxy, carboxyl or sulfo;

$R^4$~$R^6$ are each independently hydrogen, $C_1$~$C_4$ alkyl, $C_1$~$C_4$ alkoxy or sulfo;

$X^1$ and $X^2$ are each independently —$SO_2Y^1$, —$NHCO(CH_2)_pSO_2Y^2$ or —$CONH(CH_2)_qSO_2Y^3$, wherein $Y^1$~$Y^3$ are each independently —$CH{=}CH_2$, —$CH_2CH_2OSO_3H$ or —$CH_2CH_2Cl$, p=1-3 and q=1-3;

in formula (II):

$R^8$~$R^{11}$ are each independently hydrogen, $C_1$~$C_4$ alkyl, $C_1$~$C_4$ alkoxy or sulfo;

$Y^4$ and $Y^5$ are each independently —$CH{=}CH_2$, —$CH_2CH_2OSO_3H$ or —$CH_2CH_2Cl$.

2. The reactive navy to black dye composition as claimed in claim 1, wherein the reactive navy to black dye composition consists of component A and component B.

3. The reactive navy to black dye composition as claimed in claim 1, wherein the reactive navy to black dye composition also comprises component C and component D; component C is one or more selected from the group consisting of compounds of formulae (III)~(IV) and alkali metal salts thereof, and the mass of component C is 1% to 50% of the total mass of component A and component B; component D is one or more selected from the group consisting of dye compounds of formulae (V)~(VII) and alkali metal salts thereof, and the mass of component D is 1% to 50% of the total mass of component A and component B;

(III)

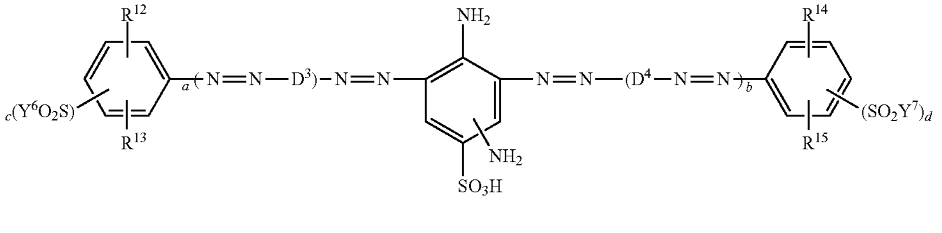

-continued (IV)

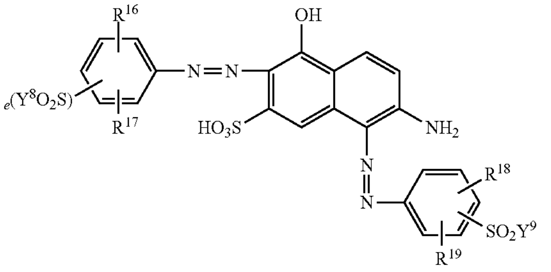

(V)

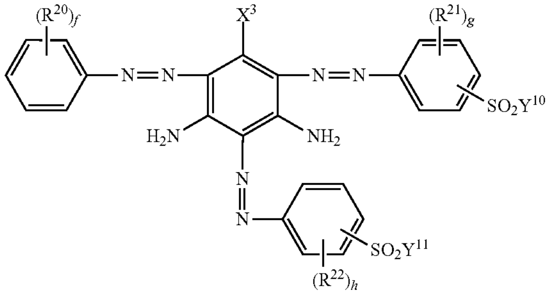

(VI)

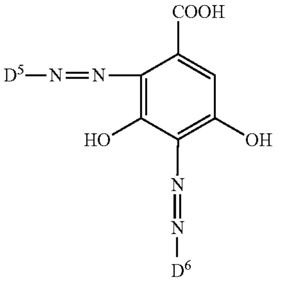

(VII)

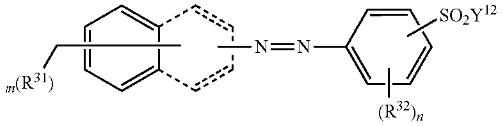

in formula (III):

$R^{12}$~$R^{15}$ are each independently H, $C_1$~$C_4$ alkyl, $C_1$~$C_4$ alkoxy, carboxyl or sulfo;

$Y^6$ and $Y^7$ are each independently —CH═$CH_2$, —$C_2H_4OSO_3H$ or —$C_2H_4Cl$;

a is 0 or 1;

b is 0 or 1;

c and d are each independently 0 or 1;

each of $D^3$ and $D^4$ is independently substituted phenyl, unsubstituted phenyl, substituted naphthyl or unsubstituted naphthyl, and the number of the substituents of the substituted phenyl and the substituted naphthyl is 1-3, respectively, and each of the substituents is independently selected from the group consisting of amino, sulfo, ureido, $C_1$~$C_4$ alkanoylamino, $C_1$~$C_4$ alkoxy and hydroxyl;

in formula (IV):

$R^{16}$~$R^{19}$ are each independently H, $C_1$~$C_4$ alkyl, $C_1$~$C_4$ alkoxy or sulfo;

e=0-1;

$Y^8$ and $Y^9$ are each independently —CH═$CH_2$, —$C_2H_4OSO_3H$ or —$C_2H_4Cl$, in formula (V):

f, g and h are each independently selected from 0-3, and every $R^{20}$, $R^{21}$ and $R^{22}$ is each independently $C_1$~$C_4$ alkyl, $C_1$~$C_4$ alkoxy or sulfo;

$X^3$ is hydrogen or carboxyl;

$Y^{10}$ and $Y^{11}$ are each independently —CH═$CH_2$, —$C_2H_4OSO_3H$ or —$C_2H_4Cl$;

in formula (VI):

$D^5$ and $D^6$ are each independently a group of the following formula (c), (d) or (f):

(c)

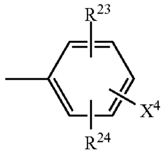

-continued (d)

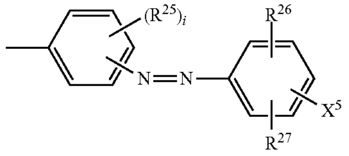

(f)

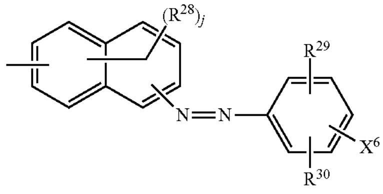

in the above formulae (c), (d) and (f) $R^{23}$, $R^{24}$, $R^{26}$, $R^{27}$, $R^{29}$ and $R^{30}$ are each independently H, $C_1$~$C_4$ alkyl, $C_1$~$C_4$ alkoxy or sulfo; i=0-3, and every $R^{25}$ is each independently selected from the group consisting of $C_1$~$C_4$ alkyl, sulfo, ureido and $C_1$~$C_4$ alkanoylamino; j=0-3, and every $R^{28}$ is each independently selected from the group consisting of hydroxyl and sulfo;

$X^4$, $X^5$ and $X^6$ are each independently —$SO_2Y^{13}$, —$NHCO(CH_2)_rSO_2Y^{14}$ or —$CONH(CH_2)_sSO_2Y^{15}$, wherein r and s are integers, r=1-3, s=1-3, $Y^{13}$~$Y^{15}$ are each independently —CH═$CH_2$, —$C_2H_4OSO_3H$ or —$CH_2CH_2Cl$;

in formula (VII):

m=1-3, and every $R^{31}$ is each independently selected from the group consisting of amino, sulfo, ureido, $C_1$~$C_4$ alkanoylamino, $C_1$~$C_4$ alkoxy and hydroxyl;

$Y^{12}$ is —CH═CH$_2$, —$C_2H_4OSO_3H$ or —$C_2H_4Cl$;

n=0-2, and every $R^{32}$ is each independently linear or branched $C_1$~$C_4$ alkyl, $C_1$~$C_4$ alkoxy or sulfo.

4. The reactive navy to black dye composition as claimed in claim 3, wherein the reactive navy to black dye composition consists of component A, component B, component C and component D.

5. The reactive navy to black dye composition as claimed in claim 1, wherein both $D^1$ and $D^2$ are the group of formula (a) or (b).

6. The reactive navy to black dye composition as claimed in claim 1, wherein component A is at least one selected from the group consisting of dye compounds of the following formulae (I-1)~(I-665) and alkali metal salts thereof:

(I-1)

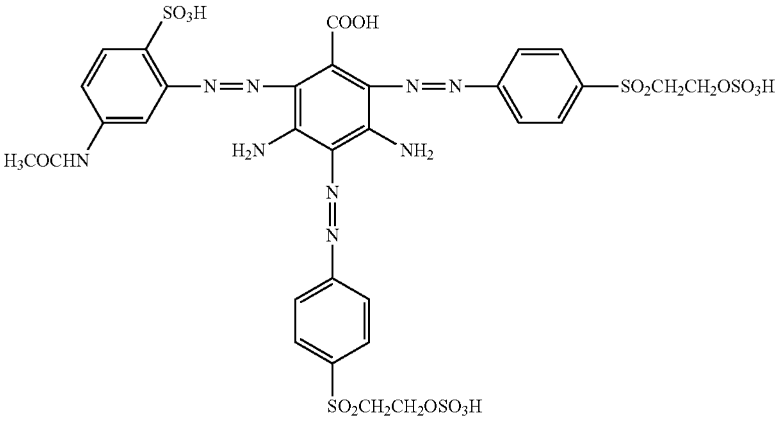

(I-2)

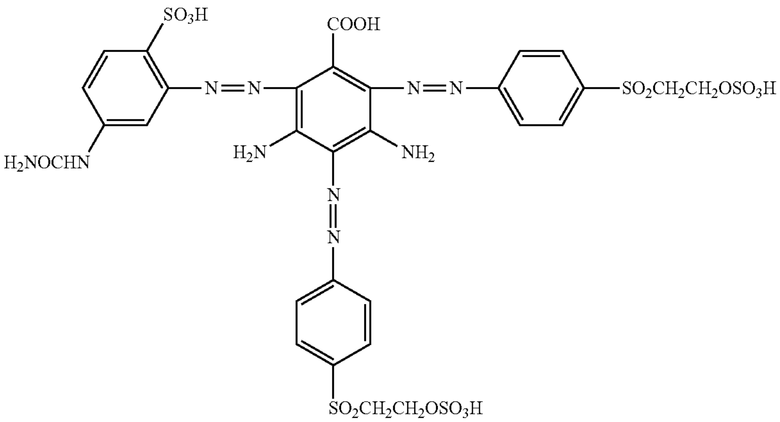

(I-3)

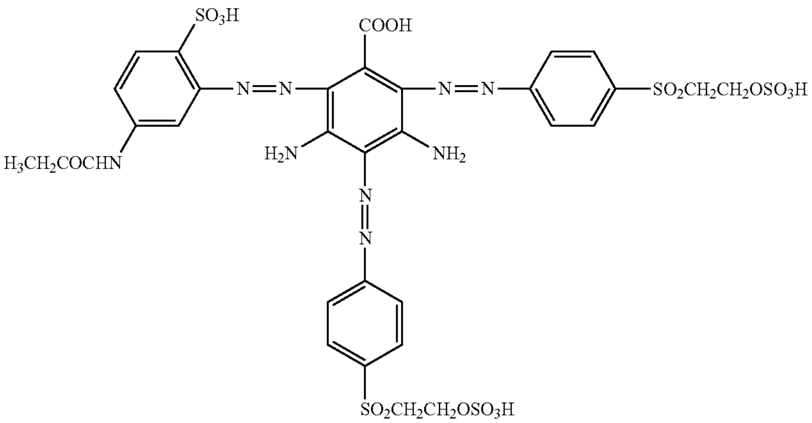

-continued
(I-4)
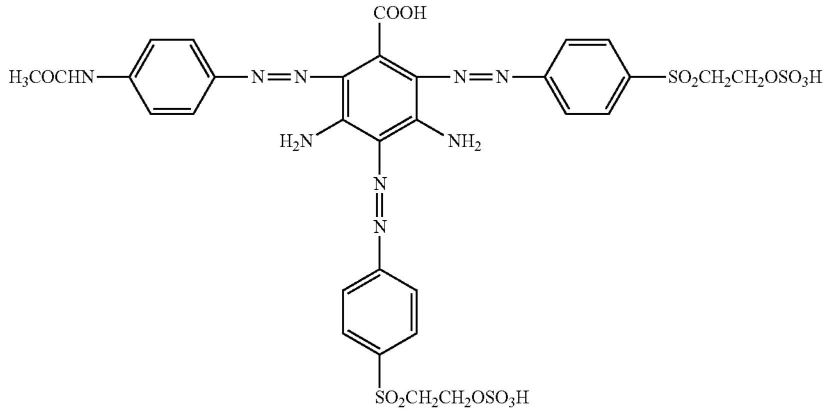
(I-5)
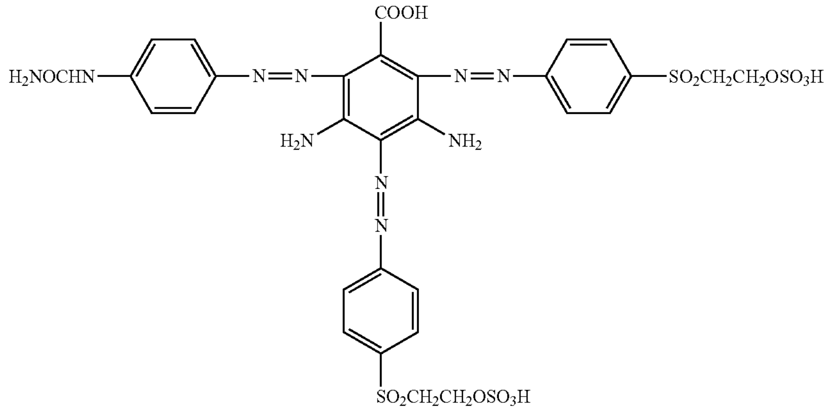
(I-6)
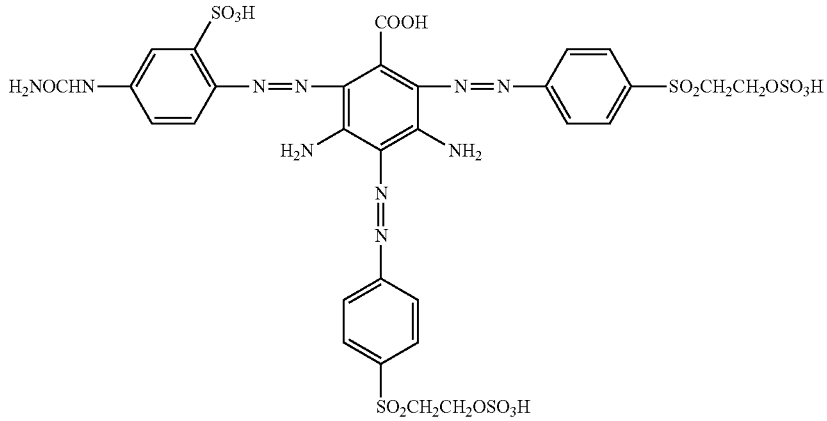

-continued
(I-7)
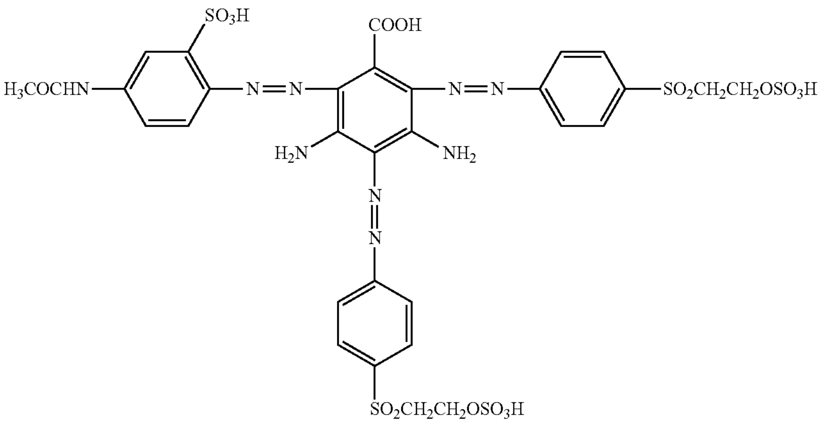
(I-8)
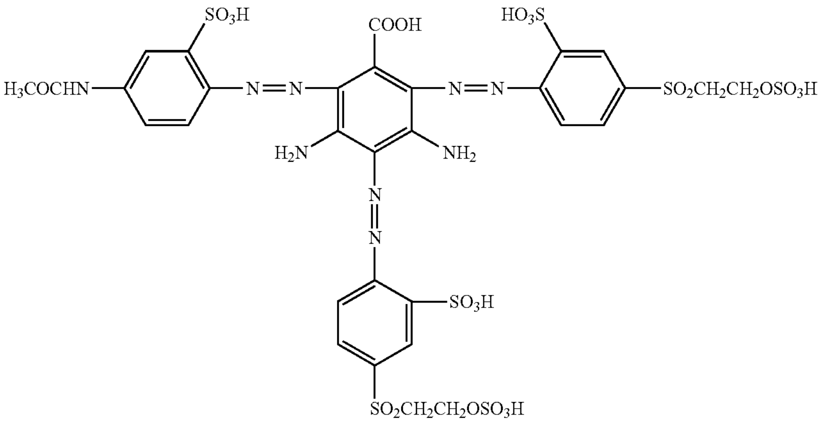
(I-9)
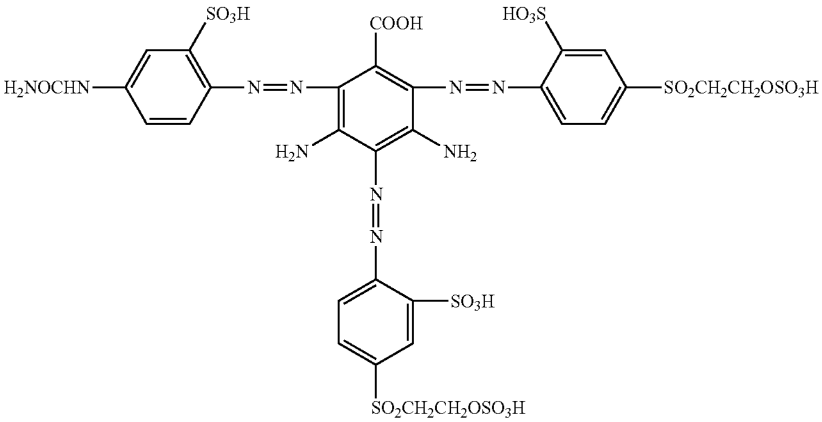
(I-10)
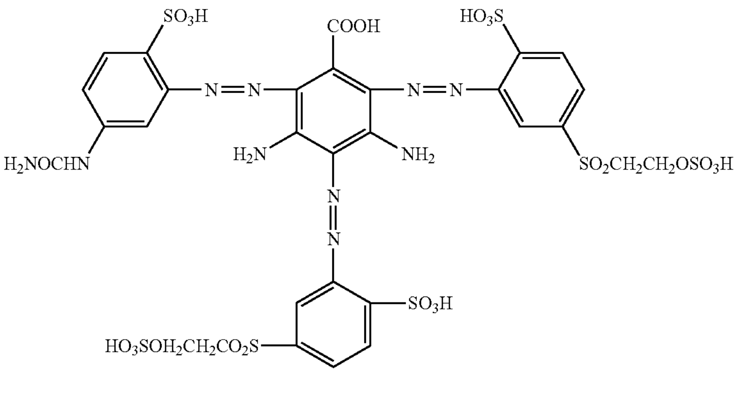

-continued
(I-11)
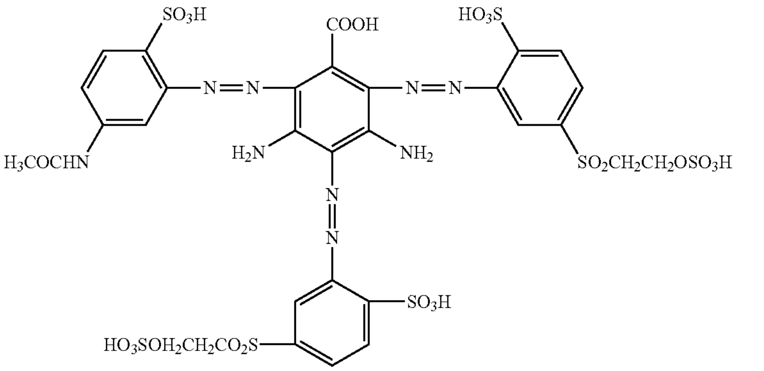
(I-12)
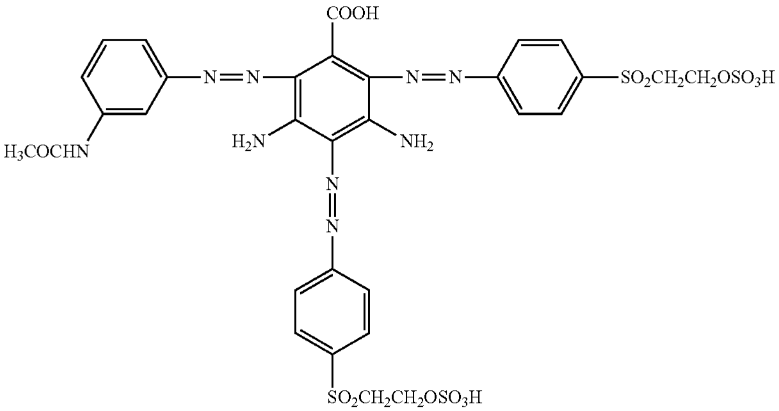
(I-13)
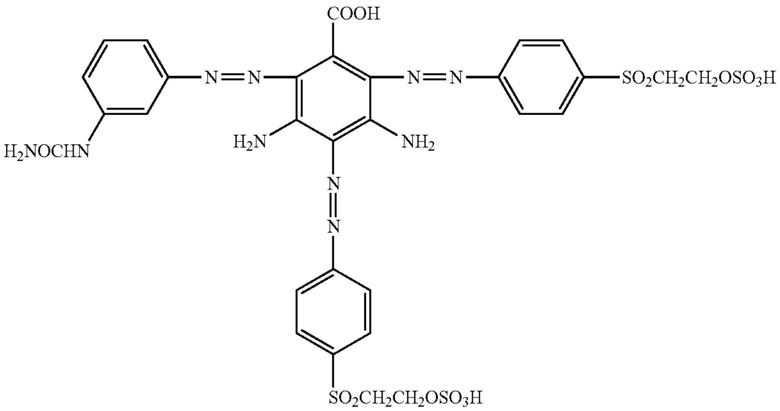
(I-14)
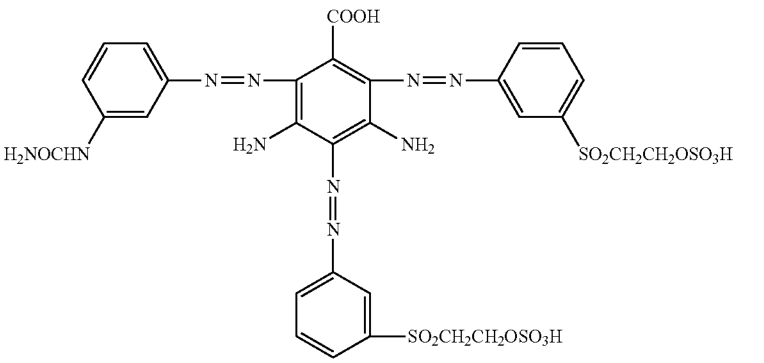

-continued
(I-15)
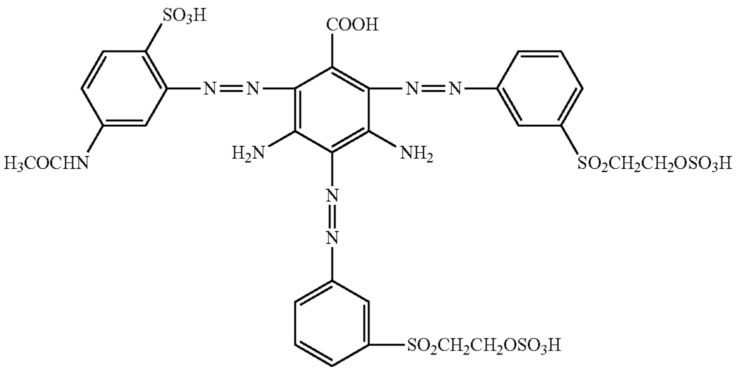
(I-16)
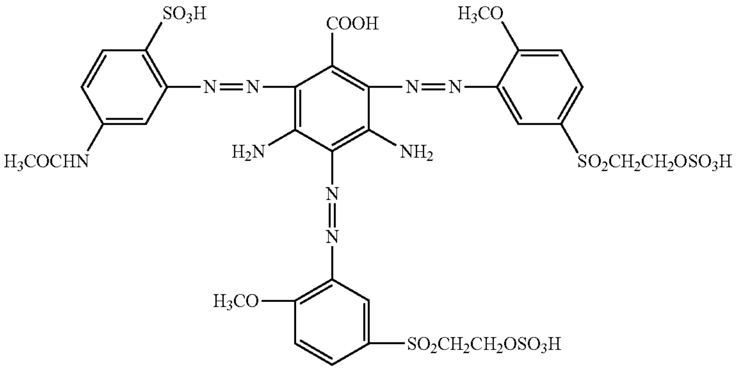
(I-17)
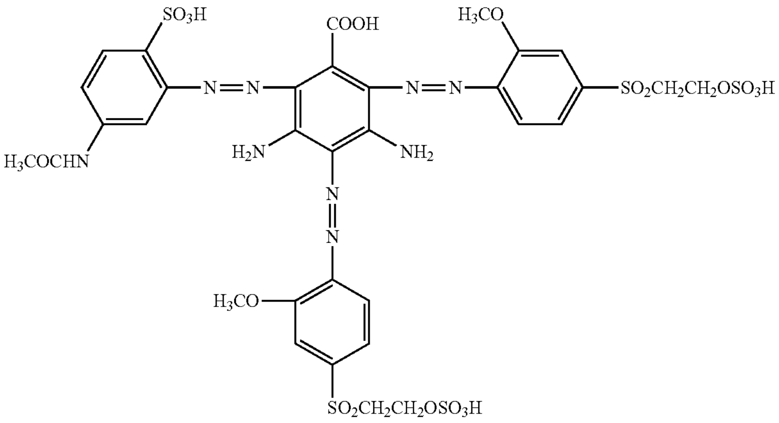
(I-18)
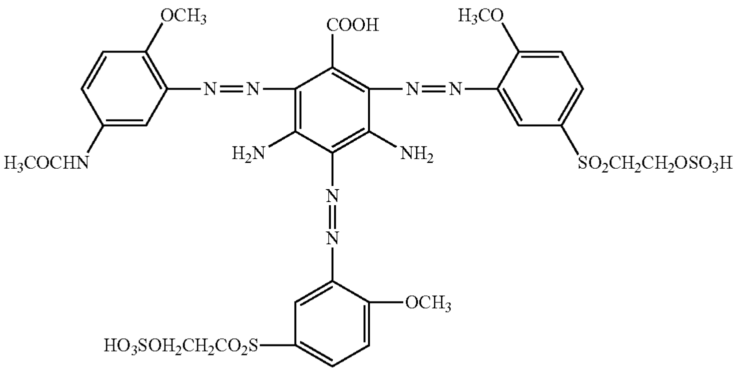

-continued
(I-19)
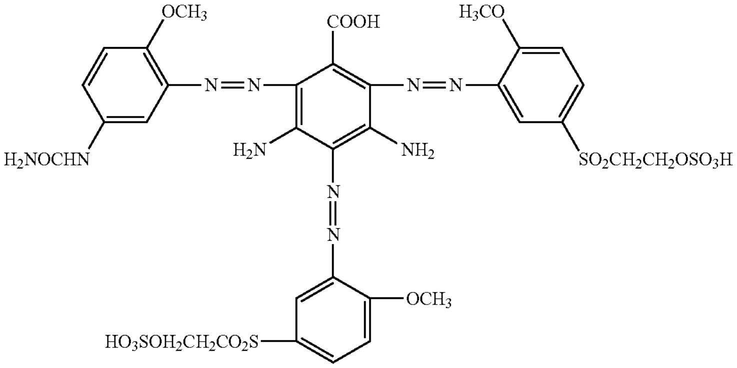
(I-20)
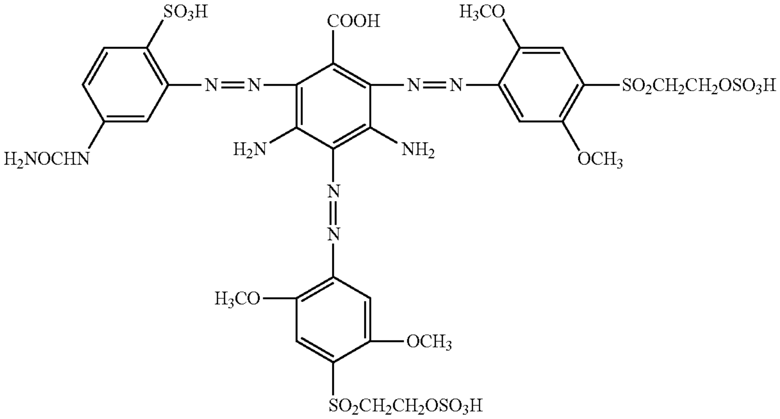
(I-21)
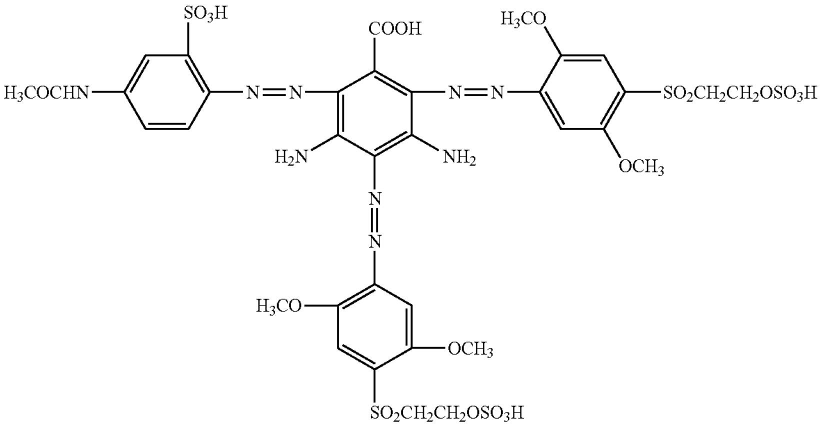
(I-22)
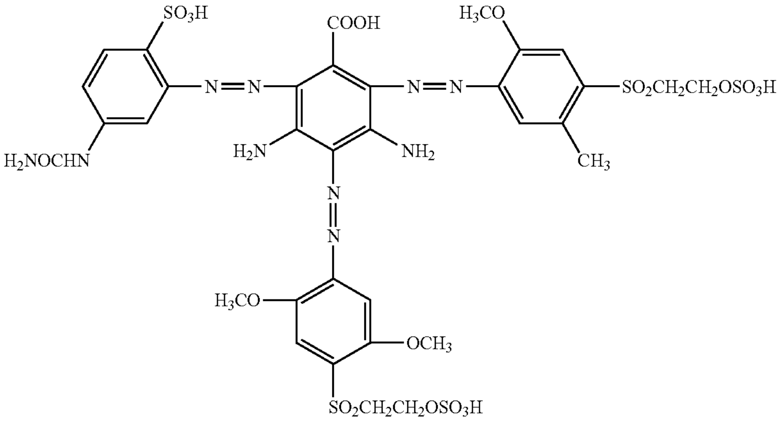

-continued
(I-23)
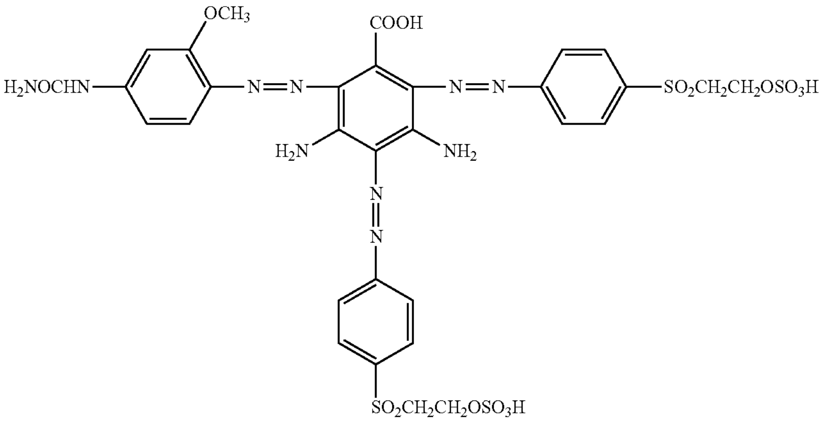
(I-24)
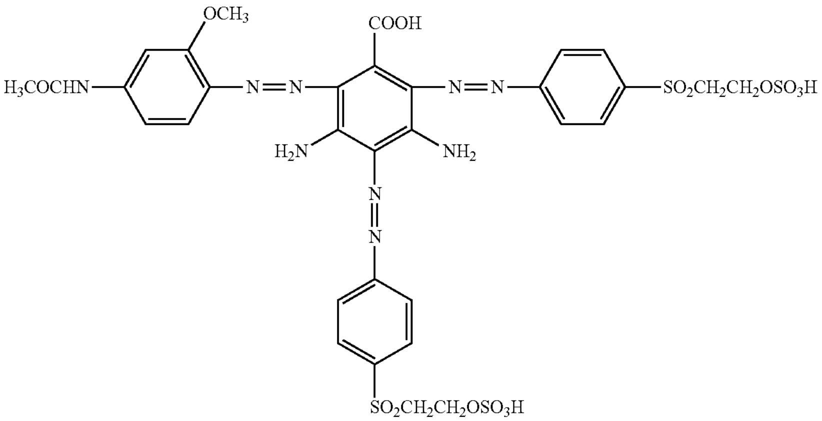
(I-25)
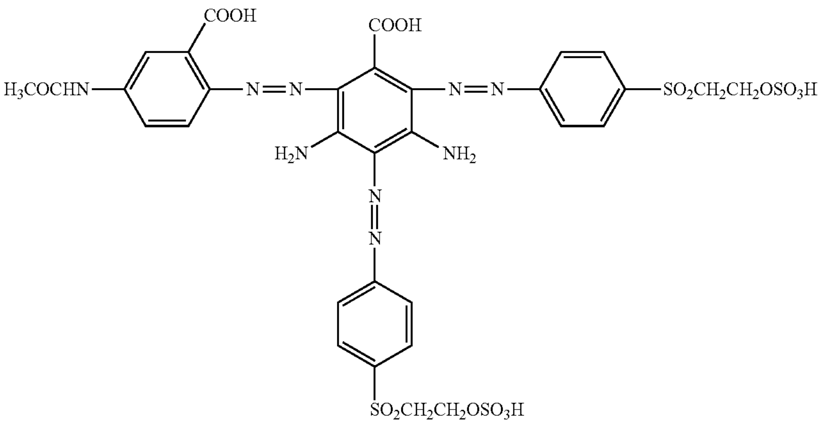

-continued
(I-26)
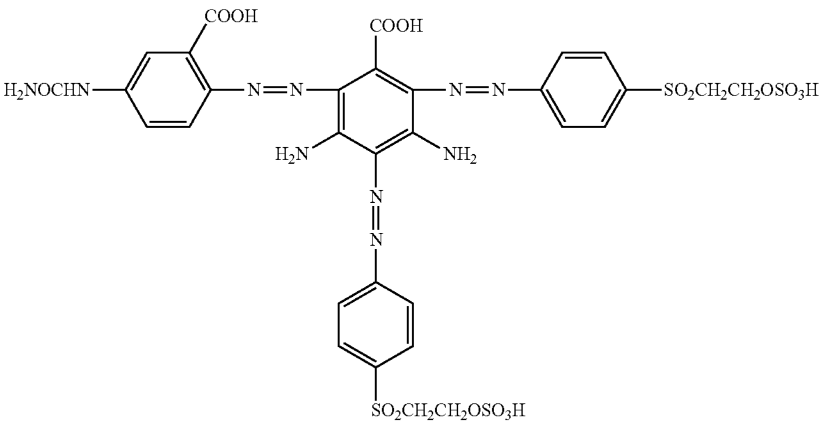
(I-27)
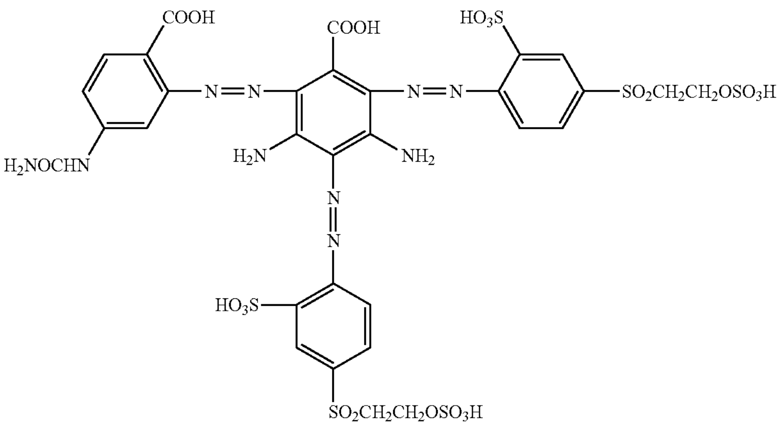
(I-28)
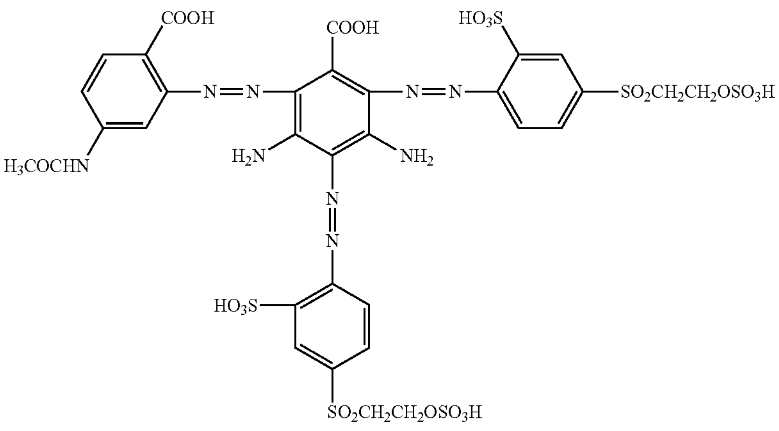

-continued
(I-29)
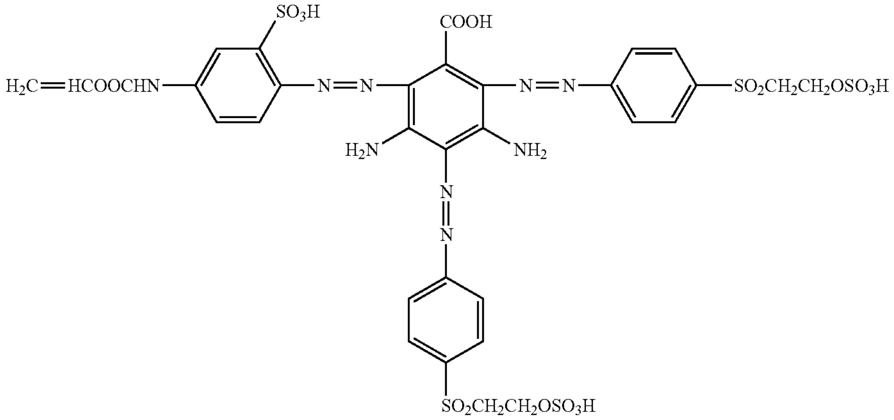
(I-30)
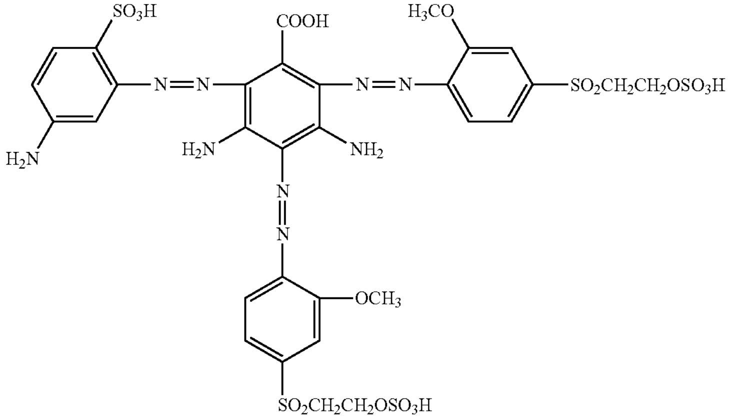
(I-31)
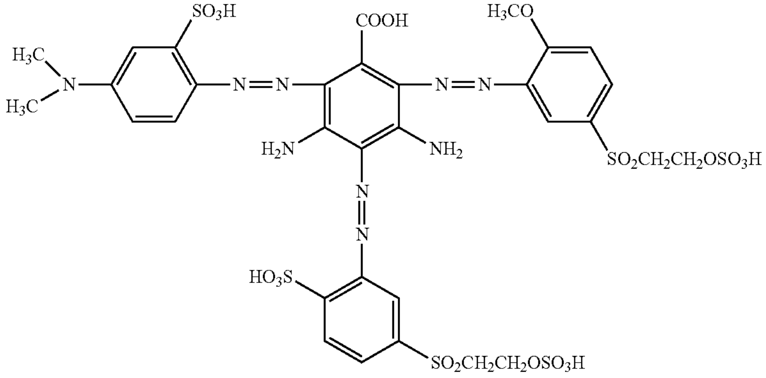
(I-32)
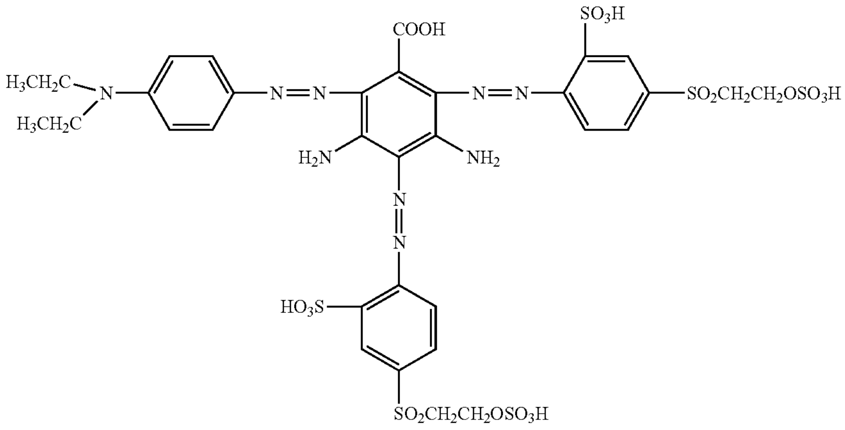

-continued
(I-33)
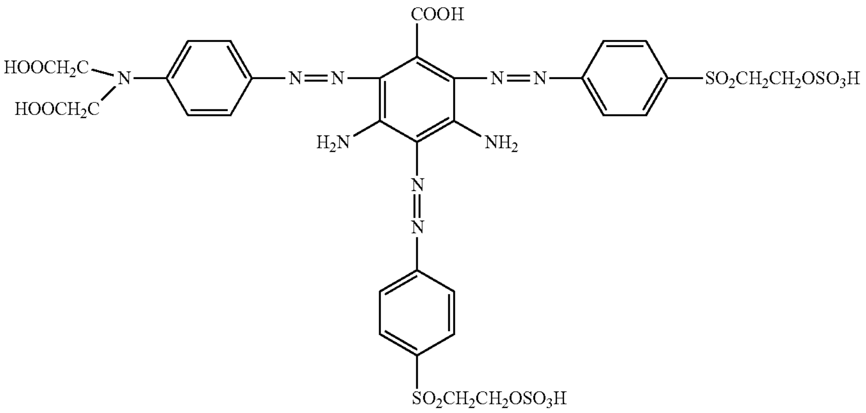
(I-34)
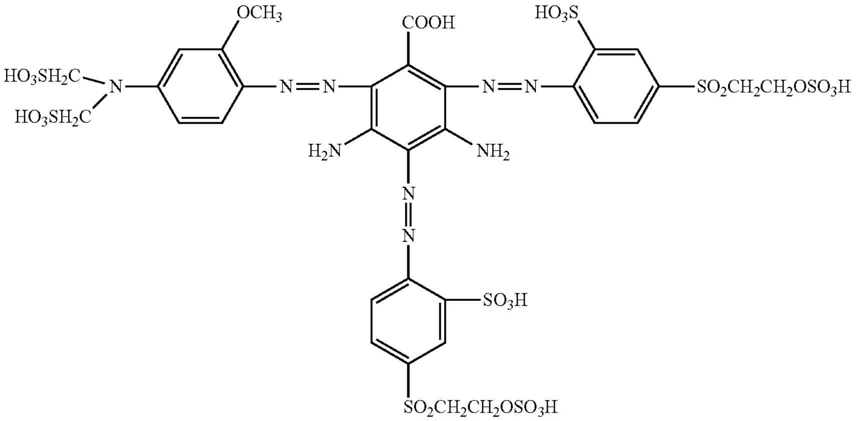
(I-35)
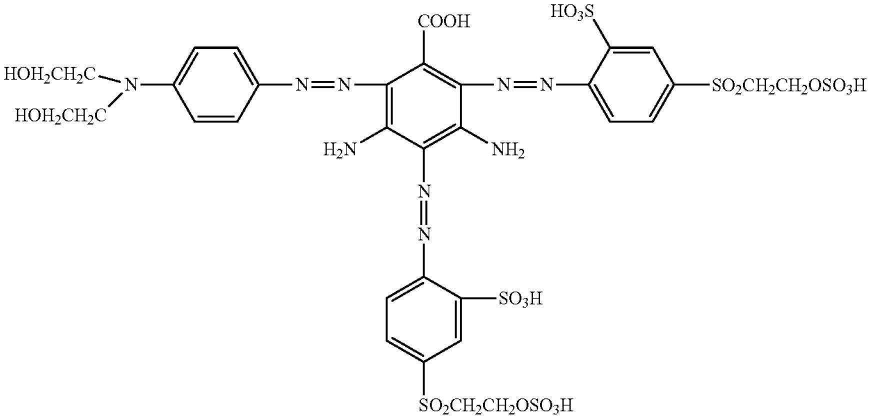

-continued
(I-36)
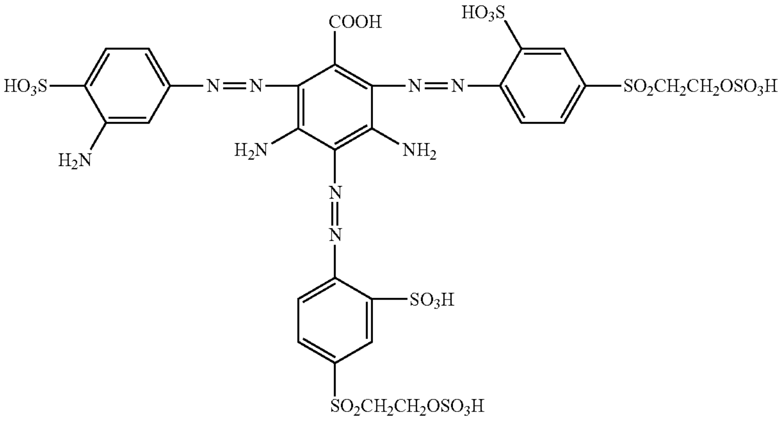
(I-37)
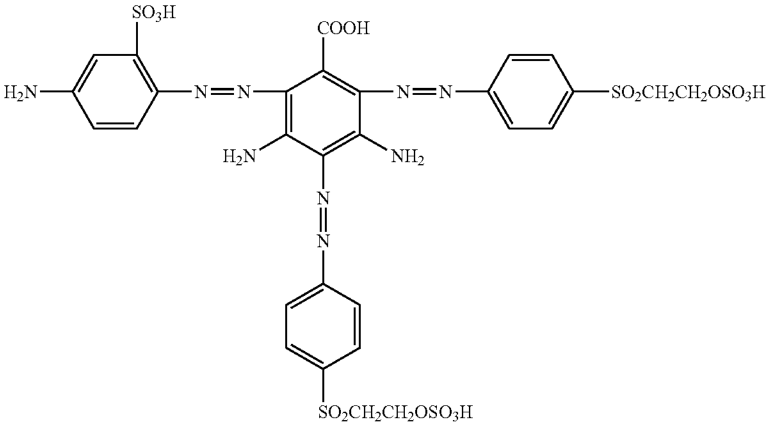
(I-38)
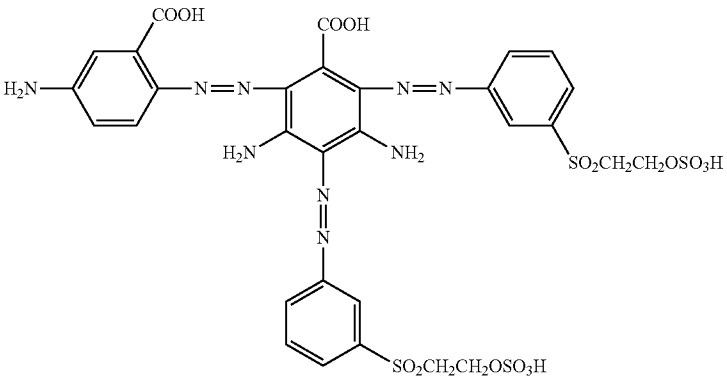

-continued
(I-39)
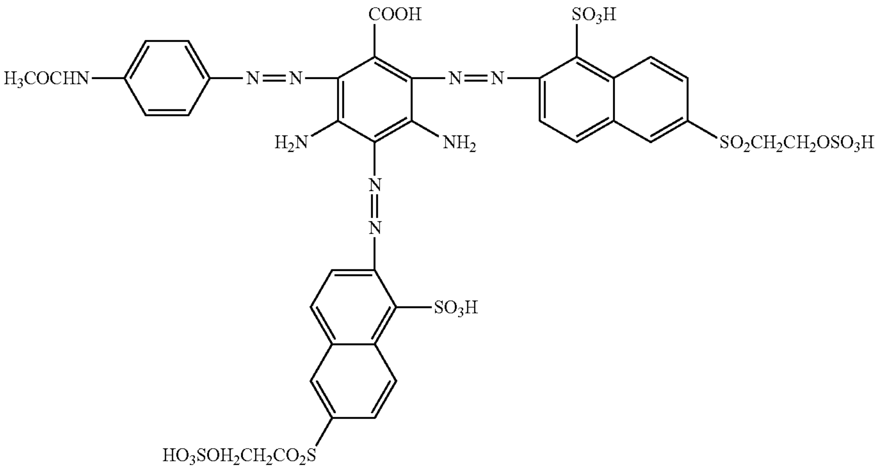
(I-40)
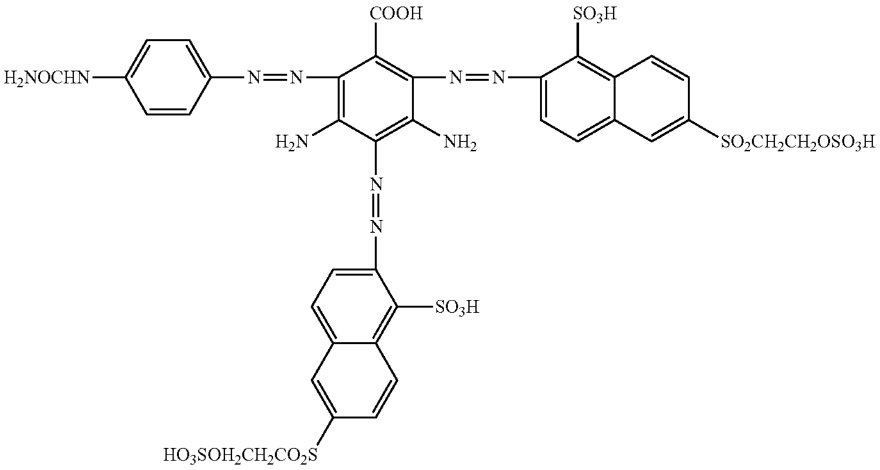
(I-41)
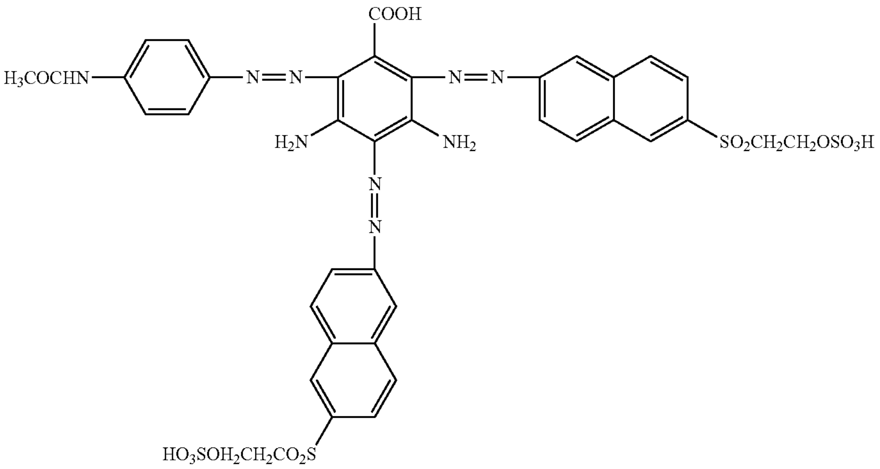

-continued
(I-42)
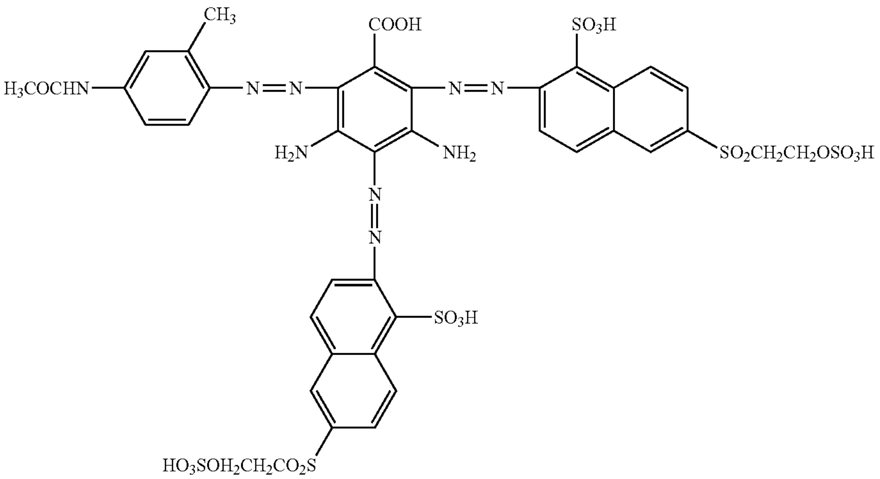
(I-43)
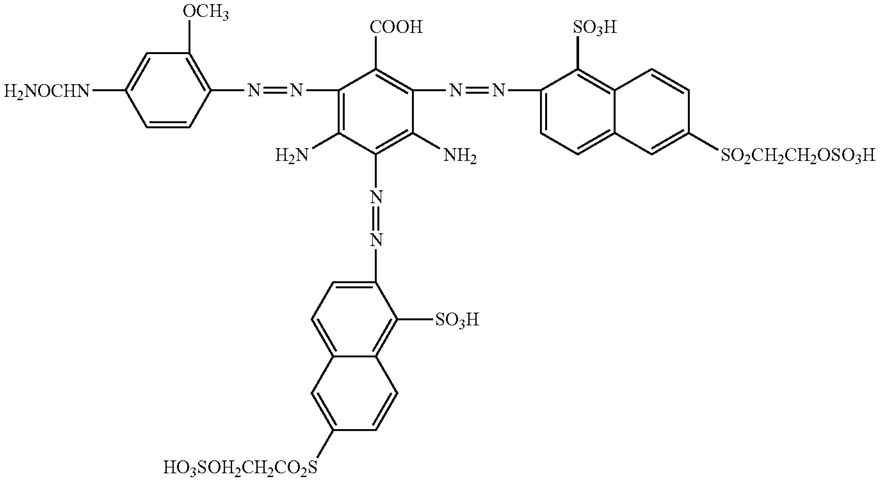
(I-44)
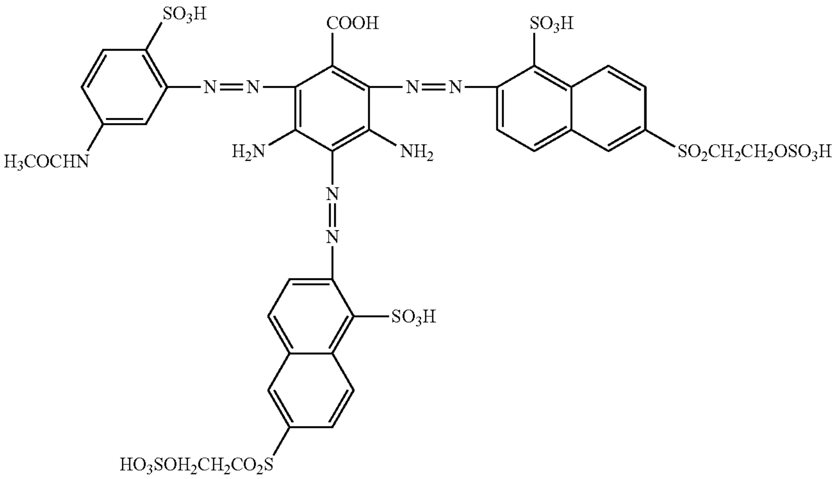

-continued
(I-45)
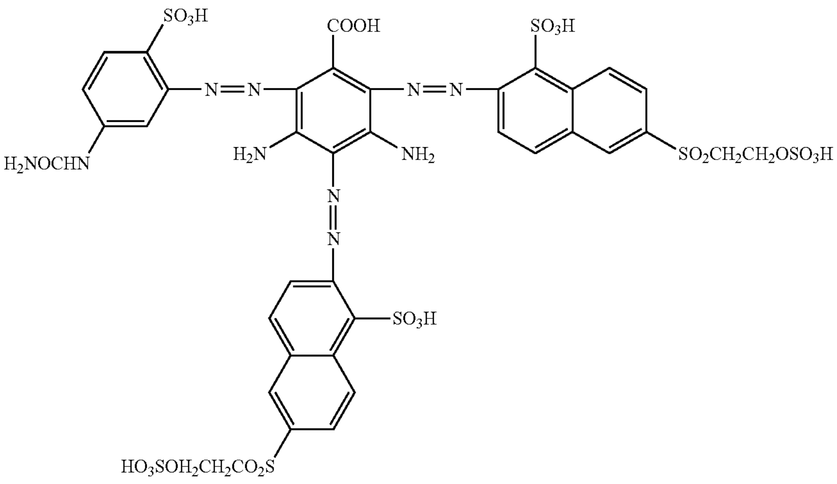
(I-46)
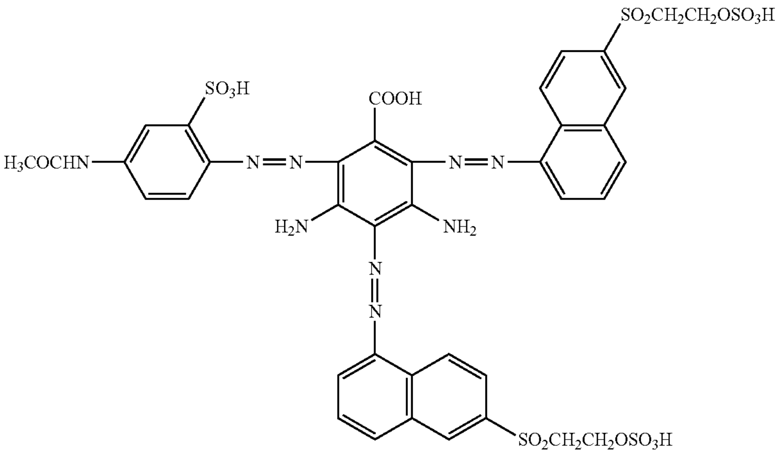
(I-47)
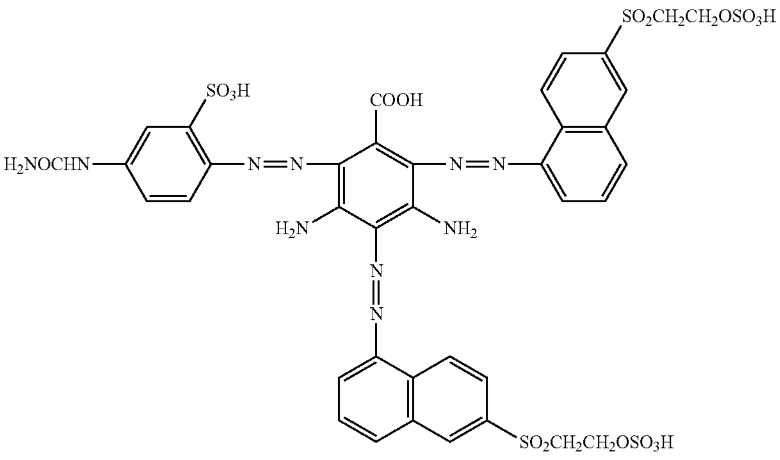

-continued
(I-48)
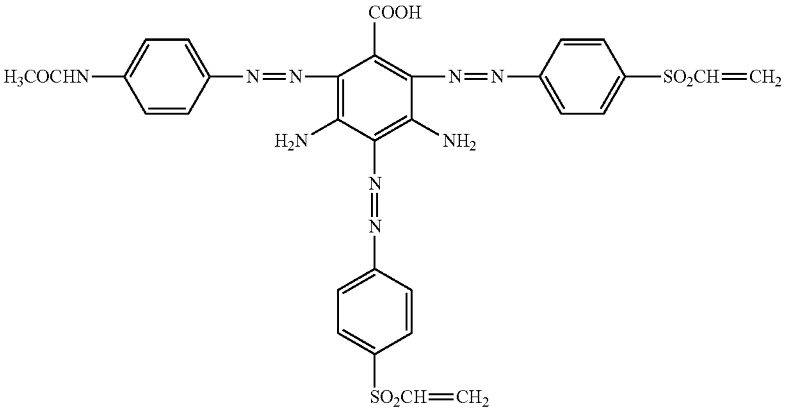
(I-49)
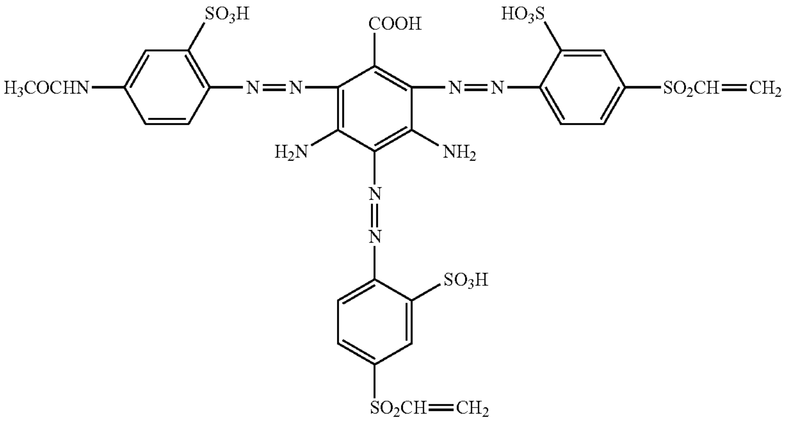
(I-50)
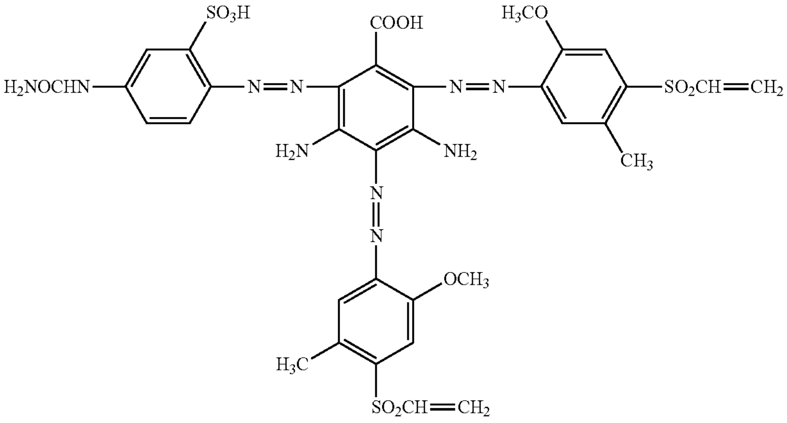

-continued
(I-51)
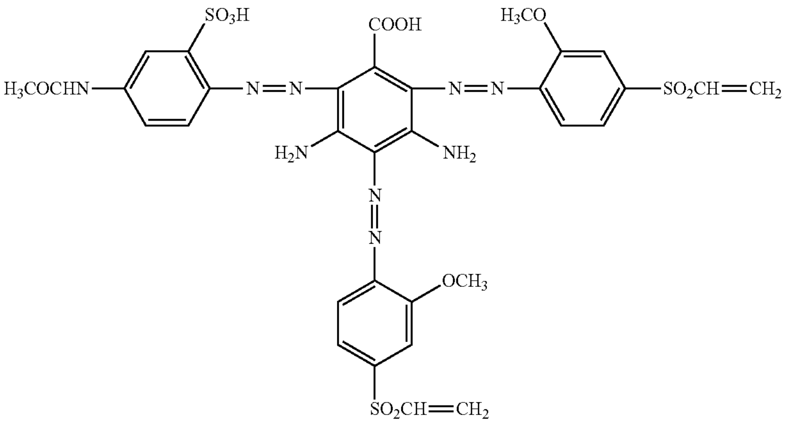
(I-52)
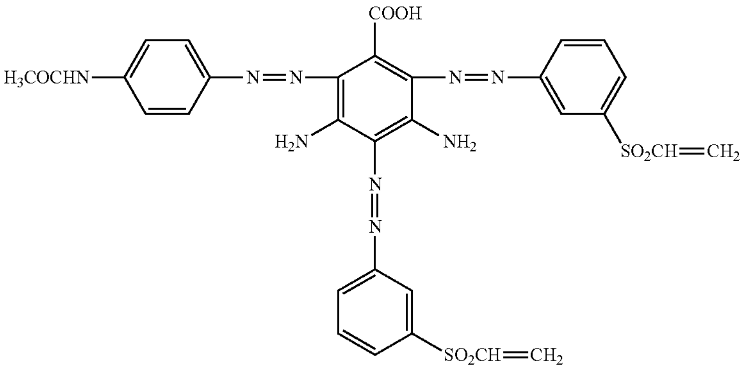
(I-53)
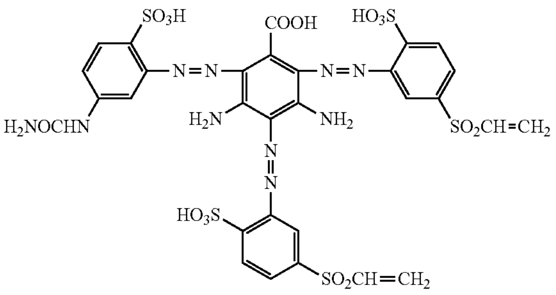
(I-54)
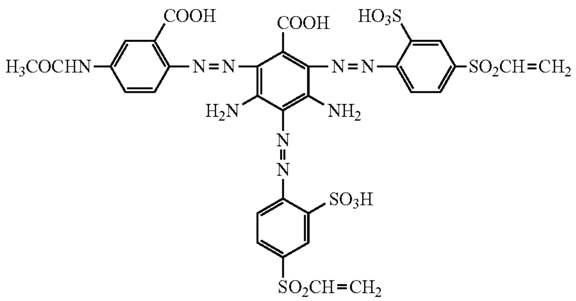
(I-55)
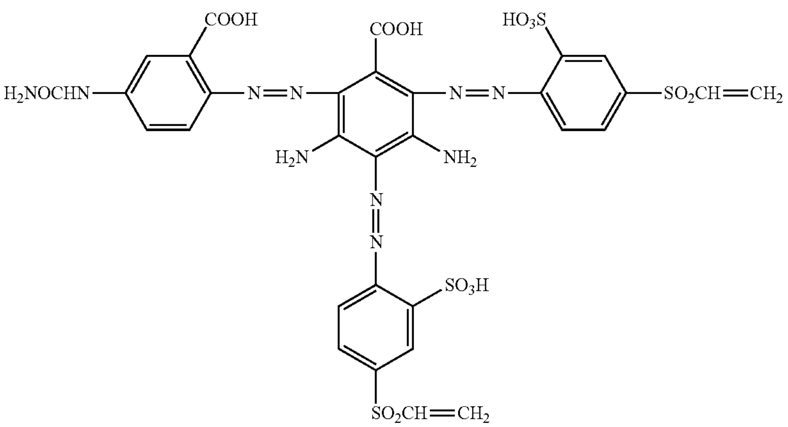

-continued
(I-56)
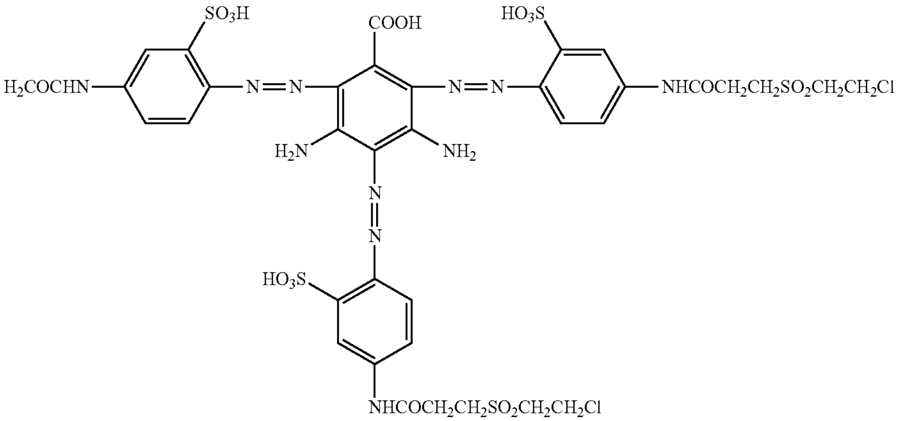
(I-57)
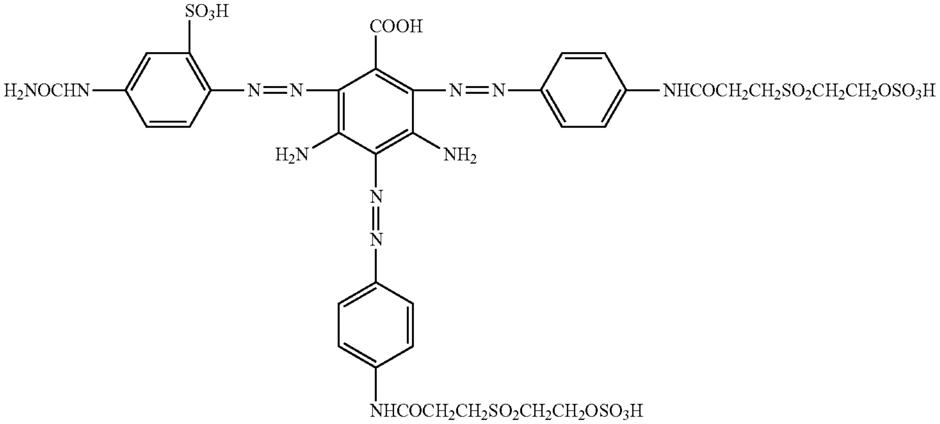
(I-58)
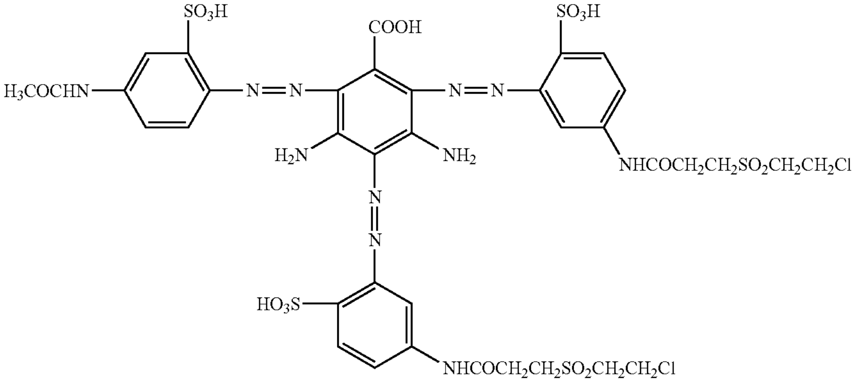
(I-59)
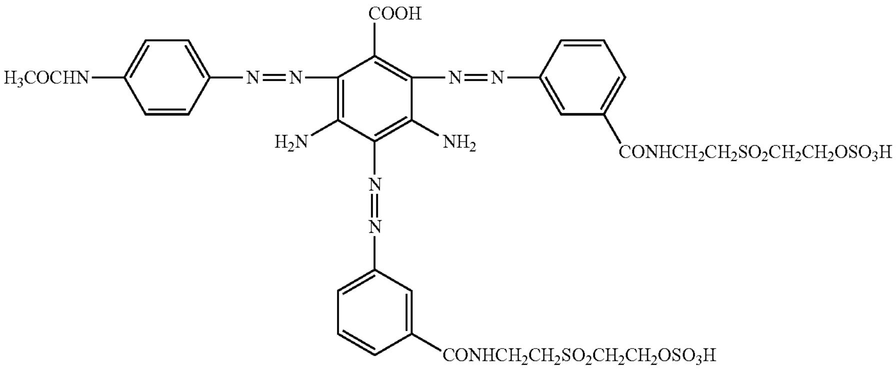

-continued
(I-60)
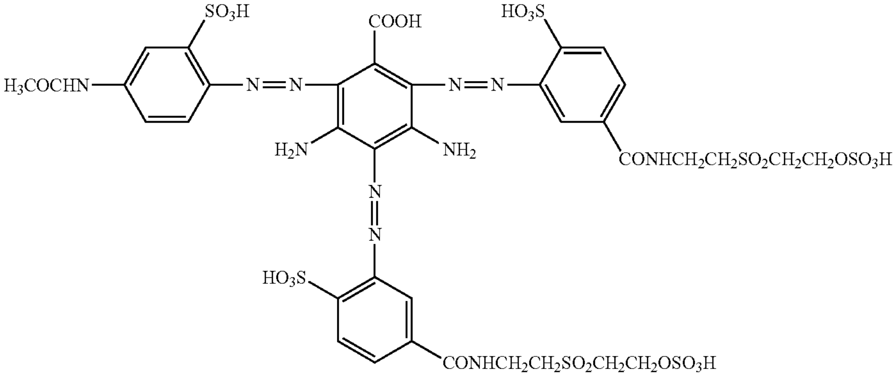
(I-61)
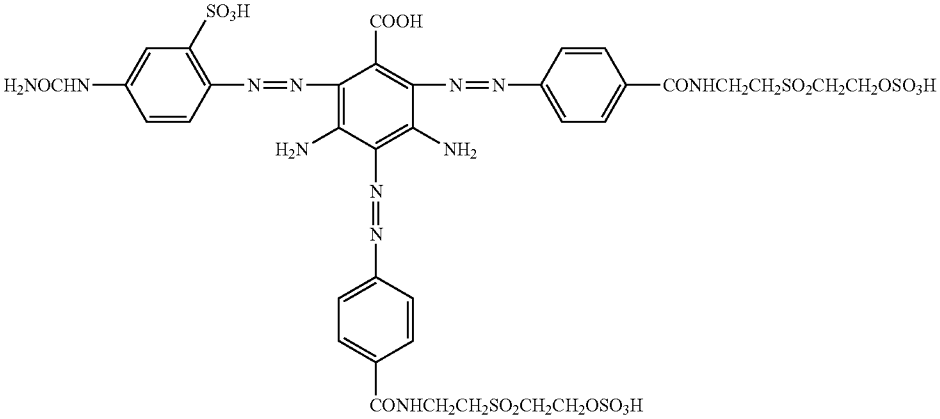
(I-62)
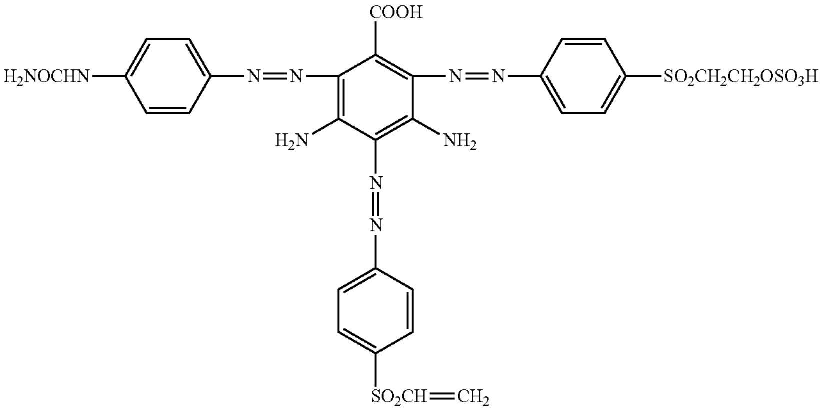
(I-63)
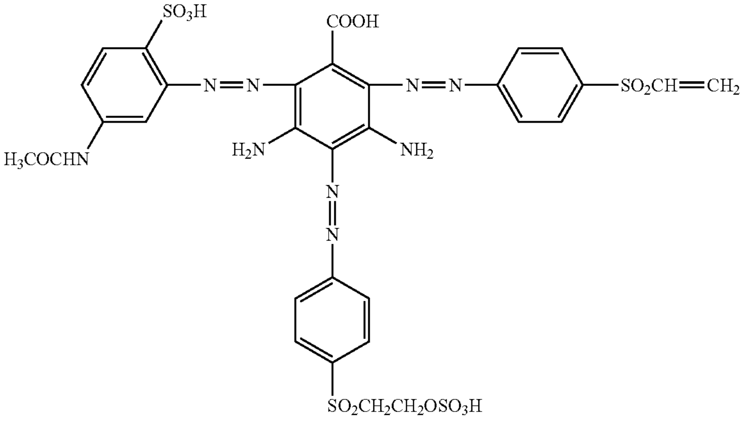

-continued
(I-64)
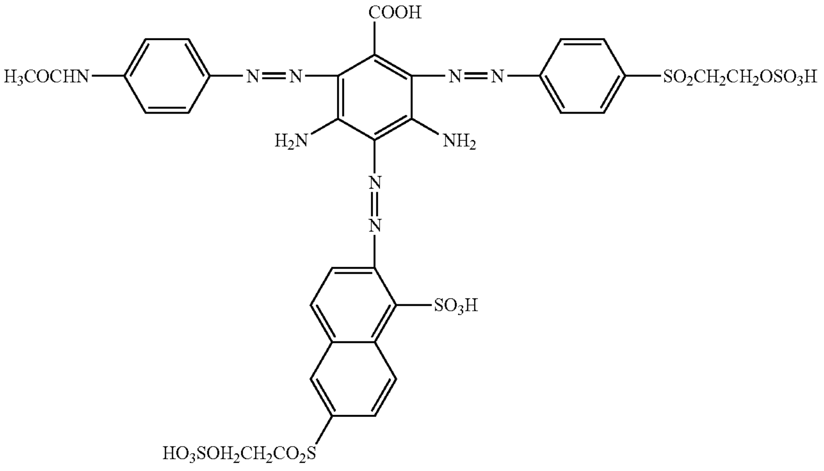
(I-65)
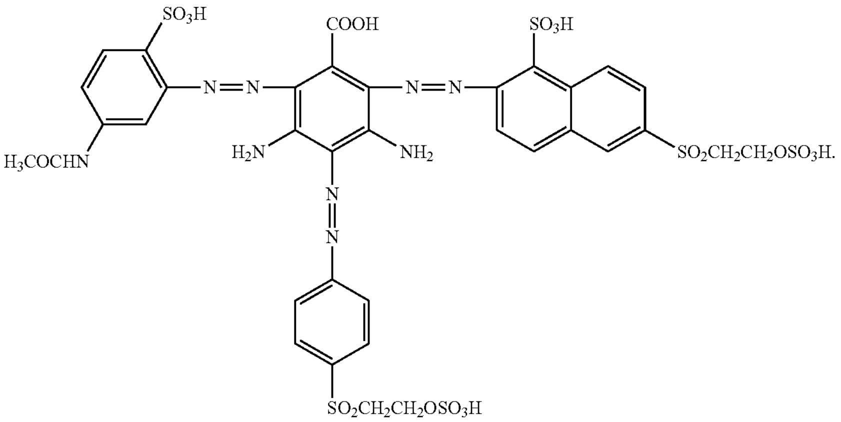
7. The reactive navy to black dye composition as claimed in claim 1, wherein component B is at least one selected from the group consisting of the following compounds and alkali metal salts thereof:
(II-1)
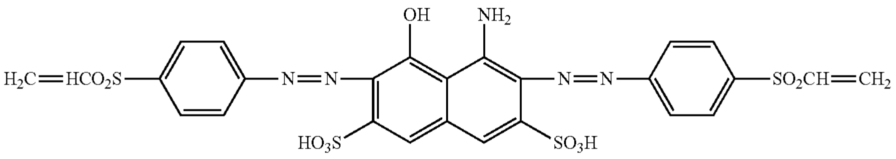
(II-2)
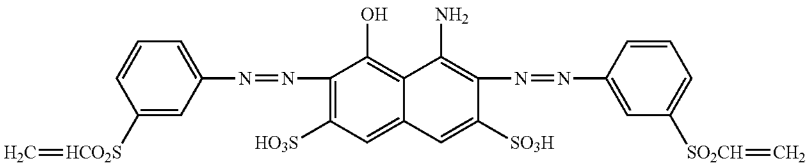
(II-3)
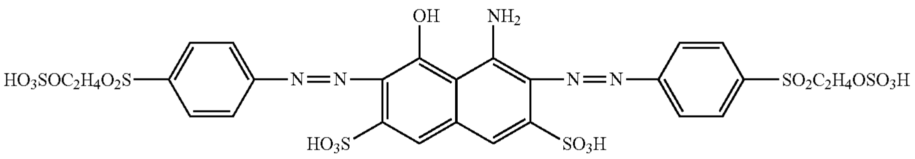

-continued
(II-4)
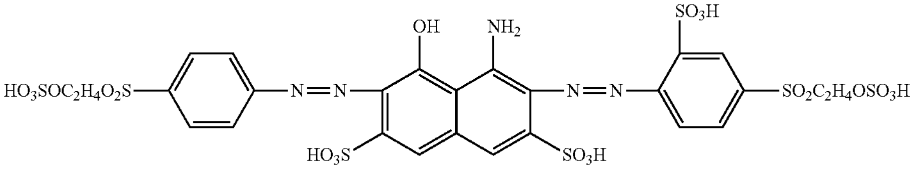
(II-5)
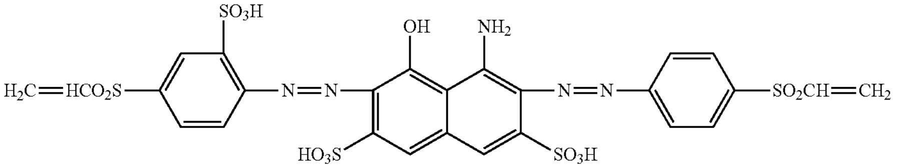
(II-6)
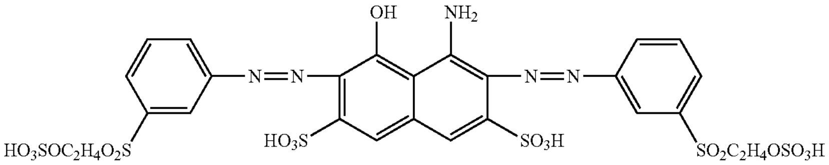
(II-7)
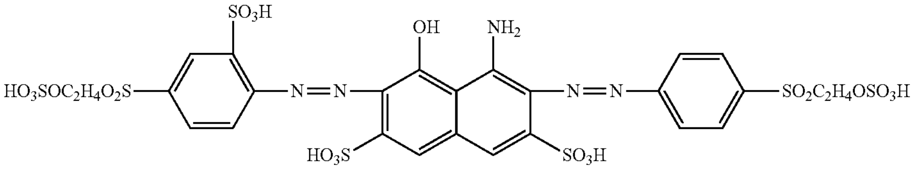
(II-8)
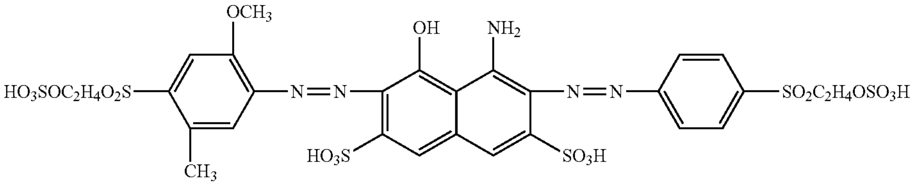
(II-9)
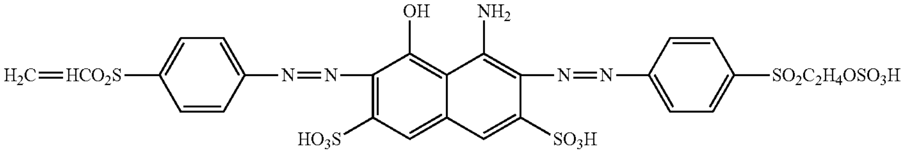
(II-10)
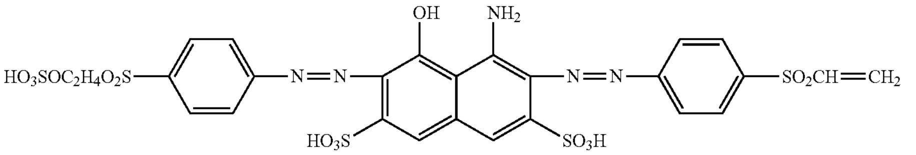
(II-11)
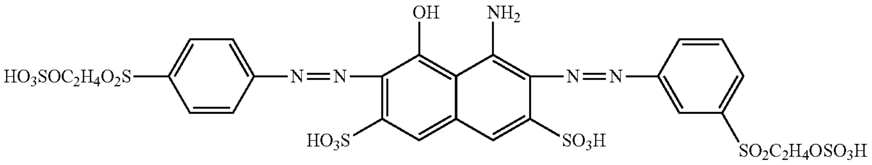
(II-12)
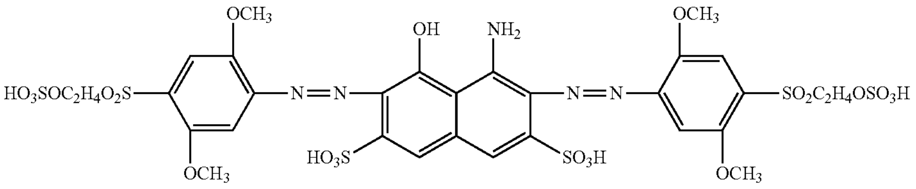

-continued (II-13)

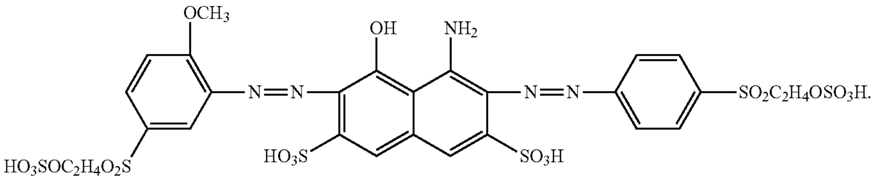

8. The reactive navy to black dye composition as claimed in claim 3, wherein component C is at least one selected from the group consisting of dye compounds of formula (III) and/or formula (IV) and alkali metal salts thereof, wherein both a and b are 0, or one of a and b is 0 while the other is 1, c is 1, and d is 0 or 1.

9. The reactive navy to black dye composition as claimed in claim 3, wherein component C is at least one selected from the group consisting of the following compounds and alkali metal salts thereof:

(III-1)

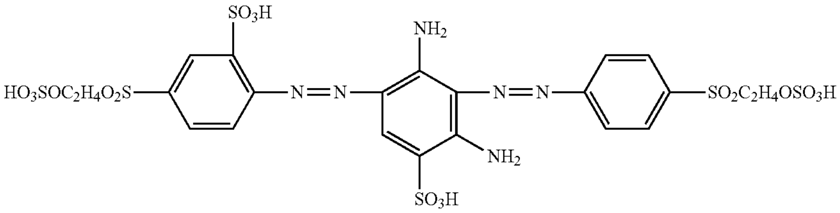

(III-2)

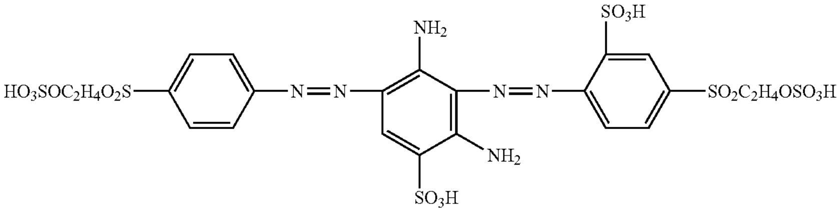

(III-3)

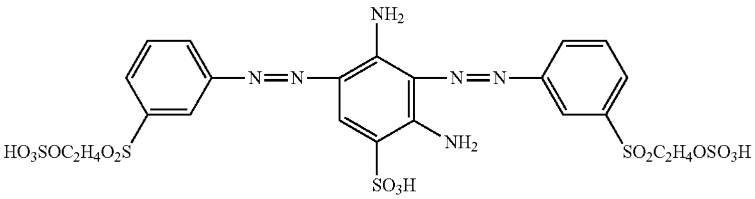

(III-4)

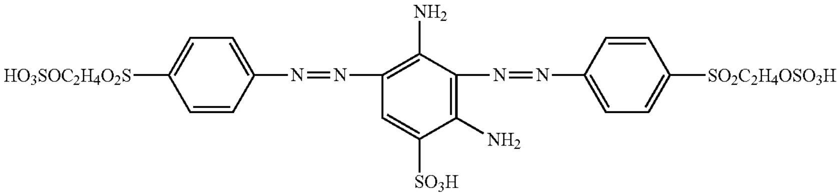

(III-5)

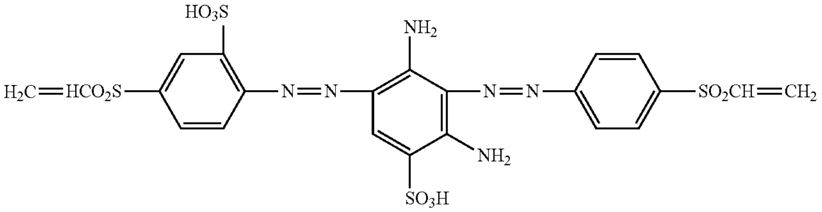

-continued
(III-6)
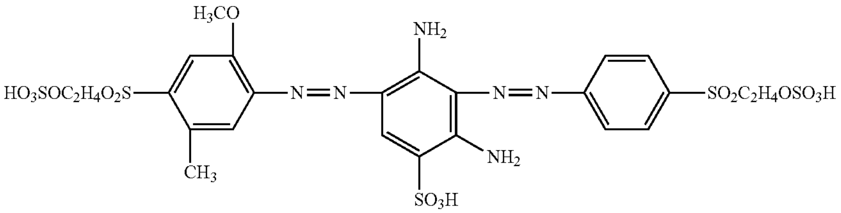
(III-7)
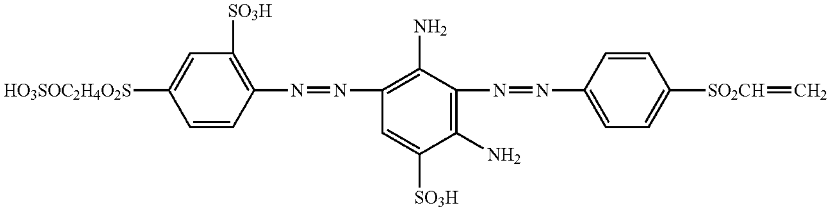
(III-8)
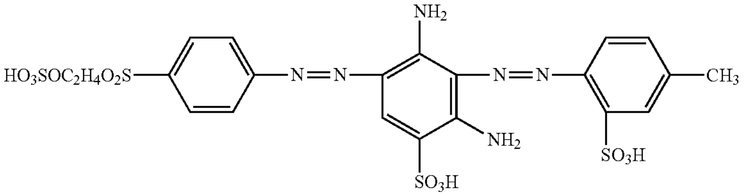
(III-9)
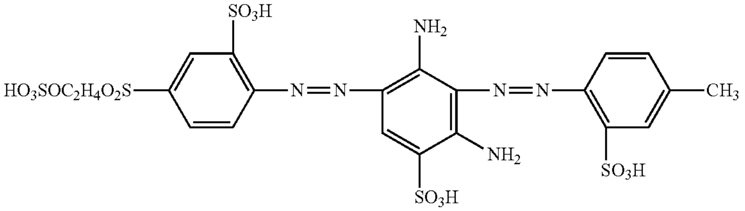
(III-10)
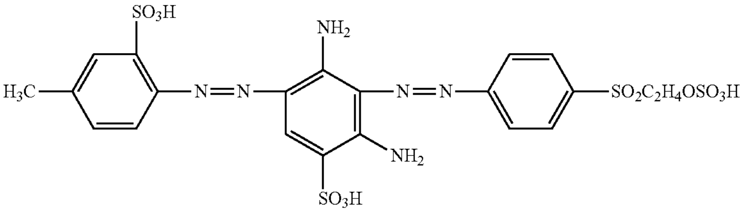
(III-11)
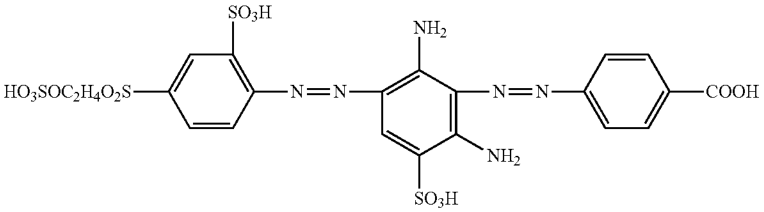
(III-12)
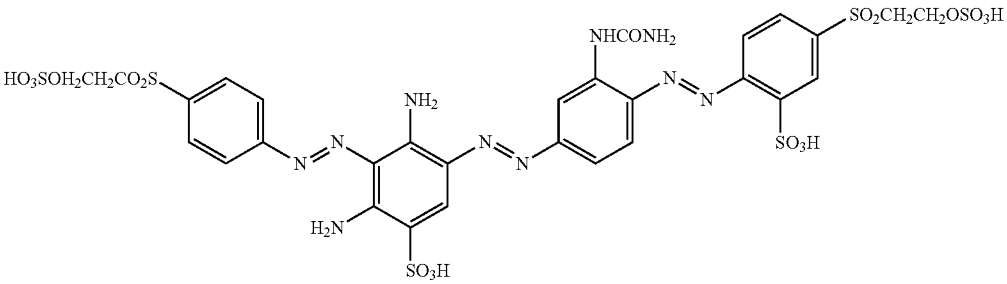

-continued
(III-13)
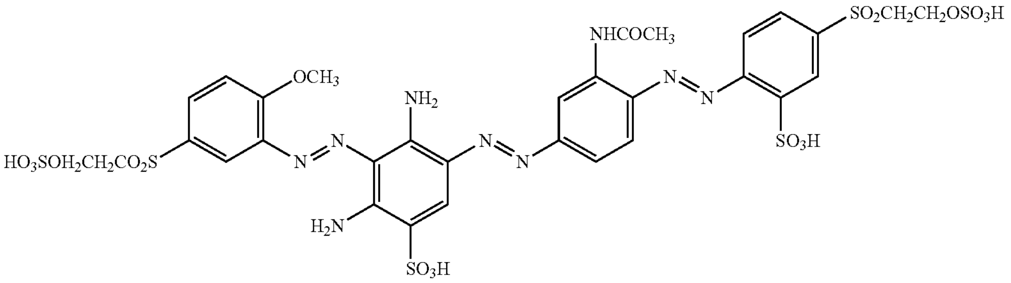
(III-14)
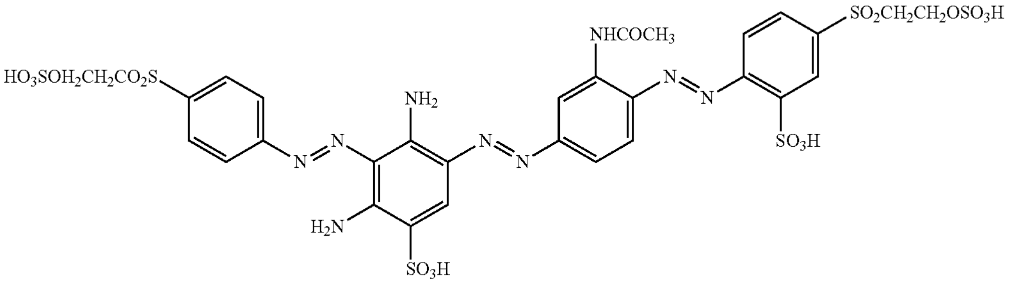
(III-15)
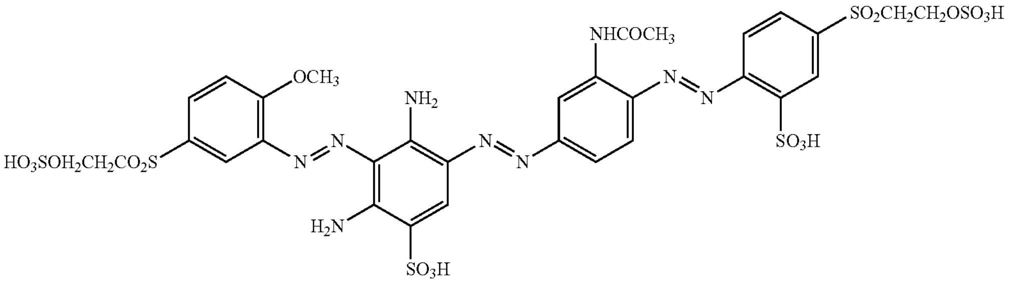
(III-16)
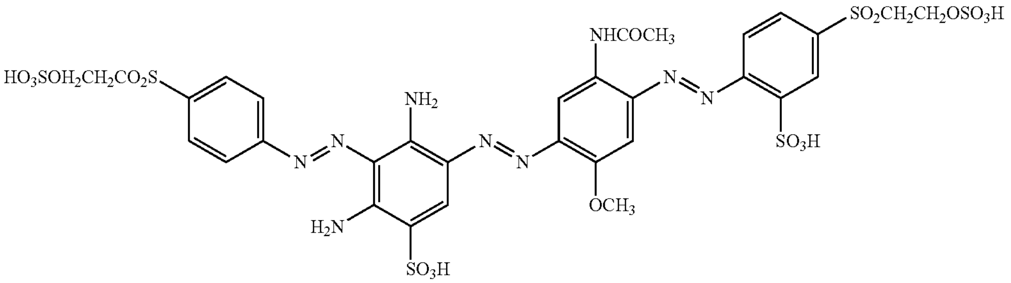
(III-17)
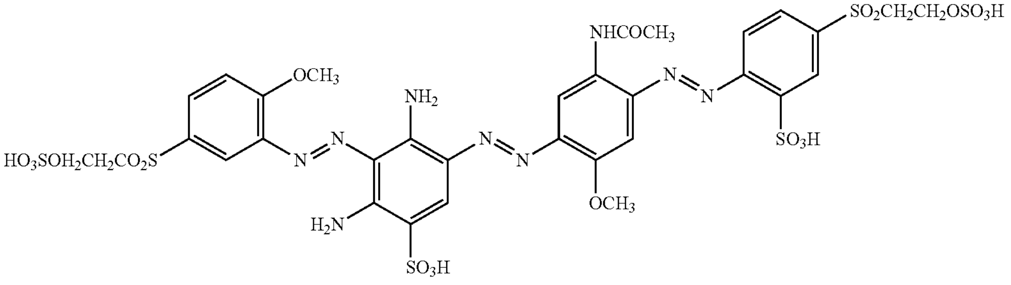

-continued
(III-18)
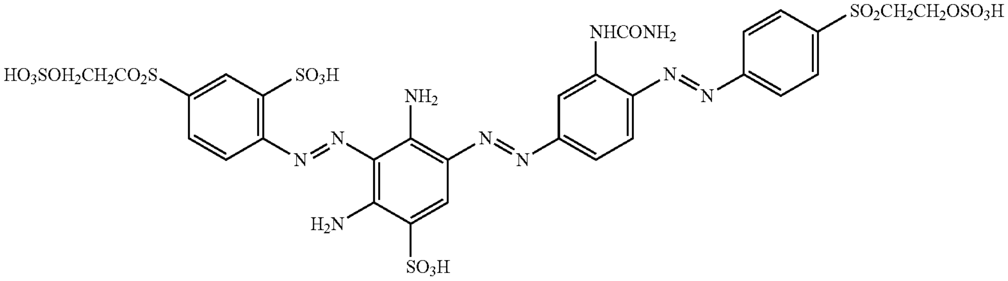
(III-19)
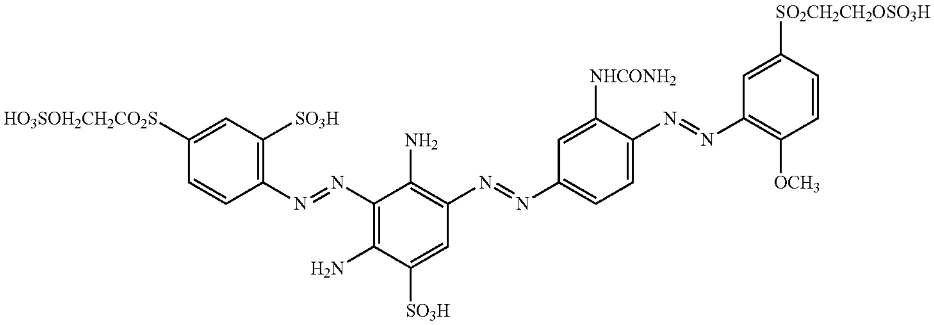
(III-20)
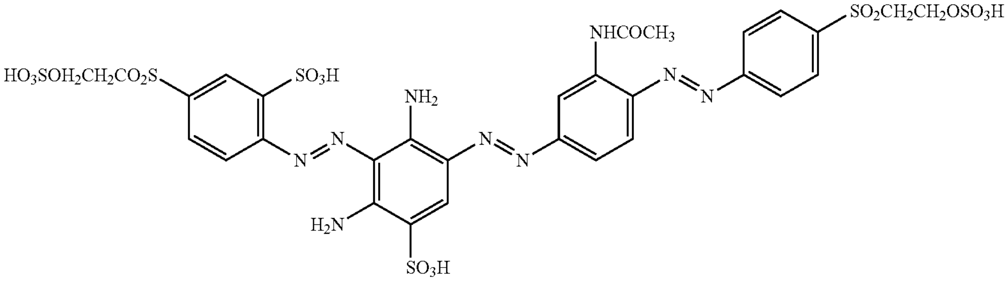
(III-21)
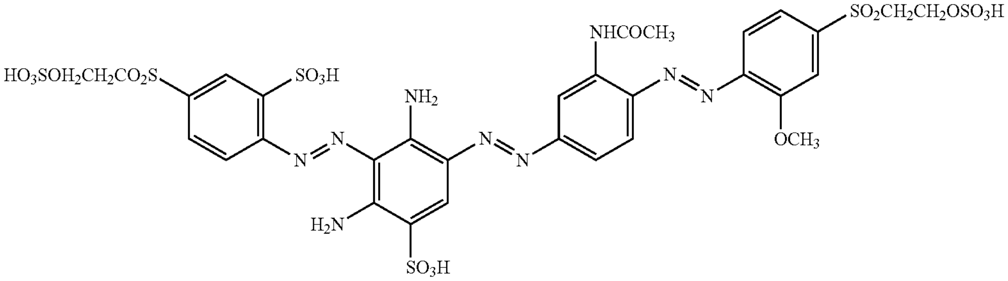
(III-22)
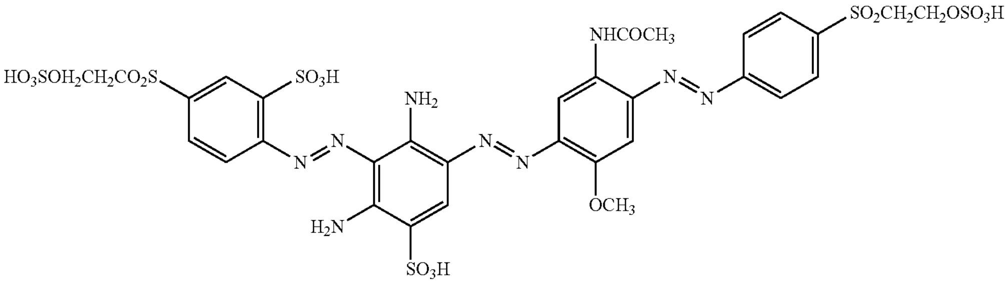

-continued
(III-23)
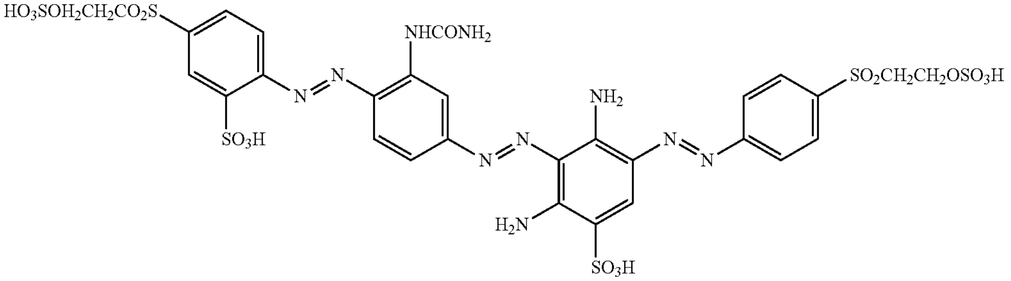
(III-24)
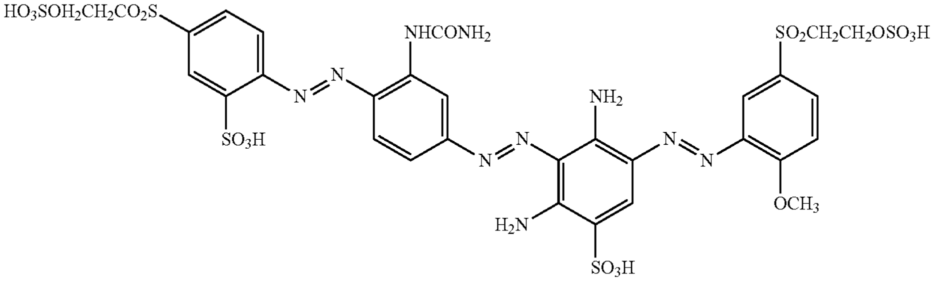
(III-25)
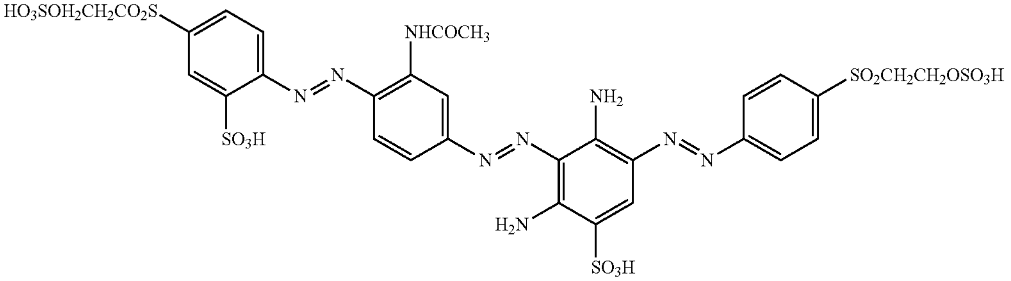
(III-26)
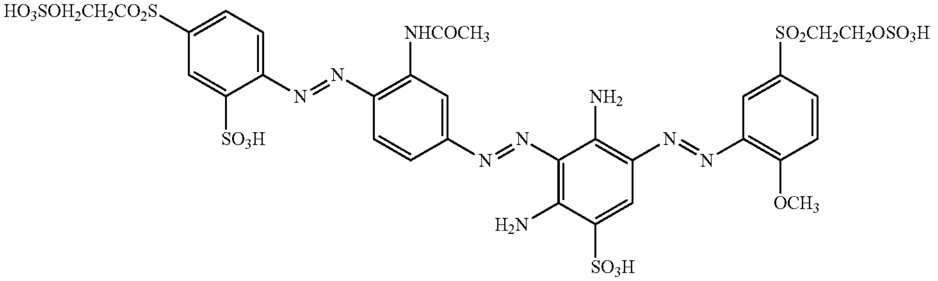
(III-27)
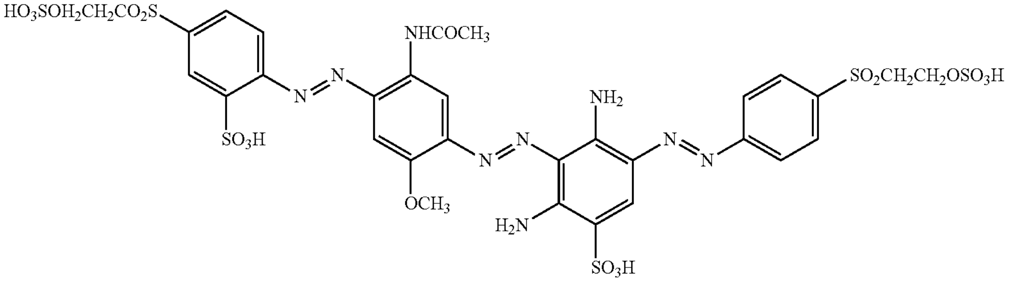

-continued
(III-28)
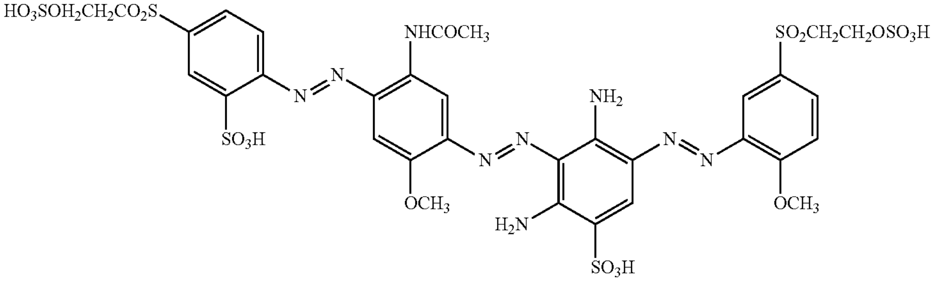
(III-29)
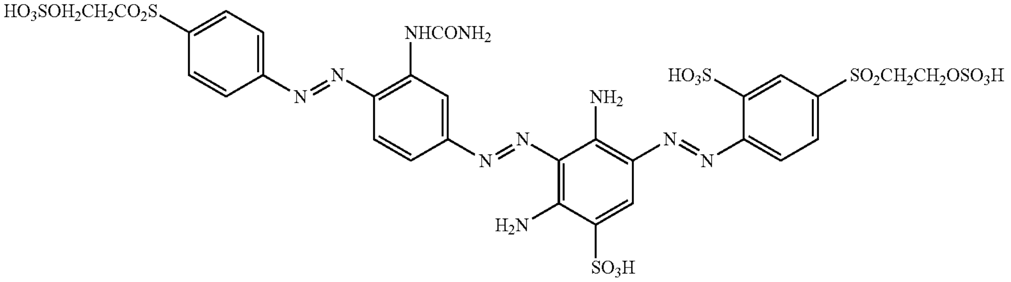
(III-30)
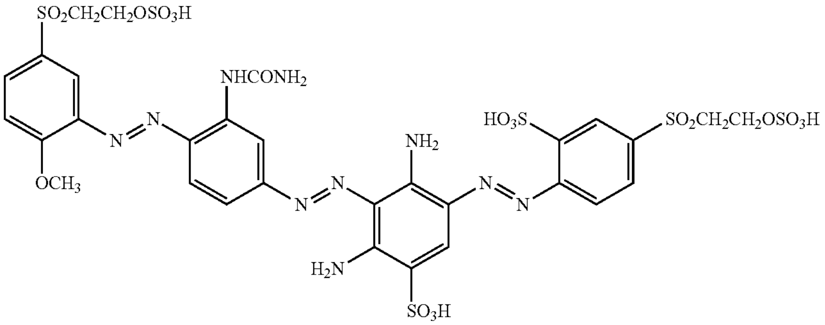
(III-31)
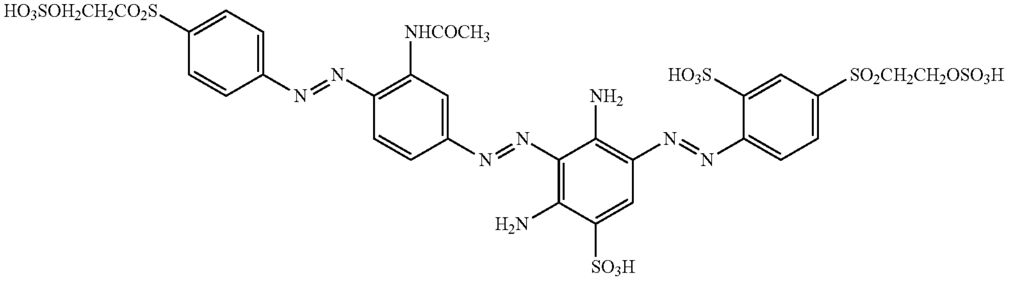
(III-32)
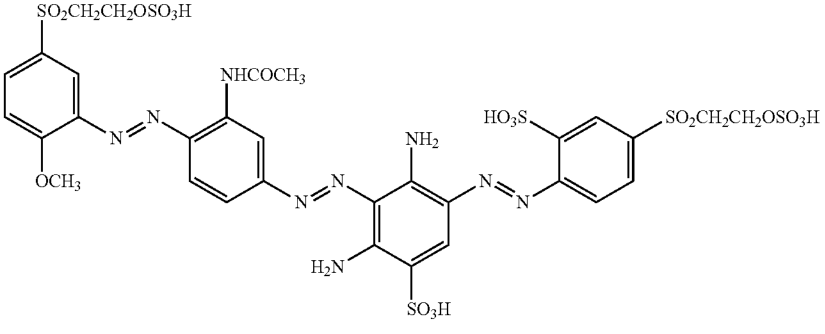

-continued
(III-33)
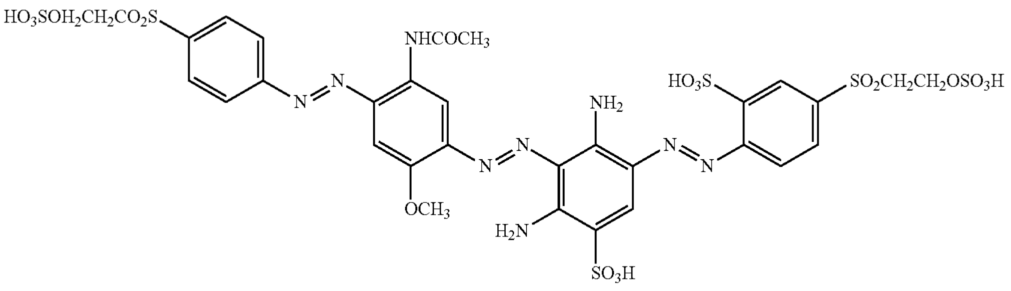
(III-34)
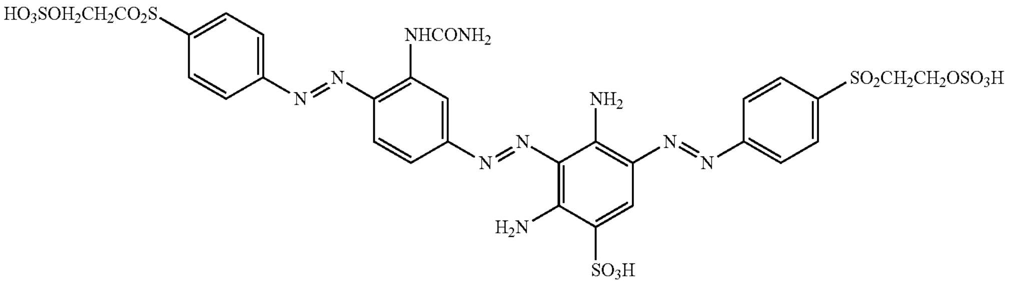
(III-35)
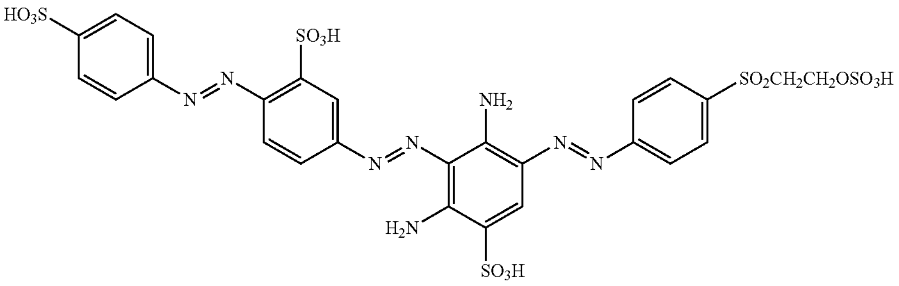
(III-36)
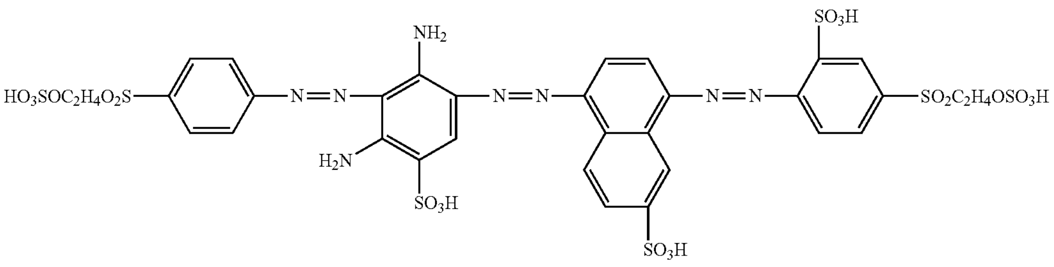
(III-37)
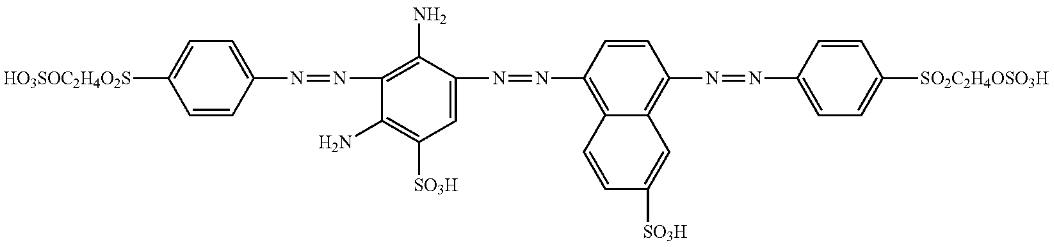

-continued
(III-38)
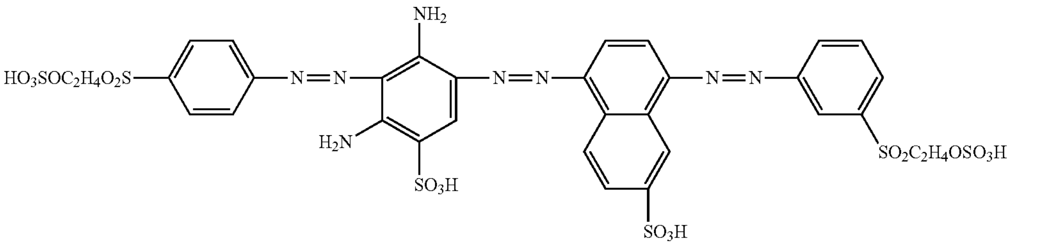
(III-39)
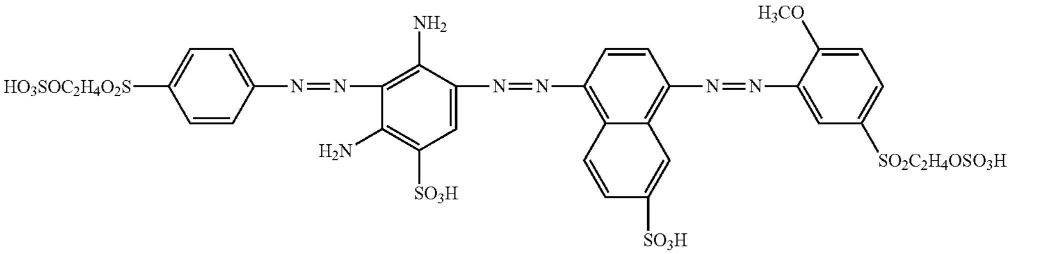
(III-40)
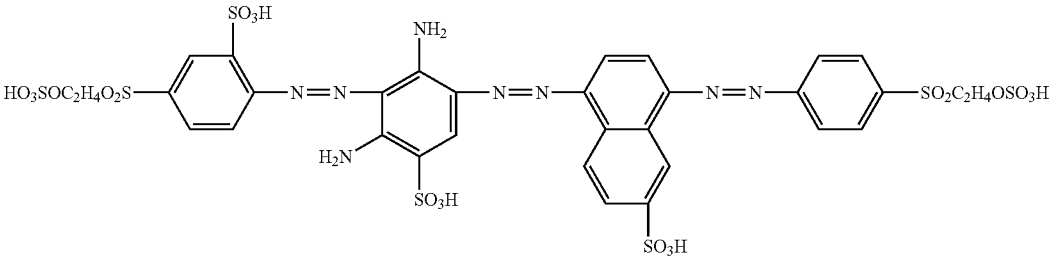
(III-41)
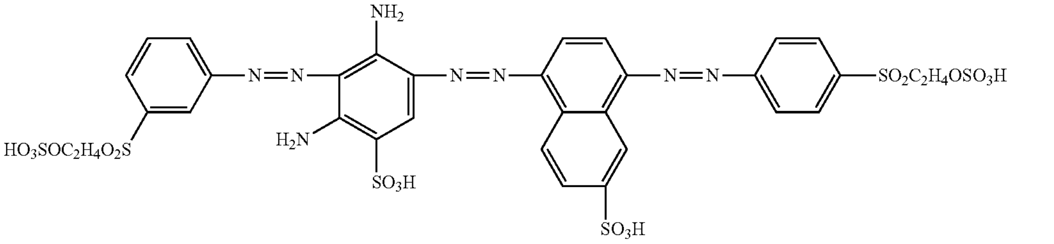
(III-42)
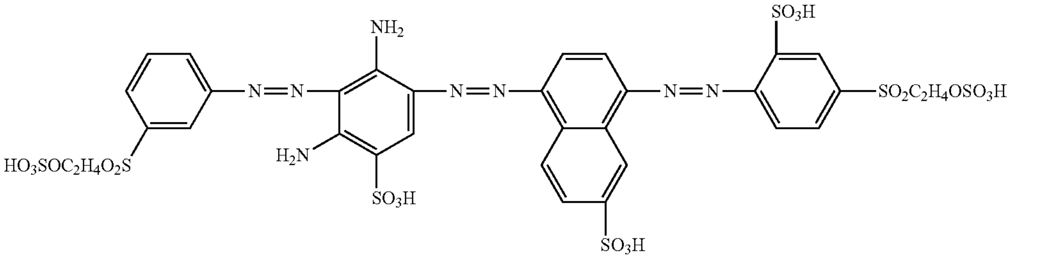
(III-43)
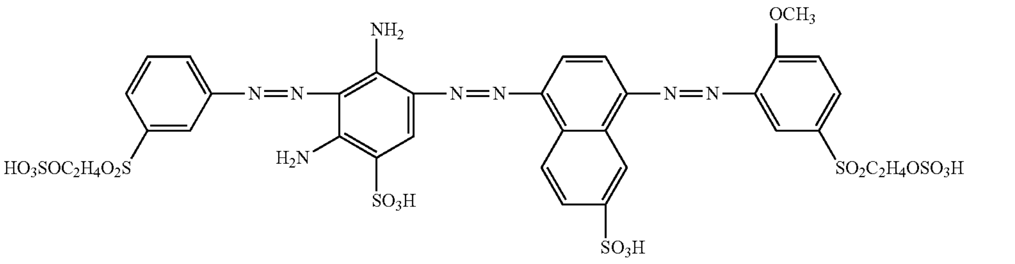

-continued
(III-44)
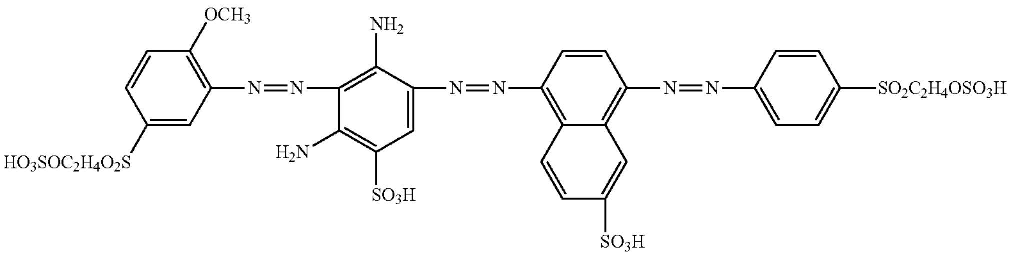
(III-45)
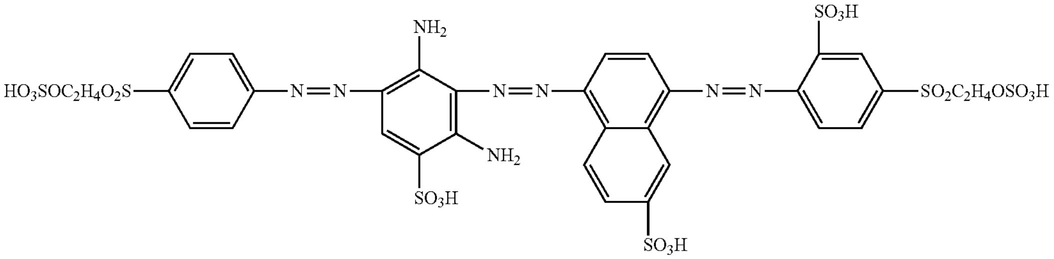
(III-46)
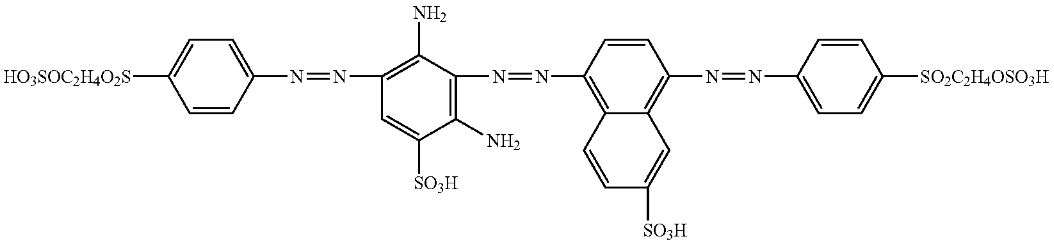
(III-47)
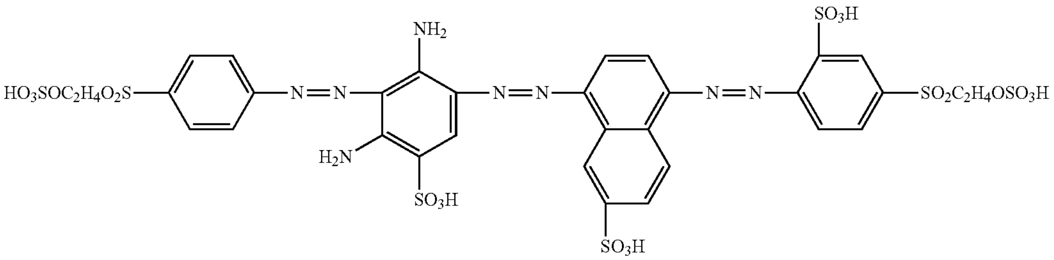
(III-48)
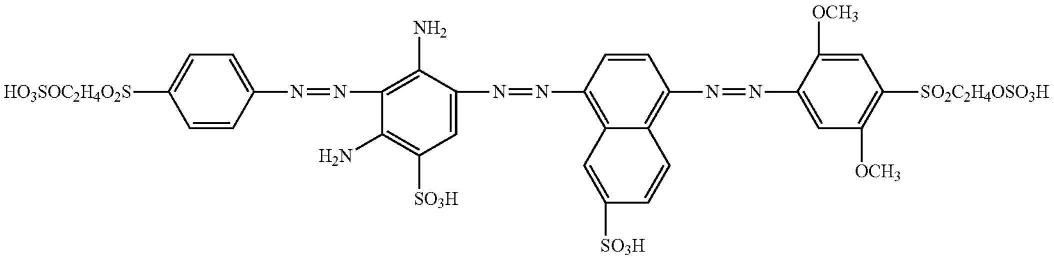
(III-49)
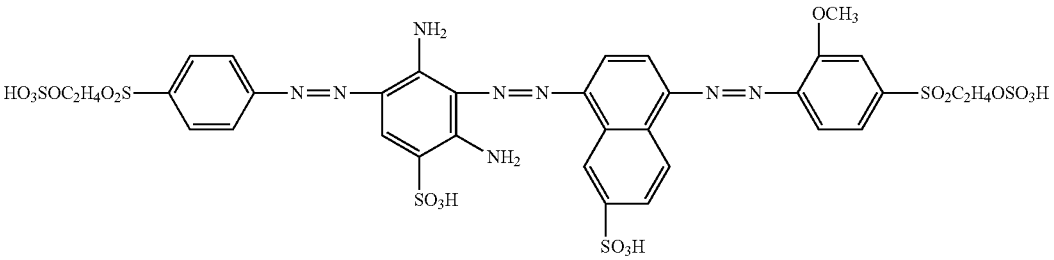

-continued
(III-50)
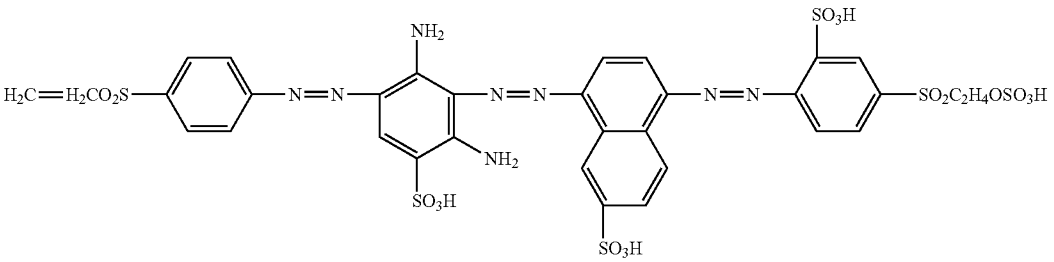
(III-51)
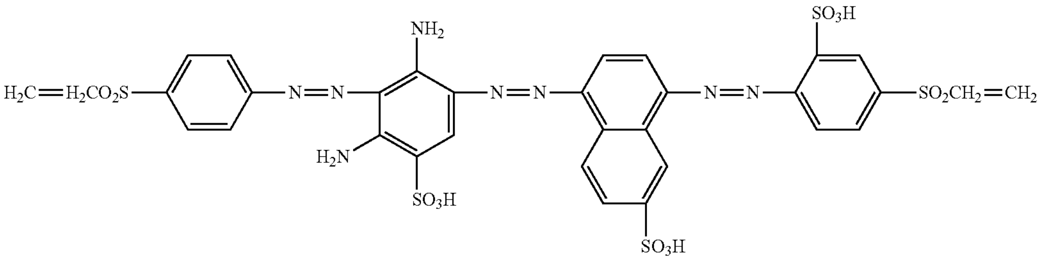
(III-52)
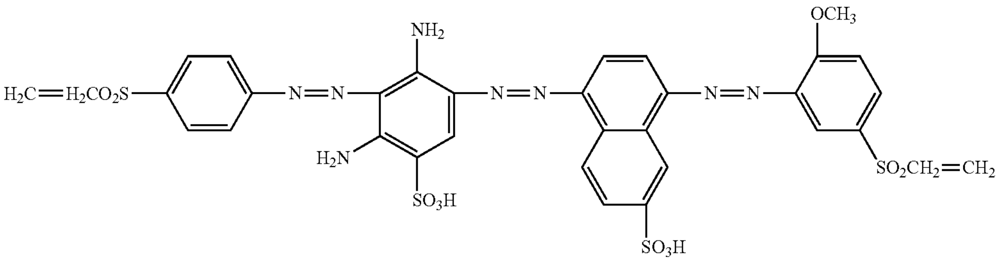
(IV-1)
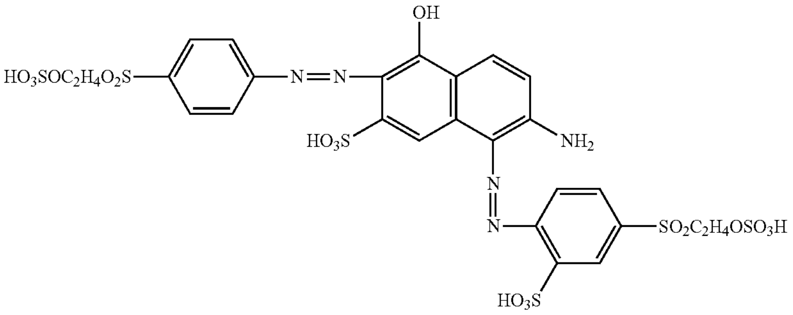
(IV-2)
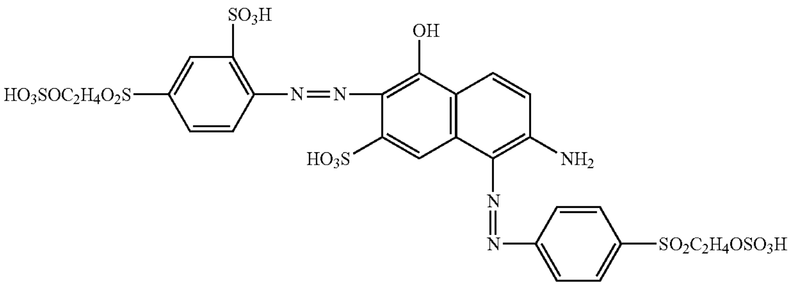

-continued
(IV-3)
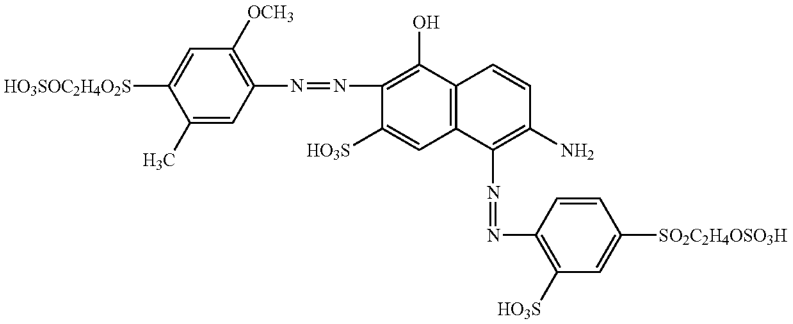
(IV-4)
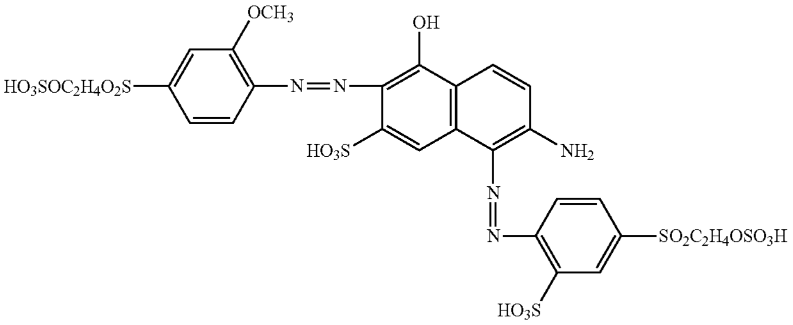
(IV-5)
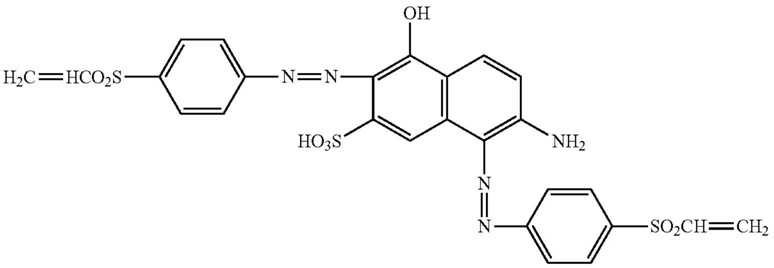
(IV-6)
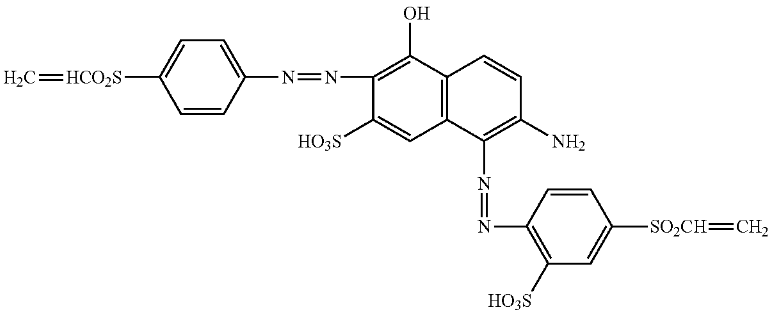
(IV-7)
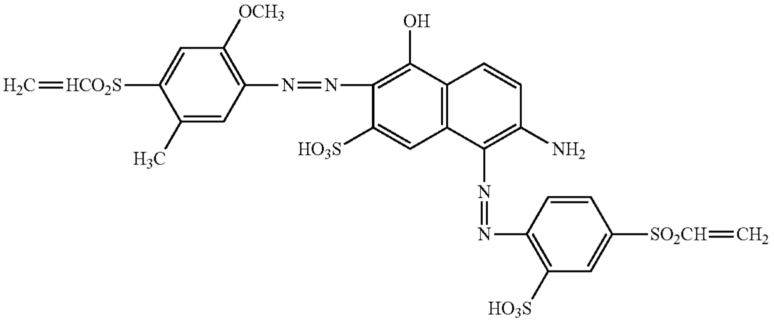

-continued
(IV-8)
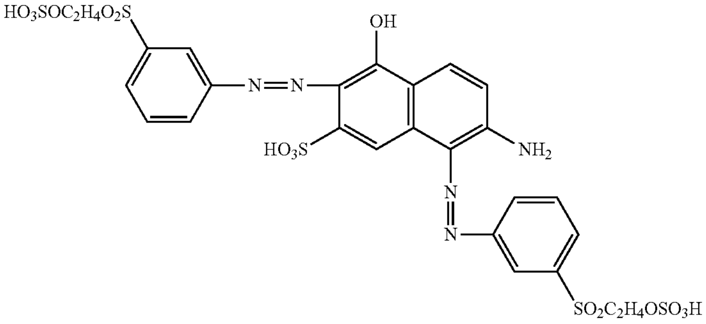
(IV-9)
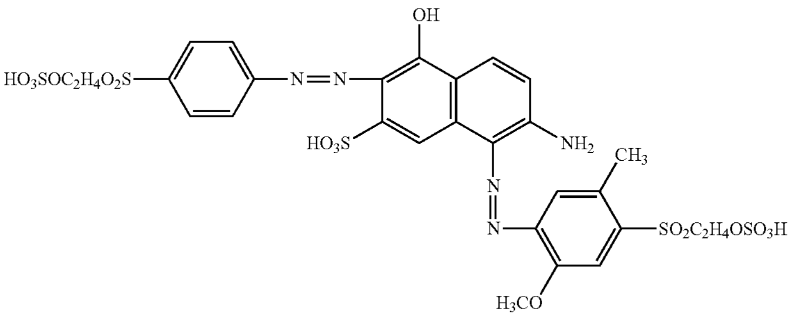
(IV-10)
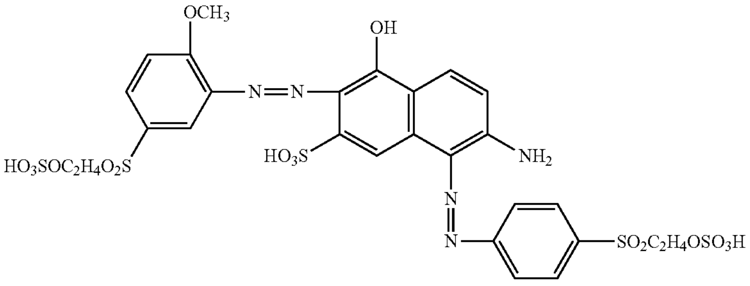
(IV-11)
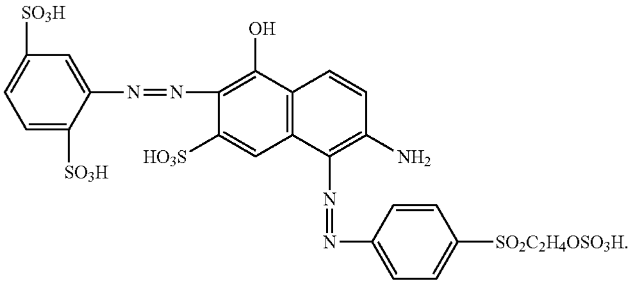

10. The reactive navy to black dye composition as claimed in claim 3, wherein component D is at least one selected from the group consisting of the following compounds and alkali metal salts thereof:
(V-1)
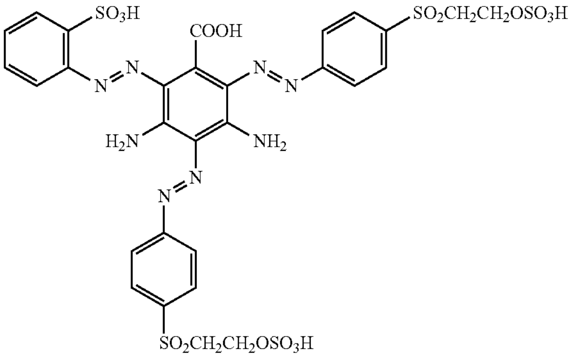
(V-2)
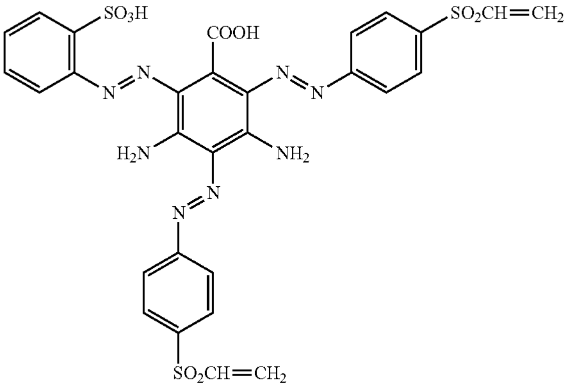
(V-3)
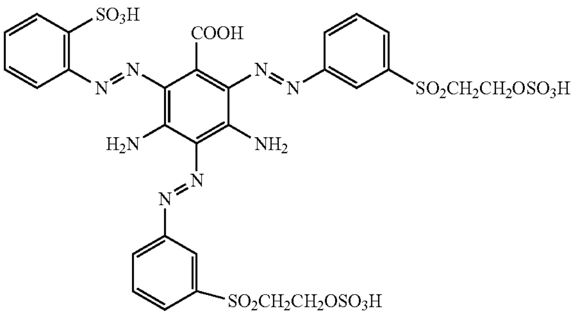
(V-4)
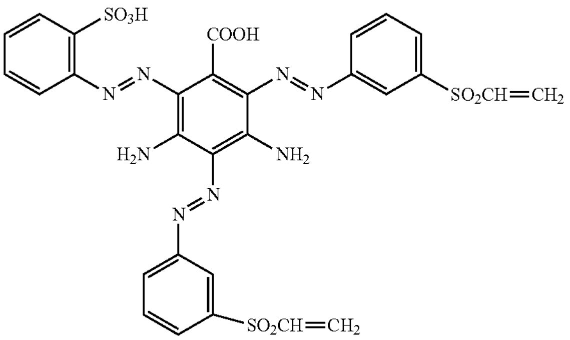
(V-5)
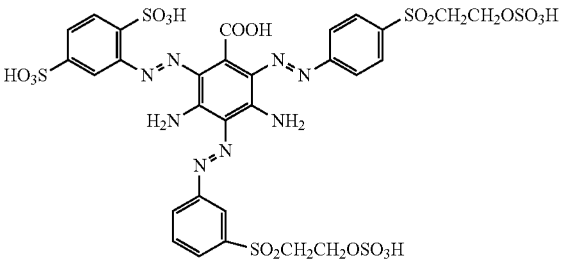
(V-6)
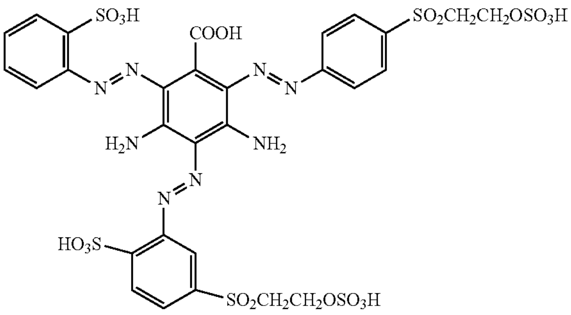
(V-7)
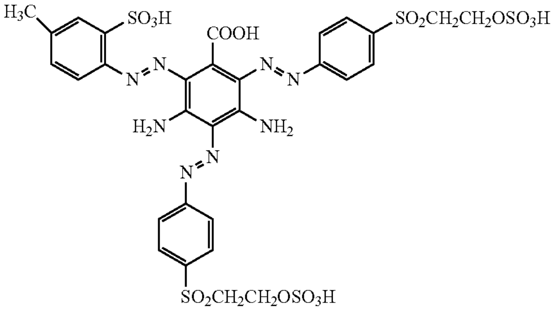
(V-8)
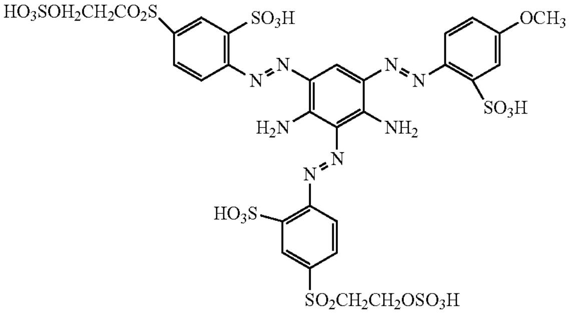

-continued
(VI-1)
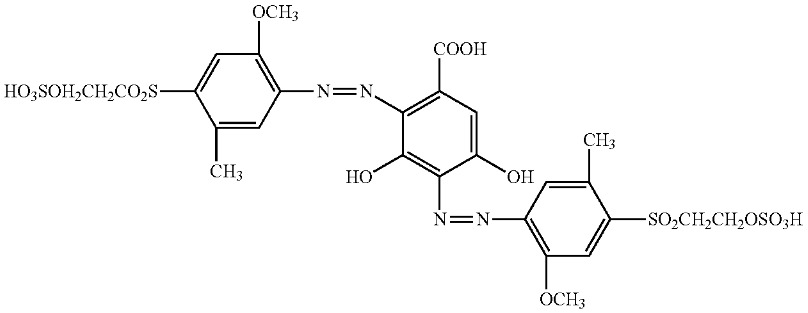
(VI-2)
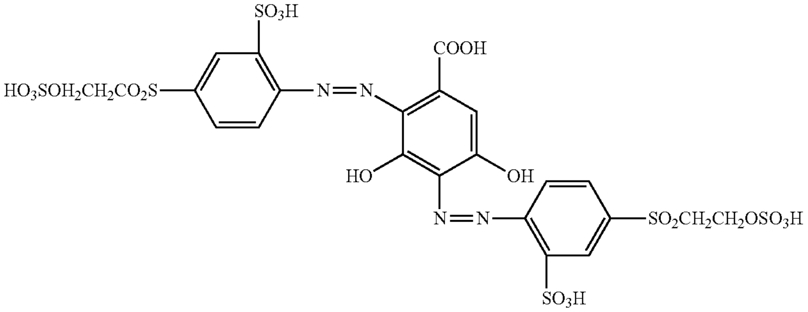
(VI-3)
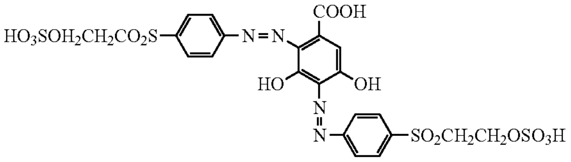
(VI-4)
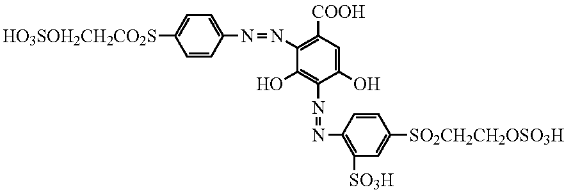
(VI-5)
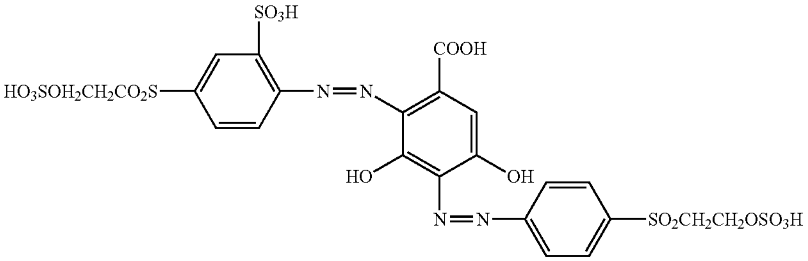
(VI-6)
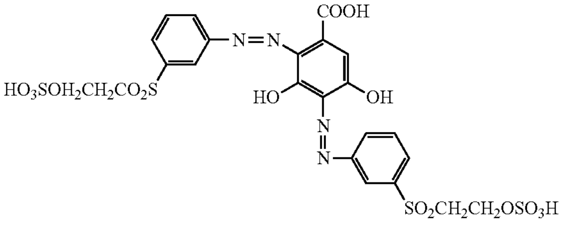
(VI-7)
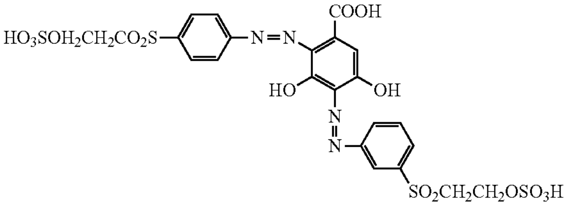

-continued
(VI-8)
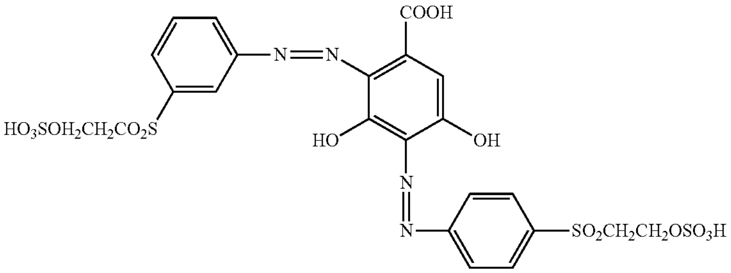
(VI-9)
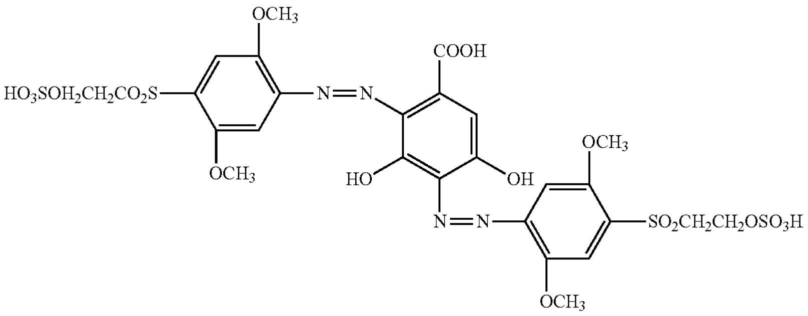
(VI-10)
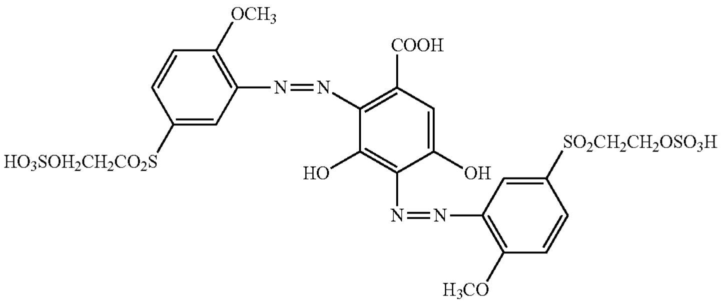
(VI-11)
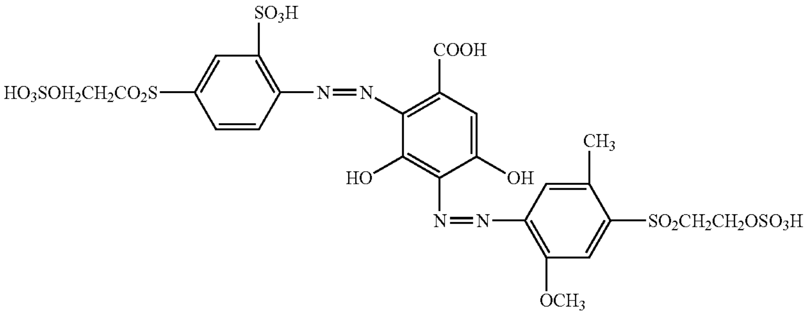
(VI-12)
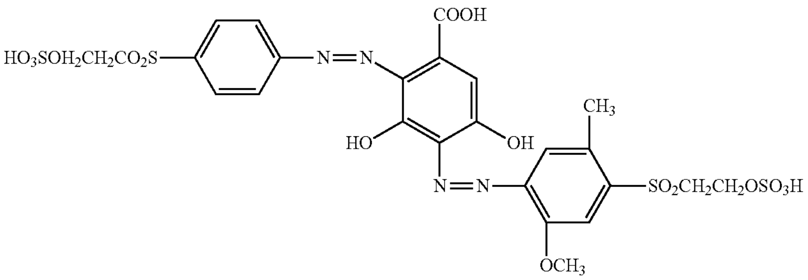

-continued
(VI-13)
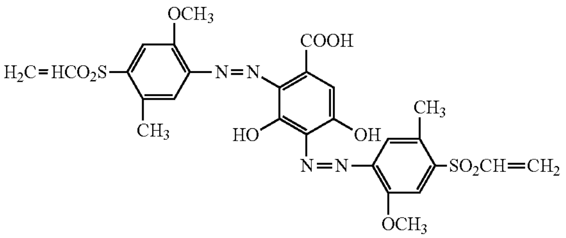
(VI-14)
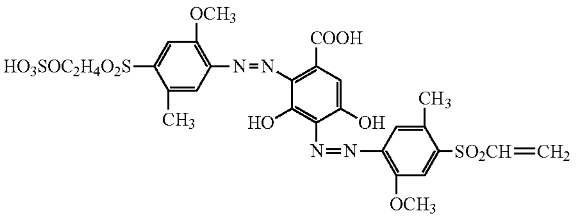
(VI-15)
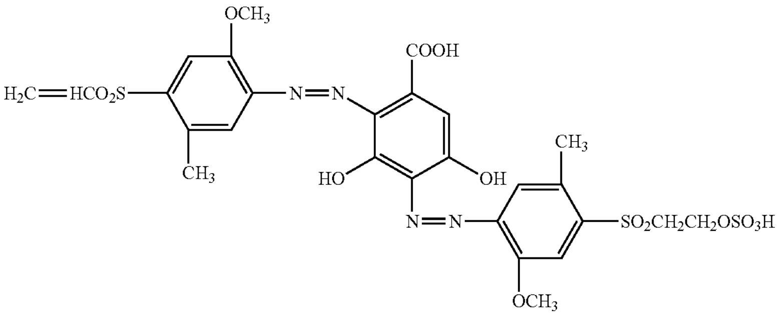
(VI-16)
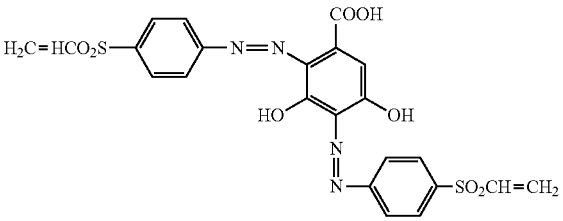
(VI-17)
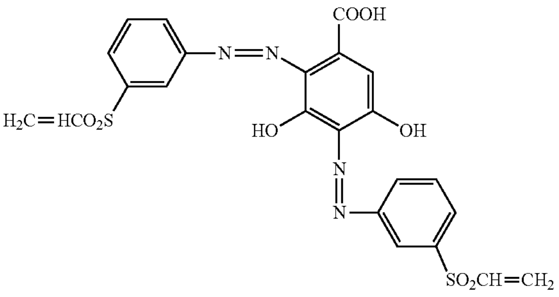
(VI-18)
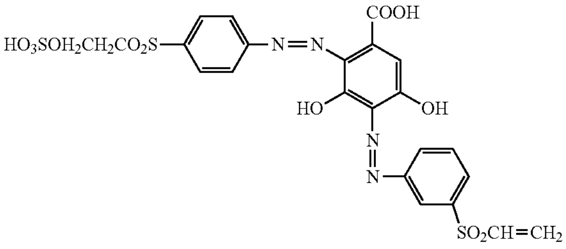
(VI-19)
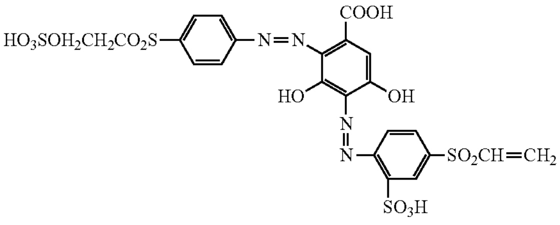
(VI-20)
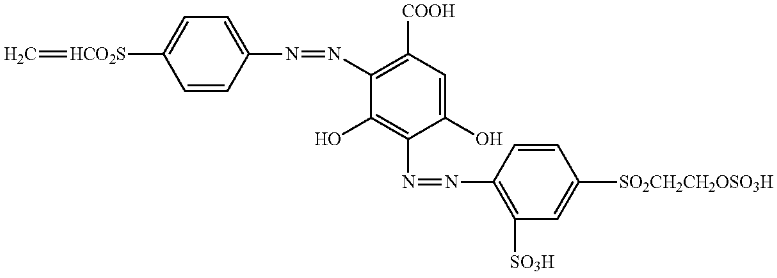

-continued
(VI-21)
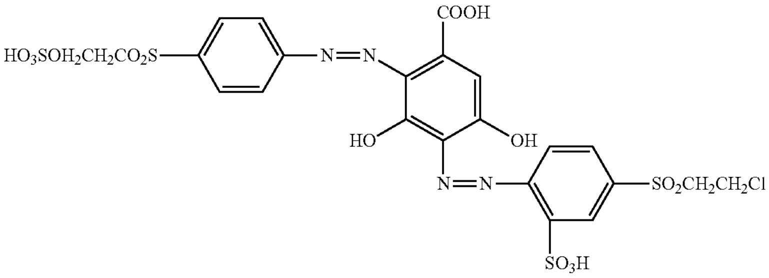
(VI-22)
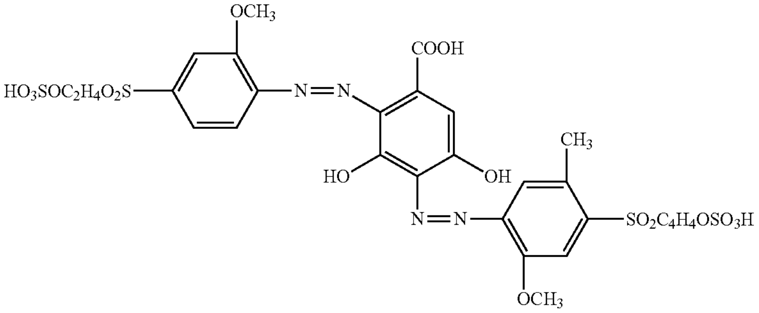
(VI-23)
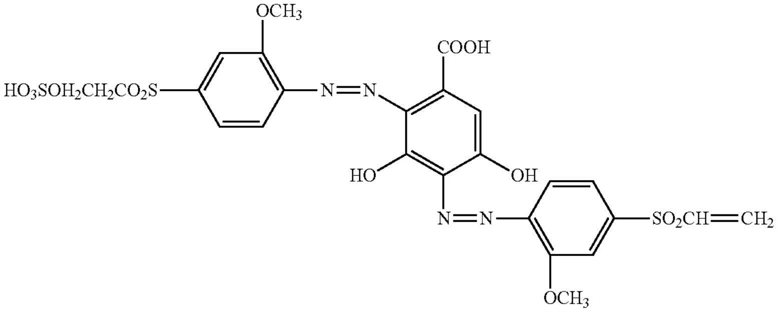
(VI-24)
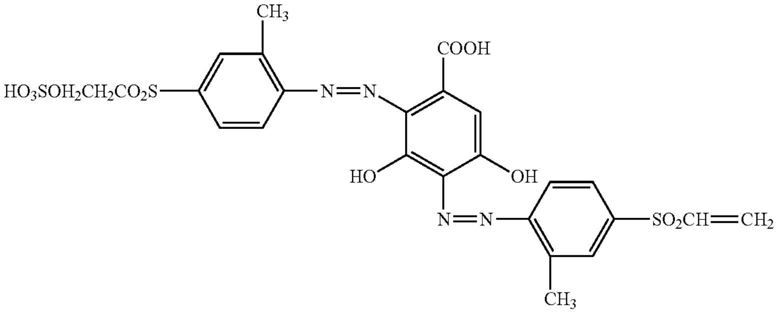
(VI-25)
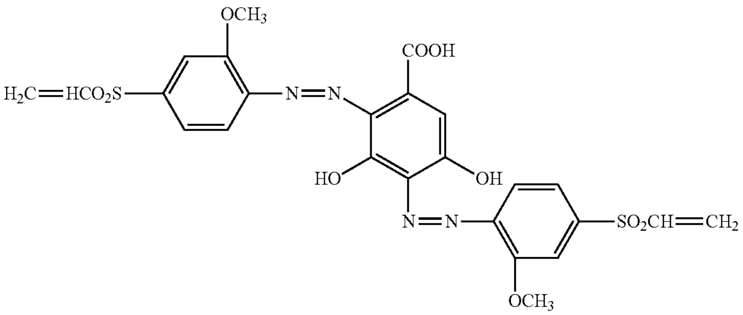

-continued
(VI-26)
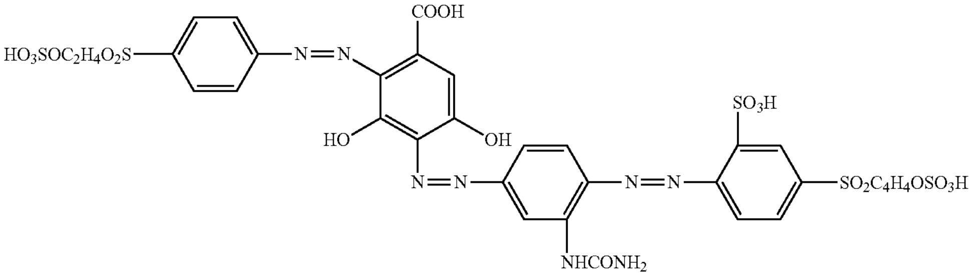
(VI-27)
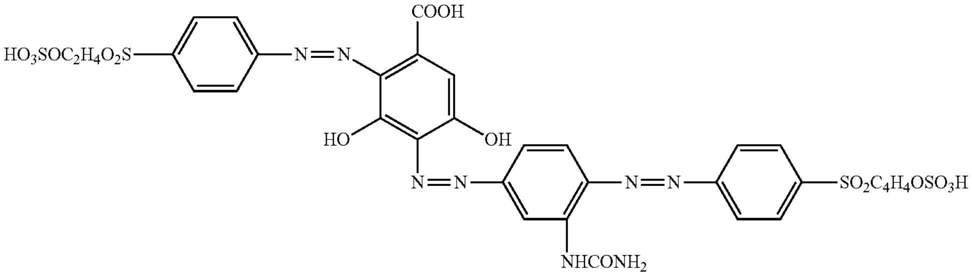
(VI-28)
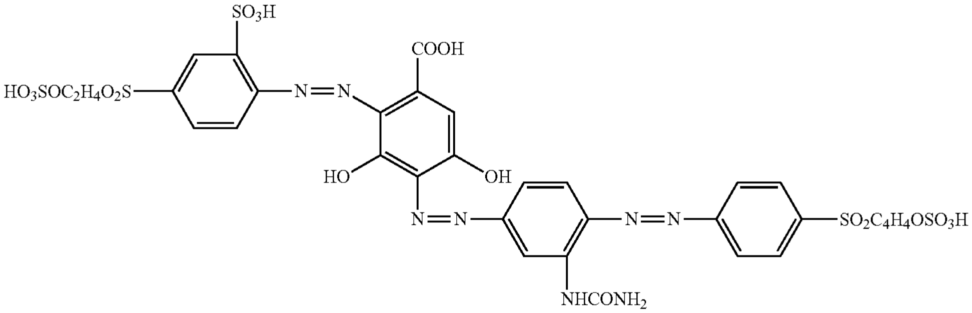
(VI-29)
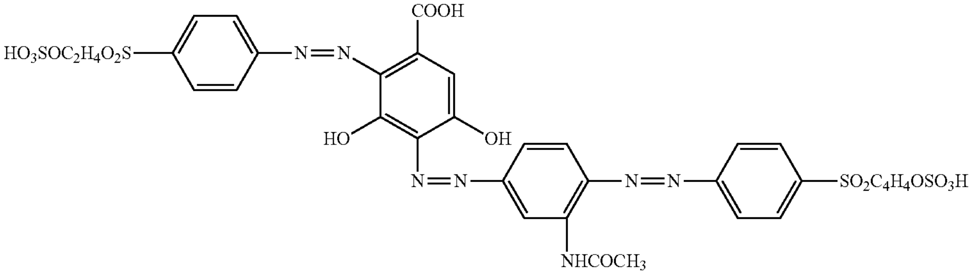
(VI-30)
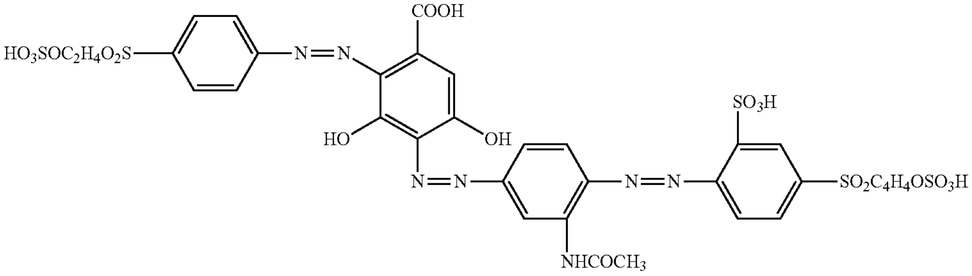

-continued
(VI-31)
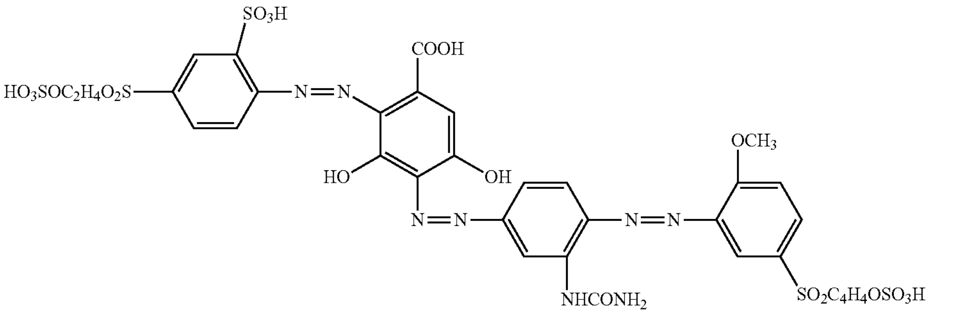
(VI-32)
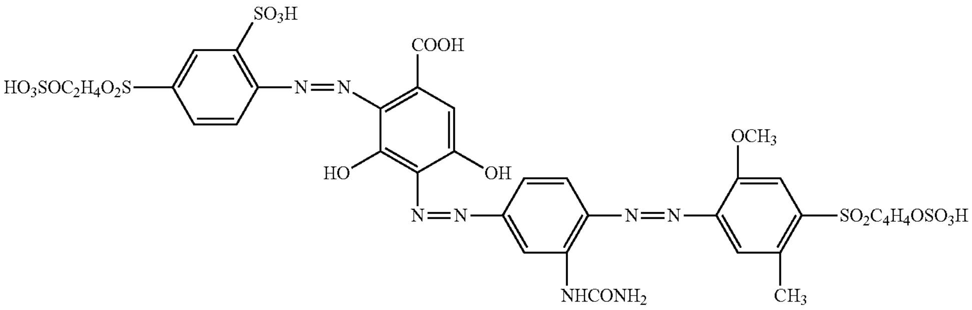
(VI-33)
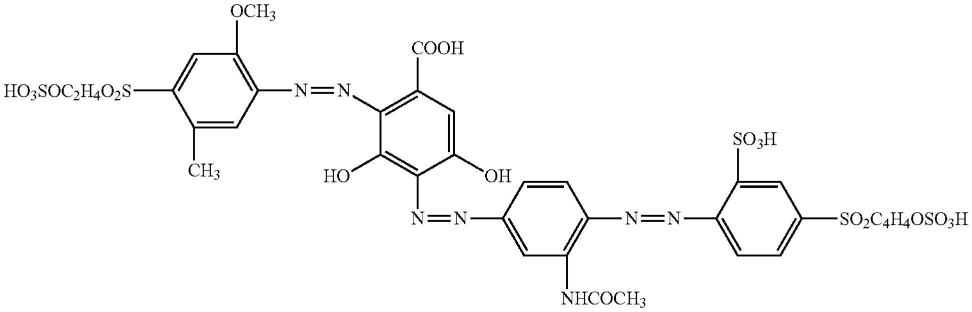
(VI-34)
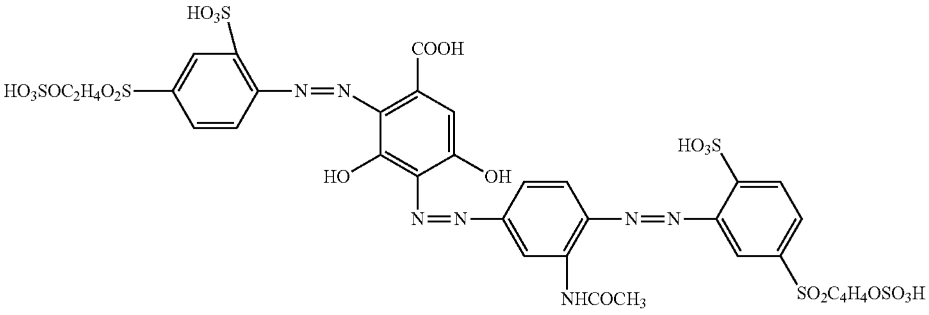
(VI-35)
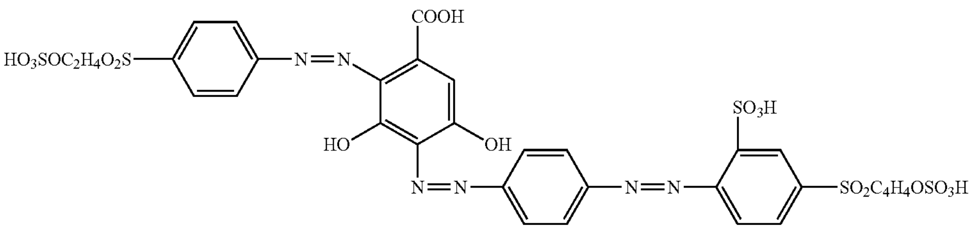

-continued
(VI-36)
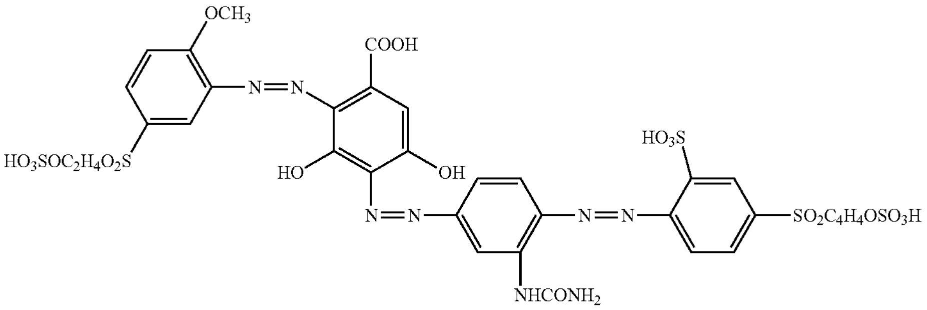
(VI-37)
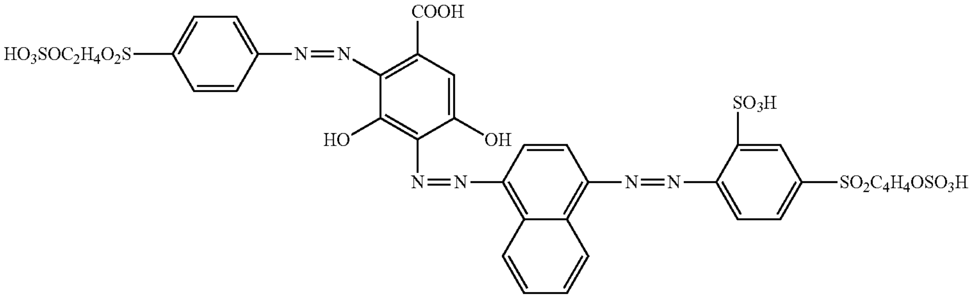
(VI-38)
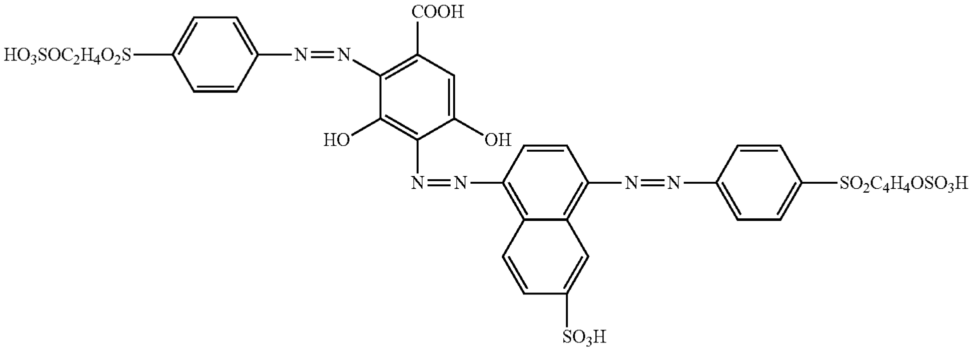
(VI-39)
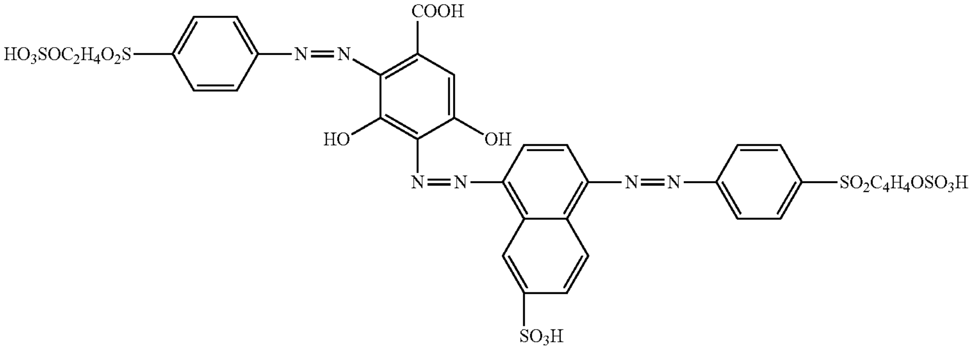
(VI-40)
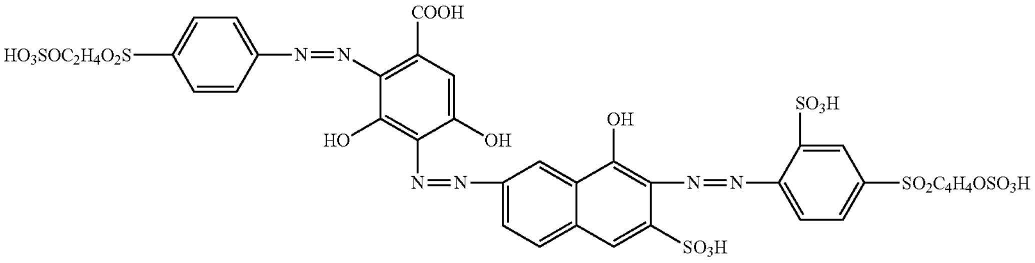

-continued
(VI-41)
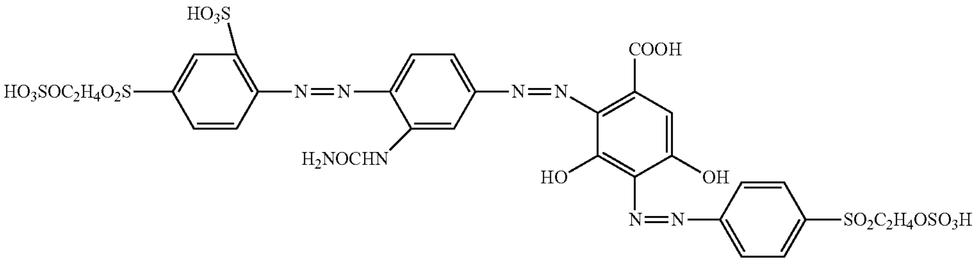
(VI-42)
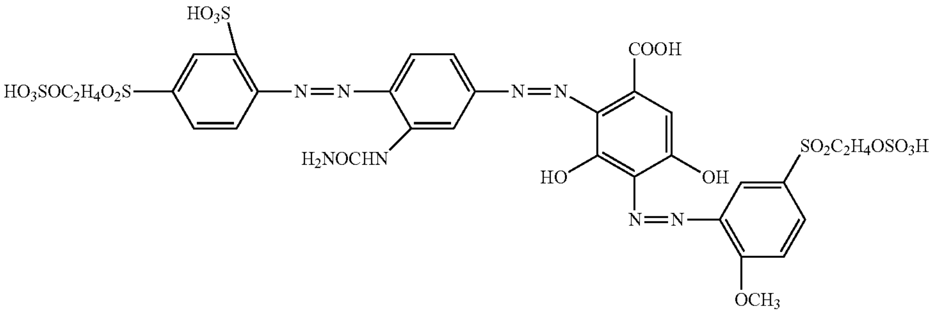
(VI-43)
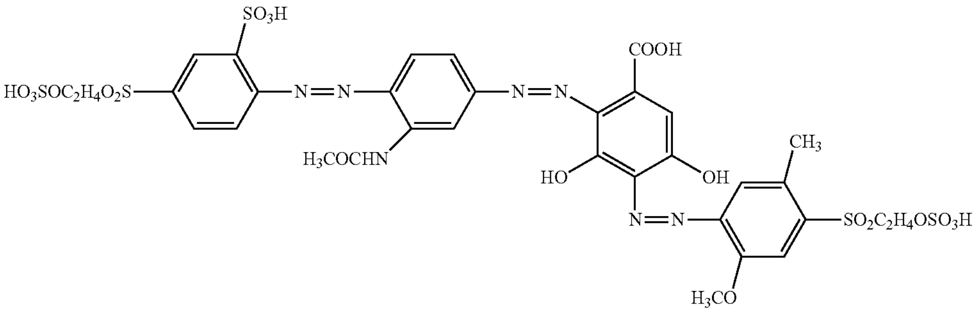
(VI-44)
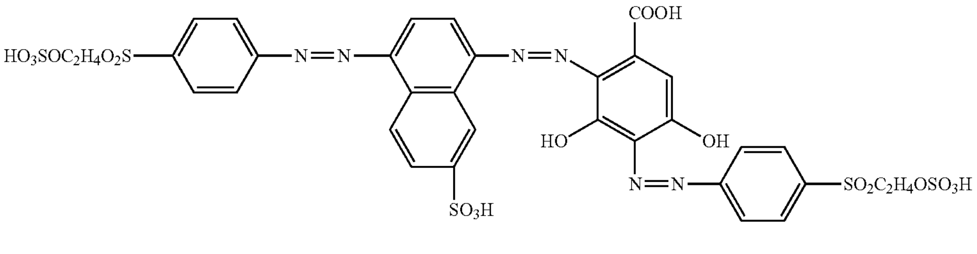
(VI-45)
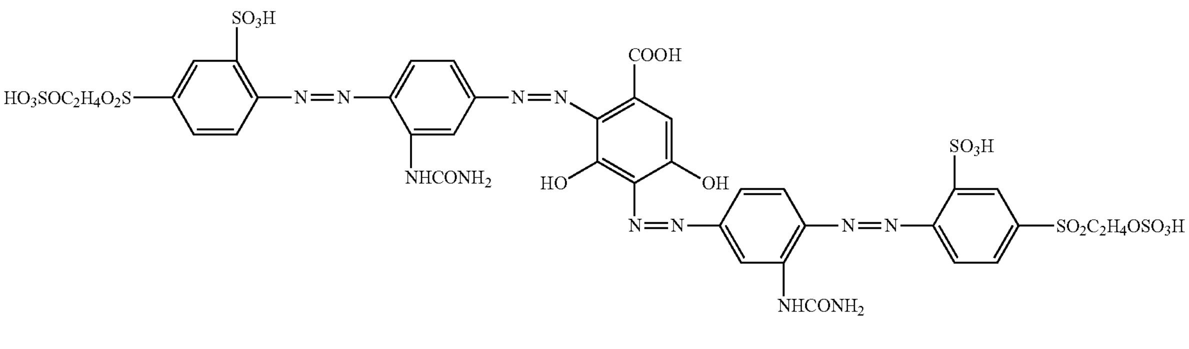

-continued
(VI-46)
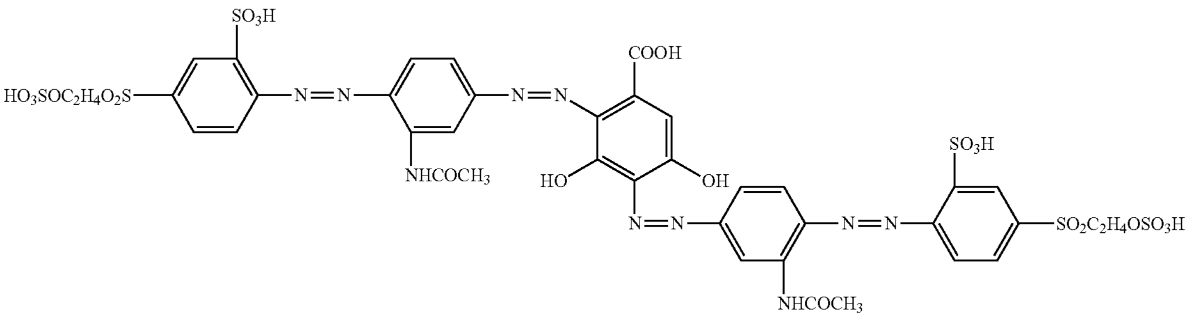
(VI-47)
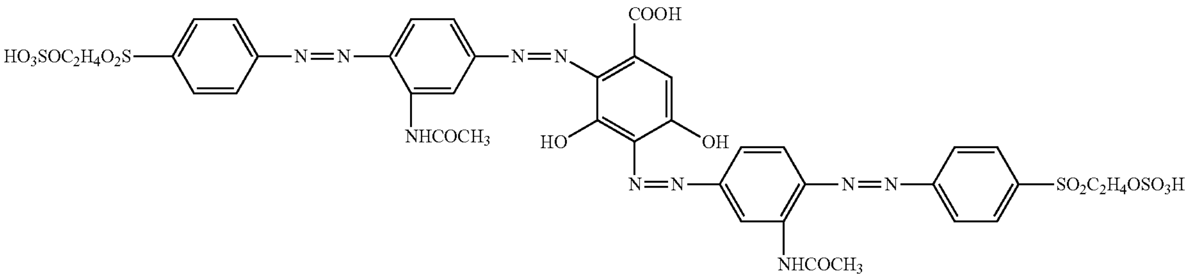
(VI-48)
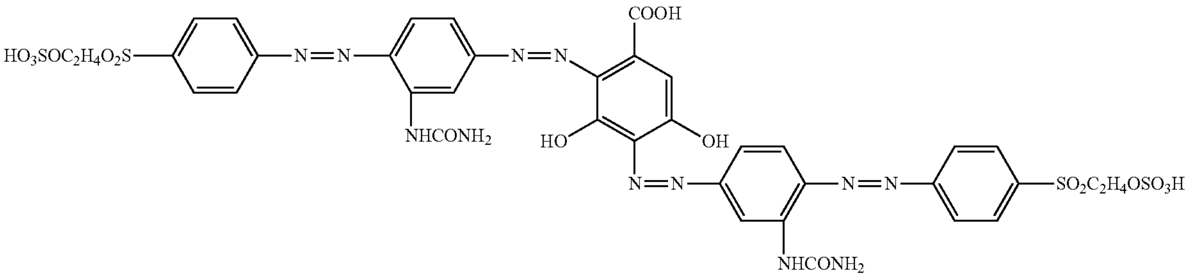
(VI-49)
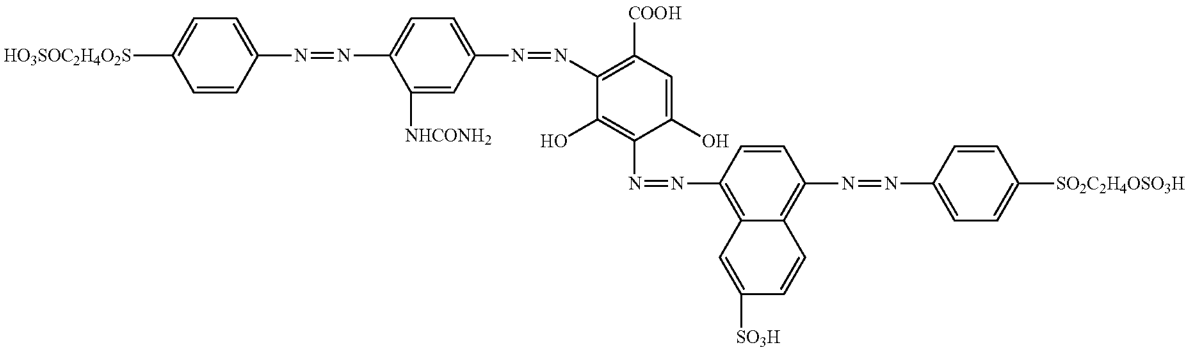
(VI-50)
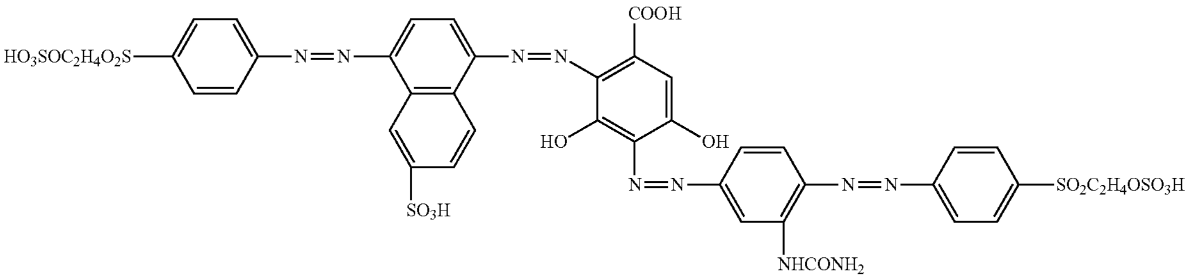

-continued
(VI-51)
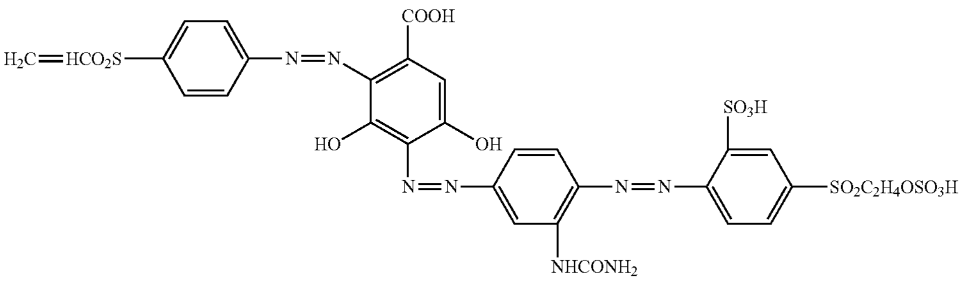
(VI-52)
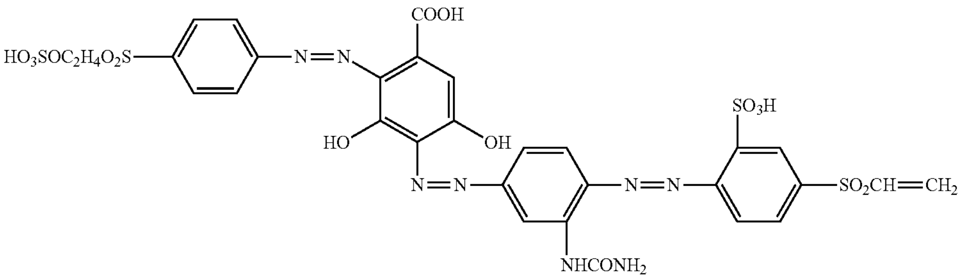
(VI-53)
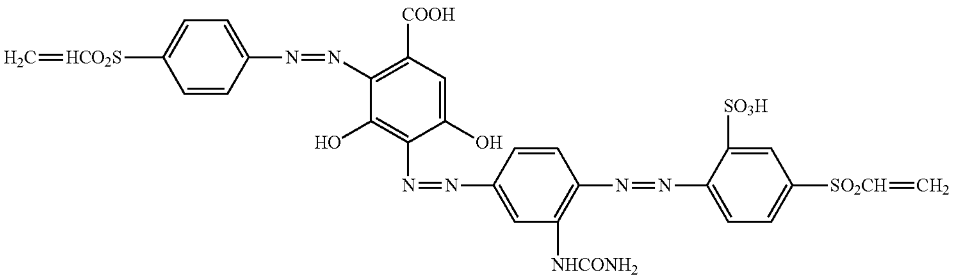
(VI-54)
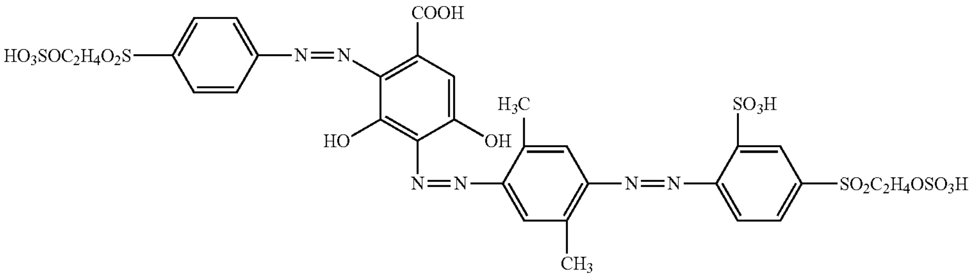
(VI-55)
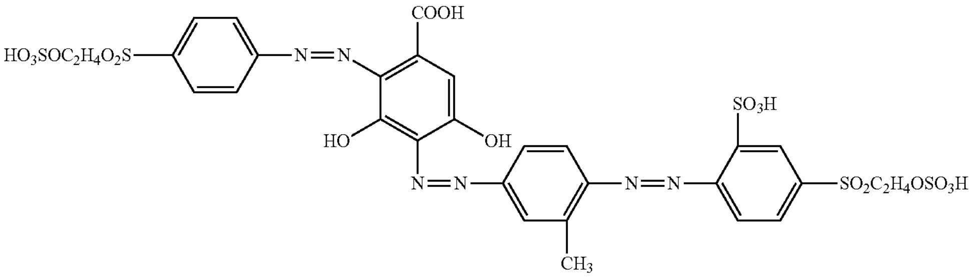

-continued (VII-1)

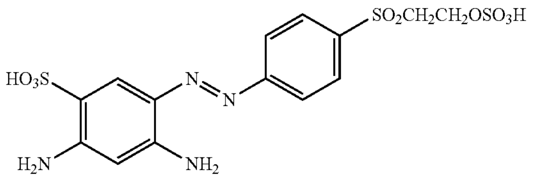

(VII-2)

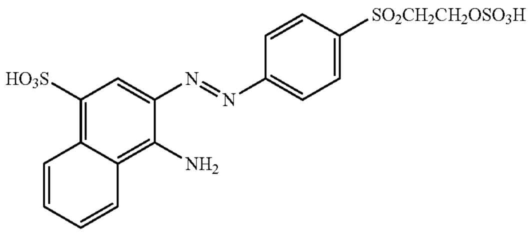

(VII-3)

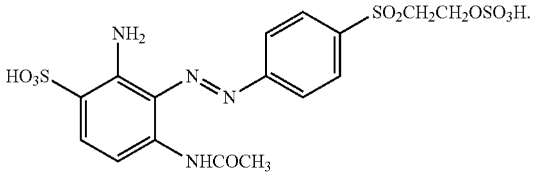

11. The reactive navy to black dye composition as claimed in claim 1, wherein component A is at least one selected from the group consisting of dye compounds of formulae (I-1)~(I-28) and (I-48)~(I-55) and alkali metal salts thereof;

component B is at least one selected from the group consisting of dye compounds of formulae (II-1) and (II-3) and alkali metal salts thereof, component C is at least one selected from the group consisting of dye compounds of formulae (III-1), (III-2), (III-4), (IV-1) and (IV-3) and alkali metal salts thereof;

and component D is at least one selected from the group consisting of compounds of formulae (VI-26), (VI-27), (VI-41) and (VI-42) and alkali metal salts thereof, based on the sum of the masses of components A and B, the mass percentage of component A is 5-50%, the mass percentage of component B is 50-95%, the mass of component C is 1-50% of the total mass of components A and B, and the mass of component D is 1-50% of the total mass of components A and B;

(II-1)

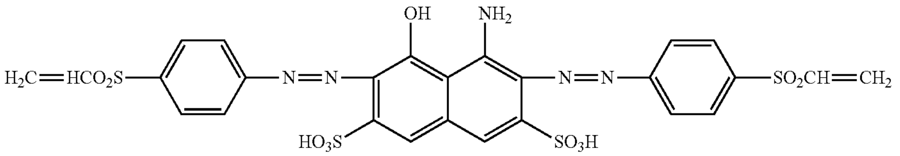

(II-3)

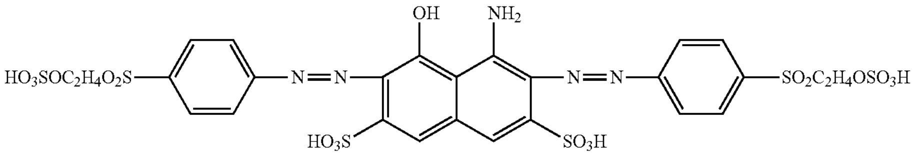

(III-1)

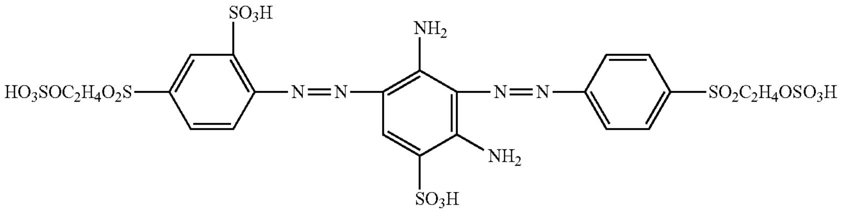

(III-2)

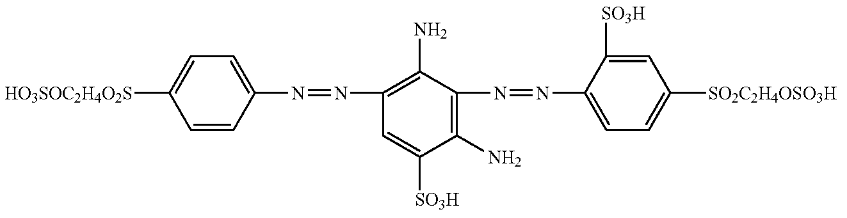

-continued
(III-4)
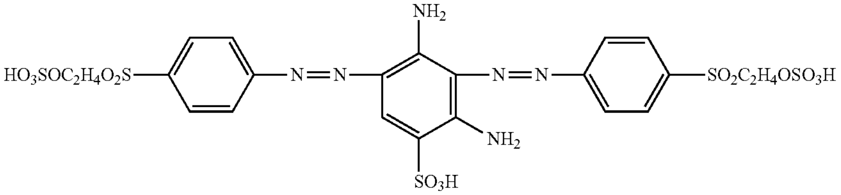
(IV-1)
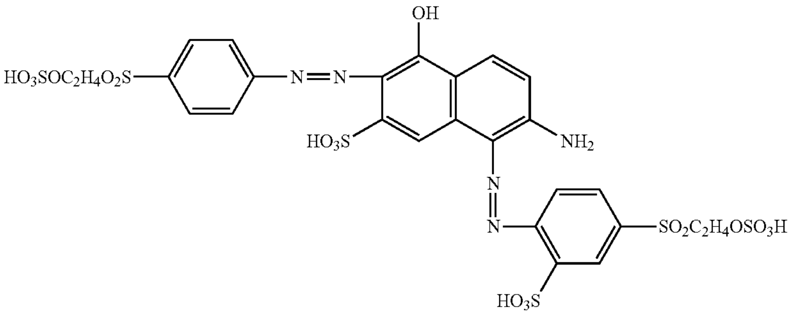
(IV-3)
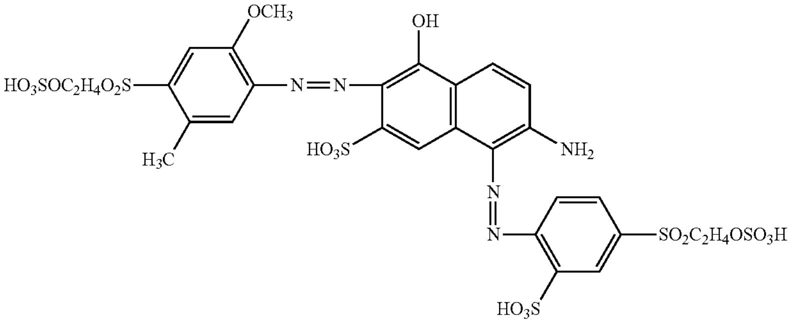
(VI-26)
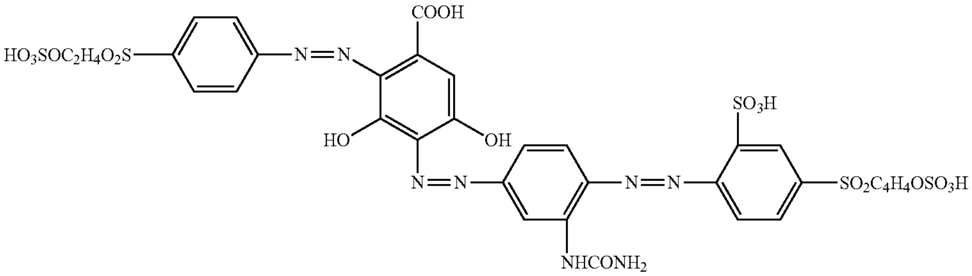
(VI-27)
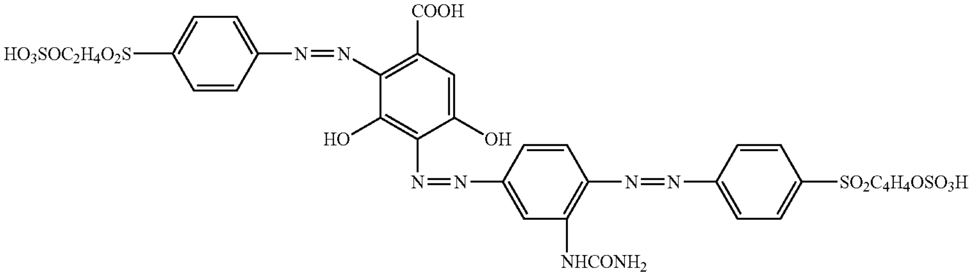

-continued (VI-41)

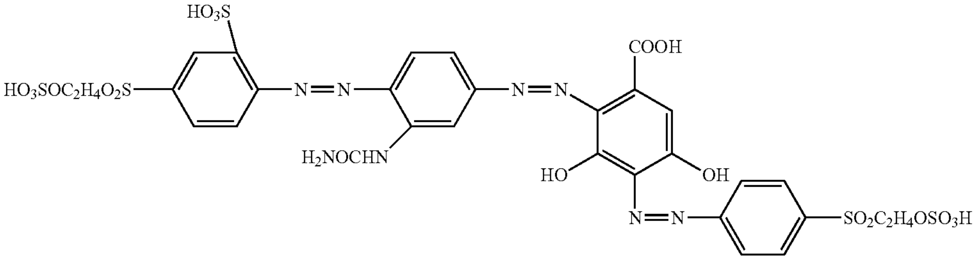

(VI-42)

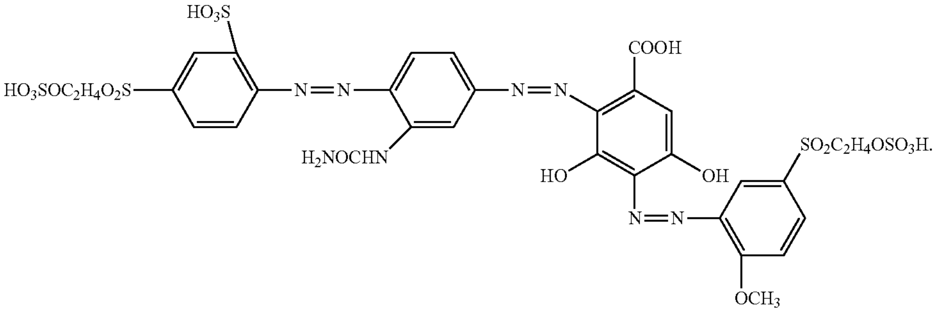

12. The reactive navy to black dye composition as claimed in claim 1, wherein the alkali metal salt is sodium salt or potassium salt.

13. The reactive navy to black dye composition as claimed in claim 1, wherein in the reactive navy to black dye composition, the dye compound of the formula (II) contains a quinohydrazone structure of the following formula (IIa), (IIa)

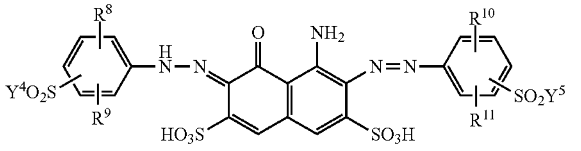

the definitions of the substituents of the above formulae (IIa) are respectively the same as those of formula (II).

14. A reactive navy to black dye product comprising the reactive navy to black dye composition as claimed in claim 1.

15. The reactive navy to black dye composition as claimed in claim 3, wherein the mass of component C is 1% to 40% of the total mass of component A and component B; and the mass of component D is 1% to 40% of the total mass of component A and component B.

16. The reactive navy to black dye composition as claimed in claim 3, wherein in formula (III):

$R^{12}$~$R^{15}$ are each independently H, methyl, methoxy, carboxyl or sulfo;

c and d are each independently 1;

each of $D^3$ and $D^4$ is independently substituted phenyl, unsubstituted phenyl, substituted naphthyl or unsubstituted naphthyl, and the number of the substituents of the substituted phenyl and the substituted naphthyl is 1-2, respectively, and each of the substituents is independently selected from the group consisting of amino, sulfo, ureido, acetylamino, methoxy and hydroxyl;

in formula (IV):

$R^{16}$~$R^{19}$ are each independently H, methyl, methoxy or sulfo;

in formula (V):

f, g and h are each independently selected from 0-3, and every $R^{20}$, $R^{21}$ and $R^{22}$ is each independently methyl, methoxy or sulfo;

in formula (VI):

$R^{23}$, $R^{24}$, $R^{26}$, $R^{27}$, $R^{29}$ and $R^{30}$ are each independently H, methyl, methoxy or sulfo;

i=0-3, and every $R^{25}$ is each independently methyl, sulfo, ureido or acetylamino;

j=0-3, and every $R^{28}$ is each independently selected from the group consisting of hydroxyl and sulfo;

$X^4$, $X^5$ and $X^6$ are each independently —$SO_2Y^{13}$;

in formula (VII):

m=1-3, and every $R^{31}$ is each independently amino, sulfo or acetylamino;

n=0-2, and every $R^{32}$ is each independently methyl, methoxy or sulfo.

17. The reactive navy to black dye composition as claimed in claim 5, wherein both $D^1$ and $D^2$ are the group of formula (a).

18. The reactive navy to black dye composition as claimed in claim 11, wherein component A is at least one selected from the group consisting of dye compounds of formulae (I-1), (I-2), (I-4), (I-5), (I-6) and (I-7) and alkali metal salts thereof.

19. The reactive navy to black dye composition as claimed in claim 12, wherein the alkali metal salt is sodium salt.

20. The reactive navy to black dye composition as claimed in claim 3, wherein in the reactive navy to black dye composition, the dye compound of the formula (II) contains a quinohydrazone structure of the following formula (IIa), the dye compound of the formula (IV) contains a quinohydrazone structure of the following formula (IVa), and the dye compound of the formula (VI) contains a quinohydrazone structure of the following formulae (VIa) and/or (VIb) and/or (VIc) and/or (VId), (IIa)
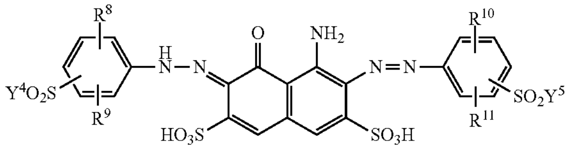
(IVa)
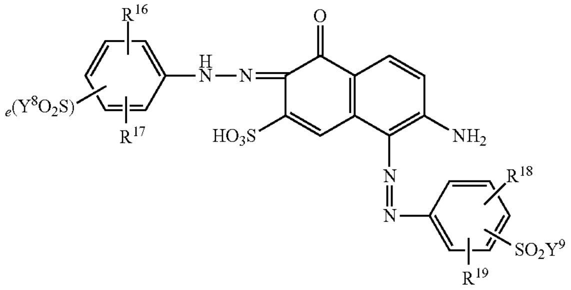
(VIa)
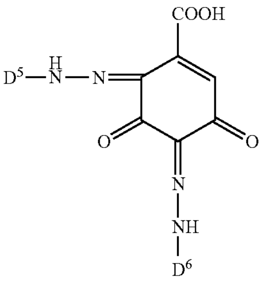
-continued
(VIb)
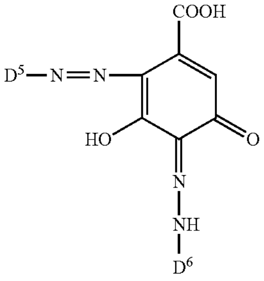
(VIc)
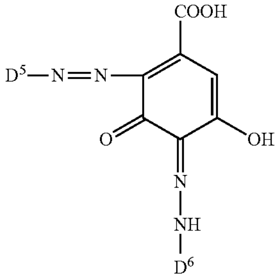
(VId)
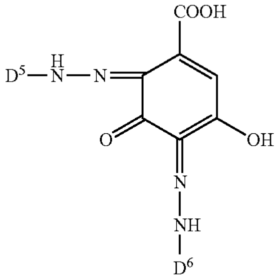
the definitions of the substitutents of the above formula (IIa) and (IVa) are respectively the same as those of formulae (II) and (IV), and the definitions of the substituents of formulae (VIa)~(VId) are the same as those of formula (VI).
* * * * *